United States Patent
Yamashita

(10) Patent No.: US 7,221,406 B2
(45) Date of Patent: May 22, 2007

(54) DATA CREATION METHOD AND DATA TRANSFER METHOD AND APPARATUS

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 776 days.

(21) Appl. No.: 10/470,284

(22) PCT Filed: Jan. 23, 2002

(86) PCT No.: PCT/JP02/00457

§ 371 (c)(1),
(2), (4) Date: Jul. 28, 2003

(87) PCT Pub. No.: WO02/062071

PCT Pub. Date: Aug. 8, 2002

(65) Prior Publication Data

US 2004/0100580 A1    May 27, 2004

(30) Foreign Application Priority Data

Jan. 30, 2001    (JP) .............................. 2001-021132

(51) Int. Cl.
| | |
|---|---|
| *H04N 7/04* | (2006.01) |
| *H04N 7/12* | (2006.01) |
| *H04N 9/64* | (2006.01) |
| *H04N 11/02* | (2006.01) |
| *H04N 11/04* | (2006.01) |

(52) U.S. Cl. .................... 348/469; 348/426.1; 348/720
(58) Field of Classification Search ............ 348/426.1, 348/469, 720; *H04N 7/04, 7/12, 9/64, 11/02, H04N 11/04*
See application file for complete search history.

(56) References Cited

U.S. PATENT DOCUMENTS 4,698,809 A * 10/1987 Munter ........................ 714/746

(Continued)

FOREIGN PATENT DOCUMENTS

JP          5-95566          4/1993

(Continued)

OTHER PUBLICATIONS

SMPTE Standard for Television-1920*1080 Scanning and Analog and Parallel Digital Interfaces for Multiple Picture Rates (SMPTE 274), The Society of Motion Picture and Television Engineers, 1998, pp. 1-24 (particularly, p. 7, columns 7, 10).

(Continued)

*Primary Examiner*—Brian P. Yenke
(74) *Attorney, Agent, or Firm*—Frommer Lawrence & Haug LLP; William S. Frommer

(57) ABSTRACT

A method of producing digital data, which comprises the steps of making first arrangements for 12-bit word digital data constituting a digital video signal, which include a frame rate of 24 Hz, 25 Hz, 30 Hz, 50 Hz or 60 Hz, 1125 lines per frame, 1080 active lines per frame, a sampling frequency of 74.25 MHz or 148.5 MHz and 1920 or 1280 active data samples per line, making second arrangements for the 12-bit word digital data, in which 12-bit codes each containing an upper 8-bit portion representing 00h or FFh (h indicates a hexadecimal number) are predetermined to be forbidden code for each active line, and forming the 12-bit word digital data constituting the digital video signal in accordance with the first and second arrangements.

88 Claims, 56 Drawing Sheets

| DATA | ACTIVE DATA SAMPLES/L | ALS/FRAME | FRAME RATA (Hz) | SAMPLING FREQUENCY (MHz) | BITS/WORD | FORBIDDEN CODE |
|---|---|---|---|---|---|---|
| DA12: 1080/24P/4:2:2/12 | 1920 | 1080 | 24 | 74.25 | | |
| DB12: 1080/25P/4:2:2/12 | 1920 | 1080 | 25 | 74.25 | | |
| DC12: 1080/30P/4:2:2/12 | 1920 | 1080 | 30 | 74.25 | | |
| DD12: 1080/60P/4:2:2/12 | 1920 | 1080 | 60 | 148.5 | | |
| DE12: 1080/50P/4:2:2/12 | 1920 | 1080 | 50 | 148.5 | 12 BITS | 000h~00Fh FF0h~FFFh |
| DF12: 1080/24P/4:4:4/12 | 1920 | 1080 | 24 | 74.25 | | |
| DG12: 1080/25P/4:4:4/12 | 1920 | 1080 | 25 | 74.25 | | |
| DH12: 1080/30P/4:4:4/12 | 1920 | 1080 | 30 | 74.25 | | |
| DI12: 1080/60P/4:4:4/12 | 1920 | 1080 | 60 | 148.5 | | |
| DJ12: 1080/50P/4:4:4/12 | 1920 | 1080 | 50 | 148.5 | | |

*P : PROGRESSIVE TYPE    *L : LINE    *AL: ACTIVE LINE

U.S. PATENT DOCUMENTS

| | | | |
|---|---|---|---|
| 5,487,019 A * | 1/1996 | Ueta et al. | 710/66 |
| 6,618,095 B1 * | 9/2003 | Takeuchi et al. | 348/476 |
| 6,914,637 B1 * | 7/2005 | Wolf et al. | 348/473 |
| 7,088,398 B1 * | 8/2006 | Wolf et al. | 348/423.1 |
| 2004/0073725 A1 * | 4/2004 | Yamashita | 710/65 |
| 2005/0122335 A1 * | 6/2005 | MacInnis et al. | 345/520 |

FOREIGN PATENT DOCUMENTS

| | | |
|---|---|---|
| JP | 9-8810 | 1/1997 |
| JP | 2000-151423 | 5/2000 |

OTHER PUBLICATIONS

SMPTE Standard for Television-1280*720 Scanning Analog and Digital Representation and Analog Interface (SMPTE 296M), The Society of Motion Picture and Television Engineers, 1997, pp. 1-14 (particularly, p. 5, columns 7, 10).

1125/60 Hoshiki HDTV Shingo no Bit Chokuretsu Interface, Kikaku (BTAS-004), Hoso Gijutsu Kaihatsu Kyogikai, 1995, pp. 1-22 No translation.

* cited by examiner

FIG. 4

| BITS/WORD | FORBIDDEN CODE | | |
|---|---|---|---|
| 12 BITS | 000h~00Fh : | MSB 0000 0000 0000 ~ LSB 0000 0000 0000 | MSB 0000 0000 0000 ~ LSB 0000 0000 1111 |
| | FF0h~FFFh : | MSB 1111 1111 0000 ~ LSB | MSB 1111 1111 1111 ~ LSB 1111 1111 1111 |
| 14 BITS | 0000h~003Fh : | MSB 00 0000 0000 0000 ~ LSB | MSB 00 0000 0011 1111 ~ LSB |
| | 3FC0h~FFFFh : | MSB 11 1111 1100 0000 ~ LSB | MSB 11 1111 1111 1111 ~ LSB |
| 16 BITS | 0000h~00FFh : | MSB 0000 0000 0000 0000 ~ LSB | MSB 0000 0000 1111 1111 ~ LSB |
| | FF00h~FFFFh : | MSB 1111 1111 0000 0000 ~ LSB | MSB 1111 1111 1111 1111 ~ LSB |

\* h INDICATES HEXADECIMAL NUMBER

FIG. 6

| DATA | ACTIVE DATA SAMPLES/L | ALS/FRAME | FRAME RATA (Hz) | SAMPLING FREQUENCY (MHz) | BITS/WORD | FORBIDDEN CODE |
|---|---|---|---|---|---|---|
| DA12: 1080/24P/4:2:2/12 | 1920 | 1080 | 24 | 74.25 | 12 BITS | 000h~00Fh FF0h~FFFh |
| DB12: 1080/25P/4:2:2/12 | 1920 | 1080 | 25 | 74.25 | | |
| DC12: 1080/30P/4:2:2/12 | 1920 | 1080 | 30 | 74.25 | | |
| DD12: 1080/60P/4:2:2/12 | 1920 | 1080 | 60 | 148.5 | | |
| DE12: 1080/50P/4:2:2/12 | 1920 | 1080 | 50 | 148.5 | | |
| DF12: 1080/24P/4:4:4/12 | 1920 | 1080 | 24 | 74.25 | | |
| DG12: 1080/25P/4:4:4/12 | 1920 | 1080 | 25 | 74.25 | | |
| DH12: 1080/30P/4:4:4/12 | 1920 | 1080 | 30 | 74.25 | | |
| DI12: 1080/60P/4:4:4/12 | 1920 | 1080 | 60 | 148.5 | | |
| DJ12: 1080/50P/4:4:4/12 | 1920 | 1080 | 50 | 148.5 | | |

*P : PROGRESSIVE TYPE
*L : LINE
*AL: ACTIVE LINE

FIG. 7

| DATA | ACTIVE DATA SAMPLES/L | ALS/FRAME | FRAME RATA (Hz) | SAMPLING FREQUENCY (MHz) | BITS/WORD | FORBIDDEN CODE |
|---|---|---|---|---|---|---|
| DA14: 1080/24P/4:2:2/14 | 1920 | 1080 | 24 | 74.25 | 14 BITS | 0000h~003Fh 3FC0h~FFFFh |
| DB14: 1080/25P/4:2:2/14 | 1920 | 1080 | 25 | 74.25 | | |
| DC14: 1080/30P/4:2:2/14 | 1920 | 1080 | 30 | 74.25 | | |
| DD14: 1080/60P/4:2:2/14 | 1920 | 1080 | 60 | 148.5 | | |
| DE14: 1080/50P/4:2:2/14 | 1920 | 1080 | 50 | 148.5 | | |

*P : PROGRESSIVE TYPE   *L : LINE   *AL: ACTIVE LINE

FIG. 8

| DATA | ACTIVE DATA SAMPLES/L | ALS/FRAME | FRAME RATA (Hz) | SAMPLING FREQUENCY (MHz) | BITS/WORD | FORBIDDEN CODE |
|---|---|---|---|---|---|---|
| DA16: 1080/24P/4:2:2/16 | 1920 | 1080 | 24 | 74.25 | 16 BITS | 0000h~00FFh FF00h~FFFFh |
| DB16: 1080/25P/4:2:2/16 | 1920 | 1080 | 25 | 74.25 | | |
| DC16: 1080/30P/4:2:2/16 | 1920 | 1080 | 30 | 74.25 | | |
| DD16: 1080/60P/4:2:2/16 | 1920 | 1080 | 60 | 148.5 | | |
| DE16: 1080/50P/4:2:2/16 | 1920 | 1080 | 50 | 148.5 | | |

*P : PROGRESSIVE TYPE   *L : LINE   *AL: ACTIVE LINE

FIG. 11

| DATA | ACTIVE DATA SAMPLES/L | ALS/FRAME | FRAME RATA (Hz) | SAMPLING FREQUENCY (MHz) | BITS/WORD |
|---|---|---|---|---|---|
| DDT12: 720/60P/4:2:2/12 | 1280 | 720 | 60 | 74.25 | 12 |
| DDT14: 720/60P/4:2:2/14 | 1280 | 720 | 60 | 74.25 | 14 |
| DDT16: 720/60P/4:2:2/16 | 1280 | 720 | 60 | 74.25 | 16 |
| DIT12: 720/60P/4:4:4/12 | 1280 | 720 | 60 | 74.25 | 12 |

*P : PROGRESSIVE TYPE   *L : LINE   *AL: ACTIVE LINE

FIG. 13A

DA12 (74.25MBps) OR DDT12 (74.25MBps)

| [Y DATA SEQUENCE] 12 bits | YD0 | YD1 | YD2 | YD3 | YD4 | YD5 | YD6 | YD7 |
|---|---|---|---|---|---|---|---|---|
| [PB/PR DATA SEQUENCE] 12 bits | PbD0 | PrD0 | PbD1 | PrD1 | PbD2 | PrD2 | PbD3 | PrD3 |

FIG. 13B

DA12A (74.25MBps) OR DDT12A (74.25MBps)
(LINK A) (LINK A)

| 10 bits | Y0;11 ~ Y0;2 | Y1;11 ~ Y1;2 | Y2;11 ~ Y2;2 | Y3;11 ~ Y3;2 | Y4;11 ~ Y4;2 | Y5;11 ~ Y5;2 | Y6;11 ~ Y6;2 | Y7;11 ~ Y7;2 |
|---|---|---|---|---|---|---|---|---|
| 10 bits | Pb0;11 ~ Pb0;2 | Pr0;11 ~ Pr0;2 | Pb1;11 ~ Pb1;2 | Pr1;11 ~ Pr1;2 | Pb2;11 ~ Pb2;2 | Pr2;11 ~ Pr2;2 | Pb3;11 ~ Pb3;2 | Pr3;11 ~ Pr3;2 |

FIG. 13C

DA12B (74.25MBps) OR DDT12B (74.25MBps)
(LINK B) (LINK B)

| 10 bits | Y0;1 ~ Y0;0 + $\alpha 0$ | Y1;1 ~ Y1;0 + $\alpha 1$ | Y2;1 ~ Y2;0 + $\alpha 2$ | Y3;1 ~ Y3;0 + $\alpha 3$ | Y4;1 ~ Y4;0 + $\alpha 4$ | Y5;1 ~ Y5;0 + $\alpha 5$ | Y6;1 ~ Y6;0 + $\alpha 6$ | Y7;1 ~ Y7;0 + $\alpha 7$ |
|---|---|---|---|---|---|---|---|---|
| 10 bits | Pb0;1 ~ Pb0;0 + $\beta 0$ | Pr0;1 ~ Pr0;0 + $\beta 1$ | Pb1;1 ~ Pb1;0 + $\beta 2$ | Pr1;1 ~ Pr1;0 + $\beta 3$ | Pb2;1 ~ Pb2;0 + $\beta 4$ | Pr2;1 ~ Pr2;0 + $\beta 5$ | Pb3;1 ~ Pb3;0 + $\beta 6$ | Pr3;1 ~ Pr3;0 + $\beta 7$ |

FIG. 14A

DA14 (74.25MBps) OR DDT14 (74.25MBps)

| [Y DATA SEQUENCE] 14 bits | YD0 | YD1 | YD2 | YD3 | YD4 | YD5 | YD6 | YD7 |
|---|---|---|---|---|---|---|---|---|
| [PB/PR DATA SEQUENCE] 14 bits | PbD0 | PrD0 | PbD1 | PrD1 | PbD2 | PrD2 | PbD3 | PrD3 |

FIG. 14B

DA14A (74.25MBps) OR DDT14A (74.25MBps)
(LINK A)            (LINK A)

| 10 bits | Y0;13 ~ Y0;4 | Y1;13 ~ Y1;4 | Y2;13 ~ Y2;4 | Y3;13 ~ Y3;4 | Y4;13 ~ Y4;4 | Y5;13 ~ Y5;4 | Y6;13 ~ Y6;4 | Y7;13 ~ Y7;4 |
|---|---|---|---|---|---|---|---|---|
| 10 bits | Pb0;13 ~ Pb0;4 | Pr0;13 ~ Pr0;4 | Pb1;13 ~ Pb1;4 | Pr1;13 ~ Pr1;4 | Pb2;13 ~ Pb2;4 | Pr2;13 ~ Pr2;4 | Pb3;13 ~ Pb3;4 | Pr3;13 ~ Pr3;4 |

FIG. 14C

DA14B (74.25MBps) OR DDT14B (74.25MBps)
(LINK B)            (LINK B)

| 10 bits | Y0;3 ~ Y0;0 + $\alpha 0$ | Y1;3 ~ Y1;0 + $\alpha 1$ | Y2;3 ~ Y2;0 + $\alpha 2$ | Y3;3 ~ Y3;0 + $\alpha 3$ | Y4;3 ~ Y4;0 + $\alpha 4$ | Y5;3 ~ Y5;0 + $\alpha 5$ | Y6;3 ~ Y6;0 + $\alpha 6$ | Y7;3 ~ Y7;0 + $\alpha 7$ |
|---|---|---|---|---|---|---|---|---|
| 10 bits | Pb0;3 ~ Pb0;0 + $\beta 0$ | Pr0;3 ~ Pr0;0 + $\beta 1$ | Pb1;3 ~ Pb1;0 + $\beta 2$ | Pr1;3 ~ Pr1;0 + $\beta 3$ | Pb2;3 ~ Pb2;0 + $\beta 4$ | Pr2;3 ~ Pr2;0 + $\beta 5$ | Pb3;3 ~ Pb3;0 + $\beta 6$ | Pr3;3 ~ Pr3;0 + $\beta 7$ |

FIG. 15A

DA16 (74.25MBps) OR DDT16 (74.25MBps)

| [Y DATA SEQUENCE] 16 bits | YD0 | YD1 | YD2 | YD3 | YD4 | YD5 | YD6 | YD7 |
|---|---|---|---|---|---|---|---|---|
| [Pb/Pr DATA SEQUENCE] 16 bits | PbD0 | PrD0 | PbD1 | PrD1 | PbD2 | PrD2 | PbD3 | PrD3 |

FIG. 15B

DA16A (74.25MBps)   OR   DDT16A (74.25MBps)
(LINK A)                 (LINK A)

| 10 bits | Y0;15 ~ Y0;6 | Y1;15 ~ Y1;6 | Y2;15 ~ Y2;6 | Y3;15 ~ Y3;6 | Y4;15 ~ Y4;6 | Y5;15 ~ Y5;6 | Y6;15 ~ Y6;6 | Y7;15 ~ Y7;6 |
|---|---|---|---|---|---|---|---|---|
| 10 bits | Pb0;15 ~ Pb0;6 | Pr0;15 ~ Pr0;6 | Pb1;15 ~ Pb1;6 | Pr1;15 ~ Pr1;6 | Pb2;15 ~ Pb2;6 | Pr2;15 ~ Pr2;6 | Pb3;15 ~ Pb3;6 | Pr3;15 ~ Pr3;6 |

FIG. 15C

DA16B (74.25MBps)   OR   DDT16B (74.25MBps)
(LINK B)                 (LINK B)

| 10 bits | Y0;5 ~ Y0;0 + $\alpha 0$ | Y1;5 ~ Y1;0 + $\alpha 1$ | Y2;5 ~ Y2;0 + $\alpha 2$ | Y3;5 ~ Y3;0 + $\alpha 3$ | Y4;5 ~ Y4;0 + $\alpha 4$ | Y5;5 ~ Y5;0 + $\alpha 5$ | Y6;5 ~ Y6;0 + $\alpha 6$ | Y7;5 ~ Y7;0 + $\alpha 7$ |
|---|---|---|---|---|---|---|---|---|
| 10 bits | Pb0;5 ~ Pb0;0 + $\beta 0$ | Pr0;5 ~ Pr0;0 + $\beta 1$ | Pb1;5 ~ Pb1;0 + $\beta 2$ | Pr1;5 ~ Pr1;0 + $\beta 3$ | Pb2;5 ~ Pb2;0 + $\beta 4$ | Pr2;5 ~ Pr2;0 + $\beta 5$ | Pb3;5 ~ Pb3;0 + $\beta 6$ | Pr3;5 ~ Pr3;0 + $\beta 7$ |

FIG. 16

DF12 (74.25MBps) OR DIT12 (74.25MBps)

| [G DATA SEQUENCE] 12 bits | GD0 | GD1 | GD2 | GD3 | GD4 | GD5 | GD6 | GD7 |
|---|---|---|---|---|---|---|---|---|
| [B DATA SEQUENCE] 12 bits | BD0 | BD1 | BD2 | BD3 | BD4 | BD5 | BD6 | BD7 |
| [R DATA SEQUENCE] 12 bits | RD0 | RD1 | RD2 | RD3 | RD4 | RD5 | RD6 | RD7 |

FIG. 17

10-BIT WORD GROUP 1

| 10 bits | G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
|---|---|---|---|---|---|---|---|---|
| 10 bits | B0;11 ~ B0;2 | B1;11 ~ B1;2 | B2;11 ~ B2;2 | B3;11 ~ B3;2 | B4;11 ~ B4;2 | B5;11 ~ B5;2 | B6;11 ~ B6;2 | B7;11 ~ B7;2 |
| 10 bits | R0;11 ~ R0;2 | R1;11 ~ R1;2 | R2;11 ~ R2;2 | R3;11 ~ R3;2 | R4;11 ~ R4;2 | R5;11 ~ R5;2 | R6;11 ~ R6;2 | R7;11 ~ R7;2 |
| 10 bits | GBR0 (0~1) + $\gamma 0$ | GBR1 (0~1) + $\gamma 1$ | GBR2 (0~1) + $\gamma 2$ | GBR3 (0~1) + $\gamma 3$ | GBR4 (0~1) + $\gamma 4$ | GBR5 (0~1) + $\gamma 5$ | GBR6 (0~1) + $\gamma 6$ | GBR7 (0~1) + $\gamma 7$ |

10-BIT WORD GROUP 2

FIG. 18A

DF12A (74.25MBps) OR DIT12A (74.25MBps)
(LINK A) (LINK A)

| | | | | | | | |
|---|---|---|---|---|---|---|---|
| G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
| B0;11 ~ B0;2 | R0;11 ~ R0;2 | B2;11 ~ B2;2 | R2;11 ~ R2;2 | B4;11 ~ B4;2 | R4;11 ~ R4;2 | B6;11 ~ B6;2 | R6;11 ~ R6;2 |

↕ 10 bits (each row)

FIG. 18B

DF12B (74.25MBps) OR DIT12B (74.25MBps)
(LINK B) (LINK B)

| | | | | | | | |
|---|---|---|---|---|---|---|---|
| GBR0 (0~1) + γ0 | GBR1 (0~1) + γ1 | GBR2 (0~1) + γ2 | GBR3 (0~1) + γ3 | GBR4 (0~1) + γ4 | GBR5 (0~1) + γ5 | GBR6 (0~1) + γ6 | GBR7 (0~1) + γ7 |
| B1;11 ~ B1;2 | R1;11 ~ R1;2 | B3;11 ~ B3;2 | R3;11 ~ R3;2 | B5;11 ~ B5;2 | R5;11 ~ R5;2 | B7;11 ~ B7;2 | R7;11 ~ R7;2 |

FIG. 19

DVA10+DKA10 OR DDT10+DKD10
(74.25MBps) (74.25MBps)

| | | | | | | | | |
|---|---|---|---|---|---|---|---|---|
| [Y DATA SEQUENCE] 10 bits | YD0 | YD1 | YD2 | YD3 | YD4 | YD5 | YD6 | YD7 |
| [PB/PR DATA SEQUENCE] 10 bits | PbD0 | PrD0 | PbD1 | PrD1 | PbD2 | PrD2 | PbD3 | PrD3 |
| [KEY SIGNAL DATA SEQUENCE] 10 bits | AD0 | AD1 | AD2 | AD3 | AD4 | AD5 | AD6 | AD7 |

FIG. 22

| | | | | | | | |
|---|---|---|---|---|---|---|---|
| GD0 | GD1 | GD2 | GD3 | GD4 | GD5 | GD6 | GD7 |
| BD0 | BD1 | BD2 | BD3 | BD4 | BD5 | BD6 | BD7 |
| RD0 | RD1 | RD2 | RD3 | RD4 | RD5 | RD6 | RD7 |
| AD0 | AD1 | AD2 | AD3 | AD4 | AD5 | AD6 | AD7 |

10-BIT WORD GROUP1 1 (top), 10-BIT WORD GROUP 2 (bottom), each row 10 bits

FIG. 23

DVB10A (74.25MBps) OR DVIT10A (74.25MBps)
(LINK A)                (LINK A)

| GD0 | GD1 | GD2 | GD3 | GD4 | GD5 | GD6 | GD7 |
|---|---|---|---|---|---|---|---|
| BD0 | RD0 | BD2 | RD2 | BD4 | RD4 | BD6 | RD6 |

DVB10B (74.25MBps) OR DVIT10B (74.25MBps)
(LINK B)                (LINK B)

| AD0 | AD1 | AD2 | AD3 | AD4 | AD5 | AD6 | AD7 |
|---|---|---|---|---|---|---|---|
| BD1 | RD1 | BD3 | RD3 | BD5 | RD5 | BD7 | RD7 |

FIG. 24

DVA12+DKA12   OR   DDT12+DKD12
(74.25MBps)              (74.25MBps)

| [Y DATA SEQUENCE] 12 bits | YD0 | YD1 | YD2 | YD3 | YD4 | YD5 | YD6 | YD7 |
|---|---|---|---|---|---|---|---|---|
| [PB/PR DATA SEQUENCE] 12 bits | PbD0 | PrD0 | PbD1 | PrD1 | PbD2 | PrD2 | PbD3 | PrD3 |
| [KEY SIGNAL DATA SEQUENCE] 12 bits | AD0 | AD1 | AD2 | AD3 | AD4 | AD5 | AD6 | AD7 |

FIG. 25

DVA12A (74.25MBps)   OR   DVDT12A (74.25MBps)
(LINK A)                           (LINK A)

| 10 bits | Y0; 2-11 | Y1; 2-11 | Y2; 2-11 | Y3; 2-11 | Y4; 2-11 | Y5; 2-11 | Y6; 2-11 | Y7; 2-11 |
|---|---|---|---|---|---|---|---|---|
| 10 bits | Pb0; 2-11 | Pr0; 2-11 | Pb1; 2-11 | Pr1; 2-11 | Pb2; 2-11 | Pr2; 2-11 | Pb3; 2-11 | Pr3; 2-11 |

DVA12B (74.25MBps)   OR   DVDT12B (74.25MBps)
(LINK B)                           (LINK B)

| 10 bits | [YA0BR0; 0-1] + a0 | [Y1;0-1, A1; 0-1] + b0 | [YA2BR1; 0-1] + a1 | [Y3;0-1, A3; 0-1] + b1 | [YA4BR2; 0-1] + a2 | [Y5;0-1, A5; 0-1] + b2 | [YA6BR3; 0-1] + a3 | [Y7;0-1, A7; 0-1] + b3 |
|---|---|---|---|---|---|---|---|---|
| 10 bits | A0; 2-11 | A1; 2-11 | A2; 2-11 | A3; 2-11 | A4; 2-11 | A5; 2-11 | A6; 2-11 | A7; 2-11 |

DVA12A (74.25MBps) OR DVDT12A (74.25MBps)
(LINK A)               (LINK A)

| Y0; 2-11 | Y1; 2-11 | Y2; 2-11 | Y3; 2-11 | Y4; 2-11 | Y5; 2-11 | Y6; 2-11 | Y7; 2-11 |
|---|---|---|---|---|---|---|---|
| Pb0; 2-11 | Pr0; 2-11 | Pb1; 2-11 | Pr1; 2-11 | Pb2; 2-11 | Pr2; 2-11 | Pb3; 2-11 | Pr3; 2-11 |

↕ 10 bits / ↕ 10 bits

DVA12B (74.25MBps) OR DVDT12B (74.25MBps)
(LINK B)               (LINK B)

| [Y0; 0-1] + c0 | [Y1; 0-1] + c1 | [Y2; 0-1] + c2 | [Y3; 0-1] + c3 | [Y4; 0-1] + c4 | [Y5; 0-1] + c5 | [Y6; 0-1] + c6 | [Y7; 0-1] + c7 |
|---|---|---|---|---|---|---|---|
| [Pb0; 0-1] + d0 | [Pr0; 0-1] + d1 | [Pb1; 0-1] + d2 | [Pr1; 0-1] + d3 | [Pb2; 0-1] + d4 | [Pr2; 0-1] + d5 | [Pb3; 0-1] + d6 | [Pr3; 0-1] + d7 |

DVA12C (74.25MBps) OR DVDT12C (74.25MBps)
(LINK C)               (LINK C)

| A0; 2-11 | A1; 2-11 | A2; 2-11 | A3; 2-11 | A4; 2-11 | A5; 2-11 | A6; 2-11 | A7; 2-11 |
|---|---|---|---|---|---|---|---|
| [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

FIG. 30

DVA12A (74.25MBps) OR DVDT12A (74.25MBps)
(LINK A)                              (LINK A)

| | | | | | | | |
|---|---|---|---|---|---|---|---|
| Y0; 2-11 | Y1; 2-11 | Y2; 2-11 | Y3; 2-11 | Y4; 2-11 | Y5; 2-11 | Y6; 2-11 | Y7; 2-11 |
| Pb0; 2-11 | Pr0; 2-11 | Pb1; 2-11 | Pr1; 2-11 | Pb2; 2-11 | Pr2; 2-11 | Pb3; 2-11 | Pr3; 2-11 |

(10 bits each row)

DVA12B (74.25MBps) OR DVDT12B (74.25MBps)
(LINK B)                              (LINK B)

| | | | | | | | |
|---|---|---|---|---|---|---|---|
| [Y0BR0; 0-1] + d0 | [Y1;0-1] + e0 | [Y2BR1; 0-1] + d1 | [Y3;0-1] + e1 | [Y4BR2; 0-1] + d2 | [Y5;0-1] + e2 | [Y6BR3; 0-1] + d3 | [Y7;0-1] + e3 |
| αD0 | αD1 | αD2 | αD3 | αD4 | αD5 | αD6 | αD7 |

(10 bits each row)

DVA12C (74.25MBps) OR DVDT12C (74.25MBps)
(LINK C)                              (LINK C)

| | | | | | | | |
|---|---|---|---|---|---|---|---|
| A0; 2-11 | A1; 2-11 | A2; 2-11 | A3; 2-11 | A4; 2-11 | A5; 2-11 | A6; 2-11 | A7; 2-11 |
| [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

(10 bits each row)

DVB12+DKB12 OR DIT12+DKI12
(74.25MBps)     (74.25MBps)

| [G DATA SEQUENCE] 12 bits | GD0 | GD1 | GD2 | GD3 | GD4 | GD5 | GD6 | GD7 |
|---|---|---|---|---|---|---|---|---|
| [B DATA SEQUENCE] 12 bits | BD0 | BD1 | BD2 | BD3 | BD4 | BD5 | BD6 | BD7 |
| [R DATA SEQUENCE] 12 bits | RD0 | RD1 | RD2 | RD3 | RD4 | RD5 | RD6 | RD7 |
| [KEY SIGNAL DATA SEQUENCE] 12 bits | AD0 | AD1 | AD2 | AD3 | AD4 | AD5 | AD6 | AD7 |

FIG. 32

10-BIT WORD GROUP 1

| | | | | | | | |
|---|---|---|---|---|---|---|---|
| G0; 2-11 | G1; 2-11 | G2; 2-11 | G3; 2-11 | G4; 2-11 | G5; 2-11 | G6; 2-11 | G7; 2-11 |
| B0; 2-11 | B1; 2-11 | B2; 2-11 | B3; 2-11 | B4; 2-11 | B5; 2-11 | B6; 2-11 | B7; 2-11 |
| R0; 2-11 | R1; 2-11 | R2; 2-11 | R3; 2-11 | R4; 2-11 | R5; 2-11 | R6; 2-11 | R7; 2-11 |
| [GBR0; 0-1] + f0 | [GBR1; 0-1] + f1 | [GBR2; 0-1] + f2 | [GBR3; 0-1] + f3 | [GBR4; 0-1] + f4 | [GBR5; 0-1] + f5 | [GBR6; 0-1] + f6 | [GBR7; 0-1] + f7 |

10-BIT WORD GROUP 2

[GBRn; 0-1]
⇩
Gn; 0-1
Bn; 0-1
Rn; 0-1
(n = 0, 1, 2, 3, ·········)

FIG. 33

DVB12A (74.25MBps)  OR  DVIT12A (74.25MBps)
(LINK A)                                (LINK A)

| 10 bits | G0; 2-11 | G1; 2-11 | G2; 2-11 | G3; 2-11 | G4; 2-11 | G5; 2-11 | G6; 2-11 | G7; 2-11 |
|---|---|---|---|---|---|---|---|---|
| 10 bits | B0; 2-11 | R0; 2-11 | B2; 2-11 | R2; 2-11 | B4; 2-11 | R4; 2-11 | B6; 2-11 | R6; 2-11 |

DVB12B (74.25MBps)  OR  DVIT12B (74.25MBps)
(LINK B)                                (LINK B)

| 10 bits | [GBR0; 0-1] + f0 | [GBR1; 0-1] + f1 | [GBR2; 0-1] + f2 | [GBR3; 0-1] + f3 | [GBR4; 0-1] + f4 | [GBR5; 0-1] + f5 | [GBR6; 0-1] + f6 | [GBR7; 0-1] + f7 |
|---|---|---|---|---|---|---|---|---|
| 10 bits | B1; 2-11 | R1; 2-11 | B3; 2-11 | R3; 2-11 | B5; 2-11 | R5; 2-11 | B7; 2-11 | R7; 2-11 |

DVB12C (74.25MBps)  OR  DVIT12C (74.25MBps)
(LINK C)                                (LINK C)

| 10 bits | A0; 2-11 | A1; 2-11 | A2; 2-11 | A3; 2-11 | A4; 2-11 | A5; 2-11 | A6; 2-11 | A7; 2-11 |
|---|---|---|---|---|---|---|---|---|
| 10 bits | [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

FIG. 34

DVC10+DKC10 (74.25MBps)

| [Y DATA SEQUENCE] 10 bits | YD0 | YD1 | YD2 | YD3 | YD4 | YD5 | YD6 | YD7 |
|---|---|---|---|---|---|---|---|---|
| [PB/PR DATA SEQUENCE] 10 bits | PbD0 | PrD0 | PbD1 | PrD1 | PbD2 | PrD2 | PbD3 | PrD3 |
| [KEY SIGNAL DATA SEQUENCE] 10 bits | AD0 | AD1 | AD2 | AD3 | AD4 | AD5 | AD6 | AD7 |

FIG. 35

DVC10A (74.25MBps) (LINK A)

| [Y DATA SEQUENCE] 10 bits | YD0 | YD1 | YD2 | YD3 | YD4 | YD5 | YD6 | YD7 |
|---|---|---|---|---|---|---|---|---|
| [PB/PR DATA SEQUENCE] 10 bits | PbD0 | PrD0 | PbD1 | PrD1 | PbD2 | PrD2 | PbD3 | PrD3 |

DVC10B (74.25MBps) (LINK B)

| [Y DATA SEQUENCE] 10 bits | YD0 | YD1 | YD2 | YD3 | YD4 | YD5 | YD6 | YD7 |
|---|---|---|---|---|---|---|---|---|
| [PB/PR DATA SEQUENCE] 10 bits | PbD0 | PrD0 | PbD1 | PrD1 | PbD2 | PrD2 | PbD3 | PrD3 |

DVC10C (74.25MBps) (LINK C)

| [KEY SIGNAL DATA SEQUENCE] 10 bits | γ0 | AD1 | γ1 | AD3 | γ2 | AD5 | γ3 | AD7 |
|---|---|---|---|---|---|---|---|---|
| 10 bits | β0 | AD0 | β1 | AD2 | β2 | AD4 | β3 | AD6 |

FIG. 40

DD12 (148.5MBps)

| [Y DATA SEQUENCE] 12 bits | YD0 | YD1 | YD2 | YD3 | YD4 | YD5 | YD6 | YD7 |
|---|---|---|---|---|---|---|---|---|
| [PB/PR DATA SEQUENCE] 12 bits | PbD0 | PrD0 | PbD1 | PrD1 | PbD2 | PrD2 | PbD3 | PrD3 |

FIG. 41A

DD12A (74.25MBps) (LINK A)

| [Y DATA SEQUENCE] 12 bits | YD0 | YD1 | YD2 | YD3 | YD4 | YD5 | YD6 | YD7 |
|---|---|---|---|---|---|---|---|---|
| [PB/PR DATA SEQUENCE] 12 bits | PbD0 | PrD0 | PbD1 | PrD1 | PbD2 | PrD2 | PbD3 | PrD3 |

FIG. 41B

DD12B (74.25MBps) (LINK B)

| [Y DATA SEQUENCE] 12 bits | YD0 | YD1 | YD2 | YD3 | YD4 | YD5 | YD6 | YD7 |
|---|---|---|---|---|---|---|---|---|
| [PB/PR DATA SEQUENCE] 12 bits | PbD0 | PrD0 | PbD1 | PrD1 | PbD2 | PrD2 | PbD3 | PrD3 |

FIG. 42A  DD12A1 (74.25MBps) (LINK A-1)

| | | | | | | | |
|---|---|---|---|---|---|---|---|
| Y0;11 ~ Y0;2 | Y1;11 ~ Y1;2 | Y2;11 ~ Y2;2 | Y3;11 ~ Y3;2 | Y4;11 ~ Y4;2 | Y5;11 ~ Y5;2 | Y6;11 ~ Y6;2 | Y7;11 ~ Y7;2 |
| Pb0;11 ~ Pb0;2 | Pr0;11 ~ Pr0;2 | Pb1;11 ~ Pb1;2 | Pr1;11 ~ Pr1;2 | Pb2;11 ~ Pb2;2 | Pr2;11 ~ Pr2;2 | Pb3;11 ~ Pb3;2 | Pr3;11 ~ Pr3;2 |

(10 bits / 10 bits)

FIG. 42B  DD12A2 (74.25MBps) (LINK A-2)

| | | | | | | | |
|---|---|---|---|---|---|---|---|
| Y0;1 ~ Y0;0 + α0 | Y1;1 ~ Y1;0 + α1 | Y2;1 ~ Y2;0 + α2 | Y3;1 ~ Y3;0 + α3 | Y4;1 ~ Y4;0 + α4 | Y5;1 ~ Y5;0 + α5 | Y6;1 ~ Y6;0 + α6 | Y7;1 ~ Y7;0 + α7 |
| Pb0;1 ~ Pb0;0 + β0 | Pr0;1 ~ Pr0;0 + β1 | Pb1;1 ~ Pb1;0 + β2 | Pr1;1 ~ Pr1;0 + β3 | Pb2;1 ~ Pb2;0 + β4 | Pr2;1 ~ Pr2;0 + β5 | Pb3;1 ~ Pb3;0 + β6 | Pr3;1 ~ Pr3;0 + β7 |

(10 bits / 10 bits)

FIG. 43A  DD12B1 (74.25MBps) (LINK B-1)

| | | | | | | | |
|---|---|---|---|---|---|---|---|
| Y0;11 ~ Y0;2 | Y1;11 ~ Y1;2 | Y2;11 ~ Y2;2 | Y3;11 ~ Y3;2 | Y4;11 ~ Y4;2 | Y5;11 ~ Y5;2 | Y6;11 ~ Y6;2 | Y7;11 ~ Y7;2 |
| Pb0;11 ~ Pb0;2 | Pr0;11 ~ Pr0;2 | Pb1;11 ~ Pb1;2 | Pr1;11 ~ Pr1;2 | Pb2;11 ~ Pb2;2 | Pr2;11 ~ Pr2;2 | Pb3;11 ~ Pb3;2 | Pr3;11 ~ Pr3;2 |

(10 bits / 10 bits)

FIG. 43B  DD12B2 (74.25MBps) (LINK B-2)

| | | | | | | | |
|---|---|---|---|---|---|---|---|
| Y0;1 ~ Y0;0 + α0 | Y1;1 ~ Y1;0 + α1 | Y2;1 ~ Y2;0 + α2 | Y3;1 ~ Y3;0 + α3 | Y4;1 ~ Y4;0 + α4 | Y5;1 ~ Y5;0 + α5 | Y6;1 ~ Y6;0 + α6 | Y7;1 ~ Y7;0 + α7 |
| Pb0;1 ~ Pb0;0 + β0 | Pr0;1 ~ Pr0;0 + β1 | Pb1;1 ~ Pb1;0 + β2 | Pr1;1 ~ Pr1;0 + β3 | Pb2;1 ~ Pb2;0 + β4 | Pr2;1 ~ Pr2;0 + β5 | Pb3;1 ~ Pb3;0 + β6 | Pr3;1 ~ Pr3;0 + β7 |

(10 bits / 10 bits)

FIG. 44

DD14 (148.5MBps)

| [Y DATA SEQUENCE] 14 bits | YD0 | YD1 | YD2 | YD3 | YD4 | YD5 | YD6 | YD7 |
|---|---|---|---|---|---|---|---|---|
| [PB/PR DATA SEQUENCE] 14 bits | PbD0 | PrD0 | PbD1 | PrD1 | PbD2 | PrD2 | PbD3 | PrD3 |

FIG. 45A

DD14A (74.25MBps) (LINK A)

| [Y DATA SEQUENCE] 14 bits | YD0 | YD1 | YD2 | YD3 | YD4 | YD5 | YD6 | YD7 |
|---|---|---|---|---|---|---|---|---|
| [PB/PR DATA SEQUENCE] 14 bits | PbD0 | PrD0 | PbD1 | PrD1 | PbD2 | PrD2 | PbD3 | PrD3 |

FIG. 45B

DD14B (74.25MBps) (LINK B)

| [Y DATA SEQUENCE] 14 bits | YD0 | YD1 | YD2 | YD3 | YD4 | YD5 | YD6 | YD7 |
|---|---|---|---|---|---|---|---|---|
| [PB/PR DATA SEQUENCE] 14 bits | PbD0 | PrD0 | PbD1 | PrD1 | PbD2 | PrD2 | PbD3 | PrD3 |

FIG. 46A      DD14A1 (74.25MBps) (LINK A-1)

| 10 bits | Y0;13 ~ Y0;4 | Y1;13 ~ Y1;4 | Y2;13 ~ Y2;4 | Y3;13 ~ Y3;4 | Y4;13 ~ Y4;4 | Y5;13 ~ Y5;4 | Y6;13 ~ Y6;4 | Y7;13 ~ Y7;4 |
|---|---|---|---|---|---|---|---|---|
| 10 bits | Pb0;13 ~ Pb0;4 | Pr0;13 ~ Pr0;4 | Pb1;13 ~ Pb1;4 | Pr1;13 ~ Pr1;4 | Pb2;13 ~ Pb2;4 | Pr2;13 ~ Pr2;4 | Pb3;13 ~ Pb3;4 | Pr3;13 ~ Pr3;4 |

FIG. 46B      DD14A2 (74.25MBps) (LINK A-2)

| 10 bits | Y0;3 ~ Y0;0 + $\alpha 0$ | Y1;3 ~ Y1;0 + $\alpha 1$ | Y2;3 ~ Y2;0 + $\alpha 2$ | Y3;3 ~ Y3;0 + $\alpha 3$ | Y4;3 ~ Y4;0 + $\alpha 4$ | Y5;3 ~ Y5;0 + $\alpha 5$ | Y6;3 ~ Y6;0 + $\alpha 6$ | Y7;3 ~ Y7;0 + $\alpha 7$ |
|---|---|---|---|---|---|---|---|---|
| 10 bits | Pb0;3 ~ Pb0;0 + $\beta 0$ | Pr0;3 ~ Pr0;0 + $\beta 1$ | Pb1;3 ~ Pb1;0 + $\beta 2$ | Pr1;3 ~ Pr1;0 + $\beta 3$ | Pb2;3 ~ Pb2;0 + $\beta 4$ | Pr2;3 ~ Pr2;0 + $\beta 5$ | Pb3;3 ~ Pb3;0 + $\beta 6$ | Pr3;3 ~ Pr3;0 + $\beta 7$ |

FIG. 47A      DD14B1 (74.25MBps) (LINK B-1)

| 10 bits | Y0;13 ~ Y0;4 | Y1;13 ~ Y1;4 | Y2;13 ~ Y2;4 | Y3;13 ~ Y3;4 | Y4;13 ~ Y4;4 | Y5;13 ~ Y5;4 | Y6;13 ~ Y6;4 | Y7;13 ~ Y7;4 |
|---|---|---|---|---|---|---|---|---|
| 10 bits | Pb0;13 ~ Pb0;4 | Pr0;13 ~ Pr0;4 | Pb1;13 ~ Pb1;4 | Pr1;13 ~ Pr1;4 | Pb2;13 ~ Pb2;4 | Pr2;13 ~ Pr2;4 | Pb3;13 ~ Pb3;4 | Pr3;13 ~ Pr3;4 |

FIG. 47B      DD14B2 (74.25MBps) (LINK B-2)

| 10 bits | Y0;3 ~ Y0;0 + $\alpha 0$ | Y1;3 ~ Y1;0 + $\alpha 1$ | Y2;3 ~ Y2;0 + $\alpha 2$ | Y3;3 ~ Y3;0 + $\alpha 3$ | Y4;3 ~ Y4;0 + $\alpha 4$ | Y5;3 ~ Y5;0 + $\alpha 5$ | Y6;3 ~ Y6;0 + $\alpha 6$ | Y7;3 ~ Y7;0 + $\alpha 7$ |
|---|---|---|---|---|---|---|---|---|
| 10 bits | Pb0;3 ~ Pb0;0 + $\beta 0$ | Pr0;3 ~ Pr0;0 + $\beta 1$ | Pb1;3 ~ Pb1;0 + $\beta 2$ | Pr1;3 ~ Pr1;0 + $\beta 3$ | Pb2;3 ~ Pb2;0 + $\beta 4$ | Pr2;3 ~ Pr2;0 + $\beta 5$ | Pb3;3 ~ Pb3;0 + $\beta 6$ | Pr3;3 ~ Pr3;0 + $\beta 7$ |

FIG. 50A

DD16A1 (74.25MBps) (LINK A-1)

| 10 bits | Y0;15 ~ Y0;6 | Y1;15 ~ Y1;6 | Y2;15 ~ Y2;6 | Y3;15 ~ Y3;6 | Y4;15 ~ Y4;6 | Y5;15 ~ Y5;6 | Y6;15 ~ Y6;6 | Y7;15 ~ Y7;6 |
|---|---|---|---|---|---|---|---|---|
| 10 bits | Pb0;15 ~ Pb0;6 | Pr0;15 ~ Pr0;6 | Pb1;15 ~ Pb1;6 | Pr1;15 ~ Pr1;6 | Pb2;15 ~ Pb2;6 | Pr2;15 ~ Pr2;6 | Pb3;15 ~ Pb3;6 | Pr3;15 ~ Pr3;6 |

FIG. 50B

DD16A2 (74.25MBps) (LINK A-2)

| 10 bits | Y0;5 ~ Y0;0 + $\alpha 0$ | Y1;5 ~ Y1;0 + $\alpha 1$ | Y2;5 ~ Y2;0 + $\alpha 2$ | Y3;5 ~ Y3;0 + $\alpha 3$ | Y4;5 ~ Y4;0 + $\alpha 4$ | Y5;5 ~ Y5;0 + $\alpha 5$ | Y6;5 ~ Y6;0 + $\alpha 6$ | Y7;5 ~ Y7;0 + $\alpha 7$ |
|---|---|---|---|---|---|---|---|---|
| 10 bits | Pb0;5 ~ Pb0;0 + $\beta 0$ | Pr0;5 ~ Pr0;0 + $\beta 1$ | Pb1;5 ~ Pb1;0 + $\beta 2$ | Pr1;5 ~ Pr1;0 + $\beta 3$ | Pb2;5 ~ Pb2;0 + $\beta 4$ | Pr2;5 ~ Pr2;0 + $\beta 5$ | Pb3;5 ~ Pb3;0 + $\beta 6$ | Pr3;5 ~ Pr3;0 + $\beta 7$ |

FIG. 51A

DD16B1 (74.25MBps) (LINK B-1)

| 10 bits | Y0;15 ~ Y0;6 | Y1;15 ~ Y1;6 | Y2;15 ~ Y2;6 | Y3;15 ~ Y3;6 | Y4;15 ~ Y4;6 | Y5;15 ~ Y5;6 | Y6;15 ~ Y6;6 | Y7;15 ~ Y7;6 |
|---|---|---|---|---|---|---|---|---|
| 10 bits | Pb0;15 ~ Pb0;6 | Pr0;15 ~ Pr0;6 | Pb1;15 ~ Pb1;6 | Pr1;15 ~ Pr1;6 | Pb2;15 ~ Pb2;6 | Pr2;15 ~ Pr2;6 | Pb3;15 ~ Pb3;6 | Pr3;15 ~ Pr3;6 |

FIG. 51B

DD16B2 (74.25MBps) (LINK B-2)

| 10 bits | Y0;5 ~ Y0;0 + $\alpha 0$ | Y1;5 ~ Y1;0 + $\alpha 1$ | Y2;5 ~ Y2;0 + $\alpha 2$ | Y3;5 ~ Y3;0 + $\alpha 3$ | Y4;5 ~ Y4;0 + $\alpha 4$ | Y5;5 ~ Y5;0 + $\alpha 5$ | Y6;5 ~ Y6;0 + $\alpha 6$ | Y7;5 ~ Y7;0 + $\alpha 7$ |
|---|---|---|---|---|---|---|---|---|
| 10 bits | Pb0;5 ~ Pb0;0 + $\beta 0$ | Pr0;5 ~ Pr0;0 + $\beta 1$ | Pb1;5 ~ Pb1;0 + $\beta 2$ | Pr1;5 ~ Pr1;0 + $\beta 3$ | Pb2;5 ~ Pb2;0 + $\beta 4$ | Pr2;5 ~ Pr2;0 + $\beta 5$ | Pb3;5 ~ Pb3;0 + $\beta 6$ | Pr3;5 ~ Pr3;0 + $\beta 7$ |

FIG. 52

| | DI12 (148.5MBps) | | | | | | | |
|---|---|---|---|---|---|---|---|---|
| [G DATA SEQUENCE] 12 bits | GD0 | GD1 | GD2 | GD3 | GD4 | GD5 | GD6 | GD7 |
| [B DATA SEQUENCE] 12 bits | BD0 | BD0 | BD1 | BD1 | BD2 | BD2 | BD3 | BD3 |
| [R DATA SEQUENCE] 12 bits | RD0 | RD1 | RD2 | RD3 | RD4 | RD5 | RD6 | RD7 |

FIG. 53A

D I 12A (148.5MBps) (LINK A)

| | | | | | | | | |
|---|---|---|---|---|---|---|---|---|
| [G DATA SEQUENCE] 12 bits | GD0 | GD1 | GD2 | GD3 | GD4 | GD5 | GD6 | GD7 |
| [B DATA SEQUENCE] 12 bits | BD0 | BD0 | BD1 | BD1 | BD2 | BD2 | BD3 | BD3 |
| [R DATA SEQUENCE] 12 bits | RD0 | RD1 | RD2 | RD3 | RD4 | RD5 | RD6 | RD7 |

FIG. 53B

D I 12B (148.5MBps) (LINK B)

| | | | | | | | | |
|---|---|---|---|---|---|---|---|---|
| [G DATA SEQUENCE] 12 bits | GD0 | GD1 | GD2 | GD3 | GD4 | GD5 | GD6 | GD7 |
| [B DATA SEQUENCE] 12 bits | BD0 | BD0 | BD1 | BD1 | BD2 | BD2 | BD3 | BD3 |
| [R DATA SEQUENCE] 12 bits | RD0 | RD1 | RD2 | RD3 | RD4 | RD5 | RD6 | RD7 |

FIG. 54

10-BIT WORD GROUP 1

| | G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
|---|---|---|---|---|---|---|---|---|
| | B0;11 ~ B0;2 | B1;11 ~ B1;2 | B2;11 ~ B2;2 | B3;11 ~ B3;2 | B4;11 ~ B4;2 | B5;11 ~ B5;2 | B6;11 ~ B6;2 | B7;11 ~ B7;2 |
| | R0;11 ~ R0;2 | R1;11 ~ R1;2 | R2;11 ~ R2;2 | R3;11 ~ R3;2 | R4;11 ~ R4;2 | R5;11 ~ R5;2 | R6;11 ~ R6;2 | R7;11 ~ R7;2 |
| | GBR0 (0~1) + $\gamma 0$ | GBR1 (0~1) + $\gamma 1$ | GBR2 (0~1) + $\gamma 2$ | GBR3 (0~1) + $\gamma 3$ | GBR4 (0~1) + $\gamma 4$ | GBR5 (0~1) + $\gamma 5$ | GBR6 (0~1) + $\gamma 6$ | GBR7 (0~1) + $\gamma 7$ |

Each row: 10 bits. Left label: DI12A OR DI12B

10-BIT WORD GROUP 2

FIG. 55A

DI12A1 (74.25MBps) (LINK A-1)

| G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
|---|---|---|---|---|---|---|---|
| B0;11 ~ B0;2 | R0;11 ~ R0;2 | B2;11 ~ B2;2 | R2;11 ~ R2;2 | B4;11 ~ B4;2 | R4;11 ~ R4;2 | B6;11 ~ B6;2 | R6;11 ~ R6;2 |

FIG. 55B

DI12A2 (74.25MBps) (LINK A-2)

| GBR0 (0~1) + $\gamma 0$ | GBR1 (0~1) + $\gamma 1$ | GBR2 (0~1) + $\gamma 2$ | GBR3 (0~1) + $\gamma 3$ | GBR4 (0~1) + $\gamma 4$ | GBR5 (0~1) + $\gamma 5$ | GBR6 (0~1) + $\gamma 6$ | GBR7 (0~1) + $\gamma 7$ |
|---|---|---|---|---|---|---|---|
| B1;11 ~ B1;2 | R1;11 ~ R1;2 | B3;11 ~ B3;2 | R3;11 ~ R3;2 | B5;11 ~ B5;2 | R5;11 ~ R5;2 | B7;11 ~ B7;2 | R7;11 ~ R7;2 |

FIG. 56A

DI12B1 (74.25MBps) (LINK B-1)

| | | | | | | | |
|---|---|---|---|---|---|---|---|
| G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
| B0;11 ~ B0;2 | R0;11 ~ R0;2 | B2;11 ~ B2;2 | R2;11 ~ R2;2 | B4;11 ~ B4;2 | R4;11 ~ R4;2 | B6;11 ~ B6;2 | R6;11 ~ R6;2 |

↑10 bits↓ (each row)

FIG. 56B

DI12B2 (74.25MBps) (LINK B-2)

| | | | | | | | |
|---|---|---|---|---|---|---|---|
| GBR0 (0~1) + $\gamma 0$ | GBR1 (0~1) + $\gamma 1$ | GBR2 (0~1) + $\gamma 2$ | GBR3 (0~1) + $\gamma 3$ | GBR4 (0~1) + $\gamma 4$ | GBR5 (0~1) + $\gamma 5$ | GBR6 (0~1) + $\gamma 6$ | GBR7 (0~1) + $\gamma 7$ |
| B1;11 ~ B1;2 | R1;11 ~ R1;2 | B3;11 ~ B3;2 | R3;11 ~ R3;2 | B5;11 ~ B5;2 | R5;11 ~ R5;2 | B7;11 ~ B7;2 | R7;11 ~ R7;2 |

FIG. 57

DVD10+DKD10 (148.5MBps)

| | | | | | | | | |
|---|---|---|---|---|---|---|---|---|
| [G DATA SEQUENCE] 10 bits | GD0 | GD1 | GD2 | GD3 | GD4 | GD5 | GD6 | GD7 |
| [B DATA SEQUENCE] 10 bits | BD0 | BD1 | BD2 | BD3 | BD4 | BD5 | BD6 | BD7 |
| [R DATA SEQUENCE] 10 bits | RD0 | RD1 | RD2 | RD3 | RD4 | RD5 | RD6 | RD7 |
| [KEY SIGNAL DATA SEQUENCE] 10 bits | AD0 | AD1 | AD2 | AD3 | AD4 | AD5 | AD6 | AD7 |

FIG. 58A

DVD10A (74.25MBps) (LINK A)

| [G DATA SEQUENCE] 10 bits | GD0 | GD1 | GD2 | GD3 | GD4 | GD5 | GD6 | GD7 |
|---|---|---|---|---|---|---|---|---|
| [B DATA SEQUENCE] 10 bits | BD0 | BD1 | BD2 | BD3 | BD4 | BD5 | BD6 | BD7 |
| [R DATA SEQUENCE] 10 bits | RD0 | RD1 | RD2 | RD3 | RD4 | RD5 | RD6 | RD7 |
| [KEY SIGNAL DATA SEQUENCE] 10 bits | AD0 | AD1 | AD2 | AD3 | AD4 | AD5 | AD6 | AD7 |

FIG. 58B

DVD10B (74.25MBps) (LINK B)

| [G DATA SEQUENCE] 10 bits | GD0 | GD1 | GD2 | GD3 | GD4 | GD5 | GD6 | GD7 |
|---|---|---|---|---|---|---|---|---|
| [B DATA SEQUENCE] 10 bits | BD0 | BD1 | BD2 | BD3 | BD4 | BD5 | BD6 | BD7 |
| [R DATA SEQUENCE] 10 bits | RD0 | RD1 | RD2 | RD3 | RD4 | RD5 | RD6 | RD7 |
| [KEY SIGNAL DATA SEQUENCE] 10 bits | AD0 | AD1 | AD2 | AD3 | AD4 | AD5 | AD6 | AD7 |

FIG. 59

DVD10A1 (74.25MBps)
(LINK A-1)

| 10 bits | GD0 | GD1 | GD2 | GD3 | GD4 | GD5 | GD6 | GD7 |
|---|---|---|---|---|---|---|---|---|
| 10 bits | BD0 | RD0 | BD2 | RD2 | BD4 | RD4 | BD6 | RD6 |

DVD10A2 (74.25MBps)
(LINK A-2)

| 10 bits | AD0 | AD1 | AD2 | AD3 | AD4 | AD5 | AD6 | AD7 |
|---|---|---|---|---|---|---|---|---|
| 10 bits | BD1 | RD1 | BD3 | RD3 | BD5 | RD5 | BD7 | RD7 |

FIG. 60

DVD10B1 (74.25MBps)
(LINK B-1)

| 10 bits | GD0 | GD1 | GD2 | GD3 | GD4 | GD5 | GD6 | GD7 |
|---|---|---|---|---|---|---|---|---|
| 10 bits | BD0 | RD0 | BD2 | RD2 | BD4 | RD4 | BD6 | RD6 |

DVD10B2 (74.25MBps)
(LINK B-2)

| 10 bits | AD0 | AD1 | AD2 | AD3 | AD4 | AD5 | AD6 | AD7 |
|---|---|---|---|---|---|---|---|---|
| 10 bits | BD1 | RD1 | BD3 | RD3 | BD5 | RD5 | BD7 | RD7 |

FIG. 64

DVC12+DKC12 (148.5MBps)

| [Y DATA SEQUENCE] 12 bits | YD0 | YD1 | YD2 | YD3 | YD4 | YD5 | YD6 | YD7 |
|---|---|---|---|---|---|---|---|---|
| [P$_B$/P$_R$ DATA SEQUENCE] 12 bits | PbD0 | PrD0 | PbD1 | PrD1 | PbD2 | PrD2 | PbD3 | PrD3 |
| [KEY SIGNAL DATA SEQUENCE] 12 bits | AD0 | AD1 | AD2 | AD3 | AD4 | AD5 | AD6 | AD7 |

FIG. 65A

DVC12A (74.25MBps) (LINK A)

| | | | | | | | | |
|---|---|---|---|---|---|---|---|---|
| [Y DATA SEQUENCE] 12 bits | YD0 | YD1 | YD2 | YD3 | YD4 | YD5 | YD6 | YD7 |
| [PB/PR DATA SEQUENCE] 12 bits | PbD0 | PrD0 | PbD1 | PrD1 | PbD2 | PrD2 | PbD3 | PrD3 |
| [KEY SIGNAL DATA SEQUENCE] 12 bits | AD0 | AD1 | AD2 | AD3 | AD4 | AD5 | AD6 | AD7 |

FIG. 65B

DVC12B (74.25MBps) (LINK B)

| | | | | | | | | |
|---|---|---|---|---|---|---|---|---|
| [Y DATA SEQUENCE] 12 bits | YD0 | YD1 | YD2 | YD3 | YD4 | YD5 | YD6 | YD7 |
| [PB/PR DATA SEQUENCE] 12 bits | PbD0 | PrD0 | PbD1 | PrD1 | PbD2 | PrD2 | PbD3 | PrD3 |
| [KEY SIGNAL DATA SEQUENCE] 12 bits | AD0 | AD1 | AD2 | AD3 | AD4 | AD5 | AD6 | AD7 |

FIG. 66

DVC12A1 (74.25MBps) (LINK A-1)

| | | | | | | | |
|---|---|---|---|---|---|---|---|
| Y0; 2-11 | Y1; 2-11 | Y2; 2-11 | Y3; 2-11 | Y4; 2-11 | Y5; 2-11 | Y6; 2-11 | Y7; 2-11 |
| Pb0; 2-11 | Pr0; 2-11 | Pb1; 2-11 | Pr1; 2-11 | Pb2; 2-11 | Pr2; 2-11 | Pb3; 2-11 | Pr3; 2-11 |

↕ 10 bits (each row)

DVC12A2 (74.25MBps) (LINK A-2)

| | | | | | | | |
|---|---|---|---|---|---|---|---|
| [Y0; 0-1] + c0 | [Y1; 0-1] + c1 | [Y2; 0-1] + c2 | [Y3; 0-1] + c3 | [Y4; 0-1] + c4 | [Y5; 0-1] + c5 | [Y6; 0-1] + c6 | [Y7; 0-1] + c7 |
| [Pb0; 0-1] + d0 | [Pr0; 0-1] + d1 | [Pb1; 0-1] + d2 | [Pr1; 0-1] + d3 | [Pb2; 0-1] + d4 | [Pr2; 0-1] + d5 | [Pb3; 0-1] + d6 | [Pr3; 0-1] + d7 |

DVC12CA (74.25MBps) (LINK C-1)

| | | | | | | | |
|---|---|---|---|---|---|---|---|
| A0; 2-11 | A1; 2-11 | A2; 2-11 | A3; 2-11 | A4; 2-11 | A5; 2-11 | A6; 2-11 | A7; 2-11 |
| [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

FIG. 67

DVC12B1 (74.25MBps) (LINK B-1)

| Y0; 2-11 | Y1; 2-11 | Y2; 2-11 | Y3; 2-11 | Y4; 2-11 | Y5; 2-11 | Y6; 2-11 | Y7; 2-11 |
|---|---|---|---|---|---|---|---|
| Pb0; 2-11 | Pr0; 2-11 | Pb1; 2-11 | Pr1; 2-11 | Pb2; 2-11 | Pr2; 2-11 | Pb3; 2-11 | Pr3; 2-11 |

10 bits / 10 bits

DVC12B2 (74.25MBps) (LINK B-2)

| [Y0; 0-1] + c0 | [Y1; 0-1] + c1 | [Y2; 0-1] + c2 | [Y3; 0-1] + c3 | [Y4; 0-1] + c4 | [Y5; 0-1] + c5 | [Y6; 0-1] + c6 | [Y7; 0-1] + c7 |
|---|---|---|---|---|---|---|---|
| [Pb0; 0-1] + d0 | [Pr0; 0-1] + d1 | [Pb1; 0-1] + d2 | [Pr1; 0-1] + d3 | [Pb2; 0-1] + d4 | [Pr2; 0-1] + d5 | [Pb3; 0-1] + d6 | [Pr3; 0-1] + d7 |

10 bits / 10 bits

DVC12CB (74.25MBps) (LINK C-2)

| A0; 2-11 | A1; 2-11 | A2; 2-11 | A3; 2-11 | A4; 2-11 | A5; 2-11 | A6; 2-11 | A7; 2-11 |
|---|---|---|---|---|---|---|---|
| [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

10 bits / 10 bits

FIG. 69A

DVD12A (74.25MBps) (LINK A)

| [G DATA SEQUENCE] 12 bits | GD0 | GD1 | GD2 | GD3 | GD4 | GD5 | GD6 | GD7 |
|---|---|---|---|---|---|---|---|---|
| [B DATA SEQUENCE] 12 bits | BD0 | BD1 | BD2 | BD3 | BD4 | BD5 | BD6 | BD7 |
| [R DATA SEQUENCE] 12 bits | RD0 | RD1 | RD2 | RD3 | RD4 | RD5 | RD6 | RD7 |
| [KEY SIGNAL DATA SEQUENCE] 12 bits | AD0 | AD1 | AD2 | AD3 | AD4 | AD5 | AD6 | AD7 |

FIG. 69B

DVD12B (74.25MBps) (LINK B)

| [G DATA SEQUENCE] 12 bits | GD0 | GD1 | GD2 | GD3 | GD4 | GD5 | GD6 | GD7 |
|---|---|---|---|---|---|---|---|---|
| [B DATA SEQUENCE] 12 bits | BD0 | BD1 | BD2 | BD3 | BD4 | BD5 | BD6 | BD7 |
| [R DATA SEQUENCE] 12 bits | RD0 | RD1 | RD2 | RD3 | RD4 | RD5 | RD6 | RD7 |
| [KEY SIGNAL DATA SEQUENCE] 12 bits | AD0 | AD1 | AD2 | AD3 | AD4 | AD5 | AD6 | AD7 |

FIG. 70

DVD12A　　OR　　DVD12B
(74.25MBps)　　　　(74.25MBp)

10-BIT WORD GROUP 1

| G0; 2-11 | G1; 2-11 | G2; 2-11 | G3; 2-11 | G4; 2-11 | G5; 2-11 | G6; 2-11 | G7; 2-11 |
|---|---|---|---|---|---|---|---|
| B0; 2-11 | B1; 2-11 | B2; 2-11 | B3; 2-11 | B4; 2-11 | B5; 2-11 | B6; 2-11 | B7; 2-11 |
| R0; 2-11 | R1; 2-11 | R2; 2-11 | R3; 2-11 | R4; 2-11 | R5; 2-11 | R6; 2-11 | R7; 2-11 |
| [GBR0; 0-1] + f0 | [GBR1; 0-1] + f1 | [GBR2; 0-1] + f2 | [GBR3; 0-1] + f3 | [GBR4; 0-1] + f4 | [GBR5; 0-1] + f5 | [GBR6; 0-1] + f6 | [GBR7; 0-1] + f7 |

10-BIT WORD GROUP 2

FIG. 71

DVD12A1 (74.25MBps) (LINK A—1)

| | | | | | | | |
|---|---|---|---|---|---|---|---|
| G0; 2-11 | G1; 2-11 | G2; 2-11 | G3; 2-11 | G4; 2-11 | G5; 2-11 | G6; 2-11 | G7; 2-11 |
| B0; 2-11 | R0; 2-11 | B2; 2-11 | R2; 2-11 | B4; 2-11 | R4; 2-11 | B6; 2-11 | R6; 2-11 |

10 bits / 10 bits

DVD12A2 (74.25MBps) (LINK A—2)

| | | | | | | | |
|---|---|---|---|---|---|---|---|
| [GBR0; 0-1] + f0 | [GBR1; 0-1] + f1 | [GBR2; 0-1] + f2 | [GBR3; 0-1] + f3 | [GBR4; 0-1] + f4 | [GBR5; 0-1] + f5 | [GBR6; 0-1] + f6 | [GBR7; 0-1] + f7 |
| B1; 2-11 | R1; 2-11 | B3; 2-11 | R3; 2-11 | B5; 2-11 | R5; 2-11 | B7; 2-11 | R7; 2-11 |

10 bits / 10 bits

DVD12CA (74.25MBps) (LINK C—1)

| | | | | | | | |
|---|---|---|---|---|---|---|---|
| A0; 2-11 | A1; 2-11 | A2; 2-11 | A3; 2-11 | A4; 2-11 | A5; 2-11 | A6; 2-11 | A7; 2-11 |
| [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

10 bits / 10 bits

FIG. 72

DVD12B1 (74.25MBps) (LINK B−1)

| | | | | | | | |
|---|---|---|---|---|---|---|---|
| G0; 2-11 | G1; 2-11 | G2; 2-11 | G3; 2-11 | G4; 2-11 | G5; 2-11 | G6; 2-11 | G7; 2-11 |
| B0; 2-11 | R0; 2-11 | B2; 2-11 | R2; 2-11 | B4; 2-11 | R4; 2-11 | B6; 2-11 | R6; 2-11 |

↕ 10 bits (each row)

DVD12B2 (74.25MBps) (LINK B−2)

| | | | | | | | |
|---|---|---|---|---|---|---|---|
| [GBR0; 0-1] + f0 | [GBR1; 0-1] + f1 | [GBR2; 0-1] + f2 | [GBR3; 0-1] + f3 | [GBR4; 0-1] + f4 | [GBR5; 0-1] + f5 | [GBR6; 0-1] + f6 | [GBR7; 0-1] + f7 |
| B1; 2-11 | R1; 2-11 | B3; 2-11 | R3; 2-11 | B5; 2-11 | R5; 2-11 | B7; 2-11 | R7; 2-11 |

DVD12CB (74.25MBps) (LINK C−2)

| | | | | | | | |
|---|---|---|---|---|---|---|---|
| A0; 2-11 | A1; 2-11 | A2; 2-11 | A3; 2-11 | A4; 2-11 | A5; 2-11 | A6; 2-11 | A7; 2-11 |
| [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

US 7,221,406 B2

DATA CREATION METHOD AND DATA TRANSFER METHOD AND APPARATUS

TECHNICAL FIELD

The present invention relates to a method of producing 12-, 14- or 16-bit word digital data representing video signal information, a method of transmitting digital data for transmitting serial data obtained based on 12-, 14- or 16-bit word digital data representing video signal information, or serial data obtained based on 10-, 12-, 14- or 16-bit word digital data representing video signal information and additional information data related thereto, or an apparatus for transmitting digital data, on which the method of transmitting digital data is carried out.

TECHNICAL BACKGROUND

In the field of video signals, digitalization of video signals has been aimed for actualizing diversification in information to be transmitted, improvements in quality of images reproduced from the video signal and so on. For example, there has been proposed the High Definition Television (HDTV) system which uses a digital video signal composed of digital word sequence data representing video signal information. The digital video signal under the HDTV system (hereinafter, referred to an HD digital video signal) is formed in accordance with, for example, one of a series of standards established by the Broadcasting Technology Association (BTA) in Japan so as to be in the form of Y and $P_B/P_R$ signals or G, B and R signals. In the case of the Y and $P_B/P_R$ signals, Y represents a luminance signal and $P_B/P_R$ represent color difference signals. In the case of the G, B and R signals, G, B and R represent green, blue and red primary color signals, respectively.

The HD digital video signal produced in the form of Y and $P_B/P_R$ signals (hereinafter, referred to an HD digital video signal of the Y and $P_B/P_R$ type) is a digital television signal for interlaced scanning by which each frame picture is reproduced at a rate of 30 Hz or 30/1.001 Hz (hereinafter, the expression "30 Hz" includes both of 30 Hz and 30/1.001 Hz) with first and second field pictures. That is, the HD digital video signal of the Y and $P_B/P_R$ type for interlaced scanning has a frame rate of 30 Hz.

This HD digital video signal of the Y and $P_B/P_R$ type for interlaced scanning is formed, for example, in accordance with such data formats as shown in FIGS. 1A and 1B. The data formats shown in FIGS. 1A and 1B include a luminance signal data sequence (Y data sequence) as shown in FIG. 1A, which represents a luminance signal component of a video signal, and a color difference signal data sequence ($P_B/P_R$ data sequence) as shown in FIG. 1B, which represents color difference signal components of the video signal. Each of data words constituting the Y data sequence or the $P_B/P_R$ data sequence are composed of 10 bits. The word transmission rate of each of the Y data sequence and the $P_B/P_R$ data sequence is selected to be, for example, 74.25 MBps. A part of the Y data sequence which includes a portion corresponding to a horizontal blanking period and parts of portions corresponding to a couple of video data periods appearing before and after the horizontal blanking period in a horizontal period of the Y data sequence is shown in FIG. 1A. Similarly, a part of the $P_B/P_R$ data sequence which includes a portion corresponding to a horizontal blanking period and parts of portions corresponding to a couple of video data periods appearing before and after the horizontal blanking period in a horizontal period of the $P_B/P_R$ data sequence is shown in FIG. 1B.

In the Y data sequence, time reference code data SAV (Start of Active Video) which are composed of four 10-bit words (3FF(Y), 000(Y), 000(Y), XYZ(Y): 3FF and 000 are hexadecimal numbers and (Y) indicates a word contained in the Y data sequence) are provided just before a portion corresponding to the video data period and another time reference code data EAV (End of Active Video) which are composed of four 10-bit words (3FF(Y), 000(Y), 000(Y), XYZ(Y)) are provided just after the portion corresponding to the video data period. Similarly, in the $P_B/P_R$ data sequence, time reference code data SAV which are composed of four 10-bit words (3FF(C), 000(C), 000(C), XYZ(C): 3FF and 000 are hexadecimal numbers and (C) indicates a word contained in the $P_B/P_R$ data sequence) are provided just before a portion corresponding to the video data period and another time reference code data EAV which are composed of four 10-bit words (3FF(C), 000(C), 000(C), XYZ(C)) are provided just after the portion corresponding to the video data period. The time reference code data EAV and SAV contained in the Y data sequence are provided in a portion corresponding to the horizontal blanking period of the Y data sequence and the time reference code data EAV and SAV contained in the $P_B/P_R$ data sequence are provided in a portion corresponding to the horizontal blanking period of the $P_B/P_R$ data sequence.

Initial three 10-bit words (3FF, 000, 000) of four 10-bit words (3FF, 000, 000, XYZ), each of which is shown with (Y) or (C), are used for establishing word synchronization or line synchronization and a last one 10-bit word (XYZ) of four 10-bit words (3FF, 000, 000, XYZ) is used for discriminating the first field from the second field in each frame or for discriminating the time reference code data EAV from the time reference code data SAV.

The HD digital video signal produced in the form of G, B and R signals (hereinafter, referred to an HD digital video signal of the G, B and R type) is also a digital television signal for interlaced scanning by which each frame picture is reproduced at a rate of 30 Hz with first and second field pictures. That is, the HD digital video signal of the G, B and R type for interlaced scanning has a frame rate of 30 Hz.

This HD digital video signal of the G, B and R type for interlaced scanning is formed, for example, in accordance with such data formats as shown in FIGS. 2A, 2B and 2C. The data formats shown in FIGS. 2A, 2B and 2C include a green primary color signal data sequence (G data sequence) as shown in FIG. 2A, which represents a green primary color signal component of a video signal, a blue primary color signal data sequence (B data sequence) as shown in FIG. 2B, which represents a blue primary color signal component of the video signal, and a red primary color signal data sequence (R data sequence) as shown in FIG. 2C, which represents a red primary color signal component of the video signal. Each of data words constituting the G data sequence, the B data sequence or the R data sequence is composed of 10 bits. The word transmission rate of each of the G data sequence, the B data sequence and the R data sequence is selected to be, for example, 74.25 MBps. A part of the G data sequence which includes a portion corresponding to a horizontal blanking period and parts of portions corresponding to a couple of video data periods appearing before and after the horizontal blanking period in a horizontal period of the G data sequence is shown in FIG. 2A. Similarly, a part of the B data sequence which includes a portion corresponding to a horizontal blanking period and parts of portions corresponding to a couple of video data periods appearing before and after the horizontal blanking period in a horizontal period of the B data sequence is shown in FIG. 2B and a part of the R data sequence which includes a portion corresponding to a horizontal blanking period and parts of portions corresponding to a couple of video data periods appearing before and after the horizontal blanking period in a horizontal period of the R data sequence is shown in FIG. 2C.

In each of the G data sequence, the B data sequence and the R data sequence, time reference code data SAV which are composed of four 10-bit words (3FF(G), 000(G), 000(G), XYZ(G): 3FF and 000 are hexadecimal numbers and (G) indicates a word contained in the G data sequence), time reference code data SAV which are composed of four 10-bit words (3FF(B), 000(B), 000(B), XYZ(B): 3FF and 000 are hexadecimal numbers and (B) indicates a word contained in the B data sequence) or time reference code data SAV which are composed of four 10-bit words (3FF(R), 000(R), 000(R), XYZ(R): 3FF and 000 are hexadecimal numbers and (R) indicates a word contained in the R data sequence) are provided just before a portion corresponding to the video data period, and another time reference code data EAV which are composed of four 10-bit words (3FF(G), 000(G), 000(G), XYZ(G)), another time reference code data EAV which are composed of four 10-bit words (3FF(B), 000(B), 000(B), XYZ(B)) or another time reference code data EAV which are composed of four 10-bit words (3FF(R), 000(R)., 000(R), XYZ(R)) are provided just after the portion corresponding to the video data period. The time reference code data EAV and SAV contained in each of the G data sequence, the B data sequence and the R data sequence are provided in a portion corresponding to the horizontal blanking period of each of the G data sequence, the B data sequence and the R data sequence.

Although, under the current HDTV system, the HD digital video signal of the Y and $P_B/P_R$ type or the G, B and R type for interlaced scanning which has the frame rate of 30 Hz, as described above, is used for reproducing color pictures, there has been proposed, as an HDTV system for the next generation, another HDTV system in which an HD digital video signal of the Y and $P_B/P_R$ type or the G, B and R type for sequential scanning by which each frame picture is reproduced at a rate of 60 Hz or 60/1.001 Hz (hereinafter, the expression "60 Hz" includes both of 60 Hz and 60/1.001 Hz) without first and second field pictures. That is, the HD digital video signal of the Y and $P_B/P_R$ type or the G, B and R type for interlaced scanning has a frame rate of 60 Hz. This HD digital video signal of the Y and $P_B/P_R$ type or the G, B and R type for sequential scanning which has the frame rate of 60 Hz is usually called a progressive HD digital video signal.

Digital data constituting the progressive HD digital video signal having the frame rate of 60 Hz have been standardized in data formats in accordance with SMPTE 247M which is one of a series of standards established by the Society of Motion Picture and Television Engineers (SMPTE) in the United States. In the data formats standardized in accordance with SMPTE 247M, 1920 active data samples per line, 1080 active lines per frame, the sampling frequency of 148.5 MHz or 148.5/1.001 MHz (hereinafter, the expression "148.5 MHz" includes both of 148.5 MHz and 148.5/1.001 MHz), 8 or 10 bits for one word and so on are predetermined in addition to the frame rate of 60 Hz. Then, parallel data interface is selected to be 8 bits×2=16 bits or 10 bits×2=20 bits for data of the Y and $P_B/P_R$ type and 8 bits×3=24 bits or 10 bits×3=30 bits for data of the G, B and R type.

For such 8-bit or 10-bit digital data constituting the digital video signal as mentioned above, some forbidden codes which can not be used for representing any video signal information are predetermined. For example, the forbidden codes for 8-bit data are 00h and FFh (00 and FF are hexadecimal numbers and h indicates a hexadecimal number), that is, "0000 0000" and "1111 1111", and the forbidden codes for 10-bit data are 000~003h and 3FCh~3FF (000, 003, 3FCh and 3FF are hexadecimal numbers and h indicates a hexadecimal number), that is, "00 0000 0000"~"00 0000 0011" and "11 1111 1100"~"11 1111 1111".

Generally, in the case of the HD digital video signal of the Y and $P_B/P_R$ type, the sampling frequency of each of the $P_B$ and $P_R$ data sequences is selected to be a half of the sampling frequency of the Y data sequence. Hereinafter, as occasion demands, a digital video signal of the Y and $P_B/P_R$ type will be indicated as a digital video signal of the 4:2:2 type. On the other hands, in the case of the HD digital video signal of the G, B and R type, the respective sampling frequencies of the G, B and R data sequences are the same as one another. Hereinafter, as occasion demands, a digital video signal of the G, B and R type will be indicated as a digital video signal of the 4:4:4 type.

Apart from the HD digital video signal as described above, there has been also proposed a kind of progressive HD digital video signal which is aimed for reproducing moving pictures of a cinefilm at twenty-four frames per second with so improved quality as to be substantially equal to that of images reproduced by means of the HDTV system and so-called a D-Cinema signal. Although the D-Cinema signal is able to be obtained in the form of one of the progressive HD digital video signals, the frame rate of which is selected to be, for example, 24 Hz or 24/1.001 Hz (hereinafter, the expression "24 Hz" includes both of 24 Hz and 24/1.001 Hz) as mentioned above, the frame rate of the D-Cinema signal is selected to be not only 24 Hz but also a rate other than 24 Hz, for example, 25 Hz or 30 Hz.

Digital data constituting the digital video signal having the frame rate of 24 Hz, 25 Hz or 30 Hz have been standardized in data formats in accordance with SMPTE 247M. In such data formats standardized in accordance with SMPTE 247M, 1920 active data samples per line, 1080 active lines per frame, the sampling frequency of 74.25 MHz or 74.25/1.001 MHz (hereinafter, the expression "74.25 MHz" includes both of 74.25 MHz and 74.25/1.001 MHz), 8 or 10 bits for one word and so on are predetermined in addition to the frame rate of 24 Hz, 25 Hz or 30 Hz. Then, parallel data interface is selected to be 8 bits×2=16 bits or 10 bits×2=20 bits for data of the Y and $P_B/P_R$ type and 8 bits×3=24 bits or 10 bits×3=30 bits for data of the G, B and R type.

There has been also proposed, in addition to the HD digital video signal and the D-Cinema signal aforementioned, another kind of progressive HD digital video signal for which the frame rate of 60 Hz, 720 active lines per frame and 1280 active data samples per line are predetermined. This digital video signal is called a 720P signal in this application.

Digital data constituting the 720P signal have been standardized in data formats in accordance with SMPTE 296M. In the data formats standardized in accordance with SMPTE 296M, 750 lines per frame, the sampling frequency of 74.25 MHz), 8 or 10 bits for one word and so on are predetermined in addition to the frame rate of 60 Hz, 720 active lines per frame and 1280 active data samples per line. Then, parallel data interface is selected to be 8 bits×2=16 bits or 10 bits×2=20 bits for data of the Y and $P_B/P_R$ type and 8 bits×3=24 bits or 10 bits×3=30 bits for data of the G, B and R type.

The 720P signal was initially proposed in a period of transition from analog video signals to HD digital video signals to be predetermined to have 720 active lines per frame which correspond to two-thirds of those of the HD digital video signal and 1280 active data samples per line which also correspond to two-thirds of those of the HD digital video signal. Accordingly, the 720P signal is inferior in definition of images reproduced therefrom to the HD digital video signal but suitable for representing images moving quickly because of the frame rate of 60 Hz.

In relation to the various digital video signals as described above, there has been further proposed to use a predetermined key signal for combining a certain digital video signal with other video signals. The key signal represents opacity or transparency of related video signals and is recommended to be used in "SMPTE RECOMMENDED PRACTICE" RP 157-1995.

When the key signal is attached to a digital video signal of the 4:2:2 type, a key signal data sequence which is contained in digital data constituting the key signal is formed with a data format similar to the data format of a Y data sequence contained in the digital data constituting the digital video signal of the 4:2:2 type and handled in the same manner as the Y data sequence. When the key signal is attached to a digital video signal of the 4:4:4 type, a key signal data sequence which is contained in digital data constituting the key signal is formed with a data format similar to the data format of a G data sequence contained in the digital data constituting the digital video signal of the 4:4:4 type and handled in the same manner as the G data sequence.

Under such a condition, it has come to be desired to produce the digital date constituting the HD digital video signal, the D-Cinema signal or the 720P signal with a series of words each made of more than 10 bits, for example, 12, 14 or 16 bits, that is, a 12-, 14- or 16-bit word sequence. However, with the current standards for digital video signals which include SMPTE 247M and SMPTE 296M aforementioned, 12-, 14- and 16-bit word digital data have not been standardized but only 8- or 10-bit word digital data have been standardized. Consequently, it is feared that some problems in compatibility or generalization are brought about on 12-, 14- or 16-bit word digital date which are produced to constitute a digital video signal.

Further, there is another problem in transmission of the 12-, 14- or 16-bit word digital date which are produced to constitute the digital video signal, as follows. In general, when digital data constituting a digital video signal are subjected to transmission, the digital data are converted to serial data to be transmitted. For such serial transmission of the digital data constituting the digital video signal, although it has been standardized that 8- or 10-bit word digital data constituting a digital video signal of the 4:2:2 type are to be transmitted in accordance with HD SDI (High Definition Serial Digital Interface) provided by BTA S-004 which is one of the standards established by the BTA, there has not been any other standard for standardizing the serial transmission of the 12-, 14- or 16-bit word digital date constituting the digital video signal or digital date constituting a digital video signal of the 4:4:4 type.

For the present, any practical embodiment of transmission system which can cause the serial transmission of the 12-, 14- or 16-bit word digital date constituting the digital video signal to be appropriately subjected to serial transmission with use of existing circuit devices used for serial transmission of, for example, 10-bit word digital date constituting a digital video signal, has not been previously found. Further, any literature or thesis disclosing the transmission system which can cause the 12-, 14- or 16-bit word digital date constituting the digital video signal to be appropriately subjected to serial transmission in such a manner as mentioned above, has not been previously found also.

With regard to transmission of digital data of the 4:2:2 or 4:4:4 type, it is required sometimes to transmit the digital data of the 4:2:2 or 4:4:4 type together with a key signal data sequence related thereto. In such a case, it is desired in view of easiness in practice, reduction in cost and so on that the key signal data sequence is transmitted as an additional information data sequence annexed to the digital data of the 4:2:2 or 4:4:4 type and it is also desired similarly that the digital data of the 4:2:2 or 4:4:4 type accompanied with the key signal data sequence are converted into serial data to be transmitted with use of existing circuit devices used for the serial transmission, for example, 10-bit word digital date constituting the digital video signal. However, as aforementioned, under the present situation in which it has been merely standardized that the 8- or 10-bit word digital data constituting the digital video signal of the 4:2:2 type are to be transmitted in accordance with HD SDI, any practical embodiment of transmission system which can cause 10-, 12-, 14- or 16-bit word digital date constituting a digital video signal of the 4:2:2 or 4:4:4 type which are accompanied with a key signal data sequence as an additional information data sequence annexed to the digital date to be appropriately subjected to serial transmission with use of existing circuit devices used for serial transmission of, for example, 10-bit word digital data constituting a digital video signal, has not been previously found. Further, any literature or thesis disclosing the transmission system which can cause the 10-, 12-, 14- or 16-bit word digital date constituting the digital video signal of the 4:2:2 or 4:4:4 type to be appropriately subjected to serial transmission in such a manner as mentioned above, has not been previously found also.

Accordingly, it is an object of the present invention to provide a method of producing digital data, by which digital data constituting a digital video signal such as one of an HD digital video signal, a D-Cinema signal, a 720P signal and so on with a series of words each made of more than 10 bits can be produced to be compatible with previous 8- or 10-bit word digital data constituting the HD digital video signal.

Another object of the present invention is to provide a method of transmitting digital data which can cause digital data constituting a digital video signal such as one of an HD digital video signal, a D-Cinema signal, a 720P signal and so on with a series of words each made of more than 10 bits to be appropriately subjected to serial transmission with use of existing circuit devices used for serial transmission of 8- or 10-bit word digital data constituting a digital video signal, and an apparatus for transmitting digital data, on which the method of transmitting digital data can be carried out.

A further object of the present invention is to provide a method of transmitting digital data which can cause digital data constituting a digital video signal with a series of words each made of more than 10 bits and a key signal data sequence related to the digital data to be appropriately subjected to serial transmission in such a manner that the key signal data sequence are transmitted as an additional information data sequence annexed to the digital date with use of existing circuit devices used for serial transmission of, for example, 10-bit word digital data constituting a digital video signal, and an apparatus for transmitting digital data, on which the method of transmitting digital data can be carried out.

DISCLOSURE OF THE INVENTION

According to a first aspect of the present invention, there is provided a method of producing digital data, which comprises the steps of making first arrangements for 12-, 14- or 16-bit word digital data constituting a digital video signal, which include a frame rate of 24 Hz, 25 Hz or 30 Hz, 1125 lines per frame, 1080 active lines per frame, a sampling frequency of 74.25 MHz and 1920 active data samples per line, making second arrangements for the 12-, 14- or 16-bit word digital data, in which 12-bit codes each containing an upper 8-bit portion representing 00h or FFh are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, and forming the 12-, 14- or 16-bit word digital data constituting the digital video signal in accordance with the first and second arrangements.

According to a second aspect of the present invention, there is provided a method of producing digital data, which comprises the steps of making first arrangements for 12-, 14- or 16-bit word digital data constituting a digital video signal, which include a frame rate of 50 Hz or 60 Hz, 1125 lines per frame, 1080 active lines per frame, a sampling frequency of 148.5 MHz and 1920 active data samples per line, making second arrangements for the 12-, 14- or 16-bit word digital data, in which 12-bit codes each containing an upper 8-bit portion representing 00h or FFh are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh (00 and FF are hexadecimal numbers) are predetermined to be forbidden code for each active line in case of the digital data of 16-bit word digital data, and forming the 12-, 14- or 16-bit word digital data constituting the digital video signal in accordance with the first and second arrangements.

According to a third aspect of the present invention, there is provided a method of producing digital data, which comprises the steps of making first arrangements for 12-, 14- or 16-bit word digital data constituting a digital video signal, which include a frame sequence at a rate of 60 Hz, 750 lines per frame, 720 active lines per frame, 1280 active data samples per line, making second arrangements for the 12-, 14- or 16-bit word digital data, in which 12-bit codes each containing an upper 8-bit portion representing 00h or FFh are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh (00 and FF are hexadecimal numbers) are predetermined to be forbidden code for each active line in case of the 16-bit word digital data, and forming the 12-, 14- or 16-bit word digital data constituting the digital video signal in accordance with the first and second arrangements.

According to a fourth aspect of the present invention, there is provided a method of transmitting digital data, which comprises the steps of dividing each of 12-, 14- or 16-bit words contained in 12-, 14- or 16-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, into an upper 10-bit portion and a lower 2-, 4- or 6-bit portion, forming first word sequence data having a word transmission rate of 74.25 MBps based on the upper 10-bit portions and second word sequence data having a word transmission rate of 74.25 MBps based on the lower 2-, 4- or 6-bit portions, obtaining first and second serial data based on the first and second word sequence data, respectively, and transmitting the first and second serial data.

According to a fifth aspect of the present invention, there is provided a method of transmitting digital data, which comprises the steps of dividing each of 12-bit words contained in 12-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh are predetermined to be forbidden code for each active line, into an upper 10-bit portion and a lower 2-bit portion, putting the upper 10-bit portions in first and second groups, multiplexing the lower 2-bit portions with one another at every predetermined numbers thereof to be caused to join in the second group, forming first word sequence data having a word transmission rate of 74.25 MBps based on data belonging to the first group and second word sequence data having a word transmission rate of 74.25 MBps based on data belonging to the second group, obtaining first and second serial data based on the first and second word sequence data, respectively, and transmitting the first and second serial data.

According to a sixth aspect of the present invention, there is provided a method of transmitting digital data, which comprises the steps of putting 12-, 14- or 16-bit word digital data constituting a digital video signal, which have a frame rate of 50 Hz or 60 Hz, 1125 lines per frame, 1080 active lines per frame, a sampling frequency of 148.5 MHz and 1920 active data samples per line, and in which 12-bit codes each containing an upper 8-bit portion representing 00h or FFh are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, in first and second groups alternately at every line portion, forming first word sequence data having a word transmission rate of 74.25 MBps based on data belonging to the first group and second word sequence data having a word transmission rate of 74.25 MBps based on data belonging to the second group, processing the first word sequence data in such a manner as to divide each 12-, 14- or 16-bit word contained in the first word sequence data into a first upper 10-bit portion and a first lower 2-, 4- or 6-bit portion and form third word sequence data having a word transmission rate of 74.25 MBps based on the first upper 10-bit portions and fourth word sequence data having a word transmission rate of 74.25 MBps based on the first lower 12-, 14- or 16-bit portions, processing the second word sequence data in such a manner as to divide each 12-, 14- or 16-bit word contained in the second word sequence data into a second upper 10-bit portion and a second lower 2-, 4- or 6-bit portion and form fifth word sequence data having a word transmission rate of 74.25 MBps based on the second upper 10-bit portions and sixth word sequence data having a word transmission rate of 74.25 MBps based on the second lower 2-, 4- or 6-bit portions, obtaining first, second, third and fourth serial data based on the third, fourth, fifth and sixth word sequence data, respectively, and transmitting the first to fourth serial data.

According to a seventh aspect of the present invention, there is provided a method of transmitting digital data, which comprises the steps of putting 12-bit word digital data constituting a digital video signal, which have a frame rate of 50 Hz or 60 Hz, 1125 lines per frame, 1080 active lines per frame, a sampling frequency of 148.5 MHz and 1920 active data samples per line and in which 12-bit codes each containing an upper 8-bit portion representing 00h or FFh are predetermined to be forbidden code for each active line in case of the digital data of 12-bit word sequence, in first and second groups alternately at every line portion, forming first word sequence data having a word transmission rate of 74.25 MBps based on data belonging to the first group and second word sequence data having a word transmission rate of 74.25 MBps based on data belonging to the second group, processing the first word sequence data in such a manner as to divide each 12-bit word contained in the first word sequence data into a first upper 10-bit portion and a first lower 2-bit portion, put the first upper 10-bit portions in first and second 10-bit groups, multiplex the first lower 2-bit portions with one another at every predetermined numbers thereof to be caused to join in the second 10-bit group, and form third word sequence data having a word transmission rate of 74.25 MBps based on data belonging to the first 10-bit group and fourth word sequence data having a word transmission rate of 74.25 MBps based on data belonging to the second 10-bit group, processing the second word sequence data in such a manner as to divide each 12-bit word contained in the second word sequence data into a second upper 10-bit portion and a second lower 2-bit portion, put the second upper 10-bit portions in third and fourth 10-bit groups, multiplex the second lower 2-bit portions with one another at every predetermined numbers thereof to be caused to join in the fourth 10-bit group, and form fifth word sequence data having a word transmission rate of 74.25 MBps based on data belonging to the third 10-bit group and sixth word sequence data having a word transmission rate of 74.25 MBps based on data belonging to the fourth 10-bit group, obtaining first, second, third and fourth serial data based on the third, fourth, fifth and sixth word sequence data, respectively, and transmitting the first to fourth serial data.

According to an eighth aspect of the present invention, there is provided a method of transmitting digital data, which comprises the steps of dividing each of 12-, 14- or 16-bit words contained in 12-, 14- or 16-bit word digital data constituting a digital video signal, which have a frame rate of 60 Hz, 750 lines per frame, 720 active lines per frame and 1280 active data samples per line, into an upper 10-bit portion and a lower 2-, 4- or 6-bit portion, forming first word sequence data having a word transmission rate of 74.25 MBps based on the upper 10-bit portions and second word sequence data having a word transmission rate of 74.25 MBps based on the lower 2-, 4- or 6-bit portions, obtaining first and second serial data based on the first and second word sequence data, respectively, and transmitting the first and second serial data.

According to a ninth aspect of the present invention, there is provided a method of transmitting digital data, which comprises the steps of dividing each of 12-bit words contained in 12-bit word digital data constituting a digital video signal, which have a frame rate of 60 Hz, 750 lines per frame, 720 active lines per frame and 1280 active data samples per line, into an upper 10-bit portion and a lower 2-bit portion, putting the upper 10-bit portions in first and second groups, multiplexing the lower 2-bit portions with one another at every predetermined numbers thereof to be caused to join in the second group, forming first word sequence data having a word transmission rate of 74.25 MBps based on data belonging to the first group and second word sequence data having a word transmission rate of 74.25 MBps based on data belonging to the second group, obtaining first and second serial data based on the first and second word sequence data, respectively, and transmitting the first and second serial data.

According to a tenth aspect of the present invention, there is provided a method of transmitting digital data, which comprises the steps of processing 30-bit parallel data including Y and $P_B/P_R$ data sequences of 20-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, obtaining first and second serial data based on the first and second 20-bit word sequence data, respectively, and transmitting the first and second serial data.

According to an eleventh aspect of the present invention, there is provided a method of transmitting digital data, which comprises the steps of processing 40-bit parallel data including G, B and R data sequences of 30-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to put 10-bit words constituting each of the G, B and R data sequences and the additional information data sequence in a first word group including the 10-bit words constituting the 6 data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group, obtaining first and second serial data based on the first and second 20-bit word sequence data, respectively, and transmitting the first and second serial data.

According to a twelfth aspect of the present invention, there is provided a method of transmitting digital data, which comprises the steps of processing 36-bit parallel data including Y and $P_B/P_R$ data sequences of 24-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence, obtaining first and second serial data based on the first and second 20-bit word sequence data, respectively, and transmitting the first and second serial data.

According to a thirteenth aspect of the present invention, there is provided a method of transmitting digital data, which comprises the steps of processing 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence, obtaining first, second and third serial data based on the first, second and third 20-bit word sequence data, respectively, and transmitting the first to third serial data.

According to a fourteenth aspect of the present invention, there is provided a method of transmitting digital data, which comprises the steps of processing 48-bit parallel data including G, B and R data sequences of 36-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence, obtaining first, second and third serial data based on the first, second and third 20-bit word sequence data, respectively, and transmitting the first to third serial data.

According to a fifteenth aspect of the present invention, there is provided a method of transmitting digital data, which comprises the steps of processing 30-bit parallel data including Y and $P_B/P_R$ data sequences of 20-bit word sequence data having a word transmission rate of 148.5 MBps and constituting a digital video signal, which have a frame rate of 50 Hz or 630 Hz, 1125 lines per frame, 1080 active lines per frame, a sampling frequency of 1438.5 MHz and 1920 active data samples per line, and an additional information data sequence of 10-bit word sequence data formed with a data format similar to the data format of the Y data sequence and having a word transmission rate of 148.5 MBps, in such a manner as to put the Y and $P_B/P_R$ data sequences in first and second 20-bit word group alternately at every line portion so as to form first and second 20-bit word sequence data having a word transmission rate of 74.25 MBps based on the first and second 20-bit word group, respectively, and form a third 20-bit word sequence data having a word transmission rate of 74.25 MBps based on the additional information data sequence, obtaining first, second and third serial data based on the first, second and third 20-bit word sequence data, respectively, and transmitting the first to third serial data.

According to a sixteenth aspect of the present invention, there is provided a method of transmitting digital data, which comprises the steps of putting 40-bit parallel data including G, B and R data sequences of 30-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 10-bit word sequence data formed with a data format similar to the data format of the G data sequence and having a word transmission rate of 148.5 MBps, in first and second 40-bit word groups alternately at every line portion so as to form first and second divided 40-bit parallel data having a word transmission rate of 74.25 MBps based on the Y and $P_B/P_R$ data sequences, respectively, processing the first divided 40-bit parallel data in such a manner as to put 10-bit words constituting the G, B and R data sequences and the additional information data sequence contained in the first divided 40-bit parallel data in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences, and form first and second 20-bit word sequence data each having a word transmission rate of 74.25 MBps based on the first and second word groups, respectively, processing the second divided 40-bit parallel data in such a manner as to put 10-bit words constituting the G, B and R data sequences and the additional information data sequence contained in the second divided 40-bit parallel data in a third word group including the 10-bit words constituting the G data sequence and a part of the 10-bit words constituting the B and R data sequences and a fourth word group including the 10-bit words constituting the additional information data sequence and another part of the 10-bit words constituting the B and R data sequences, and form third and fourth 20-bit word sequence data each having a word transmission rate of 74.25 MBps based on the third and fourth word groups, respectively, obtaining first, second, third and fourth serial data based on the first, second, third and fourth 20-bit word sequence data, respectively, and transmitting the first to fourth serial data.

According to a seventeenth aspect of the present invention, there is provided a method of transmitting digital data, which comprises the steps of putting 36-, 42- or 48-bit parallel data including Y and $P_B/P_R$ data sequences of 24-, 28- or 32-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 12-, 14- or 16-bit word sequence data formed with a data format similar to the data format of the Y data sequence and having a word transmission rate of 148.5 MBps, in first and second 36-, 42- or 48-bit word groups alternately at every line portion so as to form first and second divided 36-, 42- or 48-bit parallel data having a word transmission rate of 74.25 MBps based on the first and second 36-, 42- or 48-bit word groups, respectively, processing the first divided 36-, 42- or 48-bit parallel data in such a manner as to divide each 12-, 14- or 16-bit word constituting the Y and $P_B/P_R$ data sequences and the additional information data sequence contained in the first divided 36-, 42- or 48-bit parallel data in to a first upper 10-bit portion and a first lower 2-, 4- or 6-bit portion, and form first 20-bit word sequence data having a word transmission rate of 74.25 MBps based on the first upper 10-bit portions divided from the Y and $P_B/P_R$ data sequences, second 20-bit word sequence data having a word transmission rate of 74.25 MBps based on the first lower 2-, 4- and 6-bit portions divided from the Y and $P_B/P_R$ data sequences, and third 20-bit word sequence data having a word transmission rate of 74.25 MBps based on the first upper 10-bit portions and the first lower 2-, 4- and 6-bit portions divided from the additional information data sequence, processing the second divided 36-, 42- or 48-bit parallel data in such a manner as to divide each 12-, 14- or 16-bit word constituting the Y and $P_B/P_R$ data sequences and the additional information data sequence contained in the second divided 36-, 42- or 48-bit parallel data in to a second upper 10-bit portions and a second lower 2-, 4- or 6-bit portion, and form fourth 20-bit word sequence data having a word transmission rate of 74.25 MBps based on the second upper 10-bit portions divided from the Y and $P_B/P_R$ data sequences, fifth 20-bit word sequence data having a word transmission rate of 74.25 MBps based on the second lower 2-, 4- and 6-bit portions divided from the Y and $P_B/P_R$ data sequences, and sixth 20-bit word sequence data having a word transmission rate of 74.25 MBps based on the second upper 10-bit portions and the second lower 2-, 4- and 6-bit portions divided from the additional information data sequence, obtaining first, second, third, fourth, fifth and sixth serial data based on the first, second, third, fourth, fifth and sixth 20-bit word sequence data, respectively, and transmitting the first to sixth serial data.

According to an eighteenth aspect of the present invention, there is provided a method of transmitting digital data, which comprises the steps of putting 48-bit parallel data including G, B and R data sequences of 36-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 12-bit word sequence data formed with a data format similar to the data format of the G data sequence and having a word transmission rate of 148.5 MBps, in first and second 48-bit word groups alternately at every line portion so as to form first and second divided 48-bit parallel data having a word transmission rate of 74.25 MBps based on the first and second 48-bit word groups, respectively, processing the first divided 48-bit parallel data in such a manner as to divide each 12-bit word constituting the G, B and R data sequences and the additional information data sequence contained in the first divided 48-bit parallel data in to a first upper 10-bit portion and a first lower 2-bit portion, and form first 20-bit word sequence data having a word transmission rate of 74.25 MBps based on the first upper 10-bit portions divided from the G data sequence and a part of the first upper 10-bit portions divided from the B and R data sequences, second 20-bit word sequence data having a word transmission rate of 74.25 MBps based on another part of the first upper 10-bit portions divided from the B and R data sequences and the first lower 2-bit portions divided from the G, B and R data sequence, and third 20-bit word sequence data having a word transmission rate of 74.25 MBps based on the first upper 10-bit portions and the first lower 2-bit portions divided from the additional information data sequence, processing the second divided 48-bit parallel data in such a manner as to divide each 12-bit word constituting the G, B and R data sequences and the additional information data sequence contained in the second divided 48-bit parallel data in to a second upper 10-bit portion and a second lower 2-portion, and form fourth 20-bit word sequence data having a word transmission rate of 74.25 MBps based on the second upper 10-bit portions divided from the G data sequence and a part of the second upper 10-bit portions divided from the B and R data sequences, fifth 20-bit word sequence data having a word transmission rate of 74.25 MBps based on another part of the second upper 10-bit portions divided from the B and R data sequences and the second lower 2-bit portions divided from the G, B and R data sequence, and sixth 20-bit word sequence data having a word transmission rate of 74.25 MBps based on the second upper 10-bit portions and the second lower 2-bit portions divided from the additional information data sequence, obtaining first, second, third, fourth, fifth and sixth serial data based on the first, second, third, fourth, fifth and sixth 20-bit word sequence data, respectively, and transmitting the first to sixth serial data.

According to a nineteenth aspect of the present invention, there is provided a method of transmitting digital data, which comprises the steps of processing 30-bit parallel data including Y and $P_B/P_R$ data sequences of 20-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, obtaining first and second serial data based on the first and second 20-bit word sequence data, respectively, and transmitting the first and second serial data.

According to a twentieth aspect of the present invention, there is provided a method of transmitting digital data, which comprises the steps of processing 40-bit parallel data including G, B and R data sequences of 30-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the G data sequence and having a word transmission rate of 74.25 MBps, in such a manner as to put 10-bit words constituting each of the G, B and R data sequences and the additional information data sequence in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group, obtaining first and second serial data based on the first and second 20-bit word sequence data, respectively, and transmitting the first and second serial data.

According to a twenty-first aspect of the present invention, there is provided a method of transmitting digital data, which comprises the steps of processing 36-bit parallel data including Y and $P_B/P_R$ data sequences of 24-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence, obtaining first and second serial data based on the first and second 20-bit word sequence data, respectively, and transmitting the first and second serial data.

According to a twenty-second aspect of the present invention, there is provided a method of transmitting digital data, which comprises the steps of processing 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence, obtaining first, second and third serial data based on the first, second and third 20-bit word sequence data, respectively, and transmitting the first to third serial data.

According to a twenty-third aspect of the present invention, there is provided a method of transmitting digital data, which comprises the steps of processing 48-bit parallel data including G, B and R data sequences of 36-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence, obtaining first, second and third serial data based on the first, second and third 20-bit word sequence data, respectively, and transmitting the first to third serial data.

According to a twenty-fourth aspect of the present invention, there is provided an apparatus for transmitting digital data, which comprises a data processing portion operative to divide each of 12-, 14- or 16-bit words contained in 12-, 14- or 16-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, into an upper 10-bit portion and a lower 2-, 4- or 6-bit portion, and to form first word sequence data having a word transmission rate of 74.25 MBps based on the upper 10-bit portions and second word sequence data having a word transmission rate of 74.25 MBps based on the lower 2-, 4- or 6-bit portions, a first parallel to serial (P/S) converting portion for obtaining first serial data based on the first word sequence data, a second P/S converting portion for obtaining second serial data based on the second word sequence data, and a data transmitting portion for transmitting the first and second serial data obtained from the first and second P/S converting portions, respectively.

According to a twenty-fifth aspect of the present invention, there is provided an apparatus for transmitting digital data, which comprises a data processing portion operative to divide each of 12-bit words contained in 12-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh are predetermined to be forbidden code for each active line, into an upper 10-bit portion and a lower 2-bit portion, to put the upper 10-bit portions in first and second groups, to multiplex the lower 2-bit portions with one another at every predetermined numbers thereof to be caused to join in the second group, and to form first word sequence data having a word transmission rate of 74.25 MBps based on data belonging to the first group and second word sequence data having a word transmission rate of 74.25 MBps based on data belonging to the second group, a first P/S converting portion for obtaining first serial data based on the first word sequence data, a second P/S converting portion for obtaining second serial data based on the second word sequence data, and a data transmitting portion for transmitting the first and second serial data obtained from the first and second P/S converting portions, respectively.

According to a twenty-sixth aspect of the present invention, there is provided an apparatus for transmitting digital data, which comprises a data processing portion operative to put 12-, 14- and 16-bit word digital data constituting a digital video signal, which have a frame rate of 50 Hz or 60 Hz, 1125 lines per frame, 1080 active lines per frame, a sampling frequency of 148.5 MHz and 1920 active data samples per line and in which 12-bit codes each containing an upper 8-bit portion representing 00h or FFh are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, in first and second groups alternately at every line portion, to form first word sequence data having a word transmission rate of 74.25 MBps based on data belonging to the first group and second word sequence data having a word transmission rate of 74.25 MBps based on data belonging to the second group, to process the first word sequence data in such a manner as to divide each 12-, 14- or 16-bit word contained in the first word sequence data into a first upper 10-bit portion and a first lower 2-, 4- or 6-bit portion and form third word sequence data having a word transmission rate of 74.25 MBps based on the first upper 10-bit portions and fourth word sequence data having a word transmission rate of 74.25 MBps based on the first lower 12-, 14- or 16-bit portions, and to process the second word sequence data in such a manner as to divide each 12-, 14- or 16-bit word contained in the second word sequence data into a second upper 10-bit portion and a second lower 2-, 4- or 6-bit portion and form fifth word sequence data having a word transmission rate of 74.25 MBps based on the second upper 10-bit portions and sixth word sequence data having a word transmission rate of 74.25 MBps based on the second lower 2-, 4- or 6-bit portions, a first S/P converting portion for obtaining first serial data based on the third word sequence data, a second S/P converting portion for obtaining second serial data based on the fourth word sequence data, a third S/P converting portion for obtaining third serial data based on the fifth word sequence data, a fourth S/P converting portion for obtaining fourth serial data based on the sixth word sequence data, and a data transmitting portion for transmitting the first to fourth serial data obtained from the first to fourth S/P converting portions, respectively.

According to a twenty-seventh aspect of the present invention, there is provided an apparatus for transmitting digital data, which comprises a data processing portion operative to put 12-bit word sequences constituting a digital video signal, which have a frame rate of 50 Hz or 60 Hz, 1125 lines per frame, 1080 active lines per frame, a sampling frequency of 148.5 MHz and 1920 active data samples per line and in which 12-bit codes each containing an upper 8-bit portion representing 00h or FFh are predetermined to be forbidden code for each active line in case of the digital data of 12-bit word sequence, in first and second groups alternately at every line portion, to form first word sequence data having a word transmission rate of 74.25 MBps based on data belonging to the first group and second word sequence data having a word transmission rate of 74.25 MBps based on data belonging to the second group, to process the first word sequence data in such a manner as to divide each 12-bit word contained in the first word sequence data into a first upper 10-bit portion and a first lower 2-bit portion, put the first upper 10-bit portions in first and second 10-bit groups, multiplex the first lower 2-bit portions with one another at every predetermined numbers thereof to be caused to join in the second 10-bit group, and form third word sequence data having a word transmission rate of 74.25 MBps based on data belonging to the first 10-bit group and fourth word sequence data having a word transmission rate of 74.25 MBps based on data belonging to the second 10-bit group, and to processing the second word sequence data in such a manner as to divide each 12-bit word contained in the second word sequence data into a second upper 10-bit portion and a second lower 2-bit portion, put the second upper 10-bit portions in third and fourth 10-bit groups, multiplex the second lower 2-bit portions with one another at every predetermined numbers thereof to be caused to join in the fourth 10-bit group, and form fifth word sequence data having a word transmission rate of 74.25 MBps based on data belonging to the third 10-bit group and sixth word sequence data having a word transmission rate of 74.25 MBps based on data belonging to the fourth 10-bit group, a first S/P converting portion for obtaining first serial data based on the third word sequence data, a second S/P converting portion for obtaining second serial data based on the fourth word sequence data, a third S/P converting portion for obtaining third serial data based on the fifth word sequence data, a fourth S/P converting portion for obtaining fourth serial data based on the sixth word sequence data, and a data transmitting portion for transmitting the first to fourth serial data obtained from the first to fourth S/P converting portions, respectively.

According to a twenty-eighth aspect of the present invention, there is provided an apparatus for transmitting digital data, which comprises a data processing portion operative to divide each of 12-, 14- or 16-bit words contained in 12-, 14- or 16-bit word digital data constituting a digital video signal, which have a frame rate of 60 Hz, 750 lines per frame, 720 active lines per frame and 1280 active data samples per line, into an upper 10-bit portion and a lower 2-, 4- or 6-bit portion, and to form first word sequence data having a word transmission rate of 74.25 MBps based on the upper 10-bit portions and second word sequence data having a word transmission rate of 74.25 MBps based on the lower 2-, 4- or 6-bit portions, a first S/P converting portion for obtaining first serial data based on the first word sequence data, a second S/P converting portion for obtaining second serial data based on the second word sequence data, and a data transmitting portion for transmitting the first and second serial data obtained from the first and second S/P converting portions, respectively.

According to a twenty-ninth aspect of the present invention, there is provided an apparatus for transmitting digital data, which comprises a data processing portion operative to divide each of 12-bit words contained in 12-bit word digital data constituting a digital video signal, which have a frame rate of 60 Hz, 750 lines per frame, 720 active lines per frame and 1280 active data samples per line, into an upper 10-bit portion and a lower 2-bit portion, to put the upper 10-bit portions in first and second groups, to multiplex the lower 2-bit portions with one another at every predetermined numbers thereof to be caused to join in the second group, and to form first word sequence data having a word transmission rate of 74.25 MBps based on data belonging to the first group and second word sequence data having a word transmission rate of 74.25 MBps based on data belonging to the second group, a first S/P converting portion for obtaining first serial data based on the first word sequence data, a second S/P converting portion for obtaining second serial data based on the second word sequence data, and a data transmitting portion for transmitting the first and second serial data obtained from the first and second S/P converting portions, respectively.

According to a thirtieth aspect of the present invention, there is provided an apparatus for transmitting digital data, which comprises a data processing portion operative to process 30-bit parallel data including Y and $P_B/P_R$ data sequences of 20-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

According to a thirty-first aspect of the present invention, there is provided an apparatus for transmitting digital data, which comprises a data processing portion operative to process 40-bit parallel data including G, B and R data sequences of 30-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to put 10-bit words constituting each of the G, B and R data sequences and the additional information data sequence in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

According to a thirty-second aspect of the present invention, there is provided an apparatus for transmitting digital data, which comprises a data processing portion operative to process 36-bit parallel data including Y and $P_B/P_R$ data sequences of 24-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

According to a thirty-third aspect of the present invention, there is provided an apparatus for transmitting digital data, which comprises a data processing portion operative to process 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

According to a thirty-fourth aspect of the present invention, there is provided an apparatus for transmitting digital data, which comprises a data processing portion operative to process 48-bit parallel data including G, B and R data sequences of 36-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

According to a thirty-fifth aspect of the present invention, there is provided an apparatus for transmitting digital data, which comprises a data processing portion operative to process 30-bit parallel data including Y and $P_B/P_R$ data sequences of 20-bit word sequence data having a word transmission rate of 148.5 MBps and constituting a digital video signal, which have a frame rate of 50 Hz or 630 Hz, 1125 lines per frame, 1080 active lines per frame, a sampling frequency of 1438.5 MHz and 1920 active data samples per line, and an additional information data sequence of 10-bit word sequence data formed with a data format similar to the data format of the Y data sequence and having a word transmission rate of 148.5 MBps, in such a manner as to put the Y and $P_B/P_R$ data sequences in first and second 20-bit word group alternately at every line portion so as to form first and second 20-bit word sequence data having a word transmission rate of 74.25 MBps based on the first and second 20-bit word group, respectively, and form a third 20-bit word sequence data having a word transmission rate of 74.25 MBps based on the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

According to a thirty-sixth aspect of the present invention, there is provided an apparatus for transmitting digital data, which comprises a data processing portion operative to put 40-bit parallel data including G, B and R data sequences of 30-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 10-bit word sequence data formed with a data format similar to the data format of the G data sequence and having a word transmission rate of 148.5 MBps, in first and second 40-bit word groups alternately at every line portion so as to form first and second divided 40-bit parallel data having a word transmission rate of 74.25 MBps based on the Y and $P_B/P_R$ data sequences, respectively, to process the first divided 40-bit parallel data in such a manner as to put 10-bit words constituting the G, B and R data sequences and the additional information data sequence contained in the first divided 40-bit parallel data in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences, and form first and second 20-bit word sequence data each having a word transmission rate of 74.25 MBps based on the first and second word groups, respectively, and to process the second divided 40-bit parallel data in such a manner as to put 10-bit words constituting the G, B and R data sequences and the additional information data sequence contained in the second divided 40-bit parallel data in a third word group including the 10-bit words constituting the G data sequence and a part of the 10-bit words constituting the B and R data sequences and a fourth word group including the 10-bit words constituting the additional information data sequence and another part of the 10-bit words constituting the B and R data sequences, and form third and fourth 20-bit word sequence data each having a word transmission rate of 74.25 MBps based on the third and fourth word groups, respectively, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, a fourth S/P converting portion for obtaining fourth serial data based on the fourth 20-bit word sequence data, and a data transmitting portion for transmitting the first, second, third and fourth serial data obtained from the first to fourth S/P converting portions, respectively.

According to a thirty-seventh aspect of the present invention, there is provided an apparatus for transmitting digital data, which comprises a data processing portion operative to put 36-, 42- or 48-bit parallel data including Y and $P_B/P_R$ data sequences of 24-, 28- or 32-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 12-, 14- or 16-bit word sequence data formed with a data format similar to the data format of the Y data sequence and having a word transmission rate of 148.5 MBps, in first and second 36-, 42- or 48-bit word groups alternately at every line portion so as to form first and second divided 36-, 42- or 48-bit parallel data having a word transmission rate of 74.25 MBps based on the first and second 36-, 42- or 48-bit word groups, respectively, to process the first divided 36-, 42- or 48-bit parallel data in such a manner as to divide each 12-, 14- or 16-bit word constituting the Y and $P_B/P_R$ data sequences and the additional information data sequence contained in the first divided 36-, 42- or 48-bit parallel data in to a first upper 10-bit portion and a first lower 2-, 4- or 6-bit portion, and form first 20-bit word sequence data having a word transmission rate of 74.25 MBps based on the first upper 10-bit portions divided from the Y and $P_B/P_R$ data sequences, second 20-bit word sequence data having a word transmission rate of 74.25 MBps based on the first lower 2-, 4- and 6-bit portions divided from the Y and $P_B/P_R$ data sequences, and third 20-bit word sequence data having a word transmission rate of 74.25 MBps based on the first upper 10-bit portions and the first lower 2-, 4- and 6-bit portions divided from the additional information data sequence, and to process the second divided 36-, 42- or 48-bit parallel data in such a manner as to divide each 12-, 14- or 16-bit word constituting the Y and $P_B/P_R$ data sequences and the additional information data sequence contained in the second divided 36-, 42- or 48-bit parallel data in to a second upper 10-bit portions and a second lower 2-, 4- or 6-bit portion, and form fourth 20-bit word sequence data having a word transmission rate of 74.25 MBps based on the second upper 10-bit portions divided from the Y and $P_B/P_R$ data sequences, fifth 20-bit word sequence data having a word transmission rate of 74.25 MBps based on the second lower 2-, 4- and 6-bit portions divided from the Y and $P_B/P_R$ data sequences, and sixth 20-bit word sequence data having a word transmission rate of 74.25 MBps based on the second upper 10-bit portions and the second lower 2-, 4- and 6-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, a fourth S/P converting portion for obtaining fourth serial data based on the fourth 20-bit word sequence data, a fifth S/P converting portion for obtaining fifth serial data based on the fifth 20-bit word sequence data, a sixth S/P converting portion for obtaining sixth serial data based on the sixth 20-bit word sequence data, and a data transmitting portion for transmitting the first, second, third, fourth, fifth and sixth serial data obtained from the first to sixth S/P converting portions, respectively.

According to a thirty-eighth aspect of the present invention, there is provided an apparatus for transmitting digital data, which comprises a data processing portion operative to put 48-bit parallel data including G, B and R data sequences of 36-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 12-bit word sequence data formed with a data format similar to the data format of the G data sequence and having a word transmission rate of 148.5 MBps, in first and second 48-bit word groups alternately at every line portion so as to form first and second divided 48-bit parallel data having a word transmission rate of 74.25 MBps based on the first and second 48-bit word groups, respectively, to process the first divided 48-bit parallel data in such a manner as to divide each 12-bit word constituting the G, B and R data sequences and the additional information data sequence contained in the first divided 48-bit parallel data in to a first upper 10-bit portion and a first lower 2-bit portion, and form first 20-bit word sequence data having a word transmission rate of 74.25 MBps based on the first upper 10-bit portions divided from the G data sequence and a part of the first upper 10-bit portions divided from the B and R data sequences, second 20-bit word sequence data having a word transmission rate of 74.25 MBps based on another part of the first upper 10-bit portions divided from the B and R data sequences and the first lower 2-bit portions divided from the 6, B and R data sequence, and third 20-bit word sequence data having a word transmission rate of 74.25 MBps based on the first upper 10-bit portions and the first lower 2-bit portions divided from the additional information data sequence, and to process the second divided 48-bit parallel data in such a manner as to divide each 12-bit word constituting the G, B and R data sequences and the additional information data sequence contained in the second divided 48-bit parallel data in to a second upper 10-bit portion and a second lower 2-portion, and form fourth 20-bit word sequence data having a word transmission rate of 74.25 MBps based on the second upper 10-bit portions divided from the G data sequence and a part of the second upper 10-bit portions divided from the B and R data sequences, fifth 20-bit word sequence data having a word transmission rate of 74.25 MBps based on another part of the second upper 10-bit portions divided from the B and R data sequences and the second lower 2-bit portions divided from the G, B and R data sequence, and sixth 20-bit word sequence data having a word transmission rate of 74.25 MBps based on the second upper 10-bit portions and the second lower 2-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, a fourth S/P converting portion for obtaining fourth serial data based on the fourth 20-bit word sequence data, a fifth S/P converting portion for obtaining fifth serial data based on the fifth 20-bit word sequence data, a sixth S/P converting portion for obtaining sixth serial data based on the sixth 20-bit word sequence data, and a data transmitting portion for transmitting the first, second, third, fourth, fifth and sixth serial data obtained from the first to sixth S/P converting portions, respectively.

According to a thirty-ninth aspect of the present invention, there is provided an apparatus for transmitting digital data, which comprises a data processing portion operative to process 30-bit parallel data including Y and $P_B/P_R$ data sequences of 20-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

According to a fortieth aspect of the present invention, there is provided an apparatus for transmitting digital data, which comprises a data processing portion operative to process 40-bit parallel data including G, B and R data sequences of 30-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the 0 data sequence and having a word transmission rate of 74.25 MBps, in such a manner as to put 10-bit words constituting each of the G, B and R data sequences and the additional information data sequence in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

According to a forty-first aspect of the present invention, there is provided an apparatus for transmitting digital data, which comprises a data processing portion operative to process 36-bit parallel data including Y and $P_B/P_R$ data sequences of 24-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

According to a forty-second aspect of the present invention, there is provided an apparatus for transmitting digital data, which comprises a data processing portion operative to process 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

According to a forty-third aspect of the present invention, there is provided an apparatus for transmitting digital data, which comprises a data processing portion operative to process 48-bit parallel data including G, B and R data sequences of 36-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

With the method of producing digital data according to the first or second aspect of the present invention, the digital video signal constituted with the 12-, 14- or 16-bit word digital data is obtained. In this digital data constituting the digital video signal, the 12-, 14- or 16-bit codes each containing the upper 8-bit portion representing 00h or FFh are predetermined to be the bidden code for each active line, and therefore, 8-bit word sequence data constituted with the upper 8-bit portions of the 12-, 14- or 16-bit words or 10-bit word sequence data constituted with the upper 10-bit portions of the 12-, 14- or 16-bit words are compatible with 8- or 10-bit word digital data constituting a previously proposed HD digital video signal. Consequently, the digital data constituting the digital video signal obtained with the method of producing digital data according to the first or second aspect of the present invention can be subjected to recording, reading, editing, reproduction of images and so on by means of apparatus used for the 8- or 10-bit word digital data constituting the previously proposed HD digital video signal.

Especially, with the method of producing digital data according to the third aspect of the present invention, the 720P signal constituted with the 12-, 14- or 16-bit word digital data is obtained. In such digital data constituting the 720P signal also, the 12-, 14- or 16-bit codes each containing the upper 8-bit portion representing 00h or FFh are predetermined to be the bidden code for each active line, and therefore, 8-bit word sequence data constituted with the upper 8-bit portions of the 12-, 14- or 16-bit words or 10-bit word sequence data constituted with the upper 10-bit portions of the 12-, 14- or 16-bit words are compatible with 8- or 10-bit word digital data constituting a previously proposed 720P signal. Consequently, the digital data constituting the 720P signal obtained with the method of producing digital data according to the third aspect of the present invention can be subjected to recording, reading, editing, reproduction of images and so on by means of apparatus used for the 8- or 10-bit word digital data constituting the previously proposed 720P signal.

In the method of transmitting digital data according to the fourth, fifth, sixth or seventh aspect of the present invention or the apparatus for transmitting digital data according to the twenty-fourth, twenty-fifth, twenty-sixth or twenty-seventh aspect of the present invention, the 12-, 14- or 16-bit word digital data constituting the digital video signal are divided into plural word sequence data each compatible with 8- or 10-bit word digital data constituting a previously proposed HD digital video signal, and each of the plural word sequence data are converted into the serial data to be transmitted. Consequently, with the method of transmitting digital data according to the fourth, fifth, sixth or seventh aspect of the present invention or the apparatus for transmitting digital data according to the twenty-fourth, twenty-fifth, twenty-sixth or twenty-seventh aspect of the present invention, the 12-, 14- or 16-bit word digital data constituting the digital video signal can be appropriately subjected to serial transmission with use of circuit devices used for serial transmission of the 8- or 10-bit word digital data constituting the previously proposed HD digital video signal.

In the method of transmitting digital data according to the eighth or ninth aspect of the present invention or the apparatus for transmitting digital data according to the twenty-eight or twenty-ninth aspect of the present invention, the 12-, 14- or 16-bit word digital data constituting the 720P signal are divided into plural word sequence data each compatible with 8- or 10-bit word digital data constituting a previously proposed HD digital video signal, and each of the plural word sequence data are converted into the serial data to be transmitted. Consequently, with the method of transmitting digital data according to the eighth or ninth aspect of the present invention or the apparatus for transmitting digital data according to the twenty-eighth or twenty-ninth aspect of the present invention, the 12-, 14- or 16-bit word digital data constituting the 720P signal can be appropriately subjected to serial transmission with use of circuit devices used for serial transmission of the 8- or 10-bit word digital data constituting the previously proposed HD digital video signal.

In the method of transmitting digital data according to the tenth to eighteenth aspect of the present invention or the apparatus for transmitting digital data according to the thirtieth to thirty-eighth aspect of the present invention, the Y and $P_B/P_R$ data sequences of 20-, 24-, 28-, 32-bit word sequence data or the G, B and R data sequences of 30-bit word sequence data constituting the digital video signal and the additional information data sequence of 10-, 12-, 14- or 16-bit word sequence data formed with the data format similar to the data format of the Y or G data sequence and annexed to the Y and $P_B/P_R$ data sequences or the G, B and R data sequences are converted into plural 20-bit word sequence data each having the word transmission rate of 74.25 MBps and each of the plural 20-bit word sequence data are converted into the serial data to be transmitted.

The data processing to the 20-bit word sequence data having the word transmission rate of 74.25 MBps and the processing for converting the 20-bit word sequence data into the serial data to be transmitted can be carried out with circuit devices used for serial transmission of the 10-bit word digital data constituting the previously proposed HD digital video signal. Further, the additional information data sequence annexed to the Y and $P_B/P_R$ data sequences or the G, B and R data sequences can be a key signal data sequence related to the digital data including the Y and $P_B/P_R$ data sequences or the G, B and R data sequences constituting the digital video signal.

Consequently, with the method of transmitting digital data according to the tenth to eighteenth aspect of the present invention or the apparatus for transmitting digital data according to the thirtieth to thirty-eighth aspect of the present invention, the digital data constituting the digital video signal with a series of words each made of more than 10 bits, for example, the 12-, 14- or 16-bit word digital data constituting the digital video signal, and the key signal data sequence related to the digital data can be appropriately subjected to serial transmission in such a manner that the key signal data sequence are transmitted as the additional information data sequence annexed to the digital data with use of existing circuit devices used for serial transmission of, for example, the 10-bit word digital data constituting a digital video signal.

In the method of transmitting digital data according to the nineteenth to twenty-third aspect of the present invention or the apparatus for transmitting digital data according to the thirty-ninth to forty-third aspect of the present invention, the Y and $P_B/P_R$ data sequences of 20, 24-, 28 or 32-bit word sequence data or the G, B and R data sequences of 30-bit word sequence data constituting the 720P signal and the additional information data sequence of 10-, 12-, 14- or 16-bit word sequence data formed with the data format similar to the data format of the Y or G data sequence and annexed to the Y and $P_B/P_R$ data sequences or the G, B and R data sequences are converted into plural 20-bit word sequence data each having the word transmission rate of 74.25 MBps and each of the plural 20-bit word sequence data are converted into the serial data to be transmitted.

The data processing to the 20-bit word sequence data having the word transmission rate of 74.25 MBps and the processing for converting the 20-bit word sequence data into the serial data to be transmitted can be carried out with circuit devices used for serial transmission of the 10-bit word digital data constituting the previously proposed HD digital video signal. Further, the additional information data sequence annexed to the Y and $P_B/P_R$ data sequences or the G, B and R data sequences can be a key signal data sequence related to the digital data including the Y and $P_B/P_R$ data sequences or the G, B and R data sequences constituting the digital video signal.

Consequently, with the method of transmitting digital data according to the nineteenth to twenty-third aspect of the present invention or the apparatus for transmitting digital data according to the thirty-ninth to forty-third aspect of the present invention, the digital data constituting the 720P signal with a series of words each made of more than 10 bits, for example, the 12-, 14- or 16-bit word digital data constituting the 720P signal, and the key signal data sequence related to the digital data can be appropriately subjected to serial transmission in such a manner that the key signal data sequence are transmitted as the additional information data sequence annexed to the digital data constituting the 720P signal with use of existing circuit devices used for serial transmission of, for example, the 10-bit word digital data constituting a digital video signal.

BRIEF DESCRIPTION OF THE DRAWINGS

FIG. 4 is a table used for explaining forbidden codes for digital data constituting a digital video signal produced with one of embodiments of method of producing digital data according to the present invention;

FIGS. 6 to 8 are tables used for explaining digital data constituting a digital video signal produced with the embodiment of method of producing digital data according to the first or second aspect of the present invention;

FIG. 11 is a table used for explaining digital data constituting a digital video signal produced with the embodiment of method of producing digital data according to the third aspect of the present invention;

FIGS. 13A to 25 are data charts used for explaining the operation of a data processing portion provided in the data transmitting and receiving apparatus shown in FIG. 12;

FIGS. 29 to 35 are data charts used for explaining the operation of a data processing portion provided in the data transmitting and receiving apparatus shown in FIG. 28;

FIGS. 40 to 60 are data charts used for explaining the operation of a data processing portion provided in the data transmitting and receiving apparatus shown in FIGS. 38 and 39;

FIGS. 64 to 72 are data charts used for explaining the operation of a data processing portion provided in the data transmitting and receiving apparatus shown in FIGS. 62 and 63.

EMNODIMENTS MOST PREFERABLE FOR WORKING OF THE INVENTION

Figure 1:
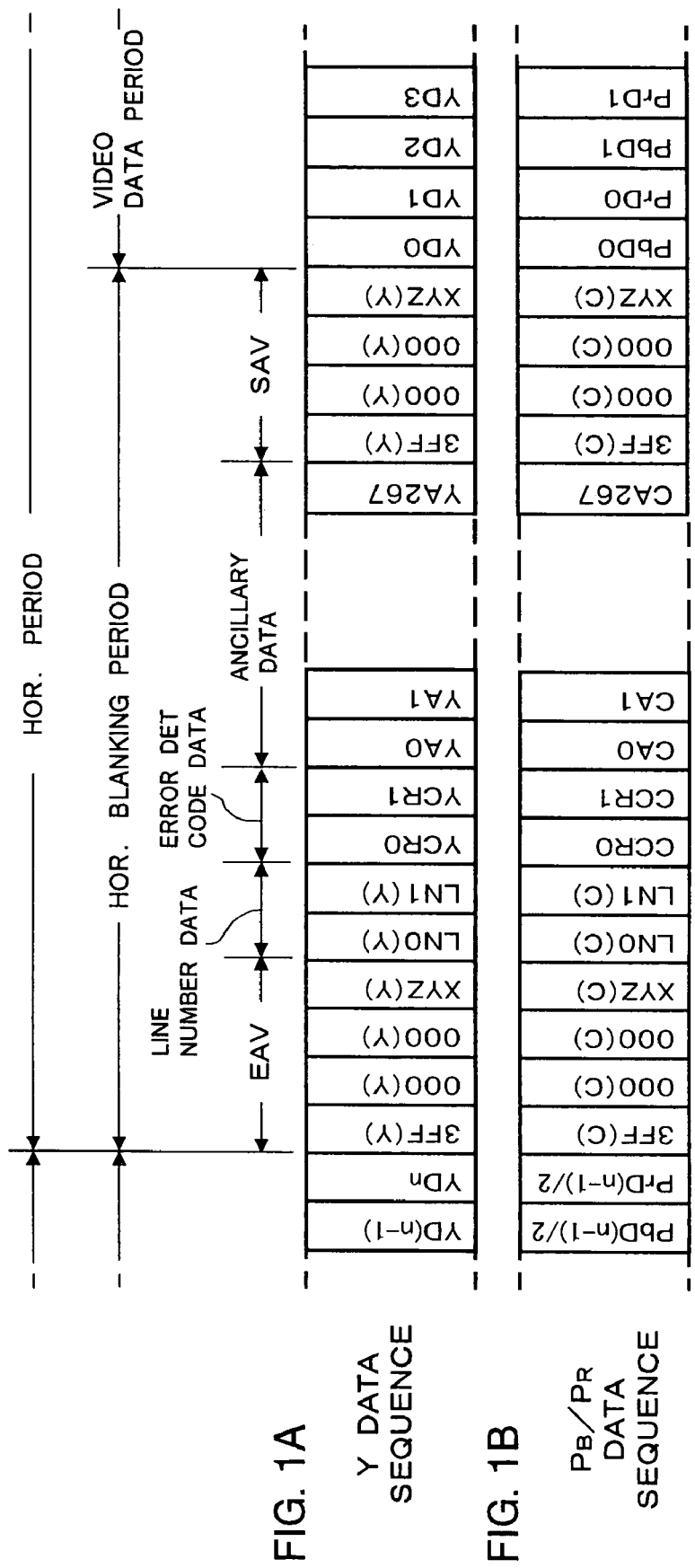
FIGS. 1A and 1B are time charts used for explaining an example of a data format for a digital video signal.
Figure 2:
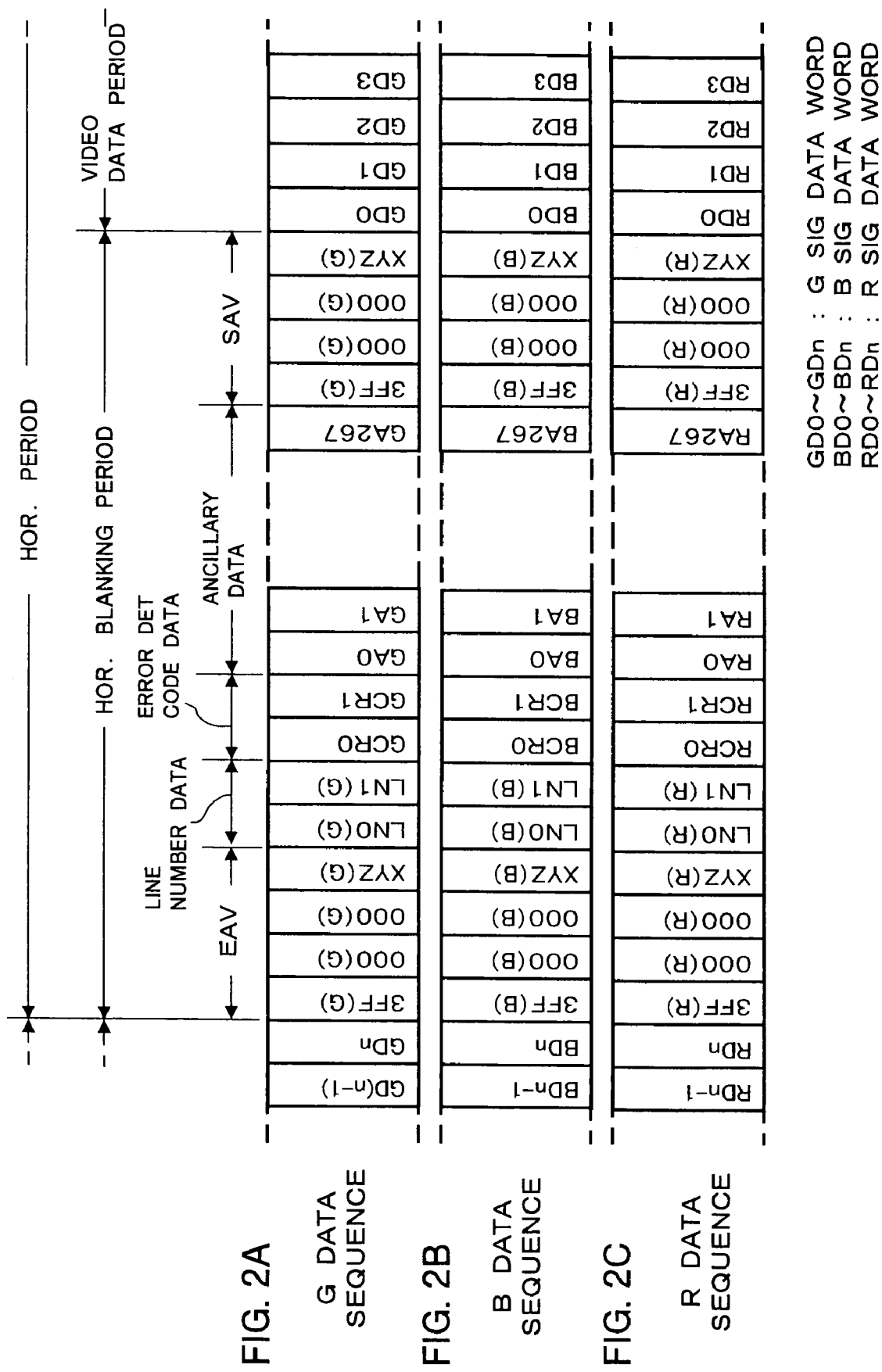
FIGS. 2A, 2B and 2C are time charts used for explaining another example of a data format for a digital video signal.
Figure 3:
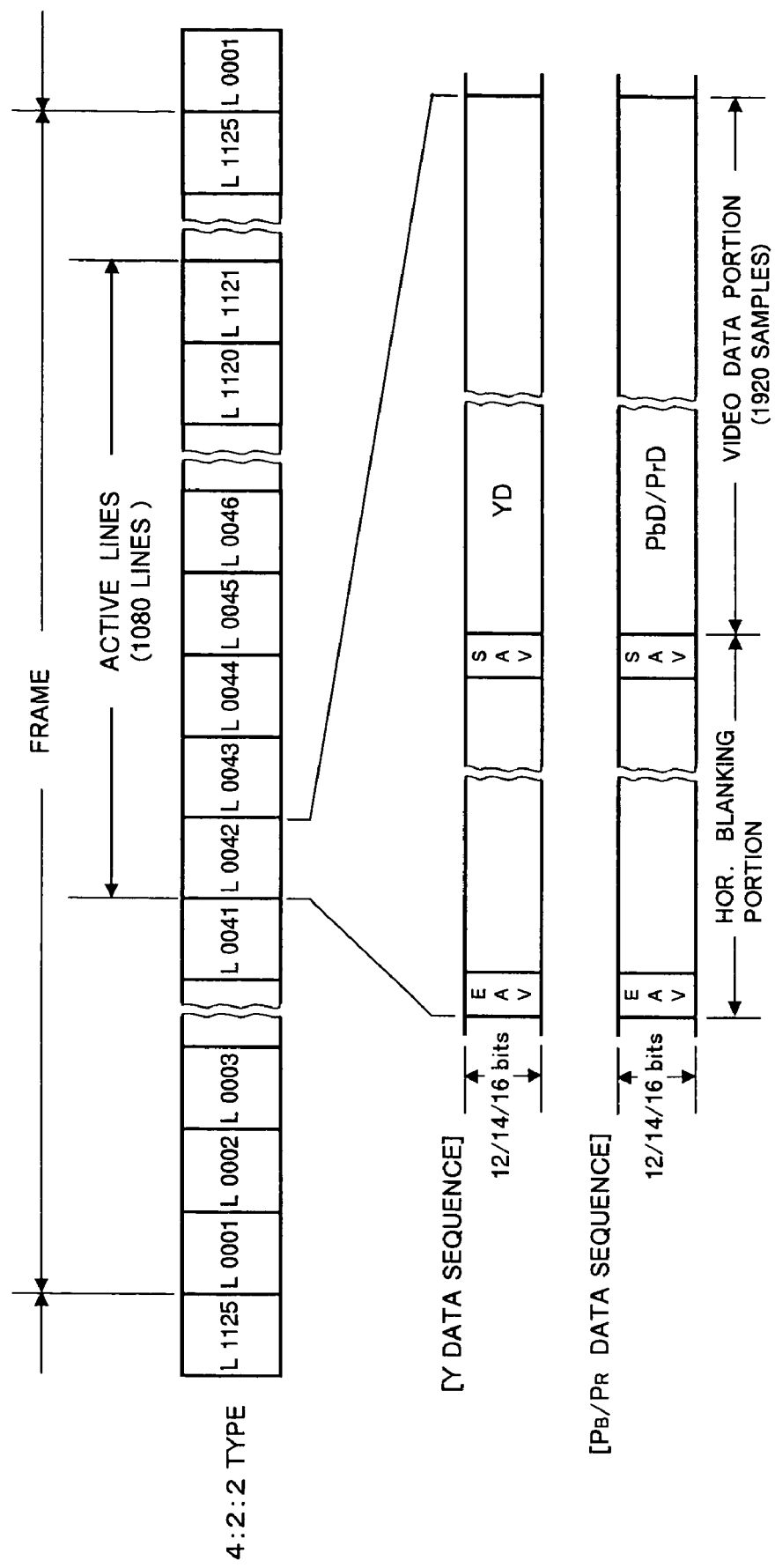
FIG. 3 is a time chart showing an example of a data format of digital data constituting a digital video signal produced with an embodiment of method of producing digital data according to the first or second aspect of the present invention.

FIG. 3 shows an example of a data format for digital data constituting a digital video signal, which are produced with a first embodiment of method of producing digital data according to the first or second aspect of the present invention.

In the first embodiment of method of producing digital data, with which digital data formed in accordance with the data format shown in FIG. 3 are obtained, 12-, 14- or 16-bit word digital data constituting a digital video signal of the 4:2:2 type are produced. The digital data thus produced are composed of a Y data sequence of 12-, 14- or 16-bit word sequence data and a $P_B/P_R$ data sequence of 12-, 14- or 16-bit word sequence data arranged in parallel.

In the method of producing digital data according to the first aspect of the present invention, with which the digital data formed in accordance with the data format shown in FIG. 3 are obtained, arrangements for 12-, 14- or 16-bit word digital data, which include a frame rate of 24 Hz, 25 Hz or 30 Hz, 1125 lines from L0001 to L1125 per frame, 1080 active lines from L0042 to L1121 per frame, a sampling frequency of 74.25 MHz and 1920 active data samples per line, are made. With such arrangements, each of 1125 lines from L0001 to L1125 in each frame is formed to include a line portion of the Y data sequence of 12-, 14- or 16-bit word sequence data and a line portion of the $P_B/P_R$ data sequence of 12-, 14- or 16-bit word sequence data. Especially, in each of 1080 active lines from L0042 to L1121 in each frame, each of the line portions of the Y data sequence of 12-, 14- or 16-bit word sequence data and the $P_B/P_R$ data sequence of 12-, 14- or 16-bit word sequence data includes a line blanking portion and a video data portion, as shown with the line of L0042 in FIG. 3.

The line blanking portion is formed with time reference code data EAV at the beginning end thereof and time reference code data SAV at the terminal end thereof. The video data portion is formed to contain a video data portion of the Y data sequence which is composed of data YD of 12-, 14- or 16-bit word sequence representing luminance signal information of 1920 active data samples and a video data portion of the $P_B/P_R$ data sequence which is composed of data PbD/PrD of 12-, 14- or 16-bit word sequence representing color difference signal information of 1920 active data samples.

Further, another arrangements for 12-, 14- or 16-bit word digital data, in which 12-bit codes each containing an upper 8-bit portion representing 00h or FFh are predetermined to be forbidden codes for the data YD of 12-bit word sequence and the data PbD/PrD of 12-bit word sequence in each of the active lines from L0042 to L1121 in each frame, 14-bit codes each containing an upper 8-bit portion representing 00h or FFh are predetermined to be forbidden codes for the data YD of 14-bit word sequence and the data PbD/PrD of 14-bit word sequence in each of the active lines from L0042 to L1121 in each frame or 16-bit codes each containing an upper 8-bit portion representing 00h or FFh are predetermined to be forbidden codes for the data YD of 16-bit word sequence and the data PbD/PrD of 16-bit word sequence in each of the active lines from L0042 to L1121 in each frame, are made. The forbidden code cannot be used for constituting the data YD representing luminance signal information and the data PbD/PrD representing color difference signal information.

As shown in FIG. 4, the forbidden codes are predetermined to be 000h~00Fh and FF0h~FFFh, namely 0000 0000 0000~0000 0000 1111 and 1111 1111 0000~1111 1111 1111 in case of the 12-bit word digital data, 0000h~003Fh and 3FC0h~FFFFh, namely 00 0000 0000 0000~00 0000 0011 1111 and 11 1111 1100 0000~11 1111 1111 1111 in case of the 14-bit word digital data, and 0000h~00FFh and FF00h~FFFFh, namely 0000 0000 0000 0000~0000 0000 1111 1111 and 1111 1111 0000 0000~1111 1111 1111 1111 in case of the 16-bit word digital data.

As described above, with the method of producing digital data according to the first aspect of the present invention, with which the digital data formed in accordance with the data format shown in FIG. 3 are obtained, the 12-, 14- or 16-bit word digital data constituting the digital video signal of the 4:2:2 type, which have the frame rate of 24 Hz, 25 Hz or 30 Hz, 1125 lines per frame, 1080 active lines per frame, the sampling frequency of 74.25 MHz and 1920 active data samples per line, and in which the 12-bit codes each containing the an upper 8-bit portion representing 00h or FFh are predetermined to be the forbidden codes for each active line in case of the 12-bit word digital data composed of the Y data sequence of 12-bit word sequence data and the $P_B/P_R$ data sequence of 12-bit word sequence data arranged in parallel, the 14-bit codes each containing the upper 8-bit portion representing 00h or FFh are predetermined to be the forbidden codes for each active line in case of the 14-bit word digital data composed of the Y data sequence of 14-bit word sequence data and the $P_B/P_R$ data sequence of 14-bit word sequence data arranged in parallel or the 16-bit codes each containing an upper 8-bit portion representing 00h or FFh are predetermined to be the forbidden codes for each active line in case of the 16-bit word digital data composed of the Y data sequence of 16-bit word sequence data and the $P_B/P_R$ data sequence of 16-bit word sequence data arranged in parallel, are produced.

In the method of producing digital data according to the second aspect of the present invention, with which the digital data formed in accordance with the data format shown in FIG. 3 are obtained, arrangements for 12-, 14- or 16-bit word digital data, which include a frame rate of 50 Hz or 60 Hz, 1125 lines from L0001 to L1125 per frame, 1080 active lines from L0042 to L1121 per frame, a sampling frequency of 148.5 MHz and 1920 active data samples per line, are made. With such arrangements, each of 1125 lines from L0001 to L1125 in each frame is formed in the same manner as that in the method of producing digital data according to the first aspect of the present invention mentioned above.

Further, another arrangements for 12-, 14- or 16-bit word digital data, in which 12-bit codes each containing an upper 8-bit portion representing 00h or FFh are predetermined to be forbidden codes for data YD of 12-bit word sequence representing luminance signal information and data PbD/PrD of 12-bit word sequence representing color difference signal information in each of the active lines from L0042 to L1121 in each frame, 14-bit codes each containing an upper 8-bit portion representing 00h or FFh are predetermined to be forbidden codes for data YD of 14-bit word sequence representing luminance signal information and data PbD/PrD of 14-bit word sequence representing color difference signal information in each of the active lines from L0042 to L1121 in each frame or 16-bit codes each containing an upper 8-bit portion representing 00h or FFh are predetermined to be forbidden codes for data YD of 16-bit word sequence representing luminance signal information and data PbD/PrD of 16-bit word sequence representing color difference signal information in each of the active lines from L0042 to L1121 in each frame, are made also in the same manner as those in the method of producing digital data according to the first aspect of the present invention mentioned above.

With the method of producing digital data according to the second aspect of the present invention, with which the digital data formed in accordance with the data format shown in FIG. 3 are obtained, the 12-, 14- or 16-bit word digital data constituting the digital video signal of the 4:2:2 type, which have the frame rate of 50 Hz or 60 Hz, 1125 lines per frame, 1080 active lines per frame, the sampling frequency of 148.5 MHz and 1920 active data samples per line, and in which the 12-bit codes each containing the upper 8-bit portion representing 00h or FFh are predetermined to be the forbidden codes for each active line in case of the 12-bit word digital data composed of the Y data sequence of 12-bit word sequence data and the $P_B/P_R$ data sequence of 12-bit word sequence data arranged in parallel, the 14-bit codes each containing the upper 8-bit portion representing 00h or FFh are predetermined to be the forbidden codes for each active line in case of the 14-bit word digital data composed of the Y data sequence of 14-bit word sequence data and the $P_B/P_R$ data sequence of 14-bit word sequence data arranged in parallel or the 16-bit codes each containing an upper 8-bit portion representing 00h or FFh are predetermined to be the forbidden codes for each active line in case of the 16-bit word digital data composed of the Y data sequence of 16-bit word sequence data and the $P_B/P_R$ data sequence of 16-bit word sequence data arranged in parallel, are produced.

Figure 5:
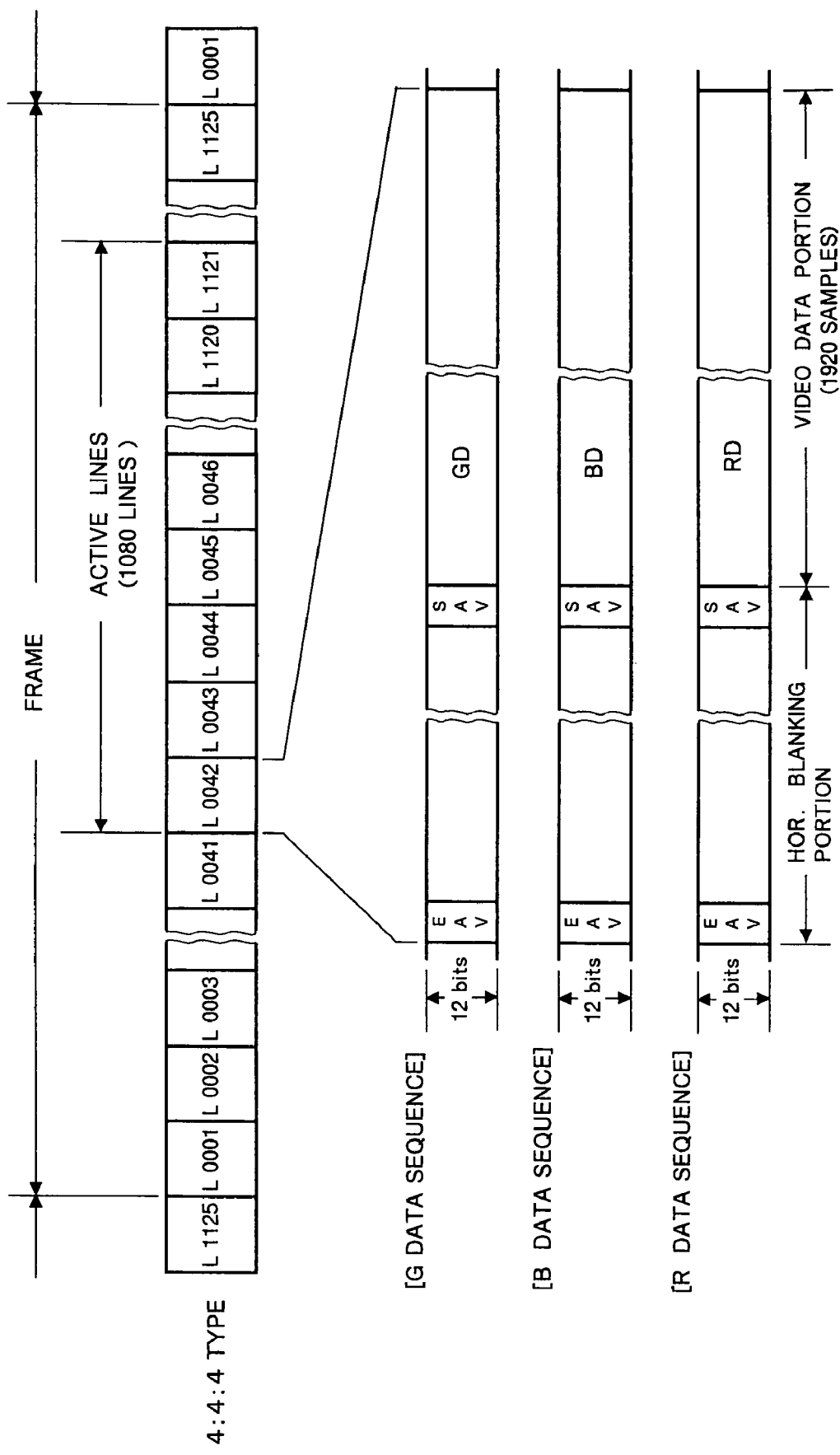
FIG. 5 is a time chart showing an example of a data format of digital data constituting a digital video signal produced with an embodiment of method of producing digital data according to the first or second aspect of the present invention.

FIG. 5 shows an example of a data format for digital data constituting a digital video signal, which are produced with a second embodiment of method of producing digital data according to the first or second aspect of the present invention.

In the second embodiment of method of producing digital data, with which digital data formed in accordance with the data format shown in FIG. 5 are obtained, 12-bit word digital data constituting a digital video signal of the 4:4:4 type are produced. The digital data thus produced are composed of a G data sequence of 12-bit word sequence data, a B data sequence of 12-bit word sequence data and an R data sequence of 12-bit word sequence data arranged in parallel.

In the method of producing digital data according to the first aspect of the present invention, with which the digital data formed in accordance with the data format shown in FIG. 5 are obtained, arrangements for 12-bit word digital data, which include a frame rate of 24 Hz, 25 Hz or 30 Hz, 1125 lines from L0001 to L1125 per frame, 1080 active lines from L0042 to L1121 per frame, a sampling frequency of 74.25 MHz and 1920 active data samples per line, are made. With such arrangements, each of 1125 lines from L0001 to L1125 in each frame is formed to include a line portion of the G data sequence of 12-bit word sequence data, a line portion of the B data sequence of 12-bit word sequence data and a line portion of the R data sequence of 12-bit word sequence data. Especially, in each of 1080 active lines from L0042 to L1121 in each frame, each of the line portions of the G data sequence of 12-bit word sequence data, the B data sequence of 12-bit word sequence data and the R data sequence of 12-bit word sequence data includes a line blanking portion and a video data portion, as shown with the line of L0042 in FIG. 5.

The line blanking portion is formed with time reference code data EAV at the beginning end thereof and time reference code data SAV at the terminal end thereof. The video data portion is formed to contain a video data portion of the G data sequence which is composed of data GD representing green primary color signal information of 1920 active data samples, a video data portion of the B data sequence which is composed of data BD representing blue primary color signal information of 1920 active data samples and a video data portion of the R data sequence which is composed of data RD representing red primary color signal information of 1920 active data samples.

Further, another arrangements for 12-bit word digital data, in which 12-bit codes each containing an upper 8-bit portion representing 00h or FFh are predetermined to be forbidden codes for the data GD of 12-bit word sequence, the data BD of 12-bit word sequence and the data RD of 12-bit word sequence in each of the active lines from L0042 to L1121 in each frame, are made. The forbidden code cannot be used for constituting the data GD representing green primary color signal information, the data BD representing blue primary color signal information and the data RD representing red primary color signal information. The forbidden codes thus predetermined are the same as the forbidden 12-bit codes shown in the table of FIG. 4.

As described above, with the method of producing digital data according to the first aspect of the present invention, with which the digital data formed in accordance with the data format shown in FIG. 5 are obtained, the 12-bit word digital data constituting the digital video signal of the 4:4:4 type, which have the frame rate of 24 Hz, 25 Hz or 30 Hz, 1125 lines per frame, 1080 active lines per frame, the sampling frequency of 74.25 MHz and 1920 active data samples per line, and in which the 12-bit codes each containing the upper 8-bit portion representing 00h or FFh are predetermined to be the forbidden codes for each active line, are produced.

In the method of producing digital data according to the second aspect of the present invention, with which the digital data formed in accordance with the data format shown in FIG. 5 are obtained, arrangements for 12-bit word digital data, which include a frame rate of 50 Hz or 60 Hz, 1125 lines from L0001 to L1125 per frame, 1080 active lines from L0042 to L1121 per frame, a sampling frequency of 148.5 MHz and 1920 active data samples per line, are made. With such arrangements, each of 1125 lines from L0001 to L1125 in each frame is formed in the same manner as that in the method of producing digital data according to the first aspect of the present invention mentioned above.

Further, another arrangements for 12-bit word digital data, in which 12-bit codes each containing an upper 8-bit portion representing 00h or FFh are predetermined to be forbidden codes for data GD of 12-bit word sequence representing green primary color signal information, data BD of 12-bit word sequence representing blue primary color signal information and data RD of 12-bit word sequence representing red primary color signal information, are made also in the same manner as those in the method of producing digital data according to the first aspect of the present invention mentioned above.

With the method of producing digital data according to the second aspect of the present invention, with which the digital data formed in accordance with the data format shown in FIG. 5 are obtained, the 12-bit word digital data constituting the digital video signal of the 4:4:4 type, which have the frame rate of 50 Hz or 60 Hz, 1125 lines per frame, 1080 active lines per frame, the sampling frequency of 148.5 MHz and 1920 active data samples per line, and in which the 12-bit codes each containing the upper 8-bit portion representing 00h or FFh are predetermined to be the forbidden codes for each active line, are produced.

The digital data produced with the method of producing digital data according to the first or second aspect of the present invention as described above, include 12-bit word digital data DA12 to DJ12 each constituting the digital video signal of the 4:2:2 or 4:4:4 type, which have the frame rate of 24 Hz, 25 Hz, 30 Hz, 50 Hz or 60 Hz, 1125 lines per frame, 1080 active lines per frame, the sampling frequency of 74.25 MHz or 148.5 MHz and 1920 active data samples per line, and in which the 12-bit codes each containing the upper 8-bit portion representing 00h or FFh are predetermined to be the forbidden codes for each active line, as shown in a table of FIG. 6, 14-bit word digital data DA14 to DE14 each constituting the digital video signal of the 4:2:2 type, which have the frame rate of 24 Hz, 25 Hz, 30 Hz, 50 Hz or 60 Hz, 1125 lines per frame, 1080 active lines per frame, the sampling frequency of 74.25 MHz or 148.5 MHz and 1920 active data samples per line, and in which the 14-bit codes each containing the upper 8-bit portion representing 00h or FFh are predetermined to be the forbidden codes for each active line, as shown in a table of FIG. 7, and 16-bit word digital data DA16 to DE16 each constituting the digital video signal of the 4:2:2 or 4:4:4 type, which have the frame rate of 24 Hz, 25 Hz, 30 Hz, 50 Hz or 60 Hz, 1125 lines per frame, 1080 active lines per frame, the sampling frequency of 74.25 MHz or 148.5 MHz and 1920 active data samples per line, and in which the 16-bit codes each containing the upper 8-bit portion representing 00h or FFh are predetermined to be the forbidden codes for each active line, as shown in a table of FIG. 8.

Figure 9:
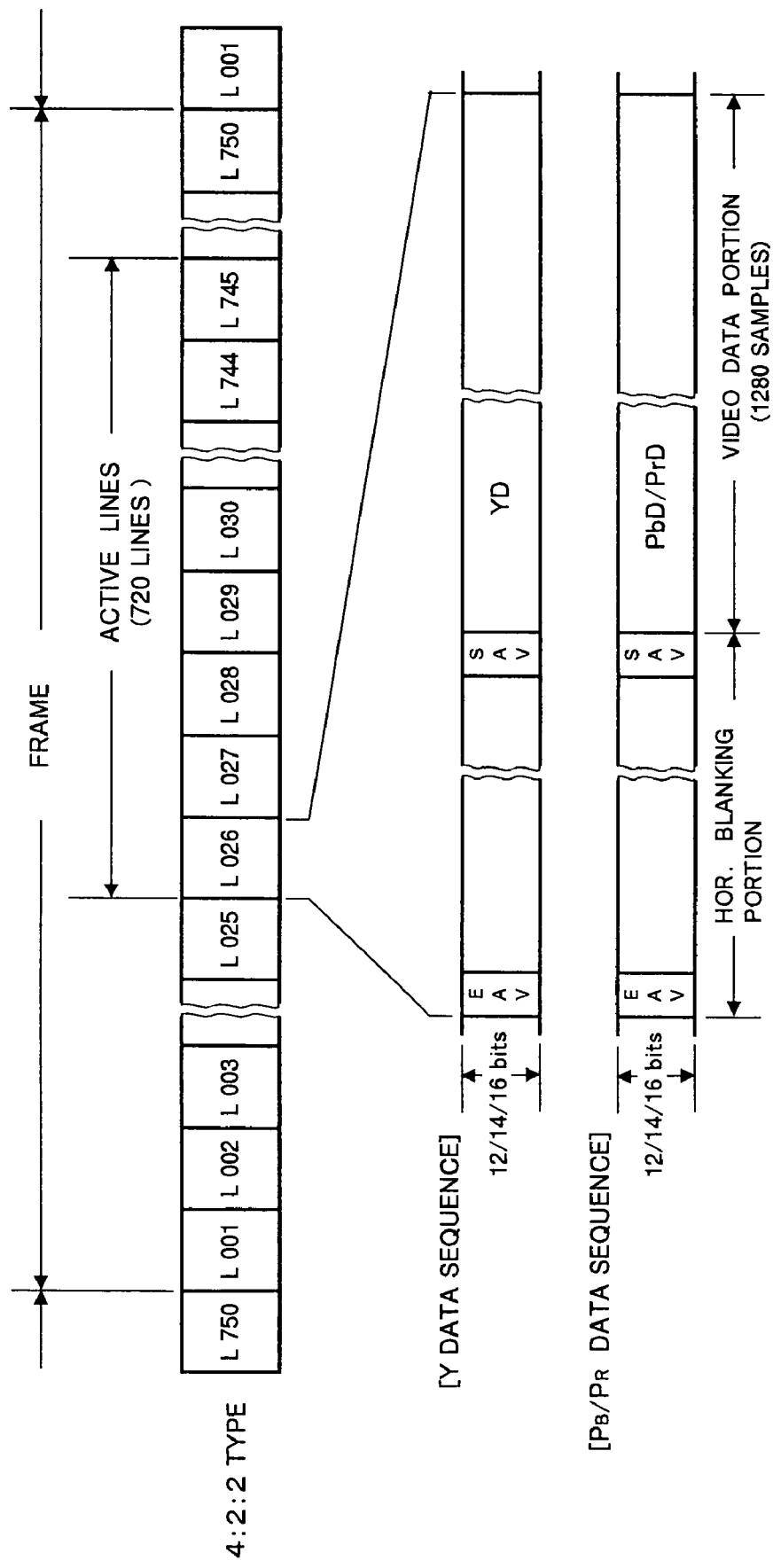
FIG. 9 is a time chart showing an example of a data format of digital data constituting a 720P signal produced with an embodiment of method of producing digital data according to the third aspect of the present invention.

FIG. 9 shows an example of a data format for digital data constituting a 720P signal, which are produced with a first embodiment of method of producing digital data according to the third aspect of the present invention.

In the first embodiment of method of producing digital data, with which digital data formed in accordance with the data format shown in FIG. 9 are obtained, 12-, 14- or 16-bit word digital data constituting a 720P signal of the 4:2:2 type are produced. The digital data thus produced are composed of a Y data sequence of 12-, 14- or 16-bit word sequence data and a $P_B/P_R$ data sequence of 12-, 14- or 16-bit word sequence data arranged in parallel.

In the method of producing digital data according to the third aspect of the present invention, with which the digital data formed in accordance with the data format shown in FIG. 9 are obtained, arrangements for 12-, 14- or 16-bit word digital data, which include a frame rate of 60 Hz, 750 lines from L001 to L750 per frame, 720 active lines from L026 to L745 per frame, a sampling frequency of 74.25 MHz and 1280 active data samples per line, are made. With such arrangements, each of 750 lines from L001 to L750 in each frame is formed to include a line portion of the Y data sequence of 12-, 14- or 16-bit word sequence data and a line portion of the $P_B/P_R$ data sequence of 1,2-, 14- or 16-bit word sequence data. Especially, in each of 720 active lines from L026 to L745 in each frame, each of the line portions of the Y data sequence of 12-, 14- or 16-bit word sequence data and the $P_B/P_R$ data sequence of 12-, 14- or 16-bit word sequence data includes a line blanking portion and a video data portion, as shown with the line of L026 in FIG. 9.

The line blanking portion is formed with time reference code data EAV at the beginning end thereof and time reference code data SAV at the terminal end thereof. The video data portion is formed to contain a video data portion of the Y data sequence which is composed of data YD of 12-, 14- or 16-bit word sequence representing luminance signal information of 1280 active data samples and a video data portion of the $P_B/P_R$ data sequence which is composed of data PbD/PrD of 12-, 14- or 16-bit word sequence representing color difference signal information of 1280 active data samples.

Further, another arrangements for 12-, 14- or 16-bit word digital data, in which 12-bit codes each containing an upper 8-bit portion representing 00h or FFh are predetermined to be forbidden codes for the data YD of 12-bit word sequence and the data PbD/PrD of 12-bit word sequence in each of the active lines from L026 to L745 in each frame, 14-bit codes each containing an upper 8-bit portion representing 00h or FFh are predetermined to be forbidden codes for the data YD of 14-bit word sequence and the data PbD/PrD of 14-bit word sequence in each of the active lines from L026 to L745 in each frame or 16-bit codes each containing an upper 8-bit portion representing 00h or FFh are predetermined to be forbidden codes for the data YD of 16-bit word sequence and the data PbD/PrD of 16-bit word sequence in each of the active lines from L026 to L745 in each frame, are made. The forbidden code cannot be used for constituting the data YD representing luminance signal information and the data PbD/PrD representing color difference signal information. The forbidden codes thus predetermined are the same as the forbidden 12-bit codes, the forbidden 14-bit codes and the forbidden 16-bit codes shown in the table of FIG. 4.

As described above, with the method of producing digital data according to the third aspect of the present invention, with which the digital data formed in accordance with the data format shown in FIG. 9 are obtained, the 12-, 14- or 16-bit word digital data constituting the 720P signal of the 4:2:2 type, which have the frame rate of 24 Hz, 25 Hz or 30 Hz, 750 lines per frame, 720 active lines per frame, the sampling frequency of 74.25 MHz and 1280 active data samples per line, and in which the 12-bit codes each containing the an upper 8-bit portion representing 00h or FFh are predetermined to be the forbidden codes for each active line in case of the digital data of 12-bit word composed of the Y data sequence of 12-bit word sequence data and the $P_B/P_R$ data sequence of 12-bit word sequence data arranged in parallel, the 14-bit codes each containing the upper 8-bit portion representing 00h or FFh are predetermined to be the forbidden codes for each active line in case of the digital data of 14-bit word composed of the Y data sequence of 14-bit word sequence data and the $P_B/P_R$ data sequence of 14-bit word sequence data arranged in parallel or the 16-bit codes each containing an upper 8-bit portion representing 00h or FFh are predetermined to be the forbidden codes for n each active line in case of the digital data of 16-bit word composed of the Y data sequence of 16-bit word sequence data and the $P_B/P_R$ data sequence of 16-bit word sequence data arranged in parallel, are produced.

Figure 10:
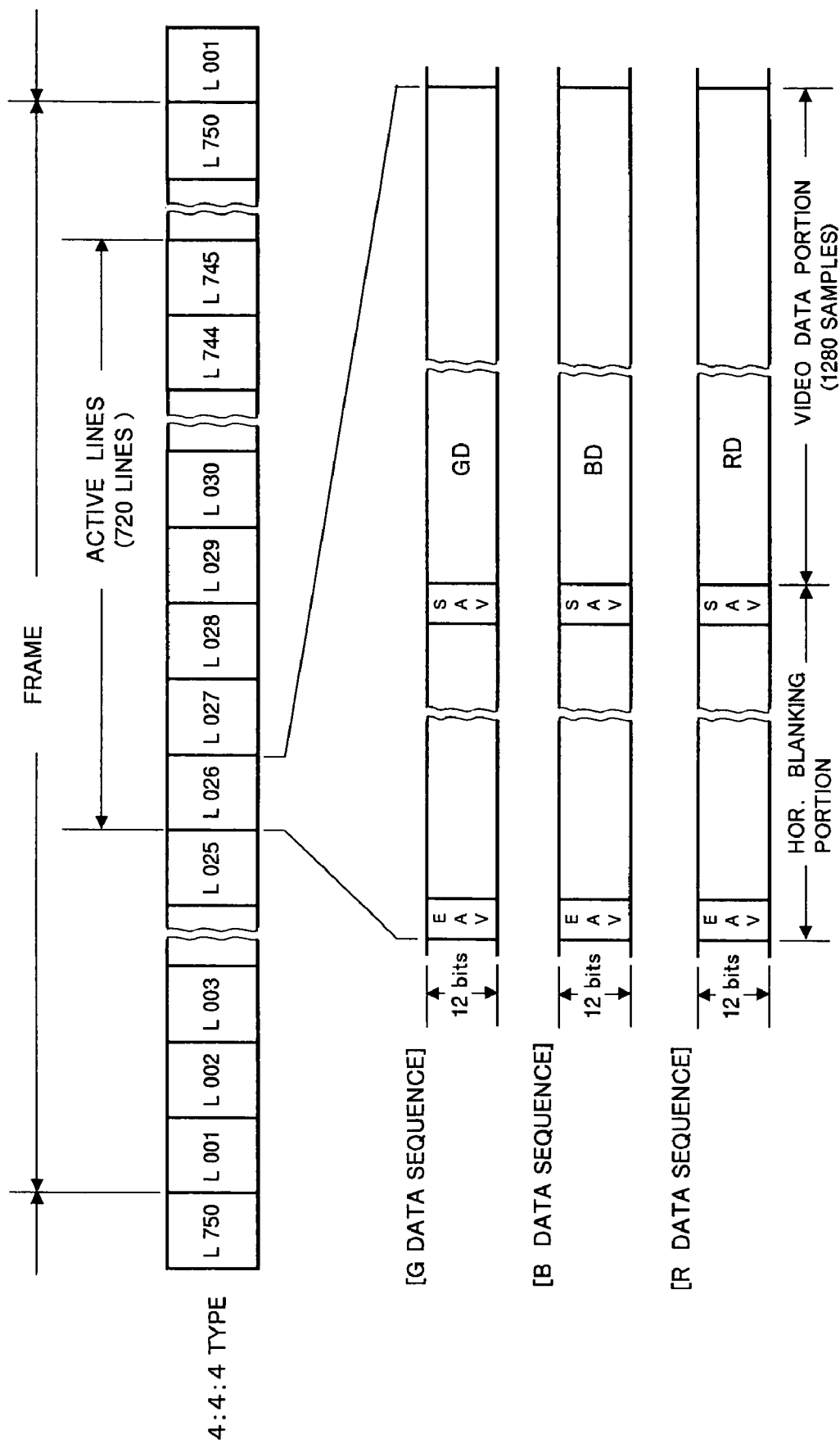
FIG. 10 is a time chart showing an example of a data format of digital data constituting a digital video signal produced with an embodiment of method of producing digital data according to the third aspect of the present invention.

FIG. 10 shows an example of a data format for digital data constituting the 720P signal, which are produced with a second embodiment of method of producing digital data according to the third aspect of the present invention.

In the second embodiment of method of producing digital data, with which digital data formed in accordance with the data format shown in FIG. 10 are obtained, 12-bit word digital data constituting a. 720P signal of the 4:4:4 type are produced. The digital data thus produced are composed of a G data sequence of 12-bit word sequence data, a B data sequence of 12-bit word sequence data and an R data sequence of 12-bit word sequence data arranged in parallel.

In the method of producing digital data according to the third aspect of the present invention, with which the digital data formed in accordance with the data format shown in FIG. 10 are obtained, arrangements for 12-bit word digital data composed of the G data sequence of 12-bit word sequence data, the B data sequence of 12-bit word sequence data and the R data sequence of 12-bit word sequence data arranged in parallel, which include a frame rate of 60 Hz, 750 lines from L001 to L750 per frame, 720 active lines from L026 to L745 per frame, a sampling frequency of 74.25 MHz and 1280 active data samples per line, are made. With such arrangements, each of 750 lines from L001 to L750 in each frame is formed to include a line portion of the G data sequence of 12-bit word sequence data, a line portion of the B data sequence of 12-bit word sequence data and a line portion of the R data sequence of 12-bit word sequence data. Especially, in each of 720 active lines from L026 to L745 in each frame, each of the line portions of the G data sequence of 12-bit word sequence data, the B data sequence of 12-bit word sequence data and the R data sequence of 12-bit word sequence data includes a line blanking portion and a video data portion, as shown with the line of L026 in FIG. 10.

The line blanking portion is formed with time reference code data EAV at the beginning end thereof and time reference code data SAV at the terminal end thereof. The video data portion is formed to contain a video data portion of the G data sequence which is composed of data GD representing green primary color signal information of 1280 active data samples, a video data portion of the B data sequence which is composed of data BD representing blue primary color signal information of 1280 active data samples and a video data portion of the R data sequence which is composed of data RD representing red primary color signal information of 1280 active data samples.

Further, another arrangements for 12-bit word digital data composed of the G data sequence of 12-bit word sequence data, the B data sequence of 12-bit word sequence data and the R data sequence of 12-bit word sequence data arranged in parallel, in which 12-bit codes each containing an upper 8-bit portion representing 00h or FFh are predetermined to be forbidden codes for the data GD of 12-bit word sequence, the data BD of 12-bit word sequence and the data RD of 12-bit word sequence in each of the active lines from L026 to L745 in each frame, are made. The forbidden code cannot be used for constituting the data GD representing green primary color signal information, the data BD representing blue primary color signal information and the data RD representing red primary color signal information. The forbidden codes thus predetermined are the same as the forbidden 12-bit codes shown in the table of FIG. 4.

As described above, with the method of producing digital data according to the third aspect of the present invention, with which the digital data formed in accordance with the data format shown in FIG. 10 are obtained, the 12-bit word digital data constituting the 720P signal of the 4:4:4 type, which have the frame rate of 24 Hz, 25 Hz or 30 Hz, 750 lines per frame, 720 active lines per frame, the sampling frequency of 74.25 MHz and 1280 active data samples per line, and in which the 12-bit codes each containing the upper 8-bit portion representing 00h or FFh are predetermined to be the forbidden codes for each active line, are produced.

The digital data produced with the method of producing digital data according to the third aspect of the present invention as described above, include 12-, 14- or 16-bit word digital data DDT12, DDT14, DDT16 and DIT12 each constituting the 720P signal of the 4:2:2 or 4:4:4 type, which have the frame rate of 60 Hz, 750 lines per frame, 720 active lines per frame, the sampling frequency of 74.25 MHz and 1280 active data samples per line, and in which the 12-bit codes each containing the upper 8-bit portion representing 00h or FFh are predetermined to be the forbidden codes for each active line in case of the 12-bit word digital data composed of the Y data sequence of 12-bit word sequence data and the $P_B/P_R$ data sequence of 12-bit word sequence data arranged in parallel, the 14-bit codes each containing the upper 8-bit portion representing 00h or FFh are predetermined to be the forbidden codes for each active line in case of the 14-bit word digital data composed of the Y data sequence of 14-bit word sequence data and the $P_B/P_R$ data sequence of 14-bit word sequence data arranged in parallel or the 16-bit codes each containing an upper 8-bit portion representing 00h or FFh are predetermined to be the forbidden codes for each active line in case of the 16-bit word digital data composed of the Y data sequence of 16-bit word sequence data and the $P_B/P_R$ data sequence of 16-bit word sequence data arranged in parallel, as shown in a table of FIG. 11.

Figure 12:
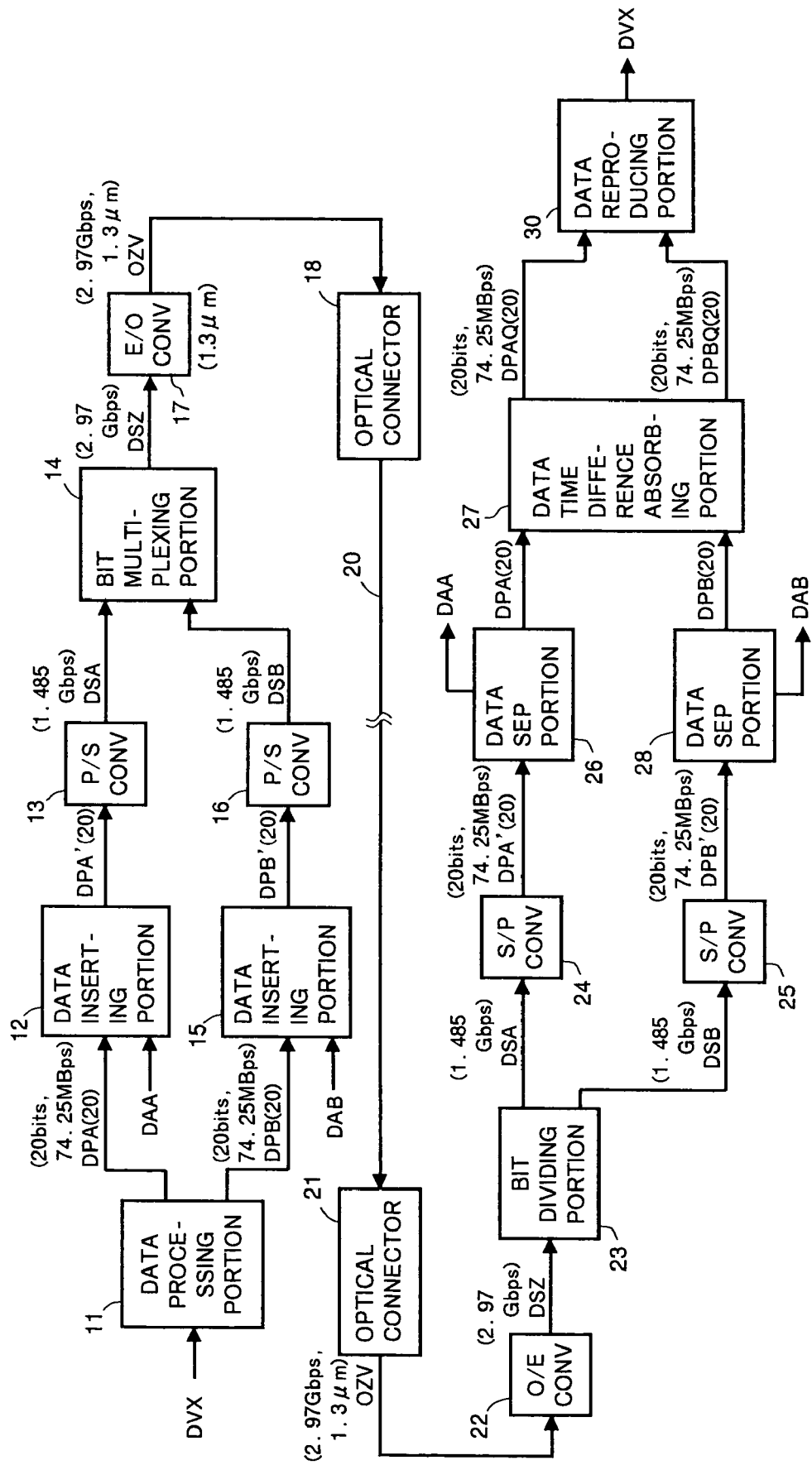
FIG. 12 is a schematic block diagram showing an example of a data transmitting and receiving apparatus including an embodiment of apparatus for transmitting digital data according to one of the twenty-fourth, twenty-fifth, twenty-eighth to thirty-second and thirty-ninth to forty-first aspects of the present invention, in which an embodiment of method of transmitting digital data according to one of the fourth, fifth, eighth to twelfth and nineteenth to twenty-first aspects of the present invention is carried out.

FIG. 12 shows an example of a data transmitting and receiving apparatus which includes a first embodiment of apparatus for transmitting digital data according to one of the twenty-fourth, twenty-fifth, twenty-eighth to thirty-second and thirty-ninth to forty-first aspects of the present invention, in which an embodiment of method of transmitting digital data according to one of the fourth, fifth, eighth to twelfth and nineteenth to twenty-first aspects of the present invention is carried out.

Referring to FIG. 12, in a transmitting side which constitutes the embodiment of apparatus for transmitting digital data according to the present invention, digital data DVX are supplied to a data processing portion 11.

The digital data DVX are one of digital data DA12 to DC12, DF12 to DH12, DA14 to DC14 and DA16 to DC16 constituting a digital video signal of the 4:2:2 or 4:4:4 type shown in the tables of FIGS. 6 to 8; one of digital data DDT12 to DDT14, DDT16 and DIT12 constituting a 720P signal of the 4:2:2 or 4:4:4 type shown in the table of FIG. 11; data DVA10+DKA10 composed of 10-bit word digital data DA10, DB10 or DC10 constituting a digital video data of the 4:2:2 type, which have a frame rate of 24 Hz, 25 Hz or 30 Hz, 1125 lines per frame, 1080 active lines per frame, a sampling frequency of 74.25 MHz and 1920 active data samplings per line, and a key signal data sequence DKA10 of 10-bit word sequence data annexed to the digital data DA10, DB10 or DC10; data DVB10+DKB10 composed of 10-bit word digital data DF10, DG10 or DH10 constituting a digital video data of the 4;4;4 type, which have a frame rate of 24 Hz, 25 Hz or 30 Hz, 1125 lines per frame, 1080 active lines per frame, a sampling frequency of 74.25 MHz and 1920 active data samplings per line, and a key signal data sequence DKB10 of 10-bit word sequence data annexed to the digital data DF10, DG10 or DHC0; data DVA12+ DKA12 composed of the digital data DA12, DB12 or DC12 and a key signal data sequence DKA12 of 12-bit word sequence data annexed to the digital data DA12, DB12 or DC12; data DDT10+DKD10 composed of 10-bit word digital data DDT10 constituting a 720P signal of the 4:2:2 type, which have a frame rate of 60 Hz, 750 lines per frame, 720 active lines per frame, a sampling frequency of 74.25 MHz and 1280 active data samplings per line, and a key signal data sequence DKD10 of 10-bit word sequence data annexed to the digital data DDT10; data DIT10+DKI10 composed of digital data DIT10 of 10-bit word sequence constituting a 720P signal of the 4;4;4 type, which have a frame rate of 60 Hz, 750 lines per frame, 720 active lines per frame, a sampling frequency of 74.25 MHz and 1280 active data samplings per line, and a key signal data sequence DKI10 of 10-bit word sequence data annexed to the digital data DIT10; or data DDT12+DKD12 composed of the digital data DDT12 and a key signal data sequence DKD12 of 12-bit word sequence data annexed to the digital data DDT12. Each of the key signal data sequences DKA10, DKA12, DKD10 and DKD12 is formed with a data format similar to the data format of the Y data format to be an additional information data sequence accompanying the Y and $P_B/P_R$ data sequences. Each of the key signal data sequences DKB10 and DKI10 is formed with a data format similar to the data format of the G data format to be an additional information data sequence accompanying the G, B and R data sequences.

When the digital data DVX are one of the 12-bit word digital data DA12 to DC12 constituting the digital video signal of the 4:2:2 type, for example, the 12-bit word digital data DA12, shown in the table of FIG. 6, or the 12-bit word digital data DDA12 constituting the 720P signal of the 4:2:2 type shown in the table of FIG. 11, the 12-bit word digital data DA12 or DDA12 are supplied to the data processing portion 11 in the form of 24-bit word sequence data having a word transmission rate of 74.25 MBps, in which Y data sequence of 12-bit word sequence data having the word transmission rate of 74.25 MBps and the $P_B/P_R$ data sequence of 12-bit word sequence data having the word transmission rate of 74.25 MBps are multiplexed in parallel with each other in frame and line synchronism, as shown in FIG. 13A.

In the data processing portion 11, the 12-bit word digital data DA12 or DDT12 supplied in the form shown in FIG. 13A are subjected to data processing for dividing each of 12-bit words (YD0, YD1, YD2, YD3, . . . ) constituting the Y data sequence and 12-bit words (PbD0, PrD0, PbD1, PrD1, PbD2, PrD2, . . . ) constituting the $P_B/P_R$ data sequence into an upper 10-bit portion (Y0;2~Y0;11, Y1;2~Y1;11, Y2;2~Y2;11, Y3;2~Y3;11, . . . , Pb0;2~Pb0;11, Pr0;2~Pr0;11, Pb1;2~Pb1;11, Pr1;2~Pr1;11, Pb2;2~Pb2;11, Pr2;2~Pr2;11, . . . ) and a lower 2-bit portion (Y0;0~Y0;1, Y1;0~Y1;1, Y2;0~Y2;1, Y3;0~Y3;1, . . . , Pb0;0~Pb0;1, Pr0;0~Pr0;1, Pb1;0~Pb1;1, Pr1;0~Pr1;1, Pb2;0~Pb2;1, Pr2; 0~Pr2;1, . . . ).

The upper 10-bit portions, Y0;2~Y1;11, Y2;2~Y2;11, Y3;2~Y3;11, . . . and the upper 10-bit portions Pb0;2~Pb0; 11, Pr0;2~Pr0;11, Pb1;2~Pb1;11, Pr1;2~Pr1;11, Pb2;2~Pb2; 11, Pr2;2~Pr2;11, . . . are multiplexed in parallel with each other to produce 20-bit word sequence data DA12A or DDT12A having the word transmission rate of 74.25 MBps as a link A, as shown in FIG. 13B.

Ancillary 8-bit word $\alpha 0$, $\alpha 1$, $\alpha 2$, $\alpha 3$, . . . are added to the lower 2-bit portions Y0;0~Y0;1, Y1;0~Y1;1, Y2;0~Y2;1, Y3;0~Y3;1, . . . , respectively, to produce 10-bit word data Y0;0~Y0;1+$\alpha 0$, Y1;0~Y1;1+$\alpha 1$, Y2;0~Y2;1+$\alpha 2$, Y3;0~Y3; 1+$\alpha 3$, . . . Further, ancillary 8-bit word $\beta 0$, $\beta 1$, $\beta 2$, $\beta 3$, $\beta 4$, $\beta 5$, . . . are added to the lower 2-bit portions Pb0;0~Pb0;1, Pr0;0~Pr0;1, Pb1;0~Pb1;1, Pr1;0~Pr1;1, Pb2;0~Pb2;1, Pr2; 0~Pr2;1, . . . , respectively, to produce 10-bit word data Pb0;0~Pb0;1+$\beta 0$, Pr0;0~Pr0;1+$\beta 1$, Pb1;0~Pb1;1+$\beta 2$, Pr1; 0~Pr1;1+$\beta 3$, Pb2;0~Pb2;1+$\beta 4$, Pr2;0~Pr2;1+$\beta 5$, . . . .

Then, the 10-bit word data Y0;0~Y0;1+$\alpha 0$, Y1;0~Y1;1+ $\alpha 1$, Y2;0~Y2;1+$\alpha 2$, Y3;0~Y3;1+$\alpha 3$, . . . and the 10-bit word data Pb0;0~Pb0;1+$\beta 0$, Pr0;0~Pr0;1+$\beta 1$, Pb1;0~Pb1;1+$\beta 2$, Pr1;0~Pr1;1+$\beta 3$, Pb2;0~Pb2;1+$\beta 4$, Pr2;0~Pr2;1+$\beta 5$, . . . are multiplexed in parallel with each other to produce 20-bit word sequence data DA12B or DDT12B having the word transmission rate of 74.25 MBps as a link B, as shown in FIG. 13C.

Namely, the 12-bit word digital data DA12 or DDT12 in the form of 24-bit word sequence are converted to a couple of 20-bit word sequence data which are the 20-bit word sequence data DA12A or DDT12A having the word transmission rate of 74.25 MBps and the 20-bit word sequence data DA12B or DDT12B having the word transmission rate of 74.25 MBps.

When the digital data DVX are the 12-bit word digital data DB12 or DC12 shown in the table of FIG. 6, the 12-bit word digital data DB12 or DCT12 in the form of 24-bit word sequence having the word transmission rate of 74.25 MBps are converted to a couple of 20-bit word sequence data each having a word transmission rate of 74.25 MBps in the similar manner as the 12-bit word digital data DA12 supplied as the digital data DVX.

When the digital data DVX are one of the 14-bit word digital data DA14 to DC14 constituting the digital video signal of the 4:2:2 type, for example, the 14-bit word digital data DA14, shown in the table of FIG. 7, or the 14-bit word digital data DDA14 constituting the 720P signal of the 4:2:2 type shown in the table of FIG. 11, the 14-bit word digital data DA14 or DDA14 are supplied to the data processing portion 11 in the form of 28-bit word sequence data having the word transmission rate of 74.25 MHz, in which the Y data sequence of 14-bit word sequence data having the word transmission rate of 74.25 MHz and the $P_B/P_R$ data sequence of 12-bit word sequence data having the word transmission rate of 74.25 MHz are multiplexed in parallel with each other in frame and line synchronism, as shown in FIG. 14A.

In the data processing portion 11, the 14-bit word digital data DA14 or DDT14 supplied in the form shown in FIG. 14A are subjected to data processing for dividing each of 14-bit words (YD0, YD1, YD2, YD3, . . . ) constituting the Y data sequence and 14-bit words (PbD0, PrD0, PbD1, PrD1, PbD2, PrD2, . . . ) constituting the $P_B/P_R$ data sequence into an upper 10-bit portion (Y0;4~Y0;13, Y1;4~Y1;13, Y2;4~Y2;13, Y3;4~Y3;13, . . . , Pb0;4~Pb0;13, Pr0;4~Pr0;13, Pb1;4~Pb1;13, Pr1;4~Pr1;13, Pb2;4~Pb2;13, Pr2;4~Pr2;13, . . . ) and a lower 4-bit portion (Y0;0~Y0;3, Y1;0~Y1;3, Y2;0~Y2;3, Y3;0~Y3;3, . . . , Pb0;0~Pb0;3, Pr0;0~Pr0;3, Pb1;0~Pb1;3, Pr1;0~Pr1;3, Pb2;0~Pb2;3, Pr2;0~Pr2;3, . . . ).

The upper 10-bit portions Y0;4~Y0;13, Y1;4~Y1;13, Y2;4~Y2;13, Y3;4~Y3;13, . . . and the upper 10-bit portions Pb0;4~Pb0;13, Pr0;4~Pr0;13, Pb1;4~Pb1;13, Pr1;4~Pr1;13, Pb2;4~Pb2;13, Pr2;4~Pr2;13, . . . are multiplexed in parallel with each other to produce 20-bit word sequence data DA14A or DDT14A having the word transmission rate of 74.25 MBps as a link A, as shown in FIG. 14B.

Ancillary 6-bit word α0, α1, α2, α3, . . . are added to the lower 4-bit portions Y0;0~Y0;3, Y1;0~Y1;3, Y2;0~Y2;3, Y3;0~Y3;3, . . . , respectively, to produce 10-bit word data Y0;0~Y0;3+α0, Y1;0~Y1;3+α1, Y2;0~Y2;3+α2, Y3;0~Y3;3+α3, . . . . Further, ancillary 6-bit word β0, β1, β2, β3, β4, β5, . . . are added to the lower 4-bit portions Pb0;0~Pb0;3, Pr0;0~Pr0;3, Pb1;0~Pb1;3, Pr1;0~Pr1;3, Pb2;0~Pb2;3, Pr2;0~Pr2;3, . . . , respectively, to produce 10-bit word data Pb0;0~Pb0;3+β0, Pr0;0~Pr0;3+β1, Pb1;0~Pb1;3+β2, Pr1;0~Pr1;3+β3, Pb2;0~Pb2;3+β4, Pr2;0~Pr2;3+β5, . . . .

Then, the 10-bit word data Y0;0~Y0;3+α0, Y1;0~Y1;3+α1, Y2;0~Y2;3+α2, Y3;0~Y3;3+α3, . . . and the 10-bit word data Pb0;0~Pb0;3+β0, Pr0;0~Pr0;3+β1, Pb1;0 ~Pb1;3+β2, Pr1;0~Pr1;4+β3, Pb2;0~Pb2;3+β4, Pr2;0~Pr2;3+β5, . . . are multiplexed in parallel with each other to produce 20-bit word sequence data DA14B or DDT14B having the word transmission rate of 74.25 MBps as a link B, as shown in FIG. 14C.

Namely, the 14-bit word digital data DA14 or DDT14 in the form of 28-bit word sequence are converted to a couple of 20-bit word sequence data which are the 20-bit word sequence data DA14A or DDT14A having the word transmission rate of 74.25 MBps and the 20-bit word sequence data DA14B or DDT14B having the word transmission rate of 74.25 MBps.

When the digital data DVX are the 14-bit word digital data DB14 or DC14 shown in the table of FIG. 7, the 14-bit word digital data DB14 or DCT14 in the form of 28-bit word sequence data having the word transmission rate of 74.25 MBps are converted to a couple of 20-bit word sequence data each having the word transmission rate of 74.25 MBps in the similar manner as the 14-bit word digital data DA14 supplied as the digital data DVX.

When the digital data DVX are one of the 16-bit word digital data DA16 to DC16 constituting the digital video signal of the 4:2:2 type, for example, the 16-bit word digital data DA16, shown in the table of FIG. 8, or the 16-bit word digital data DDA16 constituting the 720P signal of the 4:2:2 type shown in the table of FIG. 11, the 16-bit word digital data DA16 or DDA16 are supplied to the data processing portion 11 in the form of 32-bit word sequence data having the word transmission rate of 74.25 MHz, in which the Y data sequence of 16-bit word sequence data having the word transmission rate of 74.25 MHz and the $P_B/P_R$ data sequence of 16-bit word sequence data having the word transmission rate of 74.25 MHz are multiplexed in parallel with each other in frame and line synchronism, as shown in FIG. 15A.

In the data processing portion 11, the 16-bit word digital data DA16 or DDT16 supplied in the form shown in FIG. 15A are subjected to data processing for dividing each of 16-bit words (YD0, YD1, YD2, YD3, . . . ) constituting the Y data sequence and 16-bit words (PbD0, PrD0, PbD1, PrD1, PbD2, PrD2, . . . ) constituting the $P_B/P_R$ data sequence into an upper 10-bit portion (Y0;6~Y0;15, Y1;6~Y1;15, Y2;6~Y2;15, Y3;6~Y3;15, . . . , Pb0;6~Pb0;15, Pr0;6~Pr0;15, Pb1;6~Pb1;15, Pr1;6~Pr1;15, Pb2;6~Pb2;15, Pr2;6~Pr2;15, . . . ) and a lower 6-bit portion (Y0;0~Y0;5, Y1;0~Y1;5, Y2;0~Y2;5, Y3;0~Y3;5, . . . , Pb0;0~Pb0;5, Pr0;0~Pr0;5, Pb1;0~Pb1;5, Pr1;0~Pr1;5, Pb2;0~Pb2;5, Pr2;0~Pr2;5, . . . .

The upper 10-bit portions Y0;6~Y0;15, Y1;6~Y1;15, Y2;6~Y2;15, Y3;6~Y3;15, . . . and the upper 10-bit portions Pb0;6~Pb0;15, Pr0;6~Pr0;15, Pb1;6~Pb1;15, Pr1;6~Pr1;15, Pb2;6~Pb2;15, Pr2;6~Pr2;15, . . . are multiplexed in parallel with each other to produce 20-bit word sequence data DA16A or DDT16A having the word transmission rate of 74.25 MBps as a link A based on the upper 10-bit portions, as shown in FIG. 15B.

Ancillary 4-bit word α0, α1, α2, α3, . . . are added to the lower 6-bit portions Y0;0~Y0;5, Y1;0~Y1;5, Y2;0~Y2;5, Y3;0~Y3;5, . . . , respectively, to produce 10-bit word data Y0;0~Y0;5+α0, Y1;0~Y1;5+α1, Y2;0~Y2;5+α2, Y3;0~Y3;5+α3, Further, ancillary 4-bit word β0, β1, β2, β3, β4, β5, . . . are added to the lower 6-bit portions Pb0;0~Pb0;5, Pr0;0~Pr0;5, Pb1;0~Pb1;5, Pr1;0~Pr1;5, Pb2;0~Pb2;5, Pr2;0~Pr2;5, . . . , respectively, to produce 10-bit word data Pb0;0~Pb0;5+β0, Pr0;0~Pr0;5+β1, Pb1;0~Pb1;5+β2, Pr1;0~Pr1;5+β3, Pb2;0~Pb2;5+β4, Pr2;0~Pr2;5+β5, . . . .

Then, the 10-bit word data Y0;0~Y0;5+α0, Y1;0~Y1;5+α1, Y2;0~Y2;5+α2, Y3;0~Y3;5+α3, . . . and the 10-bit word data Pb0;0~Pb0;5+β0, Pr0;0~Pr0;5+β1, Pb1;0~Pb1;5+β2, Pr1;0~Pr1;5+β3, Pb2;0~Pb2;5+β4, Pr2;0~Pr2;5+β5, . . . are multiplexed in parallel with each other to produce 20-bit word sequence data DA16B or DDT16B having the word transmission rate of 74.25 MBps as a link B, as shown in FIG. 15C.

Namely, the 16-bit word digital data DA16 or DDT16 in the form of 32-bit word sequence are converted to a couple of 20-bit word sequence data which are the 20-bit word sequence data DA16A or DDT16A having the word transmission rate of 74.25 MBps and the 20-bit word sequence data DA16B or DDT16B having the word transmission rate of 74.25 MBps.

When the digital data DVX are the 16-bit word digital data DB16 or DC16 shown in the table of FIG. 8, the 16-bit word digital data DB16 or DCT16 in the form of 32-bit word sequence data having the word transmission rate of 74.25 MBps are converted to a couple of 20-bit word sequence data each having the word transmission rate of 74.25 MBps in the similar manner as the 16-bit word digital data DA16 supplied as the digital data DVX.

When the digital data DVX are one of the 12-bit word digital data DF12 to DH12 constituting the digital video signal of the 4;4;4 type, for example, the 12-bit word digital data DF12, shown in the table of FIG. 6, or the 12-bit word digital data DIT12 constituting the 720P signal of the 4;4;4 type shown in the table of FIG. 11, the 12-bit word digital data DF12 or DIT12 are supplied to the data processing portion 11 in the form of 36-bit word sequence data having the word transmission rate of 74.25 MHz, in which the G data sequence of 12-bit word sequence data having the word transmission rate of 74.25 MHz, the B data sequence of 12-bit word sequence data having the word transmission rate of 74.25 MHz and the R data sequence of 12-bit word sequence data having the word transmission rate of 74.25 MHz are multiplexed in parallel with one another in frame and line synchronism, as shown in FIG. 16.

In the data processing portion 11, the 12-bit word digital data DF12 or DIT12 supplied in the form shown in FIG. 16 are subjected to data processing for dividing each of 12-bit words (GD0, GD1, GD2, GD3, . . . ) constituting the G data sequence, 12-bit words (BD0, BD1, BD2, BD3, . . . ) constituting the B data sequence and 12-bit words (RD0, RD1, RD2, RD3, . . . ) constituting the R data sequence into an upper 10-bit portion (G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . ) and a lower 2-bit portion (G0;0~G0;1, G1;0~G1;1, G2;0~G2;1, G3;0~G3;1, . . . , B0;0~B0;1, B1;0~B1;1, B2;0~B2;1, B3;0~B3;1, . . . and R0;0~R0;1, R1;0~R1;1, R2;0~R2;1, R3;0~R3;1, . . . ).

Then, the lower 2-bit portions G0;0~G0;1, B0;0~B0;1 and R0;0~R0;1 are bit-multiplexed to produce 6-bit word GBR0(0~1). The lower 2-bit portions G1;0~G1;1, B1;0~B1;1 and R1;0~R1;1 are bit-multiplexed to produce 6-bit word GBR1(0~1). The lower 2-bit portions G2;0~G2;1, B2;0~B2;1 and R2;0~R2;1 are bit-multiplexed to produce 6-bit word GBR2(0~1) . . . . Further, ancillary 4-bit word γ0, γ1, Yγ2, γ3, . . . are added to the 6-bit words GBR0(0~1), GBR1(0~1), GBR2(0~1), GBR3(0~1), . . . , respectively, to produce 10-bit word data GBR0(0~1)+γ0, GBR1(0~1)+γ1, GBR2(0~1)+γ2, GBR3(0~1)+γ3, . . . .

The upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1;11, R2;2~R2;11, R3;2~R3;11, . . . are pit in group 1 and group 2 and the 10-bit word data GBR0(0~1)+γ0, GBR1(0~1)+γ1, GBR2(0~1)+γ2, GBR3(0~1)+γ3, . . . are added to the group 2, so that 10-bit word group 1 and 10-bit word group 2 which are partitioned with bold lines on a table shown in FIG. 17 are obtained.

20-bit word sequence data DF12A or DIT12A having the word transmission rate 74.25 MBps are formed based on the 10-bit word group 1 shown in FIG. 17 as a link A, as shown in FIG. 18A. Similarly, 20-bit word sequence data DF12B or DIT12B having the word transmission rate 74.25 MBps are formed based on the 10-bit word group 2 shown in FIG. 17 as a link B, as shown in FIG. 18B.

Namely, the 12-bit word digital data DF126 or DIT12 in the form of 36-bit word sequence having the word transmission rate 74.25 MBps are converted to a couple of 20-bit word sequence data which are the 20-bit word sequence data DF12A or DIT12A having the word transmission rate of 74.25 MBps and the 20-bit word sequence data DF12B or DIT12B having the word transmission rate of 74.25 MBps.

When the digital data DVX are the data DVA10+DKA10 composed of the digital data DA10, DB10 or DC10 and the key signal data sequence DKA10 annexed to the digital data DA10, DB10 or DC10, or the data DDT10+DKD10 composed of the digital data DDT10 and the key signal data sequence DKD10 annexed to the digital data DDT10, the data DVA10+DKA10 or DDT10+DKD10 are supplied to the data processing portion 11 in the form of 30-bit parallel data having the word transmission rate of 74.25 MBps, in which the Y data sequence, the $P_B/P_R$ data sequence and the key signal data sequence, each of which is formed to be 10-bit word sequence data having the word transmission rate of 74.25 MBps, are multiplexed in parallel with one another in frame and line synchronism, as shown in FIG. 19.

In the data processing portion 11, the data DVA10+DKA10 or DDT10+DKD10 supplied in the form of 30-bit parallel data shown in FIG. 19 are subjected to the following data processing.

Figure 20:
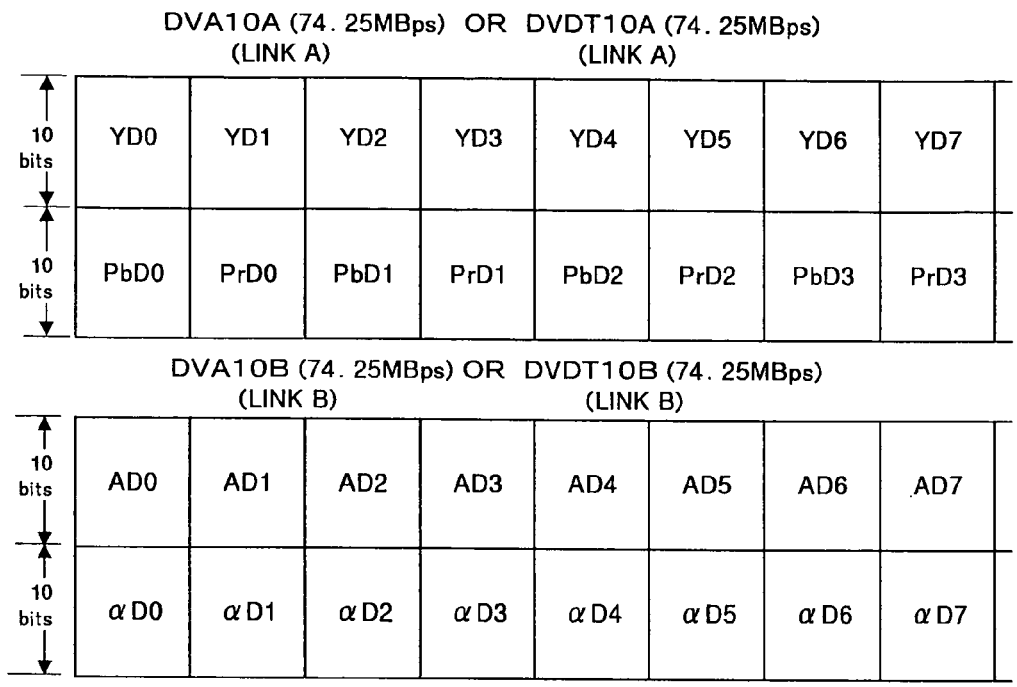

First, 10-bit words YD0, YD1, YD2, YD3, . . . constituting the Y data sequence shown in FIG. 19 and 10-bit words PbD0, PrD0, PbD1, PrD1, PbD2, PrD2, . . . constituting the $P_B/P_R$ data sequence shown in FIG. 19 are multiplexed in parallel with each other to produce 20-bit word sequence data DVA10A or DVDT10A having the word transmission rate of 74.25 MBps as a link A, as shown in FIG. 20. Similarly 10-bit words AD0, AD1, AD2, AD3, . . . constituting the key signal data sequence shown in FIG. 19 and ancillary 10-bit words αD0, αD1, αD2, αD3, . . . shown in FIG. 19 are multiplexed in parallel with each other to produce 20-bit word sequence data DVA10B or DVDT10B having the word transmission rate of 74.25 MBps as a link B, as shown in FIG. 20.

Namely, the data DVA10+DKA10 or DDT10+DKD10 in the form of 30-bit word sequence having the word transmission rate of 74.25 MBps are converted to a couple of 20-bit word sequence data which are the 20-bit word sequence data DVD10A or DVDT10A having the word transmission rate of 74.25 MBps and the 20-bit word sequence data DVD10B or DVDT10B having the word transmission rate of 74.25 MBps.

Figure 21:
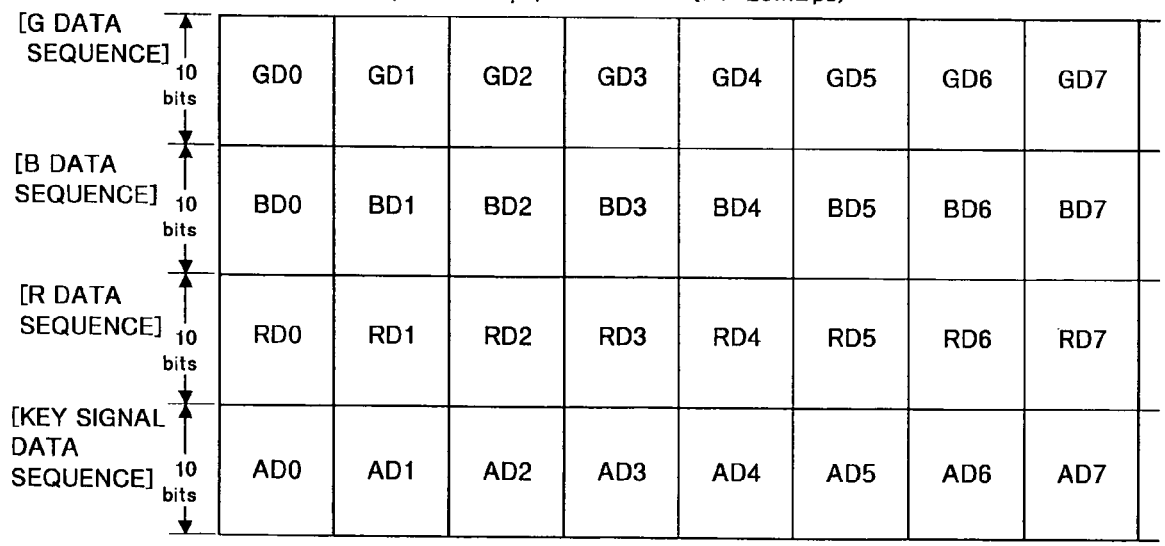

When the digital data DVX are the data DVB10+DKB10 composed of the digital data DF10, DG10 or DH10 and the key signal data sequence DKB10 annexed to the digital data DF10, DG10 or DH10, or the data D1T10+DKI10 composed of the digital data DIT10 and the key signal data sequence DKI10 annexed to the digital data DIT10, the data DVB10+DKB10 or DI10+DKI10 are supplied to the data processing portion 11 in the form of 40-bit parallel data having the word transmission rate of 74.25 MBps, in which the G data sequence, the B data sequence, the R data sequence and the key signal data sequence, each of which is formed to be 10-bit word sequence data having the word transmission rate of 74.25 MBps, are multiplexed in parallel with one another in frame and line synchronism, as shown in FIG. 21.

In the data processing portion 11, the data DVB10+ DKB10 or DIT10+DKI10 supplied in the form of 40-bit parallel data shown in FIG. 21 are subjected to the following data processing.

First, 10-bit words GD0, GD1, GD2, GD3, . . . constituting the G data sequence, 10-bit words BD0, BD1, BD2, BD3, . . . constituting the B data sequence, 10-bit words RD0, RD1, RD2, RD3, . . . constituting the R data sequence and 10-bit words AD0, AD1, AD2, AD3, . . . constituting the key signal data sequence each shown in FIG. 21 are partitioned with bold lines on a table shown in FIG. 22 to be put in a couple of 10-bit word groups which are a 10-bit word group 1 in which the 10-bit words GD0, GD1, GD2, GD3, . . . constituting the G data sequence, the 10-bit words BD0, BD2, . . . constituting a part of the B data sequence and the 10-bit words RD0, RD2, . . . constituting a part of the R data sequence are included and a 10-bit word group 2 in which the 10-bit words AD0, AD1, AD2, AD3, . . . constituting the key signal data sequence, the 10-bit words BD1, BD3, . . . constituting another part of the B data sequence and the 10-bit words RD1, RD3, . . . constituting another part of the R data sequence are included.

Then, 20-bit word sequence data DVB10A or DVIT10A having the word transmission rate of 74.25 MBps are formed based on the 10-bit word group 1 shown in FIG. 22 as a link A and 20-bit word sequence data DVB10B or DVIT10B having the word transmission rate of 74.25 MBps are formed based on the 10-bit word group 2 shown in FIG. 22 as a link B, as shown in FIG. 23.

Namely, the data DVB10+DKB10 or DIT10+DKI10 in the form of 40-bit word sequence having the word transmission rate of 74.25 MBps are converted to a couple of 20-bit word sequence data which are the 20-bit word sequence data DVB10A or DVIT10A having the word transmission rate of 74.25 MBps and the 20-bit word sequence data DVBD10B or DVIT10B having the word transmission rate of 74.25 MBps.

Figures 24, 25:
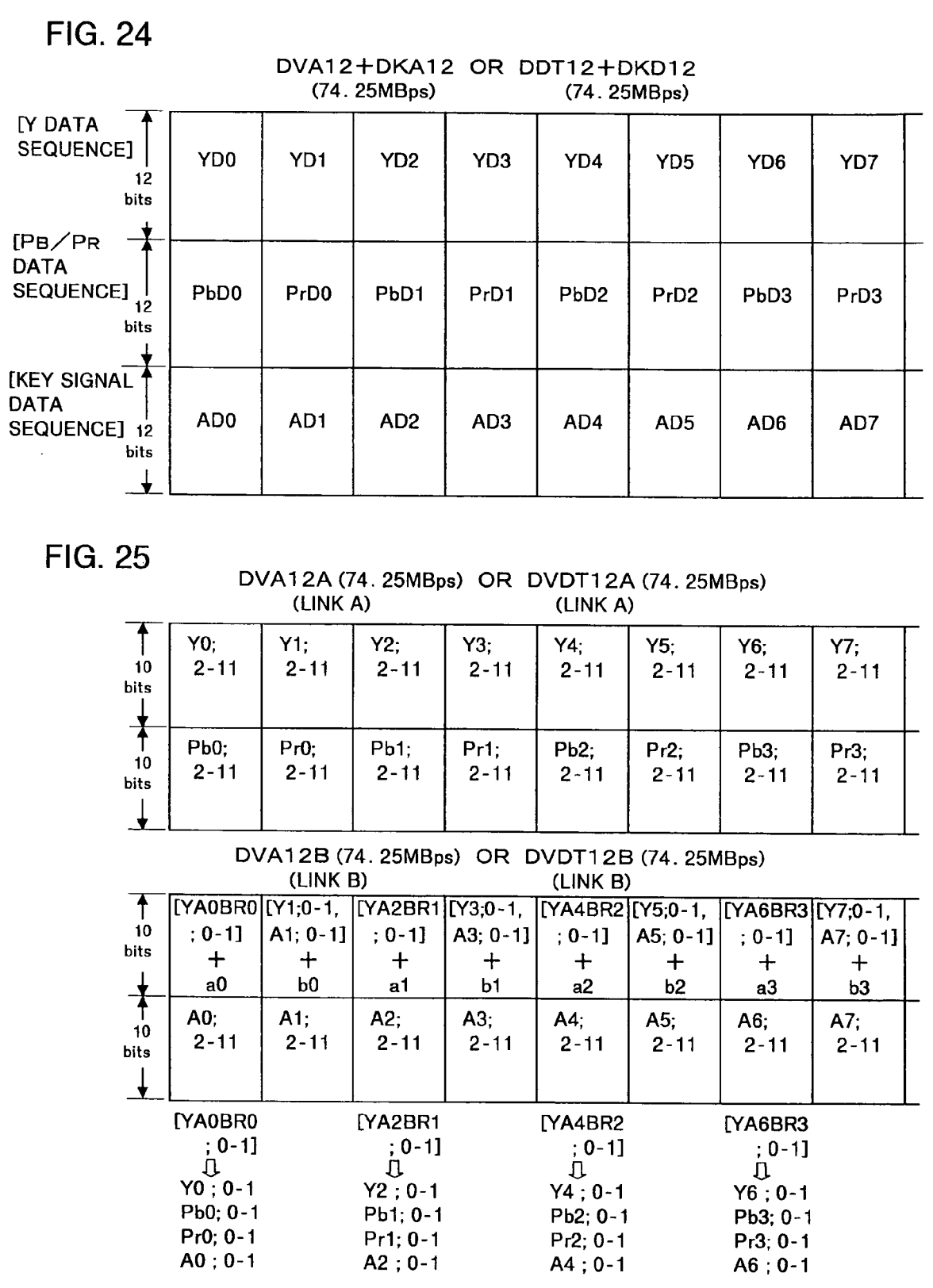

When the digital data DVX are the data DVA12+DKA12 composed of the digital data DA12, DB12 or DC12 and the key signal data sequence DKA12 annexed to the digital data DA12, DB12 or DC12, or the data DDT12+DKD12 composed of the digital data DDT12 and the key signal data sequence DKD12 annexed to the digital data DDT12, the data DVA12+DKA12 or DDT12+DKD12 are supplied to the data processing portion 11 in the form of 36-bit parallel data having the word transmission rate of 74.25 MBps, in which the Y data sequence, the $P_B/P_R$ data sequence and the key signal data sequence, each of which is formed to be 12-bit word sequence data having the word transmission rate of 74.25 MBps, are multiplexed in parallel with one another in frame and line synchronism, as shown in FIG. 24.

In the data processing portion 11, the data DVA12+ DKA12 or DDT12+DKD12 supplied in the form of 36-bit parallel data shown in FIG. 24 are subjected to the following data processing.

First, each of 12-bit words (YD0, YD1, YD2, YD3, . . . ) constituting the Y data sequence, 12-bit words (PbD0, PrD0, PbD1, PrD1, PbD2, PrD2, . . . ) constituting the $P_B/P_R$ data sequence and 12-bit words (AD0, AD1, AD2, AD3, . . . ) constituting the key signal data sequence is divided into an upper 10-bit portion (Y0;2-11, Y1;2-11, Y2;2-11, Y3; 2-11, . . . Pb0;2-11, Pr0;2-11, Pb1;2-11, Pr1;2-11, Pb2;2-11, Pr2;2-11, . . . , A0;2-11, A1;2-11, A2;2-11, A3;2-11, . . . ) and a lower 2-bit portion (Y0;0-1, Y1;0-1, Y2;0-1, Y3;0-1, . . . , Pb0;0-1, Pr0;0-1, Pb1;0-1, Pr1;0-1, Pb2;0-1, Pr2; 0-1, . . . , A0;0-1, A1;0-1, A2;0-1, A3;0-1, . . . ).

The upper 10-bit portions Y0;2-11, Y1;2-11, Y2;2-11, Y3;2-11, . . . and the upper 10-bit portions Pb0;2-11, Pr0;2-11, Pb1;2-11, Pr1;2-11, Pb2;2-11, Pr2;2-11, . . . are multiplexed in parallel with each other to produce 20-bit word sequence data DVA12A or DVDT12A having the word transmission rate of 74.25 MBps as a link A, as shown in FIG. 25.

The lower 2-bit portions Y0;0-1, Pb0;0-1, Pr0;0-1 and A0;0-1 and ancillary 2-bit a0 are multiplexed with one another to produce 10-bit word (YA0BR0;0-1)+a0; the lower 2-bit portions Y1;0-1, A1;0-1 and ancillary 6-bit b0 are multiplexed with one another to produce 10-bit word (Y1;0-1, A1;0-1+b0; the lower 2-bit portions Y2;0-1, Pb1; 0-1, Pr1;0-1 and A2;0-1 and ancillary 2-bit a1 are multiplexed with one another to produce 10-bit word (YA2BR1; 0-1)+a1; the lower 2-bit portions Y3;0-1, A3;0-1 and ancillary 6-bit b1 are multiplexed with one another to produce 10-bit word CY3;0-1, A3;0-1)+b1; the lower 2-bit portions Y4;0-1, Pb2;0-1, Pr2;0-1 and A4;0-1 and ancillary 2-bit a2 are multiplexed with one another to produce 10-bit word (YA4BR2;0-1)+a2; the lower 2-bit portions Y5;0-1, A5;0-1 and ancillary 6-bit b2 are multiplexed with one another to produce 10-bit word CY5;0-1, A5;0-1)+b2; . . . . A series of 10-bit words thus obtained and the upper 10-bit portions A0;2-11, A1;2-11, A2;2-11, A3;2,-11, . . . are multiplexed in parallel with each other to produce 20-bit word sequence data DVA12B or DVDT12B having the word transmission rate of 74.25 MBps as a link B, as shown in FIG. 25.

Namely, the data DVA12+DKA120 or DDT12+DKD12 in the form of 36-bit word sequence having the word transmission rate of 74.25 MBps are converted to a couple of 20-bit word sequence data which are the 20-bit word sequence data DVA12A or DVDT12A having the word transmission rate of 74.25 MBps and the 20-bit word sequence data DVAD12B or DVDT12B having the word transmission rate of 74.25 MBps.

From the data processing portion 11, one of data pairs of the 20-bit word sequence data DA12A and DA12B, DDT12A and DDT12B, DA14A and DA14B, DDT14A and DDT14B, DA16A and DA16B, DDT16A and DDT16B, DF12A and DF12B, DIT12A and DIT12B, DVA10A and DVA10B, DVDT10A and DVDT10B, DVB10A and DVB106, DVIT10A and DVIT10B, DVA12A and DVA12B, DVDT12A and DVDT12B, and so on is derived as a pair of 20-bit word sequence data DPA(20) and DPB(20).

The 20-bit word sequence data DPA(20) having the word transmission rate of 74.25 MBps derived from the data processing portion 11 are supplied to a data inserting portion 12. In the data inserting portion 12, ancillary data DAA containing channel identification data as occasion demands are inserted into the 20-bit word sequence data DPA(20) to produce 20-bit word sequence data DPA' (20). The 20-bit word sequence data DPA' (20) obtained from the data inserting portion 12 are supplied to a P/S convertor 13.

In the P/S convertor 13, the 20-bit word sequence data DPA' (20) are subjected to P/S conversion to produce serial data DSA having a bit transmission rate of 74.25 MBps× 20=1.485 Gbps. The serial data DSA are supplied to a bit multiplexing portion 14.

The 20-bit word sequence data DPB(20) having the word transmission rate of 74.25 MBps derived from the data processing portion 11 are supplied to a data inserting portion 15. In the data inserting portion 15, ancillary data DAB containing channel identification data as occasion demands are inserted into the 20-bit word sequence data DPB(20) to produce 20-bit word sequence data DPB' (20). The 20-bit word sequence data DPB' (20) obtained from the data inserting portion 15 are supplied to a P/S convertor 16. In the P/S convertor 16, the 20-bit word sequence data DPB' (20) are subjected to P/S conversion to produce serial data DSB having a bit transmission rate of 74.25 MBps×20=1.485 Gbps. The serial data DSB are supplied to the bit multiplexing portion 14.

In the bit multiplexing portion 14, each bit of the serial data DSA and each bit of the serial data DSB are alternately extracted to be arranged successively so that the serial data DS1 and DS2 are subjected to bit multiplexing to produce multiplexed serial data DSZ having a bit transmission rate of 1.485 Gbps×2=2.97 Gbps.

The multiplexed serial data DSZ obtained from the bit multiplexing portion 14 are supplied to an electric to optical (E/O) convertor 17. The E/O convertor 17 is operative to cause the multiplexed serial data DSZ to be subjected to E/O conversion to produce an optical signal OZV having a central wavelength of about 1.3 μm. The optical signal OZV is derived from the E/O convertor 17 to be transmitted at the bit transmission rate of 2.97 Gbps. A portion including the bit multiplexing portion 14 and the E/O convertor 17 constitutes a data transmitting portion for transmitting the serial data DSA and DSB.

The optical signal OZV derived from the E/O convertor 17 is guided through an optical connector 18 to an optical fiber data transmission line 20 to be transmitted to a receiving side. The optical fiber data transmission line 20 is made of, for example, fused quartz single-mode fiber (fused quartz SMF).

In the receiving side, the optical signal OZV transmitted through the optical fiber data transmission line 20 is guided through an optical connector 21 to an optical to electric (O/E) convertor 22. The O/E convertor 22 is operative to cause the optical signal OZV having the central wavelength of about 1.3 μm to be subjected to O/E conversion to reproduce the multiplexed serial data DSZ having the bit transmission rate of 2.97 Gbps. The multiplexed serial data DSZ thus reproduced are supplied to a bit dividing portion 23.

In the bit dividing portion 23, each bit of the multiplexed serial data DSZ is extracted successively and separated to form a couple of bit groups, one of which includes every other bits and the other of which includes another every other bits so that the multiplexed serial data DSZ is subjected to bit dividing. Thereby, the serial data DSA having the bit transmission rate of 2.97 Gbps/2=1.485 Gbps and the serial data DSB having the bit transmission rate of 2.97 Gbps/2=1.485 Gbps which form two channel data are reproduced. The serial data DSA are supplied to an S/P convertor 24 and the serial data DSB are supplied to an S/P convertor 25.

The S/P convertor 24 is operative to cause the serial data DSA to be subjected to S/P conversion to reproduce the 20-bit word sequence data DPA' (20) to be supplied to a data separating portion 26. In the data separating portion 26, the ancillary data DAA containing the channel identification data are separated from the 20-bit word sequence data DPA' (20) so that the 20-bit word sequence data DPA(20) and the ancillary data DAA are separately obtained. The 20-bit word sequence data DPA(20) are supplied to a data time difference absorbing portion 27.

The S/P convertor 25 is operative to cause the serial data DSB to be subjected to S/P conversion to reproduce the 20-bit word sequence data DPB' (20) to be supplied to a data separating portion 28. In the data separating portion 28, the ancillary data DAB containing the channel identification data are separated from the 20-bit word sequence data DPB' (20) so that the 20-bit word sequence data DPB(20) and the ancillary data DAB are separately obtained. The 20-bit word sequence data DPB(20) are supplied to the data time difference absorbing portion 27.

In the data time difference absorbing portion 27, time difference between the 20-bit word sequence data DPA(20) from the data separating portion 26 and the 20-bit word sequence data DPB(20) from the data separating portion 28 is absorbed to produce 20-bit word sequence data DPAQ(20) which are obtained based on the 20-bit word sequence data DPA(20) to be transmitted at the word transmission rate of 74.25 MBps and to produce 20-bit word sequence data DPBQ(20) which are obtained based on the 20-bit word sequence data DPB(20) to be transmitted at the word transmission rate of 74.25 MBps in such a manner that time difference between the 20-bit word sequence data DPAQ (20) and the 20-bit word sequence data DPBQ(20) is substantially zero.

The 20-bit word sequence data DPAQ(20) and the 20-bit word sequence data DPBQ(20) obtained from the data time difference absorbing portion 27 are supplied to a data reproducing portion 30. In the data reproducing portion 30, the 20-bit word sequence data DPAQ(20) and the 20-bit word sequence data DPBQ(20) are subjected to data reproduction processing, which is proceeded inversely to the data processing to which the 20-bit word sequence data constituting the digital data DVX are subjected in the data processing portion 11, to reproduce the digital data DVX formed based on the 20-bit word sequence data DPAQ(20) and DPBQ(20).

The digital data DVX thus reproduced are any of the digital data DA12 to DC12, DF12 to DH12, DA14 to DC14 and DA16 to DC16 each constituting the digital video signal of the 4:2:2 type or the 4:4:4 type shown in the table of FIGS. 6 to 8, any of the digital data DDT12, DDT14, DDT16 and DIT12 constituting the 720P signal the 4:2:2 type or 4:4:4 type shown in the table of FIG. 11, or any of the data DVA10+DKA10 composed of the digital data DA10, DBL0 or DC10 constituting the digital video signal of the 4:2:2 type and the key signal data sequence DKA10 annexed to the digital data DA10, DB10 or DC10, the data DVB10+DKB10 composed of the digital data DF10, DG10 or DH10 constituting the digital video signal of the 4:4:4 type and the key signal data sequence DKB10 annexed to the digital data DF10, DG10 or DH10, the data DVA12+DKA12 composed of the digital data DA12, DB12 or DC12 and the key signal data sequence DKA12 of 12-bit word sequence data annexed to the digital data DA12, DB12 or DC12, the data DDT10+DKD10 composed of the digital data DDT10 constituting the digital video signal of the 4:2:2 type and the key signal data sequence DKD10 annexed to the digital data DDT10, the data DIT10+DKI10 composed of the digital data DIT10 constituting the digital video signal of the 4:4:4 type and the key signal data sequence DKI10 annexed to the digital data DDT10, and the data DDT12+DKD120 composed of the digital data DDT12 and the key signal data sequence DKD12 annexed to the digital data DDT12.

Figure 26:
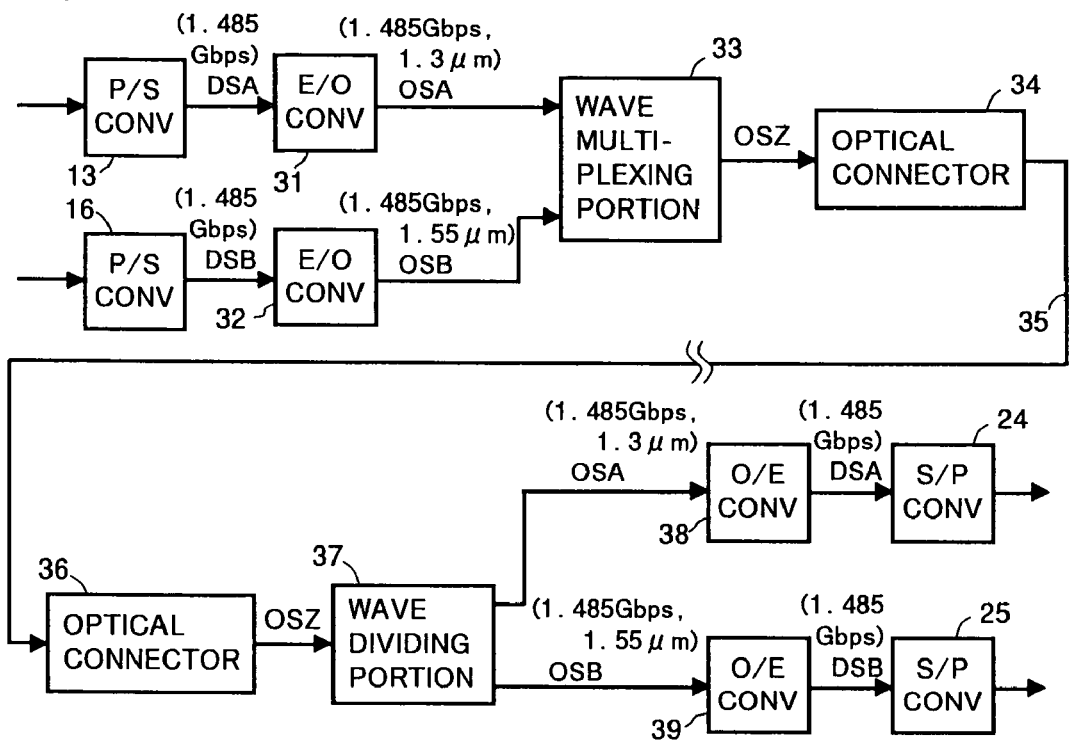
FIG. 26 is a schematic block diagram showing an example of a data transmitting and receiving apparatus including another embodiment of apparatus for transmitting digital data according to one of the twenty-fourth, twenty-fifth, twenty-eighth to thirty-second and thirty-ninth to forty-first aspects of the present invention, in which an embodiment of method of transmitting digital data according to one of the fourth, fifth, eighth to twelfth and nineteenth to twenty-first aspects of the present invention is carried out.

FIG. 26 shows a part of an example of a data transmitting and receiving apparatus which includes a second embodiment of apparatus for transmitting digital data according to one of the twenty-fourth, twenty-fifth, twenty-eighth to thirty-second and thirty-ninth to forty-first aspects of the present invention, in which an embodiment of method of transmitting digital data according to one of the fourth, fifth, eighth to twelfth and nineteenth to twenty-first aspects of the present invention is carried out.

The example of the data transmitting and receiving apparatus, a part of which is shown in FIG. 26, has a number of blocks constituted in the same manner as those in the example of FIG. 12 and blocks which are constituted to be different from those in the example of FIG. 12 are shown in FIG. 26.

Referring to FIG. 26, the bit multiplexing portion 14 and the bit dividing portion 23 employed in the example of FIG. 12 are not provided, and E/O convertors 31 and 32 and O/E convertors 38 and 39 are provided in place of the E/O convertor 17 and the O/E convertor 22 employed in the example of FIG. 12.

In the example, a part of which is shown in FIG. 26, serial data DSA having the bit transmission rate of 1.485 Gbps obtained from a P/S convertor 13 is supplied to the E/O convertor 31 and serial data DSB having the bit transmission rate of 1.485 Gbps obtained from a P/S convertor 16 is supplied to the E/O convertor 32. The E/O convertor 31 is operative to cause the serial data DSA to be E/O conversion to produce an optical signal OSA having a central wavelength of, for example, about 1.3 μm and the bit transmission rate of 1.485 Gbps. The optical signal OSA is guided to a wave multiplexing portion 33. The E/O convertor 32 is operative to cause the serial data DSB to be E/O conversion to produce an optical signal OSB having a central wavelength of, for example, about 1.55 μm and the bit transmission rate of 1.485 Gbps. The optical signal OSB is guided to the wave multiplexing portion 33.

The wave multiplexing portion 33 is constituted with, for example, a wavelength division multiplexing (WDM) using optical fiber. In the wave multiplexing portion 33, the optical signal OSA having the central wavelength of about 1.3 μm and the optical signal OSA having the central wavelength of about 1.55 μm are multiplexed with each other to produce a multiplexed optical signal OSZ. The multiplexed optical signal OSZ is derived from the wave multiplexing portion 33 as a transmission signal. A portion including the E/O convertors 31 and 32 and the wave multiplexing portion 33 constitutes a data transmitting portion for transmitting the serial data DSA and DSB obtained from the P/S convertors 13 and 16, respectively.

The multiplexed optical signal OSZ which is the transmission signal derived from the wave multiplexing portion 33 is guided through an optical connector 34 to an optical fiber data transmission line 35 to be transmitted thereby to a receiving side. The optical fiber data transmission line 35 is made of, for example, fused quartz SMF.

In the receiving side, the multiplexed optical signal OSZ transmitted through the optical fiber data transmission line 35 is guided through an optical connector 36 to a wave dividing portion 37. The wave dividing portion 37 is constituted with, for example, a wavelength dividing demultiplexer (WDD) using optical fiber functioning as wave dividing means. In the wave dividing portion 37, the multiplexed optical signal OSZ is divided into an optical element having the center wavelength of about 1.3 μm and another optical element having the center wavelength of about 1.55 μm to reproduce the optical signal OSA which has the center wavelength of about 1.3 μm and the bit transmission rate of 1.4856 bps and the optical signal OSB which has the center wavelength of about 1.55 μm and the bit transmission rate of 1.485 Gbps.

The optical signals OSA and OSB reproduced by the wave dividing portion 37 are guided the O/E convertors 38 and 39, respectively. The O/E convertor 38 is operative to cause the optical signal OSA having the center wavelength of about 1.3 μm and the bit transmission rate of 1485 Gbps to be subjected to O/E conversion to reproduce the serial data DSA having bit transmission rate of 1,485 Gbps. The serial data DSA thus reproduced are supplied to an S/P convertor 24. The O/E convertor 39 is operative to cause the optical signal OSB having the center wavelength of about 1.55 μm and the bit transmission rate of 1,485 Gbps to be subjected to O/E conversion to reproduce the serial data DSB having bit transmission rate of 1,485 Gbps. The serial data DSB thus reproduced are supplied to an S/P convertor 25. Other operations of the example, a part of which is shown in FIG. 26, are similar to those of the example of FIG. 12.

Figure 27:
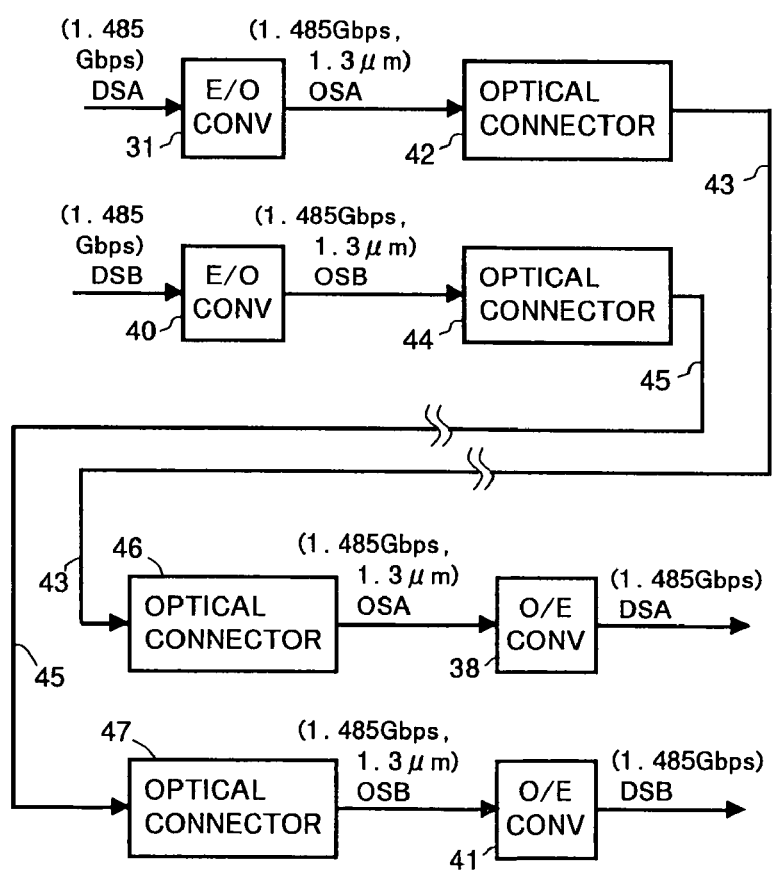
FIG. 27 is a schematic block diagram showing an example of a data transmitting and receiving apparatus including a further embodiment of apparatus for transmitting digital data according to one of the twenty-fourth, twenty-fifth, twenty-eighth to thirty-second and thirty-ninth to forty-first aspects of the present invention, in which an embodiment of method of transmitting digital data according to one of the fourth, fifth, eighth to twelfth and nineteenth to twenty-first aspects of the present invention is carried out.

FIG. 27 shows a part of an example of a data transmitting and receiving apparatus which includes a third embodiment of apparatus for transmitting digital data according to one of the twenty-fourth, twenty-fifth, twenty-eighth to thirty-second and thirty-ninth to forty-first aspects of the present invention, in which an embodiment of method of transmitting digital data according to one of the fourth, fifth, eighth to twelfth and nineteenth to twenty-first aspects of the present invention is carried out.

The example of the data transmitting and receiving apparatus, a part of which is shown in FIG. 27, has a number of blocks constituted in the same manner as those in the example of FIG. 26 and blocks which are constituted to be different from those in the example of FIG. 26 are shown in FIG. 26.

Referring to FIG. 27, the wave multiplexing portion 33 and the wave dividing portion 37 employed in the example of FIG. 26 are not provided, and E/O convertors 40 and O/E convertors 41 are provided in place of the E/O convertor 32 and the O/E convertor 39 employed in the example of FIG. 26.

In the example, a part of which is shown in FIG. 27, serial data DSB having the bit transmission rate of 1.485 Gbps is supplied to the E/O convertor 40. The E/O convertor 40 is operative to cause the serial data DSB to be E/O conversion to produce an optical signal OSB having the central wavelength of, for example, about 1.3 μm and the bit transmission rate of 1.485 Gbps. The optical signal OSB is derived from the E/O convertor 40 to be transmitted. A portion including an E/O convertor 31 and the E/O convertor 40 constitutes a data transmitting portion for transmitting the serial data DSA and DSB obtained from the P/S convertors 13 and 16, respectively.

The optical signal OSA having the central wavelength of about 1.3 μm and the bit transmission rate of 1.485 Gbps derived from the E/O convertor 31 is guided through an optical connector 42 to an optical fiber data transmission line 43 to be transmitted thereby to a receiving side. Similarly, the optical signal OSB having the central wavelength of about 1.3 μm and the bit transmission rate of 1.485 Gbps derived from the E/O convertor 40 is guided through an optical connector 44 to an optical fiber data transmission line 45 to be transmitted thereby to the receiving side. Each of the optical fiber data transmission lines 43 and is made of, for example, fused quartz SMF.

In the receiving side, the optical signal OSA transmitted through the optical fiber data transmission line 43 is guided through an optical connector 46 to an O/E convertor 38. The O/E convertor 38 is operative to cause the optical signal OSA having the center wavelength of about 1.3 μm and the bit transmission rate of 1,485 Gbps to be subjected to O/E conversion to reproduce the serial data DSA having the bit transmission rate of 1,485 Gbps. Further, the optical signal OSB transmitted through the optical fiber data transmission line 45 is guided through an optical connector 47 to the O/E convertor 41. The O/E convertor 41 is operative to cause the optical signal OSB having the center wavelength of about 1.3 μm and the bit transmission rate of 1,485 Gbps to be subjected to O/E conversion to reproduce the serial data DSB having the bit transmission rate of 1,485 Gbps. Other operations of the example, a part of which is shown in FIG. 27, are similar to those of the example of FIG. 26.

Figure 28:
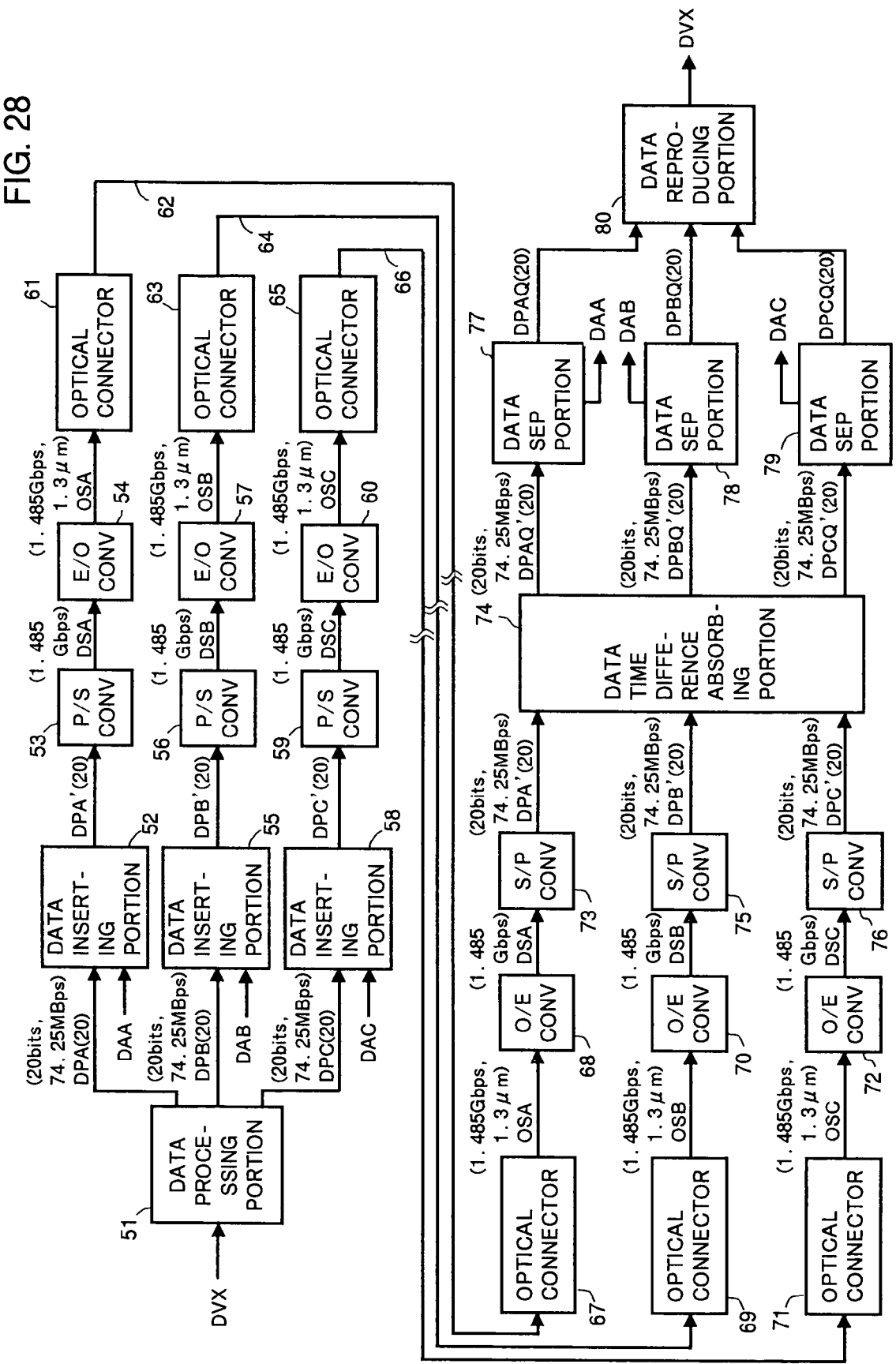
FIG. 28 is a schematic block diagram showing an example of a data transmitting and receiving apparatus including an embodiment of apparatus for transmitting digital data according to one of the thirty-third to thirty-fifth, forty-second and forty-third aspects of the present invention, in which an embodiment of method of transmitting digital data according to one of the thirteenth to fifteenth and the twenty-second and twenty-third aspects of the present invention is carried out.

FIG. 28 shows an example of a data transmitting and receiving apparatus which includes a first embodiment of apparatus for transmitting digital data according to one of the thirty-third to thirty-fifth, forty-second and forty-third aspects of the present invention, in which an embodiment of method of transmitting digital data according to one of the thirteenth to fifteenth, twenty-second and twenty-third aspects of the present invention is carried out.

Referring to FIG. 28, in a transmitting side which constitutes the embodiment of apparatus for transmitting digital data according to the present invention, digital data DVX are supplied to a data processing portion 51.

The digital data DVX are one of the data DVA12+DKA12; data DVA14+DKA14 composed of the digital data DA14, DB14 or DC14 and a key signal data sequence DKA14 of 14-bit word sequence data annexed to the digital data DA14, DB14 or DC14; data DVA16+DKA16 composed of the digital data DA16, DB16 or DC16 and a key signal data sequence DKA16 of 16-bit word sequence data annexed to the digital data DA16, DB16 or DC16; data DVB12+DKB12 composed of the digital data DF12, DG12 or DH12 and a key signal data sequence DKB12 of 12-bit word sequence data annexed to the digital data DF12, DG12 or DH12; data DVC10+DKC10 composed of 10-bit word digital data DD10 or DE10 constituting a digital video data of the 4:2:2 type, which have a frame rate of 50 Hz or 60 Hz, 1125 lines per frame, 1080 active lines per frame, the sampling frequency of 74.25 MHz and 1920 active data samplings per line, and a key signal data sequence DKC10 of 10-bit word sequence data annexed to the digital data DD10 or DE10; the data DDT12+DKD12; data DDT14+DKD14 composed of the digital data DDT14 and a key signal data sequence DKD14 of 14-bit word sequence data annexed to the digital data DDT14; data DDT16+DKD16 composed of the digital data DDT16 and a key signal data sequence DKD16 of 16-bit word sequence data annexed to the digital data DDT16; and data DIT12+DKI12 composed of the digital data DIT12 and a key signal data sequence DKI124 of 12-bit word sequence data annexed to the digital data DIT12.

Each of the key signal data sequences DKA14, DKA16, DKC10, DKD14 and DKD16 is formed with a data format similar to the data format of the Y data format to be an additional information data sequence accompanying the Y and $P_B/P_R$ data sequences. Each of the key signal data sequences DKB12 and DKI12 is formed with a data format similar to the data format of the G data format to be an additional information data sequence accompanying the G, B and R data sequences.

When the digital data DVX are the data DVA12+DKA12 or DDT12+DKD12; the data DVA12+DKA12 or DDT12+DKD12 are supplied to the data processing portion 51 in the form of 36-bit parallel data having the word transmission rate of 74.25 MBps, in which the Y data sequence, the $P_B/P_R$ data sequence and the key signal data sequence, each of which is formed to be 12-bit word sequence data having the word transmission rate of 74.25 MBps, are multiplexed in parallel with each other in frame and line synchronism, as shown in FIG. 24.

In the data processing portion 51, the data DVA12+DKA12 or DDT12+DKD12 supplied in the form of 36-bit parallel data shown in FIG. 24 are subjected to the following data processing.

First, each of 12-bit words (YD0, YD1, YD2, YD3, ...) constituting the Y data sequence, 12-bit words (PbD0, PrD0, PbD1, PrD1, PbD2, PrD2, ...) constituting the $P_B/P_R$ data sequence and 12-bit words (AD0, AD1, AD2, AD3, ...) constituting the key signal data sequence is divided into an upper 10-bit portion (Y0;2-11, Y1;2-11, Y2;2-11, Y3;2-11, ..., Pb0;2-11, Pr0;2-11, Pb1;2-11, Pr1;2-11, Pb2;2-11, Pr2;2-11, ..., A0;2-11, A1;2-11, A2;2-11, A3;2-11, ...) and a lower 2-bit portion (Y0;0-1, Y1;0-1, Y2;0-1, Y3;0-1, ..., Pb0;0-1, Pr0;0-1, Pb1;0-1, Pr1;0-1, Pb2;0-1, Pr2;0-1, ..., A0;0-1, A1;0-1, A2;0-1, A3;0-1, ...).

The upper 10-bit portions Y0;2-11, Y1;2-11, Y2;2-11, Y3;2-11, ... and the upper 10-bit portions Pb0;2-11, Pr0;2-11, Pb1;2-11, Pr1;2-11, Pb2;2-11, Pr2;2-11, ... are multiplexed in parallel with each other to produce 20-bit word sequence data DA12A or DDT12A having the word transmission rate of 74.25 MBps as a link A, as shown in FIG. 29.

Ancillary 8-bit word c0, c1, c2, c3, ... are added to the lower 2-bit portions Y0;0-1, Y1;0-1, Y2;0-1, Y3;0-1, ..., respectively, to produce 10-bit word data [Y0;0-1]+c0, [Y1;0-1]+c1, [Y2;0-1]+c2, [Y3;0-1]+c3, .... Similarly, ancillary 8-bit word d0, d1, d2, d3, d4, d5, ... are added to the lower 2-bit portions Pb0;0-1, Pr0;0-1, Pb1;0-1, Pr1;0-1, Pb2;0-1, Pr2;0-1, ..., respectively, to produce 10-bit word data [Pb0;0-1]+d0, [Pr0;0-1]+d1, [Pb1;0-1]+d2, [Pr1;0-1]+d3, [Pb2;0-1]+d4, [Pr2;0-1]+d5, ....

Then, the 10-bit word data [Y0;0-1]+c0, [Y1;0-1]+c1, [Y2;0-1]+c2, [Y3;0-1]+c3, ... and the 10-bit word data [Pb0;0-1]+d0, [Pr0;0-1]+d1, [Pb1;0-1]+d2, [Pr1;0-1]+d3, [Pb2;0-1]+d4, [Pr2;0-1]+d5, ... are multiplexed in parallel with each other to produce 20-bit word sequence data DVA12B or DVDT12B having the word transmission rate of 74.25 MBps as a link B, as shown in FIG. 29.

Further, ancillary 8-bit word e0, e1, e2, e3, ... are added to the lower 2-bit portions A0;0-1, A1;0-1, A2;0-1, A3;0-1, ..., respectively, to produce 10-bit word data [A0;0-1]+e0, [A1;0-1]+e1, [A2;0-1]+e2, [A3;0-1]+e3, .... The upper 10-bit portions A0;2-11, A1;2-11, A2;2-11, A3;2-11, ... and the 10-bit word data [A0;0-1]+e0, [A1;0-1]+e1, [A2;0-1]+e2, [A3;0-1]+e3, ... are multiplexed in parallel with each other to produce 20-bit word sequence data DVA12C or DVDT12C having the word transmission rate of 74.25 MBps as a link C, as shown in FIG. 29.

Namely, the data DVA12+DKA12 or DDT12+DKD12 in the form of 36-bit word sequence having the word transmission rate of 74.25 MBps are converted to three 20-bit word sequence data which are the 20-bit word sequence data DVA12A or DVDT12A, DVA12B or DVDT12B and DVA12C or DVDT12C each having the word transmission rate of 74.25 MBps.

In the data processing portion 51, the data DVA12+DKA12 or DDT12+DKD12 supplied in the form of 36-bit parallel data shown in FIG. 24 are able to be also subjected to another data processing in place of the above mentioned data processing, as follows.

First, each of 12-bit words (YD0, YD1, YD2, YD3, ...) constituting the Y data sequence, 12-bit words (PbD0, PrD0, PbD1, PrD1, PbD2, PrD2, ...) constituting the $P_B/P_R$ data sequence and 12-bit words (AD0, AD1, AD2, AD3, ...) constituting the key signal data sequence is divided into an upper 10-bit portion (Y0;2-11, Y1;2-11, Y2;2-11, Y3; 2-11, ..., Pb0;2-11, Pr0;2-11, Pb1;2-11, Pr1;2-11, Pb2;2-11, Pr2;2-11, ..., A0;2-11, A1;2-11, A2;2-11, A3;2-11, ...) and a lower 2-bit portion (Y0;0-1, Y1;0-1, Y2;0-1, Y3; 0-1, ..., Pb0;0-1, Pr0;0-1, Pb1;0-1, Pr1;0-1, Pb2;0-1, Pr2;0-1., A0;0-1, A1;0-1, A2;0-1, A3;0-1, ...).

Figure 30:
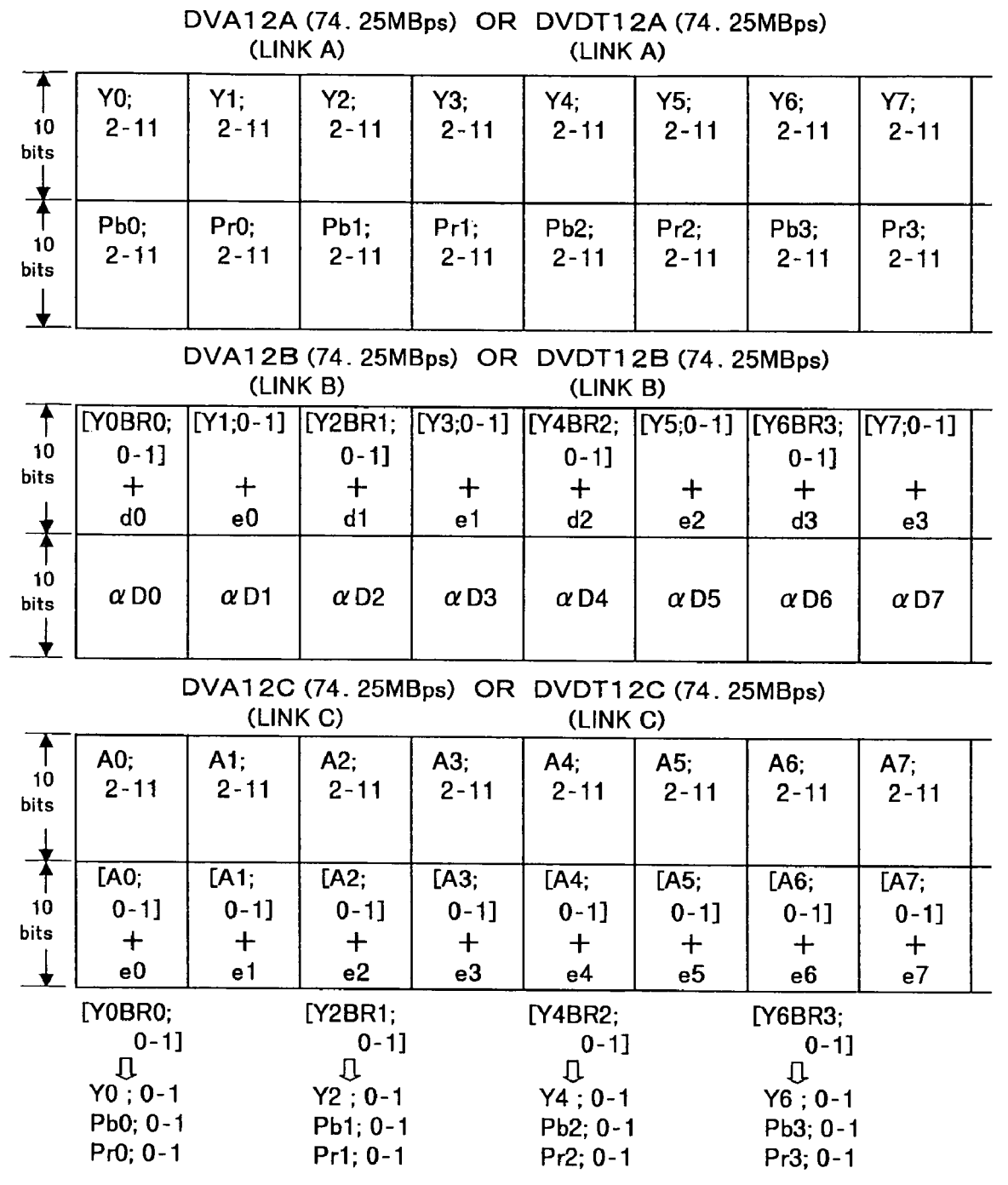

The upper 10-bit portions Y0;2-11, Y1;2-11, Y2;2-11, Y3;2-11, ... and the upper 10-bit portions Pb0;2-11, Pr0;2-11, Pb1;2-11, Pr1;2-11, Pb2;2-11, Pr2;2-11, ... are multiplexed in parallel with each other to produce 20-bit word sequence data DVA12A or DVDT12A having the word transmission rate of 74.25 MBps as a link A, as shown in FIG. 30.

Then, the lower 2-bit portion Y0;0-1, Pb0;0-1 and Pr0;0-1 and ancillary 4-bit word d0 are bit-multiplexed with one another to produce 10-bit word [Y0BR0;0-1]+d0, ancillary 8-bit word e0 is added to the lower 2-bit portion Y1;0-1 to produce 10-bit word [Y1;0-1]+e0, the lower 2-bit portion Y2;0-1, Pb1;0-1 and Pr1;0-1 and ancillary 4-bit word d1 are bit-multiplexed with one another to produce 10-bit word [Y2BR1;0-1]+d1, ancillary 8-bit word e1 is added to the lower 2-bit portion Y3;0-1 to produce 10-bit word [Y3;0-1]+e1, the lower 2-bit portion Y4;0-1, Pb2;0-1 and Pr2;0-1 and ancillary 4-bit word d21 are bit-multiplexed with one another to produce 10-bit word [Y4BR2;0-1]+d2, ancillary 8-bit word e2 is added to the lower 2-bit portion Y5;0-1 to produce 10-bit word [Y5;0-1]+e21, .... The 10-bit words thus obtained and ancillary 10-bit words αD0, αD1, αD20, αD31, ... are multiplexed in parallel with each other to produce 20-bit word sequence data DVA12B or DVDT12B as a link B, as shown in FIG. 30.

Further, ancillary 8-bit word e0, e1, e2, e3, ... are added to the lower 2-bit portions A0;0-1, A1;0-1, A2;0-1, A3; 0-1, ..., respectively, to produce 10-bit word data [A0;0-1]+e0, [A1;0-1]+e1, [A2;0-1]+e2, [A3;0-1]+e3, .... The upper 10-bit portions A0;2-11, A1;2-11, A2;2-11, A3; 2-11, ... and the 10-bit word data [A0;0-1]+e0, [A1;0-1]+e1, [A2;0-1]+e2, [A3;0-1]+e3, ... are multiplexed in parallel with each other to produce 20-bit word sequence data DVA12C or DVDT12C having the word transmission rate of 74.25 MBps as a link C, as shown in FIG. 30.

Namely, in this case also, the data DVA12+DKA12 or DDT12+DKD12 in the form of 36-bit word sequence having the word transmission rate of 74.25 MBps are converted to three 20-bit word sequence data which are the 20-bit word sequence data DVA12A or DVDT12A, DVA12B or DVDT12B and DVA12C or DVDT12C each having the word transmission rate of 74.25 MBps.

When the digital data DVX are the data DVA14+DKA14, DDT14+DKD14, DVA16+DKA16 or DDT16+DKD16, 42-bit or 48-bit parallel data having the word transmission rate of 74.25 MBps, in which the Y data sequence and the $P_B/P_R$ data sequence, each of which is formed to be 14-bit or 16-bir word sequence data having the word transmission rate of 74.25 MBps, are multiplexed in parallel with each other in frame and line synchronism, are supplied to the data processing portion 51.

In the data processing portion 51, the data DVA14+DKA14, DDT14+DKD14, DVA16+DKA16 or DDT16+DKD16 are subjected to data processing in the similar manner as the data DVA12+DKA12 or DDT12+DKD124 except that each of 14-bit or 16-bit words constituting the Y data sequence, the $P_B/P_R$ data sequence and the key signal data sequence is divided into an upper 10-bit portion and a lower 4-bit or 6-bit portion.

The data DVA14+DKA14, DDT14+DKD14, DVA16+DKA16 or DDT16+DKD16 forming the 42-bit or 48-bit parallel data having the word transmission rate of 74.25 MBps are converted to three 20-bit word sequence data which are 20-bit word sequence data DVA14A, DVDT14A, DVA16A or DVDT16A, 20-bit word sequence data DVA14B, DVDT14B, DVA16B or DVDT16B and 20-bit word sequence data DVA14C, DVDT14C, DVA16C or DVDT16C each having the word transmission rate of 74.25 MBps.

When the digital data DVX are the data DVB12+DKB12 or DIT12+DKI12, 48-bit parallel data having the word transmission rate of 74.25 MBps, in which the G data sequence, the B data sequence, the R data sequence and the key signal data sequence, each of which is formed to be 12-bit word sequence data having the word transmission rate of 74.25 MBps, are multiplexed in parallel with one another in frame and line synchronism as shown in FIG. 31, are supplied to the data processing portion 51.

In the data processing portion 51, the data DVB12+DKB12 or DIT12+DKI12 supplied in the form of 48 bit parallel data shown in FIG. 31 are subjected to the following data processing.

First, each of 12-bit words (GD0, GD1, GD2, GD3, ...) constituting the G data sequence, 12-bit words (B0, BD1, BD2, BD3, ...) constituting the B data sequence, 12-bit words (R0, RD1, RD2, RD3, ...) constituting the R data sequence and 12-bit words (AD0, AD1, AD2, AD3, ...) constituting the key signal data sequence is divided into an upper 10-bit portion (Y0;2-11, Y1;2-11, Y2;2-11, Y3;2-11, ..., B0;2-11, B1;2-11, B2;2-11, B3;2-11, R0;2-11, R1;2-11, R2;2-11, R3;2-11, ... and A0;2-11, A1;2-11, A2;2-11, A3;2-11, ...) and a lower 2-bit portion (Y0;0-1, Y1;0-1, Y2;0-1, Y3;0-1, ..., B0;0-1, B1;0-1, B2;0-1, B3;0-1, ..., R0;0-1, R1;0-1, R2;0-1, R3;0-1, ... and A0;0-1, A1;0-1, A2;0-1, A3;0-1, ...).

The lower 2-bit portion G0;0-1, B0;0-1, R0;0-1 and ancillary 4-bit word f0 are bit-multiplexed with one another to produce 10-bit word [GBR0;0-1]+f0, the lower 2-bit portion G1;0-1, B1;0-1, R1;0-1 and ancillary 4-bit word f1 are bit-multiplexed with one another to produce 10-bit word [GBR1;0-1]+f1, the lower 2-bit portion G2;0-1, B2;0-1, R2;0-1 and ancillary 4-bit word f2 are bit-multiplexed with one another to produce 10-bit word [GBR2;0-1]+f2, the lower 2-bit portion G3;0-1, B3;0-1, R3;0-1 and ancillary 4-bit word f3 are bit-multiplexed with one another to produce 10-bit word [GBR3;0-1]+f3, ....

The upper 10-bit portions G0;2-11, G1;2-11, G2;2-11, G3;2-11, ..., the upper 10-bit portions B0;2-11, B1;2-11, B2;2-11, B3;2-11, ..., the upper 10-bit portions R02-11, R1;2-11, R2;2-11, R3;2-11, [GBR3;0-1]+f3 and the 10-bit words [GBR0;0-1]+f0, [GBR1;0-1]+f1, [GBR2;0-1]+f2, [GBR3;0-1]+f3, ... are partitioned in such a manner as shown with bold lines on a table shown in FIG. 22 to be put in a couple of 10-bit word groups which are a 10-bit word group 1 in which the upper 10-bit words G0;2-11, G1;2-11, G2;2-11, G3;2-11, ..., the upper 10-bit words B0;2-11, B2;2-11, B4;2-1, ... and the upper 10-bit words R0;2-11, R2;2-11, R4;2-1, ... and a 10-bit word group 2 in which the upper 10-bit words B1;2-11, B3;2-11, B5;2-11, ..., the upper 10-bit words R10;2-11, R2;3-11, R5;2-11, ... and the 10-bit words [GBR0;0-1]+f0, [GBR1;0-1]+f1, [GBR2;0-1]+f2, [GBR3;0-1]+f3, .... Then, 20-bit word sequence data DVB12A or DVIT12A having the word transmission rate of 74.25 MBps are formed based on the 10-bit word group 1 shown in FIG. 32 as a link A, as shown in FIG. 33 and similarly 20-bit word sequence data DVB12B or DVIT12B having the word transmission rate of 74.25 MBps are formed based on the 10-bit word group 2 shown in FIG. 32 as a link B, as shown in FIG. 33.

Further, ancillary 8-bit word e0, e1, e2, e3, . . . are added to the lower 2-bit portions A0;0-1, A1;0-1, A2;0-1, A3; 0-1, . . . , respectively, to produce 10-bit word data [A0;0-1]+e0, [A1;0-1]+e1, [A2;0-1]+e2, [A3;0-1]+e3, . . . . Then, the upper 10-bit portions A0;0-1, A1;0-1, A2;0-1, A3; 0-1, . . . and the 10-bit word data [A0;0-1]+e0, [A1;0-1]+e1, [A2;0-1]+e2, [A3;0-1]+e3, . . . are multiplexed in parallel with each other to produce 20-bit word sequence data DVB12C or DVIT12C having the word transmission rate of 74.25 MBps as a link C, as shown in FIG. 33.

Namely, the data DVB12+DKB12 or DIT12+DKI12 in the form of 48-bit word sequence having the word transmission rate of 74.25 MBps are converted to three 20-bit word sequence data which are the 20-bit word sequence data DVB12A or DVIT12A, DVB12B or DVIT12B and DVB12C or DVIT12C each having the word transmission rate of 74.25 MBps.

When the digital data DVX are the data DVC10+DKC10, 30-bit parallel data having the word transmission rate of 148.5 MBps, in which the Y data sequence, the $P_B/P_R$ data sequence and the key signal data sequence, each of which is formed to be 10-bit word sequence data having the word transmission rate of 148.5 MBps, are multiplexed in parallel with one another in frame and line synchronism as shown in FIG. 34, are supplied to the data processing portion 51.

In the data processing portion 51, the data DVC10+DKC10 supplied in the form of 30-bit parallel data shown in FIG. 34 are subjected to the following data processing.

First, 10-bit words YD0, YD1, YD2, YD3, . . . constituting the Y data sequence and 10-bit words PbD0, PrD0, PbD1, PrD1, PbD2, PrD2, . . . constituting the $P_B/P_R$ data sequence are put in group 1 and group 2 alternately at every line portion. Then, 20-bit word sequence data DVC10A having the word transmission rate of 148.5 MBps/2=74.25 MBps are formed based on the 10-bit words forming every other line portions of the Y and the $P_B/P_R$ data sequences and belonging to the group 1 as a link A, as shown in FIG. 35 and similarly 20-bit word sequence data DVC10B having the word transmission rate of 148.5 MBps/2=74.25 MBps are formed based on the 10-bit words forming another every other line portions of the Y and the $P_B/P_R$ data sequences and belonging to the group 2 as a link B, as shown in FIG. 35.

Further, a first 10-bit word sequence including 10-bit words AD0, AD2, AD4, . . . constituting the key signal data sequence and ancillary 10-bit words β0, β1, β2, β3, . . . , which are arranged alternately in such a manner as β0, AD0, β1, AD2, β2, AD4, β3, . . . , is formed and a second 10-bit word sequence including the 10-bit words AD1, AD3, AD5, . . . also constituting the key signal data sequence and ancillary 10-bit words γ0, γ1, γ2, γ3, . . . , which are arranged alternately in such a manner as γ0, AD1, γ1, AD3, γ2, AD5, γ3, . . . , is formed. Then, the first 10-bit word sequence β0, AD0, β1, AD2, β2, AD4, β3, and the second 10-bit word sequence γ0, γ1, γ2, γ3, . . . are multiplexed in parallel with each other to produce 20-bit word sequence data DVC10C having the word transmission rate of 148.5 MBps/2=74.25 MBps as a link C, as shown in FIG. 35.

Namely, the data DVC10+DKC10 in the form of 30-bit word sequence having the word transmission rate of 148.5 MBps are converted to three 20-bit word sequence data which are the 20-bit word sequence data DVC10A, the 20-bit word sequence data DVC10B and the 20-bit word sequence data DVC10C each having the word transmission rate of 74.25 MBps.

From the data processing portion 51, one of data groups of the 20-bit word sequence data DVA12A or DVDT12A, DVA12B or DVDT12B and DVA12C or DVDT12C each having the word transmission rate of 74.25 MBps, the 20-bit word sequence data DVA14A or DVDT14A, DVA14B or DVDT14B and DVA14C or DVDT14C each having the word transmission rate of 74.25 MBps, the 20-bit word sequence data DVA16A or DVDT16A, DVA16B or DVDT16B and DVA16C or DVDT16C each having the word transmission rate of 74.25 MBps, the 20-bit word sequence data DVB12A or DVIT12A, DVB12B or DVIT12B and DVB12C or DVIT12C each having the word transmission rate of 74.25 MBps, and the 20-bit word sequence data DVC12A, DVC12B and DVC12C each having the word transmission rate of 74.25 MBps, is derived as a data group of 20-bit word sequence data DPA(20), DPB(20) and DPC(20).

The 20-bit word sequence data DPA(20) having the word transmission rate of 74.25 MBps derived from the data processing portion 51 are supplied to a data inserting portion 52. In the data inserting portion 52, ancillary data DAA containing channel identification data as occasion demands are inserted into the 20-bit word sequence data DPA(20) to produce 20-bit word sequence data DPA' (20). The 20-bit word sequence data DPA' (20) obtained from the data inserting portion 52 are supplied to a P/S convertor 53.

In the P/S convertor 53, the 20-bit word sequence data DPA' (20) are subjected to P/S conversion to produce serial data DSA having the bit transmission rate of 74.25 MBps× 20=1.485 Gbps. The serial data DSA are supplied to an E/O convertor 54. The E/O convertor 54 is operative to cause the 20-bit word sequence data DPA' (20) to be subjected to E/O conversion to produce an optical signal OSA having a central wavelength of, for example, about 1.3 μm and the bit transmission rate of 1.485 Gbps. The optical signal OSA is derived from the E/O convertor 54 as a transmission signal.

The 20-bit word sequence data DPB(20) having the word transmission rate of 74.25 MBps derived from the data processing portion 51 are supplied to a data inserting portion 55. In the data inserting portion 55, ancillary data DAB containing channel identification data as occasion demands are inserted into the 20-bit word sequence data DPB(20) to produce 20-bit word sequence data DPB' (20). The 20-bit word sequence data DPB' (20) obtained from the data inserting portion 55 are supplied to a P/S convertor 56.

In the P/S convertor 56, the 20-bit word sequence data DPB' (20) are subjected to P/S conversion to produce serial data DSB having the bit transmission rate of 74.25 MBps× 20=1.485 Gbps. The serial data DSA are supplied to an E/O convertor 57. The E/O convertor 57 is operative to cause the 20-bit word sequence data DPB' (20) to be subjected to E/O conversion to produce an optical signal OSB having the central wavelength of about 1.3 μm and the bit transmission rate of 1.485 Gbps. The optical signal OSB is derived from the E/O convertor 57 as a transmission signal.

Further, the 20-bit word sequence data DPC(20) having the word transmission rate of 74.25 MBps derived from the data processing portion 51 are supplied to a data inserting portion 58. In the data inserting portion 58, ancillary data DAC containing channel identification data as occasion demands are inserted into the 20-bit word sequence data DPC(20) to produce 20-bit word sequence data DPC' (20). The 20-bit word sequence data DPC' (20) obtained from the data inserting portion 58 are supplied to a P/S convertor 59.

In the P/S convertor 59, the 20-bit word sequence data DPC' (20) are subjected to P/S conversion to produce serial data DSC having the bit transmission rate of 74.25 MBps×

20=1.485 Gbps. The serial data DSC are supplied to an E/O convertor 60. The E/O convertor 60 is operative to cause the 20-bit word sequence data DPC' (20) to be subjected to E/O conversion to produce an optical signal OSC having the central wavelength of about 1.3 μm and the bit transmission rate of 1.485 Gbps. The optical signal OSC is derived from the E/O convertor 60 as a transmission signal.

A portion including the E/O convertors 54, 57 and 60 constitutes a data transmitting portion for transmitting the serial data DSA, DSB and DSC obtained from the P/S convertors 53, 56 and 59, respectively.

The optical signal OSA derived from the E/O convertor 54 is guided through an optical connector 61 to an optical fiber data transmission line 62 to be transmitted to a receiving side. The optical signal OSB derived from the E/O convertor 57 is guided through an optical connector 63 to an optical fiber data transmission line 64 to be transmitted to the receiving side. Further, the optical signal OSC derived from the E/O convertor 60 is guided through an optical connector 65 to an optical fiber data transmission line 66 to be transmitted to the receiving side. Each of the optical fiber data transmission lines 62, 64 and 66 is made of, for example, fused quartz SMF.

In the receiving side, the optical signal OSA transmitted through the optical fiber data transmission line 62 is guided through an optical connector 67 to an O/E convertor 68, the optical signal OSB transmitted through the optical fiber data transmission line 64 is guided through an optical connector 69 to an O/E convertor 70, and the optical signal OSC transmitted through the optical fiber data transmission line 66 is guided through an optical connector 71 to an O/E convertor 72.

The O/E convertor 68 is operative to cause the optical signal OSA having the central wavelength of about 1.3 μm to be subjected to O/E conversion to reproduce the serial data DSA having the bit transmission rate of 1.485 Gbps. The serial data DSA thus reproduced are supplied to an S/P convertor 73. The S/P convertor 73 is operative to cause the serial data DSA to be subjected to S/P conversion to reproduce the 20-bit word sequence data DPA' (20) having the word transmission rate of 74.25 MBps to be supplied to a data time difference absorbing portion 74.

The O/E convertor 70 is operative to cause the optical signal OSB having the central wavelength of about 1.3 μm to be subjected to O/E conversion to reproduce the serial data DSB having the bit transmission rate of 1.485 Gbps. The serial data DSB thus reproduced are supplied to an S/P convertor 75. The S/P convertor 75 is operative to cause the serial data DSB to be subjected to S/P conversion to reproduce the 20-bit word sequence data DPB' (20) having the word transmission rate of 74.25 MBps to be supplied to the data time difference absorbing portion 74.

The O/E convertor 72 is operative to cause the optical signal OSC having the central wavelength of about 1.3 μm to be subjected to O/E conversion to reproduce the serial data DSC having the bit transmission rate of 1.485 Gbps. The serial data DSC thus reproduced are supplied to an S/P convertor 76. The S/P convertor 76 is operative to cause the serial data DSC to be subjected to S/P conversion to reproduce the 20-bit word sequence data DPC' (20) having the word transmission rate of 74.25 MBps to be supplied to the data time difference absorbing portion 74.

In the data time difference absorbing portion 74, time difference among the 20-bit word sequence data DPA' (20) from the S/P convertor 73, the 20-bit word sequence data DPB' (20) from the S/P convertor 75 and the 20-bit word sequence data DPC' (20) from the S/P convertor 76 is absorbed to produce 20-bit word sequence data DPAQ' (20) which are obtained based on the 20-bit word sequence data DPA' (20) to be transmitted at the word transmission rate of 74.25 MBps, to produce 20-bit word sequence data DPBQ' (20) which are obtained based on the 20-bit word sequence data DPB' (20) to be transmitted at the word transmission rate of 74.25 MBps and to produce 20-bit word sequence data DPCQ' (20) which are obtained based on the 20-bit word sequence data DPC' (20) to be transmitted at the word transmission rate of 74.25 MBps in such a manner that time difference among the 20-bit word sequence data DPAQ' (20), the 20-bit word sequence data DPBQ' (20) and the 20-bit word sequence data DPCQ' (20) is substantially zero.

The 20-bit word sequence data DPAQ' (20), DPBQ' (20) and DPCQ' (20) obtained from the data time difference absorbing portion 74 are supplied to data separating portions 77, 78 and 79, respectively. In the data separating portion 77, the ancillary data DAA are separated from the 20-bit word sequence data DPAQ' (20) so that the 20-bit word sequence data DPAQ (20) and the ancillary data DM are separately obtained. The 20-bit word sequence data DPAQ (20) are supplied to a data reproducing portion 80. In the data separating portion 78, the ancillary data DAB are separated from the 20-bit word sequence data DPBQ' (20) so that the 20-bit word sequence data DPBQ (20) and the ancillary data DAB are separately obtained. The 20-bit word sequence data DPBQ (20) are supplied to the data reproducing portion 80. Further, in the data separating portion 79, the ancillary data DAC are separated from the 20-bit word sequence data DPCQ' (20) so that the 20-bit word sequence data DPCQ (20) and the ancillary data DAC are separately obtained. The 20-bit word sequence data DPCQ (20) are supplied to the data reproducing portion 80.

In the data reproducing portion 80, the 20-bit word sequence data DPAQ(20), the 20-bit word sequence data DPBQ(20) and the 20-bit word sequence data DPCQ(20) are subjected to data reproduction processing, which is proceeded inversely to the data processing to which the 20-bit word sequence data constituting the digital data DVX are subjected in the data processing portion 51, to reproduce the digital data DVX formed based on the 20-bit word sequence data DPAQ(20), DPBQ(20) and DPCQ(20).

The digital data DVX thus reproduced are one of the data DVA12+DKA12, DDT12+DKD12, DVA14+DKA14, DDT14+DKD14, DVA16+DKA16, DDT16+DKD16, DVB12+DKB12, DIT12+DKI12 and DVC10+DKC10.

Each of the 20-bit word sequence data DVA12A, DVDT12A, DVA14A, DVDT14A, DVA16A or DVDT16A composed of the upper 10-bit portions each divided from the 12-bit, 14-bit or 16-bit word constituting the Y data sequence and the upper 10-bit portions each divided from the 12-bit, 14-bit or 16-bit word constituting the $P_B/P_R$ data sequence, which are multiplexed in parallel with each other and the 20-bit word sequence data DVB12A or DVIT12A composed of the upper 10-bit portions each divided from the 12-bit word constituting the G data sequence, the upper 10-bit portions each divided from the 12-bit word constituting the B data sequence and the upper 10-bit portions each divided from the 12-bit word constituting the R data sequence, which are multiplexed in parallel with one another, can be recorded or reproduced by means of, for example, a previously proposed video tape recorder for HD digital video signals. Accordingly, it is possible to confirm or edit the contents of the 20-bit word sequence data DVA12A, DVDT12A, DVA14A, DVDT14A, DVA16A, DVDT16A, DVB12A or DVIT12A with use of the previously proposed video tape recorder for HD digital video signals. Further, it is also possible to obtain images reproduced from the 20-bit word sequence data DVA12A, DVDT12A, DVA14A, DVDT14A, DVA16A, DVDT16A, DVB12A or DVIT12A with use of the combination of a video tape recorder and a video monitor for HD digital video signals proposed previously. These facts bring about remarkable advantage for handling word sequence data constituting a digital video signal, in which each word is made of more than 10 bits.

Figure 36:
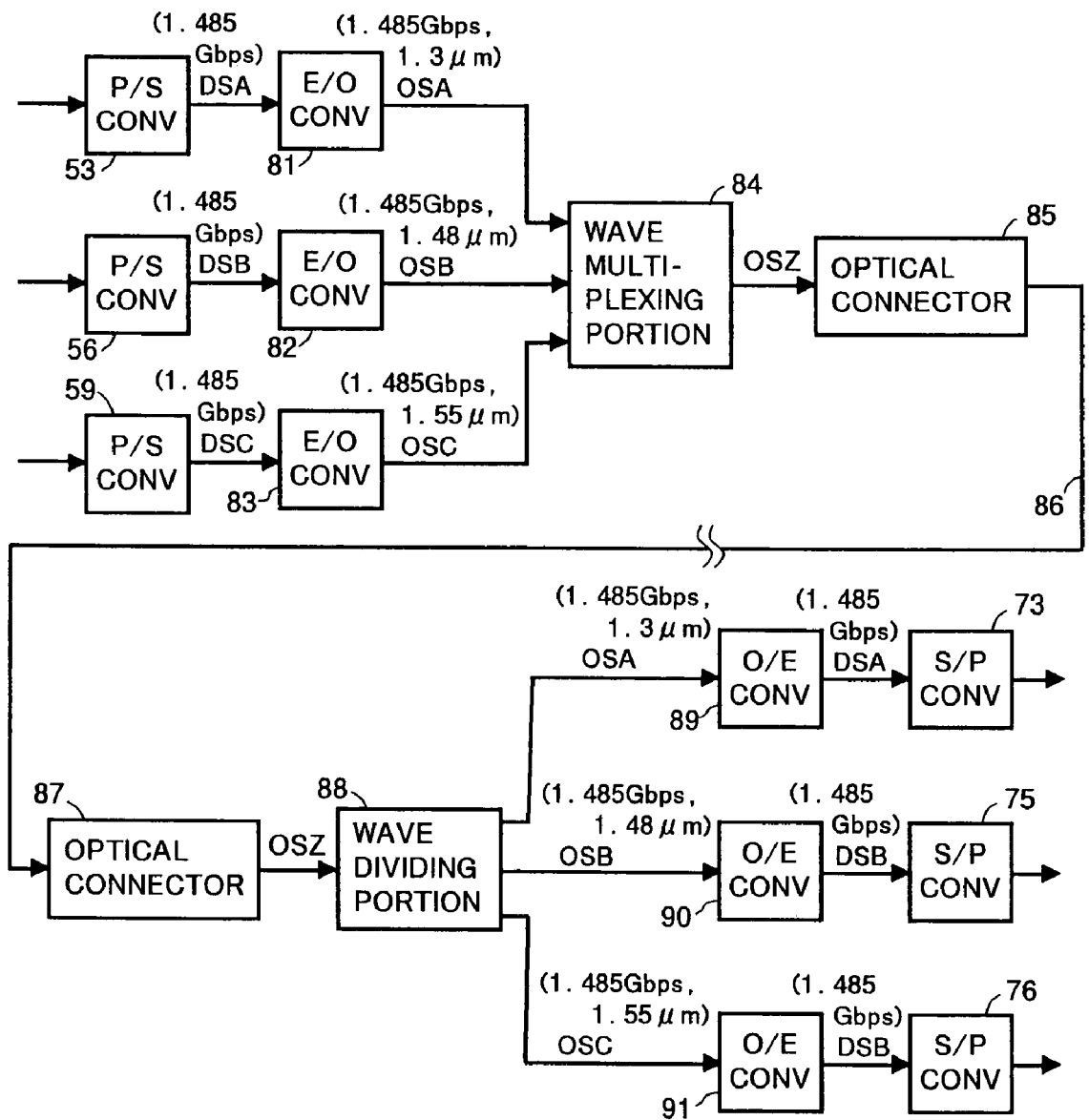
FIG. 36 is a schematic block diagram showing a part of an example of a data transmitting and receiving apparatus including another embodiment of apparatus for receiving digital data according to one of the thirty-third to thirty-fifth, forty-second and forty-third aspects of the present invention, in which an embodiment of method of transmitting digital data according to one of the thirteenth to fifteenth and the twenty-second and twenty-third aspects of the present invention is carried out.

FIG. 36 shows a part of an example of a data transmitting and receiving apparatus which includes a second embodiment of apparatus for transmitting digital data according to one of the thirty-third to thirty-fifth, forty-second and forty-third aspects of the present invention, in which an embodiment of method of transmitting digital data according to one of the thirteenth to fifteenth, twenty-second and twenty-third aspects of the present invention is carried out.

The example of the data transmitting and receiving apparatus, a part of which is shown in FIG. 36, has a number of blocks constituted in the same manner as those in the example of FIG. 28 and blocks which are constituted to be different from those in the example of FIG. 28 are shown in FIG. 36.

Referring to FIG. 36, E/O convertors 81, 82 and 83 and O/E convertors 89, 90 and 91 are provided in place of the E/O convertors 54, 57 and 60 and the O/E convertor 68, 70 and 72 employed in the example of FIG. 28. Further, an optical connector 85, an optical fiber data transmission line 86 and an optical connector 87 are provided in place of the optical connectors 61, 63 and 65, the optical fiber data transmission lines 62, 64 and 66 and the optical connectors 67, 69 and 71 employed in the example of FIG. 28. The optical fiber data transmission line 86 is made of, for example, fused quartz SMF.

In the example, a part of which is shown in FIG. 36, serial data DSA having the bit transmission rate of 1.485 Gbps obtained from a P/S convertor 53 is supplied to the E/O convertor 81, serial data DSB having the bit transmission rate of 1.485 Gbps obtained from a P/S convertor 56 is supplied to the E/O convertor 82 and serial data DSC having the bit transmission rate of 1.485 Gbps obtained from a P/S convertor 59 is supplied to the E/O convertor 83. The E/O convertor 81 is operative to cause the serial data DSA to be E/O conversion to produce an optical signal OSA having, for example, the central wavelength of about 1.3 μm and the bit transmission rate of 1.485 Gbps. The optical signal OSA is guided to a wave multiplexing portion 84. The E/O convertor 82 is operative to cause the serial data DSB to be E/O conversion to produce an optical signal OSB having, for example, a central wavelength of about 1.48 μm and the bit transmission rate of 1.485 Gbps. The optical signal OSB is guided to the wave multiplexing portion 84. The E/O convertor 83 is operative to cause the serial data DSC to be E/O conversion to produce an optical signal OSC having, for example, the central wavelength of about 1.55 μm and the bit transmission rate of 1.485 Gbps. The optical signal OSC is guided to the wave multiplexing portion 84.

The wave multiplexing portion 84 is constituted with, for example, a WDM using optical fiber. In the wave multiplexing portion 84, the optical signal OSA having the central wavelength of about 1.3 μm, the optical signal OSB having the central wavelength of about 1.48 μm and the optical signal OSC having the central wavelength of about 1.55 μm are multiplexed with one another to produce a multiplexed optical signal OSZ. The multiplexed optical signal OSZ is derived from the wave multiplexing portion 84 as a transmission signal. A portion including the E/O convertors 81, 82 and 83 and the wave multiplexing portion 84 constitutes a data transmitting portion for transmitting the serial data DSA, DSB and DSC obtained from the P/S convertors 53, 56 and 59, respectively.

The multiplexed optical signal OSZ which is the transmission signal derived from the wave multiplexing portion 84 is guided through the optical connector 85 to the optical fiber data transmission line 86 to be transmitted thereby to a receiving side. The optical fiber data transmission line 86 is made of, for example, fused quartz SMF.

In the receiving side, the multiplexed optical signal OSZ transmitted through the optical fiber data transmission line 86 is guided through the optical connector 87 to a wave dividing portion 88. The wave dividing portion 88 is constituted with, for example, a WDD using optical fiber functioning as wave dividing means. In the wave dividing portion 88, the multiplexed optical signal OSZ is divided into a first optical elements having the center wavelength of about 1.3 μm, a second optical element having the center wavelength of about 1.48 μm and a third optical element having the center wavelength of about 1.55 μm to reproduce the optical signal OSA which has the center wavelength of about 1.3 μm and the bit transmission rate of 1.485 Gbps, the optical signal OSB which has the center wavelength of about 1.48 μm and the bit transmission rate of 1.485 Gbps and the optical signal OSC which has the center wavelength of about 1.551 μm and the bit transmission rate of 1.485 Gbps based on the first, second and third optical elements, respectively.

The optical signals OSA, OSB and OSC reproduced by the wave dividing portion 88 are guided the O/E convertors 89, 90 and 91, respectively. The O/E convertor 89 is operative to cause the optical signal OSA having the center wavelength of about 1.3 μm and the bit transmission rate of 1,485 Gbps to be subjected to O/E conversion to reproduce the serial data DSA having bit transmission rate of 1,485 Gbps. The serial data DSA thus reproduced are supplied to an S/P convertor 73. The O/E convertor 90 is operative to cause the optical signal OSB having the center wavelength of about 1.48 μm and the bit transmission rate of 1,485 Gbps to be subjected to O/E conversion to reproduce the serial data DSB having bit transmission rate of 1,485 Gbps. The serial data DSB thus reproduced are supplied to an S/P convertor 75. The O/E convertor 91 is operative to cause the optical signal OSC having the center wavelength of about 1.55 μm and the bit transmission rate of 1,485 Gbps to be subjected to O/E conversion to reproduce the serial data DSC having bit transmission rate of 1,485 Gbps. The serial data DSC thus reproduced are supplied to an S/P convertor 76.

Other operations of the example, a part of which is shown in FIG. 36, are similar to those of the example of FIG. 28.

Figure 37:
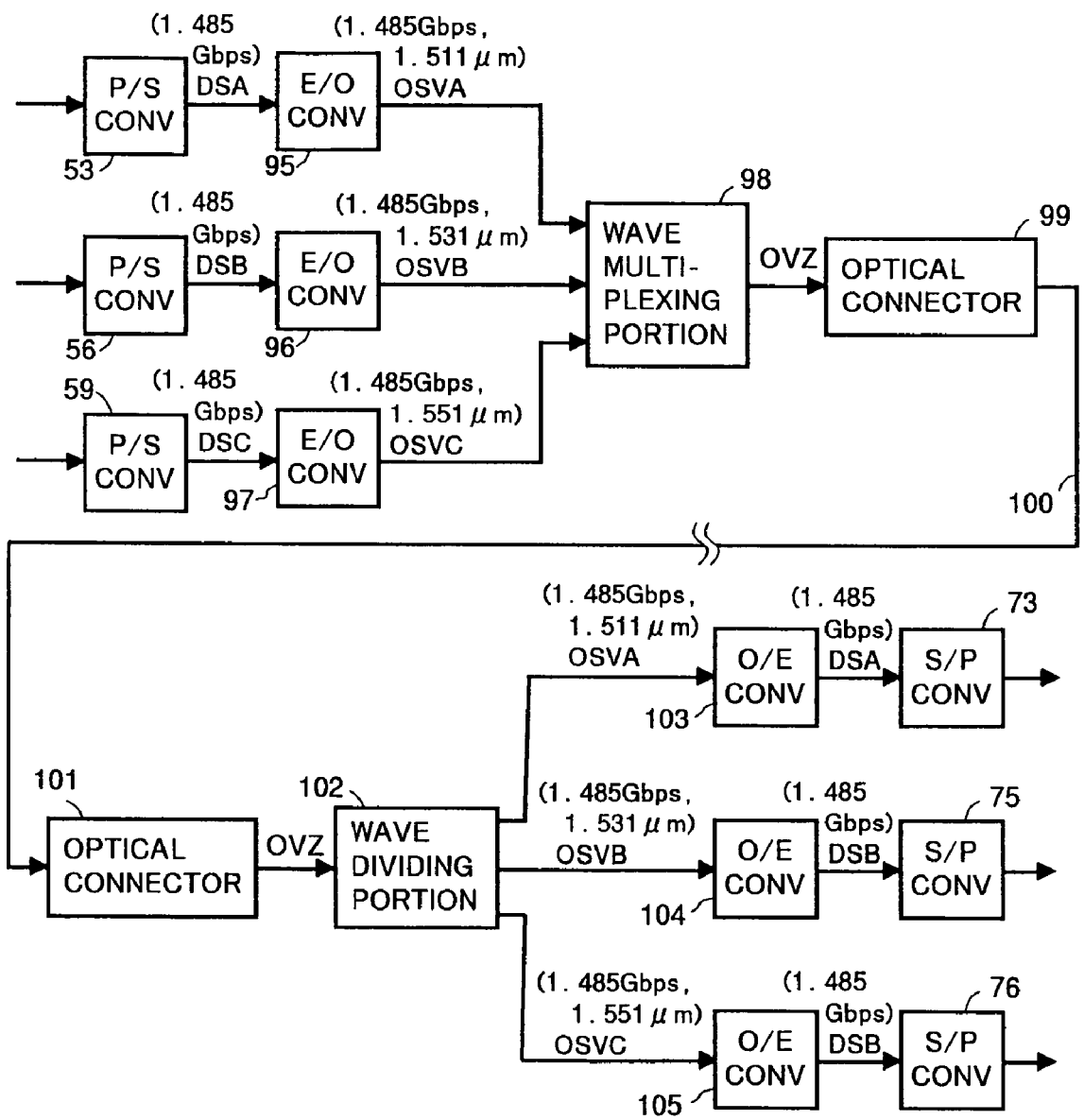
FIG. 37 is a schematic block diagram showing a part of an example of a data transmitting and receiving apparatus including a further embodiment of apparatus for transmitting digital data according to one of the thirty-third to thirty-fifth, forty-second and forty-third aspects of the present invention, in which an embodiment of method of transmitting digital data according to one of the thirteenth to fifteenth and the twenty-second and twenty-third aspects of the present invention is carried out.

FIG. 37 shows a part of an example of a data transmitting and receiving apparatus which includes a third embodiment of apparatus for transmitting digital data according to one of the thirty-third to thirty-fifth, forty-second and forty-third aspects of the present invention, in which an embodiment of method of transmitting digital data according to one of the thirteenth to fifteenth, twenty-second and twenty-third aspects of the present invention is carried out.

The example of the data transmitting and receiving apparatus, a part of which is shown in FIG. 37, has also a number of blocks constituted in the same manner as those in the example of FIG. 28 and blocks which are constituted to be different from those in the example of FIG. 28 are shown in FIG. 37.

Referring to FIG. 37, E/O convertors 95, 96 and 97 and O/E convertors 103, 104 and 105 are provided in place of the E/O convertors 54, 57 and 60 and the O/E convertors 68, 70 and 72 employed in the example of FIG. 28. Further, an optical connector 99, an optical fiber data transmission line 100 and an optical connector 101 are provided in place of the optical connectors 61, 63 and 65, the optical fiber data transmission lines 62, 64 and 66 and the optical connectors 67, 69 and 71 employed in the example of FIG. 28. The optical fiber data transmission line 101 is made of, for example, fused quartz SMF.

In the example, a part of which is shown in FIG. 37, serial data DSA having the bit transmission rate of 1.485 Gbps obtained from a P/S convertor 53 is supplied to the E/O convertor 95, serial data DSB having the bit transmission rate of 1.485 Gbps obtained from a P/S convertor 56 is supplied to the E/O convertor 96 and serial data DSC having the bit transmission rate of 1.485 Gbps obtained from a P/S convertor 59 is supplied to the E/O convertor 97.

The E/O convertor 95 is operative to cause the serial data DSA to be E/O conversion to produce an optical signal OSVA having, for example, a central wavelength of about 1.511 Om and the bit transmission rate of 1.4856 bps. The optical signal OSVA is guided to a wave multiplexing portion 98. The E/O convertor 96 is operative to cause the serial data DSB to be E/O conversion to produce an optical signal OSVB having, for example, a central wavelength of about 1.531 μm and the bit transmission rate of 1.485 Gbps. The optical signal OSVB is guided to the wave multiplexing portion 98. The E/O convertor 97 is operative to cause the serial data DSC to be E/O conversion to produce an optical signal OSVC having, for example, a central wavelength of about 1.551 μm and the bit transmission rate of 1.485 Gbps. The optical signal OSVC is guided to the wave multiplexing portion 98.

In the wave multiplexing portion 98, the optical signal OSVA having the central wavelength of about 1.5 μm, the optical signal OSVB having the central wavelength of about 1.531 μm and the optical signal OSVC having the central wavelength of about 1.551 μm are multiplexed with one another to produce a multiplexed optical signal OVZ. The multiplexed optical signal OVZ is derived from the wave multiplexing portion 98 as a transmission signal. A portion including the E/O convertors 95, 96 and 97 and the wave multiplexing portion 98 constitutes a data transmitting portion for transmitting the serial data DSA, DSB and DSC obtained from the P/S convertors 53, 56 and 59, respectively.

The optical signals OSVA, OSVB and OSVC which are multiplexed with one another in the wave multiplexing portion 98 have the respective central wavelengths so close to one another as to be different only by about 0.02 μm (20 nm) for producing the multiplexed optical signal OVZ. Therefore, the wave multiplexing technology called the Coarse Wavelength Division Multiplexing (CWDM) is applied to a portion including the E/O convertors 95, 96 and 97 and the wave multiplexing portion 98.

The multiplexed optical signal OVZ which is the transmission signal derived from the wave multiplexing portion 98 is guided through the optical connector 99 to the optical fiber data transmission line 100 to be transmitted thereby to a receiving side. The optical fiber data transmission line 100 is made of, for example, fused quartz SMF.

In the receiving side, the multiplexed optical signal OVZ transmitted through the optical fiber data transmission line 100 is guided through the optical connector 101 to a wave dividing portion 102. The wave dividing portion 102 is constituted with, for example, a WDD using optical fiber functioning as wave dividing means. In the wave dividing portion 102, the multiplexed optical signal OVZ is divided into a first optical element having the center wavelength of about 1.511 μm, a second optical element having the center wavelength of about 1.531 μm and a third optical element having the center wavelength of about 1.551 μm to reproduce the optical signal OSVA which has the center wavelength of about 1.531 μm and the bit transmission rate of 1.485 Gbps, the optical signal OSVB which has the center wavelength of about 1.531 μm and the bit transmission rate of 1.485 Gbps and the optical signal OSVC which has the center wavelength of about 1.551 μm and the bit transmission rate of 1.485 Gbps based on the first, second and third optical elements, respectively.

The optical signals OSVA, OSVB and OSVC reproduced by the wave dividing portion 102 are guided the O/E convertors 103, 104 and 105, respectively. The O/E convertor 103 is operative to cause the optical signal OSVA having the center wavelength of about 1.511 μm and the bit transmission rate of 1,485 Gbps to be subjected to O/E conversion to reproduce the serial data DSA having bit transmission rate of 1,485 Gbps. The serial data DSA thus reproduced are supplied to an S/P convertor 73. The O/E convertor 104 is operative to cause the optical signal OSVB having the center wavelength of about 1.531 μm and the bit transmission rate of 1,485 Gbps to be subjected to O/E conversion to reproduce the serial data DSB having bit transmission rate of 1,485 Gbps. The serial data DSB thus reproduced are supplied to an S/P convertor 75. The O/E convertor 105 is operative to cause the optical signal OSVC having the center wavelength of about 1.551 μm and the bit transmission rate of 1,485 Gbps to be subjected to O/E conversion to reproduce the serial data DSC having bit transmission rate of 1,485 Gbps. The serial data DSC thus reproduced are supplied to an S/P convertor 76.

Other operations of the example, a part of which is shown in FIG. 37, are similar to those of the example of FIG. 28.

Figure 38:
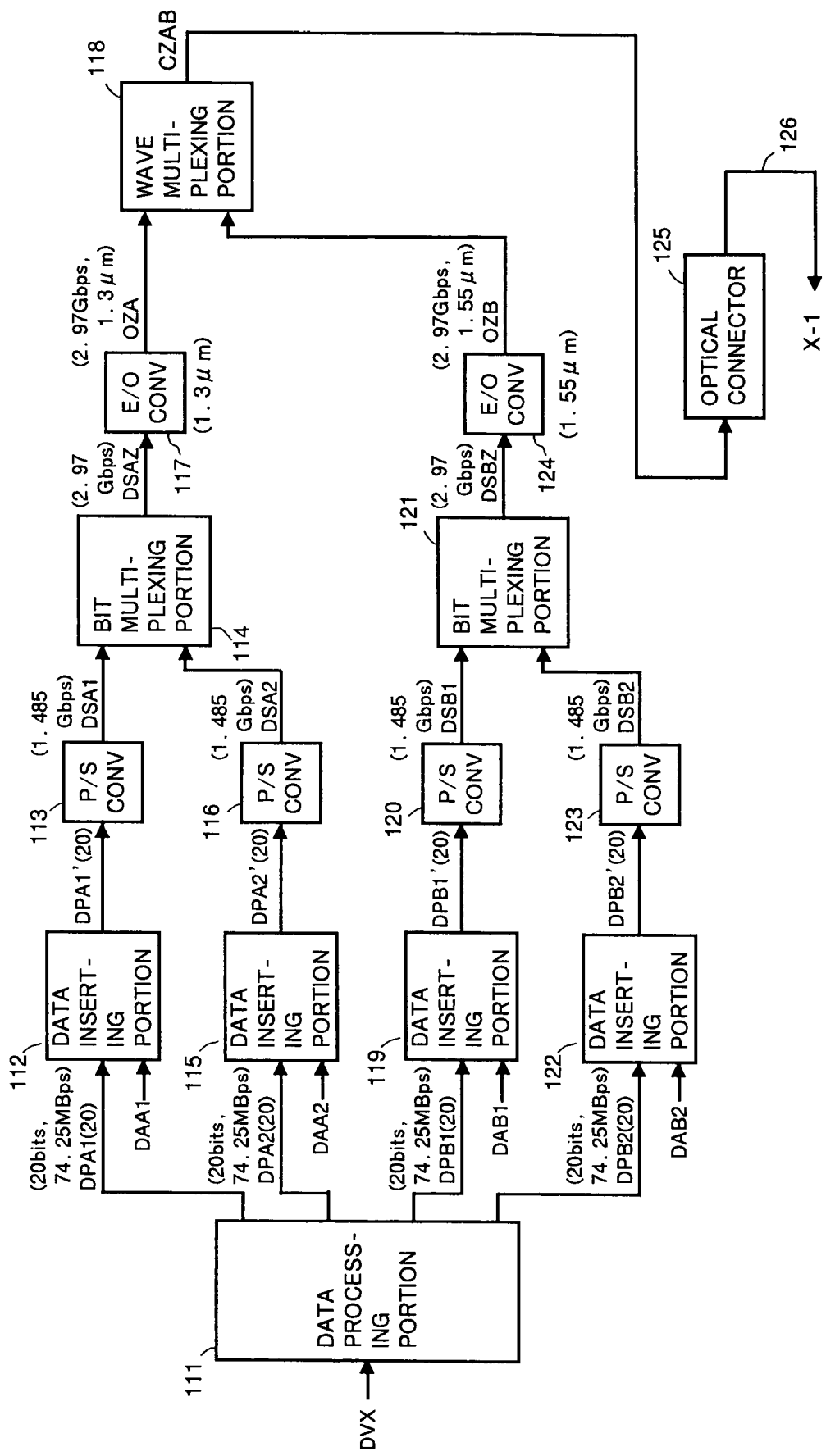
FIGS. 38 and 39 are schematic block diagrams showing an example of a data transmitting and receiving apparatus including an embodiment of apparatus for transmitting digital data according to one of the twenty-sixth, twenty-seventh and thirty-sixth aspects of the present invention, in which an embodiment of method of transmitting digital data according to one of the sixth, seventh and sixteenth aspects of the present invention is carried out.
Figure 39:
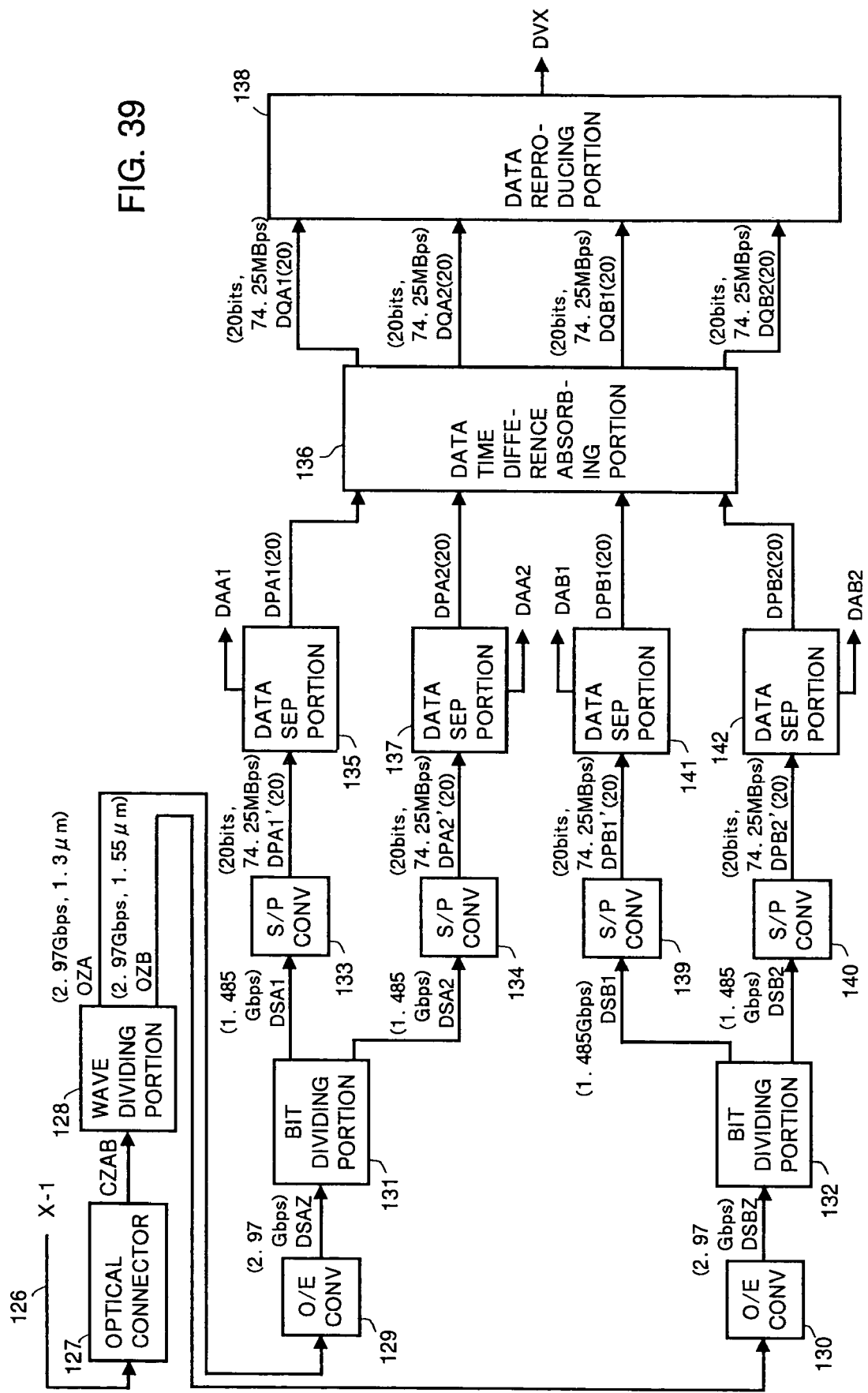

FIGS. 38 and 39 show an example of a data transmitting and receiving apparatus which includes a first embodiment of apparatus for transmitting digital data according to one of the twenty-sixth, twenty-seventh and thirty-sixth aspects of the present invention, in which an embodiment of method of transmitting digital data according to one of the sixth, seventh and sixteenth aspects of the present invention is carried out.

Referring to FIGS. 38 and 39, in a transmitting side which constitutes the embodiment of apparatus for transmitting digital data according to the present invention, digital data DVX are supplied to a data processing portion 111.

The digital data DVX are one of the digital data DD12, DE12, DD14, DE14, DD16, DE16, DI12 and DJ12 or data DVD10+DKD10 composed of 10-bit word digital data DI10 or DJ10 constituting a digital video data of the 4:4:4 type, which have a frame rate of 60 Hz or 50 Hz, 1125 lines per frame, 1080 active lines per frame, a sampling frequency of 148.5 MHz and 1920 active data samplings per line, and the key signal data sequence DKD10 of 10-bit word sequence data annexed to the digital data DI10 or DJ10.

When the digital data DVX are the digital data DD12, 24-bit word sequence data having the word transmission rate of 148.5 MBps, in which Y data sequence of 12-bit word sequence data having the word transmission rate of 148.5 MBps and the $P_B/P_R$ data sequence of 12-bit word sequence data having the word transmission rate of 148.5 MBps are multiplexed in parallel with each other in frame and line synchronism, as shown in FIG. 40, are supplied to the data processing portion 111.

In the data processing portion 111, the digital data DD12 supplied in the form of 24-bit word sequence shown in FIG. 40 are subjected to the following data processing.

First, 12-bit words YD0, YD1, YD2, YD3, . . . constituting the Y data sequence and 12-bit words PbD0, PrD0, PbD1, PrD1, PbD2, PrD2, . . . constituting the $P_B/P_R$ data sequence are put in group 1 and group 2 alternately at every line portions. Then, 24-bit word sequence data DD12A having the word transmission rate of 148.5 MBps/2=74.25 MBps are formed based on the 12-bit words forming every other line portions of the Y and $P_B/P_R$ data sequences and belonging to the group 1 as a link A, as shown in FIG. 41A and similarly 24-bit word sequence data DD12B having the word transmission rate of 148.5 MBps/2=74.25 MBps are formed based on the 12-bit words forming another every other line portions of the Y and $P_B/P_R$ data sequences and belonging to the group 2 as a link B, as shown in FIG. 41B.

The 24-bit word sequence data DD12A having the word transmission rate of 74.25 MBps which is shown in FIG. 41A are subjected to the following further data processing.

Each of 12-bit words (YD0, YD1, YD2, YD3, . . . ) constituting the Y data sequence and 12-bit words (PbD0, PrD0, PbD1, PrD1, PbD2, PrD2, . . . ) constituting the $P_B/P_R$ data sequence is divided into an upper 10-bit portion (Y0; 2~Y0;11, Y1;2~Y1;11, Y2;2~Y2;11, Y3;2~Y3;11, . . . , Pb0;2~Pb0;11, Pr0;2~Pr0;11, Pb1;2~Pb1;11, Pr1;2 2~Pr1; 11, Pb2;2~Pb2;11, Pr2;2~Pr2;11, . . . ) and a lower 2-bit portion (Y0;0~Y0;1, Y1;0~Y1;1, Y2;0~Y2;1, Y3;0~Y3;1, Pb0;0~Pb0;1, Pr0;0~Pr0;1, Pb1;0~Pb1;1, Pr1;0~Pr1;1, Pb2; 0~Pb2;1, Pr2;0~Pr2;1, . . . .

The upper 10-bit portions Y0;2~Y0;11, Y1;2~Y1;11, Y2;2~Y2;11, Y3;2~Y3;11, . . . and the upper 10-bit portions Pb0;2~Pb0;11, Pr0;2~Pr0;11, Pb1;2~Pb1;11, Pr1;2~Pr1;11, Pb2;2~Pb2;11, Pr2;2~Pr2;11, . . . are multiplexed in parallel with each other to produce 20-bit word sequence data DD12A1 having the word transmission rate of 74.25 MBps as a link A-1, as shown in FIG. 42A.

Ancillary 8-bit word α0, α1, α2, α3, . . . are added to the lower 2-bit portions Y0;0~Y0;1, Y1;0~Y1;1, Y2;0~Y2;1, Y3;0~Y3;1, . . . , respectively, to produce 10-bit word data Y0;0~Y0;1+α0, Y1;0~Y1;1+α1, Y2;0~Y2;1+α2, Y3;0~Y3; 1+α3, . . . . Further, ancillary 8-bit word β0, β1, β2, β3, β4, β5, . . . are added to the lower 2-bit portions Pb0;0~Pb0;1, Pr0;0~Pr0;1, Pb1;0~Pb1;1, Pr1;0~Pr1;1, Pb2;0~Pb2;1, Pr2; 0~Pr2;1, . . . , respectively, to produce 10-bit word data Pb0;0~Pb0;1+β0, Pr0;0~Pr0;11+β1, Pb1;0~Pb1;1+β2, Pr1; 0~Pr1;1+β3, Pb2;0~Pb2;1+β4, Pr2;0~Pr2;1+β5, . . . .

Then, the 10-bit word data Y0;0~Y0;1+α0, Y1;0Y1;1+ α1, Y2;0~Y2;1+α2, Y3;0~Y3;1+α3, . . . and the 10-bit word data Pb0;0~Pb0;1+β0, Pr0;0~Pr0;1+β1, Pb1;0~Pb1;1+β2, Pr1;0~Pr1;1+β3, Pb2;0~Pb2;1+β4, Pr2;0~Pr2;1+β5, . . . are multiplexed in parallel with each other to produce 20-bit word sequence data DD12A2 having the word transmission rate of 74.25 MBps as a link A-2, as shown in FIG. 42B.

Namely, the 24-bit word sequence data DD12A are converted to a couple of 20-bit word sequence data which are the 20-bit word sequence data DD12A1 having the word transmission rate of 74.25 MBps and the 20-bit word sequence data DD12A2 having the word transmission rate of 74.25 MBps.

Similarly, the 24-bit word sequence data DD12B having the word transmission rate of 74.25 MBps which is shown in FIG. 41B are subjected to the following further data processing.

Each of 12-bit words (YD0, YD1, YD2, YD3, . . . ) constituting the Y data sequence and 12-bit words (PbD0, PrD0, PbD1, PrD1, PbD2, PrD2, . . . ) constituting the $P_B/P_R$ data sequence is divided into an upper 10-bit portion (Y0; 2~Y0;11, Y1;2~Y1;11, Y2;2~Y2;11, Y3;2~Y3;11, . . . , Pb0;2~Pb0;11, Pr0;2~Pr0;11, Pb1;2~Pb1;11, Pr1;2~Pr1;11, Pb2;2~Pb2;11, Pr2;2~Pr2;11, . . . ) and a lower 2-bit portion (Y0;0~Y0;1, Y1;0~Y1;1, Y2;0~Y2;1, Y3;0~Y3;1, Pb0; 0~Pb0;1, Pr0;0~Pr0;1, Pb1;0~Pb1;1, Pr1;0; Pr1;1, Pb2; 0~Pb2;1, Pr2;0~Pr2;1, . . . ).

The upper 10-bit portions Y0;2~Y0;11, Y1;2~Y1;11, Y2;2~Y2;11, Y3;2~Y3;11, . . . and the upper 10-bit portions Pb0;2~Pb0;11, Pr0;2~Pr0;11, Pb1;2~Pb1;11, Pr1;2~Pr1;11, Pb2;2~Pb2;11, Pr2;2~Pr2;11, . . . are multiplexed in parallel with each other to produce 20-bit word sequence data DDA12B1' having the word transmission rate of 74.25 MBps as a link B-1, as shown in FIG. 43A.

Ancillary 8-bit word α0, α1, α2, α3, . . . are added to the lower 2-bit portions Y0;0~Y0;1, Y1;0~Y1;1, Y2;0~Y2;1, Y3;0~Y3;1, . . . , respectively, to produce 10-bit word data Y0;0~Y0;1+α0, Y1;0~Y1;1+α1, Y2;0~Y2;1+α2, Y3;0~Y3; 1+α3, . . . . Similarly, ancillary 8-bit word β0, β1, β2, β3, β4, β5, . . . are added to the lower 2-bit portions Pb0;0~Pb0;1, Pr0;0~Pr0;1, Pb1;0~Pb1;1, Pr1;0~Pr1;1, Pb2;0~Pb2;1, Pr2; 0~Pr2;1, . . . , respectively, to produce 10-bit word data Pb0;0~Pb0;1+β0, Pr0;0~Pr0;1+β1, Pb1;0~Pb1;1+β2, Pr1; 0~Pr1;1+β3, Pb2;0~Pb2;1+β4, Pr2;0~Pr2;1+β5, . . . .

Then, the 10-bit word data Y0;0~Y0;1+α0, Y1;0~Y1;1+ α1, Y2;0~Y2;1+α2, Y3;0~Y3;1+α3, . . . and the 10-bit word data Pb0;0~Pb0;1+β0, Pr0;0~Pr0;1+β1, Pb1;0~Pb1;1+β2, Pr1;0~Pr1;1+β3, Pb2;0~Pb2;1+β4, Pr2;0~Pr2;1+β5, . . . are multiplexed in parallel with each other to produce 20-bit word sequence data DD12B2 having the word transmission rate of 74.25 MBps as a link B-2, as shown in FIG. 43B.

Namely, the 24-bit word sequence data DD12B are converted to a couple of 20-bit word sequence data which are the 20-bit word sequence data DD12B1 having the word transmission rate of 74.25 MBps and the 20-bit word sequence data DD12B2 having the word transmission rate of 74.25 MBps.

Consequently, when the digital data DVX supplied to the data processing portion 111 are the digital data DD12 in the form of 24-bit word sequence, the digital data DD12 are converted to four 20-bit word sequence data which are the 20-bit word sequence data DD12A1, DD12A2~DD12B1 and DD12B2 in the data processing portion 111

When the digital data DVX are the digital data DE12, 24-bit word sequence data having the word transmission rate of 148.5 MBps, in which Y data sequence of 12-bit word sequence data having the word transmission rate of 148.5 MBps and the $P_B/P_R$ data sequence of 12-bit word sequence data having the word transmission rate of 148.5 MBps are multiplexed in parallel with each other in frame and line synchronism, as shown in FIG. 40, are also supplied to the data processing portion 111. In the data processing portion 111, the digital data DE12 are converted to four 20-bit word sequence data which are the 20-bit word sequence data DE12A1, DE12A2, DE12B1 and DE12B2 in the similar manner as the digital data DD12.

When the digital data DVX are the digital data DD14, 28-bit word sequence data having the word transmission rate of 148.5 MBps, in which Y data sequence of 14-bit word sequence data having the word transmission rate of 148.5 MBps and the $P_B/P_R$ data sequence of 14-bit word sequence data having the word transmission rate of 148.5 MBps are multiplexed in parallel with each other in frame and line synchronism, as shown in FIG. 44, are supplied to the data processing portion 111.

In the data processing portion 111, the digital data DD14 supplied in the form of 28-bit word sequence shown in FIG. 44 are subjected to the following data processing.

First, 14-bit words YD0, YD1, YD2, YD3, . . . constituting the Y data sequence and 14-bit words PbD0, PrD0, PbD1, PrD1, PbD2, PrD2, . . . constituting the $P_B/P_R$ data sequence are put in group 1 and group 2 alternately at every lineportions. Then, 28-bit word sequence data DD14A having the word transmission rate of 148.5 MBps/2=74.25 MBps are formed based on the 14-bit words forming every other line portions of the Y and $P_B/P_R$ data sequences and belonging to the group 1 as a link A, as shown in FIG. 45A and similarly 28-bit word sequence data DD14B having the word transmission rate of 148.5 MBps/2=74.25 MBps are formed based on the 14-bit words forming another every other line portions of the Y and $P_B/P_R$ data sequences and belonging to the group 2 as a link B, as shown in FIG. 45B.

The 28-bit word sequence data DD14A having the word transmission rate of 74.25 MBps which is shown in FIG. 45A are subjected to the following further data processing.

Each of 14-bit words (YD0, YD1, YD2, YD3, . . . ) constituting the Y data sequence and 14-bit words (PbD0, PrD0, PbD1, PrD1, PbD2, PrD2, . . . ) constituting the $P_B/P_R$ data sequence is divided into an upper 10-bit portion (Y0; 4~Y0;13, Y1;4~Y1;13, Y2;4~Y2;13, Y3;4~Y3;13, . . . , Pb0;4~Pb0;13, Pr0;4~Pr0;13, Pb1;4~Pb1;13, Pr1;4~Pr1;13, Pb2;4~Pb2;13, Pr2;4~Pr2;13, . . . ) and a lower 4-bit portion (Y0;0~Y0;3, Y1;0~Y1;3, Y2;0~Y2;3, Y3;0~Y3;3, . . . , Pb0;0~Pb0;3, Pr0;0~Pr0;3, Pb1;0~Pb1;3, Pr1;0~Pr1;3, Pb2; 0~Pb2;3, Pr2;0~Pr2;3, . . . ).

The upper 10-bit portions Y0;4~Y0;13, Y1;4~Y1;13, Y2;4~Y2;13, Y3;4~Y3;13, . . . and the upper 10-bit portions Pb0;4~Pb0;13, Pr0;4~Pr0;13, Pb1;4~Pb1;13, Pr1;4~Pr1;13, Pb2;4~Pb2;13, Pr2;4~Pr2;13, . . . are multiplexed in parallel with each other to produce 20-bit word sequence data DD14A1 having the word transmission rate of 74.25 MBps as a link A-1, as shown in FIG. 46A.

Ancillary 6-bit word α0, α1, α2, α3, . . . are added to the lower 2-bit portions Y0;0~Y0;3, Y1;0~Y1;3, Y2;0~Y2;3, Y3;0~Y3;3, . . . , respectively, to produce 10-bit word data Y0;0~Y0;3+α0, Y1;0~Y1;3+α1, Y2;0~Y2;3+α2, Y3;0~Y3; 3+α3, . . . . Further, ancillary 6-bit word β0, β1, β2, β3, β4, β5, . . . are added to the lower 4-bit portions Pb0;0~Pb0;3, Pr0;0~Pr0;3, Pb1;0~Pb1;3, Pr1;0~Pr1;3, Pb2;0~Pb2;3, Pr2; 0~Pr2;3, . . . , respectively, to produce 10-bit word data Pb0;0~Pb0;3+β0, Pr0;0~Pr0;3+β1, Pb1;0~Pb1;3+β2, Pr1; 0~Pr1;3+β3, Pb2;0~Pb2;3+β4, Pr2;0~Pr2;3+β5, . . . .

Then, the 10-bit word data Y0;0~Y0;3+α0, Y1;0~Y1;3+ α1, Y2;0~Y2;3+α2, Y3;0~Y3;3+α3, . . . and the 10-bit word data Pb0;0~Pb0;3+β0, Pr0;0~Pr0;3+β1, Pb1;0~Pb1;3+β2, Pr1;0~Pr1;3+β3, Pb2;0~Pb2;3+β4, Pr2;0~Pr2;3+β5, . . . are multiplexed in parallel with each other to produce 20-bit word sequence data DD14A2 having the word transmission rate of 74.25 MBps as a link A-2, as shown in FIG. 46B.

Namely, the 28-bit word sequence data DD14A are converted to a couple of 20-bit word sequence data which are the 20-bit word sequence data DD14A1 having the word transmission rate of 74.25 MBps and the 20-bit word sequence data DD14A2 having the word transmission rate of 74.25 MBps.

Similarly, the 28-bit word sequence data DD14B having the word transmission rate of 74.25 MBps which is shown in FIG. 45B are subjected to the following further data processing.

Each of 14-bit words (YD0, YD1, YD2, YD3, . . . ) constituting the Y data sequence and 14-bit words (PbD0, PrD0, PbD1, PrD1, PbD2, PrD2, . . . ) constituting the $P_B/P_R$ data sequence is divided into an upper 10-bit portion (Y0; 4~Y0;13, Y1;4~Y1;13, Y2;4~Y2;13, Y3;4~Y3;13, . . . , Pb0;4~Pb0;13, Pr0;4~Pr0;13, Pb1;4~Pb1;13, Pr1;4~Pr1;13, Pb2;4~Pb2;13, Pr2;4~Pr2;13, . . . ) and a lower 4-bit portion (Y0;0~Y0;3, Y1;0~Y1;3, Y2;0~Y2;3, Y3;0~Y3;3, . . . , Pb0;0~Pb0;3, Pr0;0~Pr0;3, Pb1;0~Pb1;3, Pr1;0~Pr1;3, Pb2; 0~Pb2;3, Pr2;0~Pr2;3, . . . ).

The upper 10-bit portions Y0;4~Y0;13, Y1;4~Y1;13, Y2;4~Y2;13, Y3;4~Y3;13, . . . and the upper 10-bit portions Pb0;4~Pb0;13, Pr0;4~Pr0;13, Pb1;4~Pb1;13, Pr1;4~Pr1;13, Pb2;4~Pb2;13, Pr2;4~Pr2;13, . . . are multiplexed in parallel with each other to produce 20-bit word sequence data DDA14B1 having the word transmission rate of 74.25 MBps as a link B-1, as shown in FIG. 47A.

Ancillary 6-bit word α0, α1, α2, α3, . . . are added to the lower 4-bit portions Y0;0~Y0;3, Y1;0~Y1;3, Y2;0~Y2;3, Y3;0~Y3;3, . . . , respectively, to produce 10-bit word data Y0;0~Y0;3+α0, Y1;0~Y1;3+1, Y2;0~Y2;3+c2, Y3;0~Y3; 3+CY3, . . . . Similarly, ancillary 6-bit word β0, β1, β2, β3, β4, β5, . . . are added to the lower 4-bit portions Pb0;0~Pb0; 3, Pr0;0~Pr0;3, Pb1;0~Pb1;3, Pr1;0~Pr1;3, Pb2;0~Pb2;3, Pr2;0~Pr2;3, . . . , respectively, to produce 10-bit word data Pb0;0~Pb0;3+β0, Pr0;0~Pr0;3+1β1, Pb1;0~Pb1;3+β2, Pr1; 0~Pr1;3+β3, Pb2;0~Pb2;3+β4, Pr2;0~Pr2;3+β5, . . . .

Then, the 10-bit word data Y0;0~Y0;3+α0, Y1;0~Y1;3+ α1, Y2;0~Y2;3+α2, Y3;0~Y3;3+α3, . . . and the 10-bit word data Pb0;0~Pb0;3+β0, Pr0;0~Pr0;3+β1, Pb1;0~Pb1;3+132, Pr1;0~Pr1;3+β3, Pb2;0~Pb2;3+β4, Pr2;0~Pr2;3+β5, . . . are multiplexed in parallel with each other to produce 20-bit word sequence data DD14B2 having the word transmission rate of 74.25 MBps as a link B-2, as shown in FIG. 47B.

Namely, the 28-bit word sequence data DD14B are converted to a couple of 20-bit word sequence data which are the 20-bit word sequence data DD14B1 having the word transmission rate of 74.25 MBps and the 20-bit word sequence data DD14B2 having the word transmission rate of 74.25 MBps.

Consequently, when the digital data DVX supplied to the data processing portion 111 are the digital data DD14 in the form of 28-bit word sequence, the digital data DD14 are converted to four 20-bit word sequence data which are the 20-bit word sequence data DD14A1, DD14A2~DD14B1 and DD14B2 each having the word transmission rate of 74.25 MBps in the data processing portion 111

When the digital data DVX are the digital data DE14, 28-bit word sequence data having the word transmission rate of 148.5 MBps, in which Y data sequence of 14-bit word sequence data having the word transmission rate of 148.5 MBps and the $P_B/P_R$ data sequence of 14-bit word sequence data having the word transmission rate of 148.5 MBps are multiplexed in parallel with each other in frame and line synchronism, as shown in FIG. 44, are also supplied to the data processing portion 111. In the data processing portion 111, the digital data DE14 are converted to four 20-bit word sequence data which are the 20-bit word sequence data DE14A1, DE14A2, DE14B1 and DE14B2 each having the word transmission rate of 74.25 MBps in the similar manner as the digital data DD14.

Figure 48:
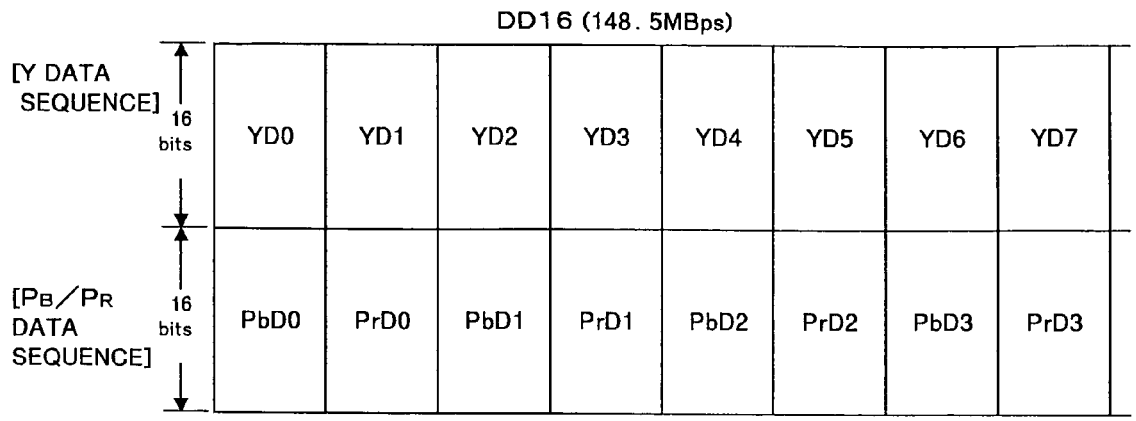

When the digital data DVX are the digital data DD16, 32-bit word sequence data having the word transmission rate of 148.5 MBps, in which Y data sequence of 16-bit word sequence data having the word transmission rate of 148.5 MBps and the $P_B/P_R$ data sequence of 16-bit word sequence data having the word transmission rate of 148.5 MBps are multiplexed in parallel with each other in frame and line synchronism, as shown in FIG. 48, are supplied to the data processing portion 111.

In the data processing portion 111, the digital data DD16 supplied in the form of 32-bit word sequence shown in FIG. 48 are subjected to the following data processing.

First, 16-bit words YD0, YD1, YD2, YD3, . . . constituting the Y data sequence and 16-bit words PbD0, PrD0, PbD1, PrD1, PbD2, PrD2, . . . constituting the $P_B/P_R$ data sequence are put in group 1 and group 2 alternately at every line portions. Then, 32-bit word sequence data DD16A having the word transmission rate of 148.5 MBps/2=74.25 MBps are formed based on the 16-bit words forming every other line portions of the Y and $P_B/P_R$ data sequences and belonging to the group 1 as a link A, as shown in FIG. 49A and similarly 32-bit word sequence data DD16B having the word transmission rate of 148.5 MBps/2=74.25 MBps are formed based on the 16-bit words forming another every other line portions of the Y and $P_B/P_R$ data sequences and belonging to the group 2 as a link B, as shown in FIG. 49B.

Figure 49A:
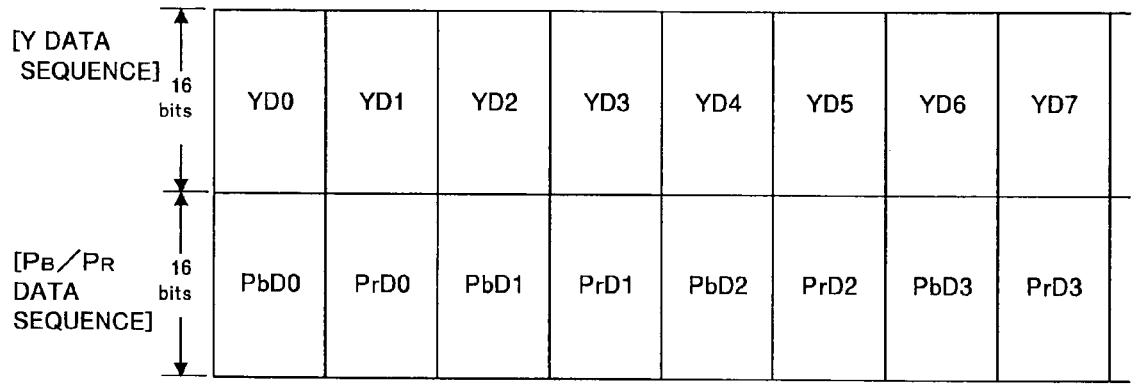
Figure 49B:
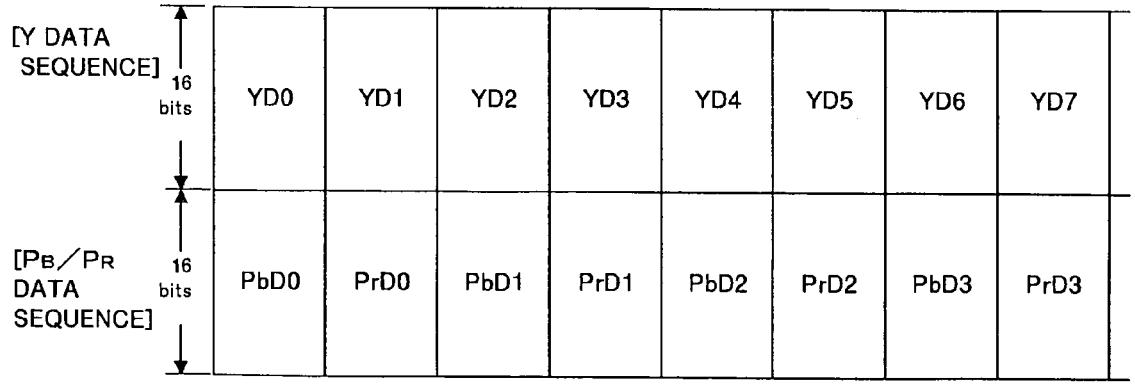

The 32-bit word sequence data DD16A having the word transmission rate of 74.25 MBps which is shown in FIG. 49A are subjected to the following further data processing.

Each of 16-bit words (YD0, YD1, YD2, YD3, . . . ) constituting the Y data sequence and 16-bit words (PbD0, PrD0, PbD1, PrD1, PbD2, PrD2, . . . ) constituting the $P_B/P_R$ data sequence is divided into an upper 10-bit portion (Y0; 6~Y0;15, Y1;6~Y1;15, Y2;6~Y2;15, Y3;6~Y3;15, . . . , Pb0;6~Pb0;15, Pr0;6~Pr0;15, Pb1;6~Pb1;15, Pr1;6 6~Pr1; 15, Pb2;6~Pb2;15, Pr2;6~Pr2;15, . . . ) and a lower 6-bit portion (Y0;0~Y0;5, Y1;0~Y1;5, Y2;0~Y2;5, Y3;0~Y3; 5, . . . , Pb0;0~Pb0;5, Pr0;0~Pr0;5, Pb1;0~Pb1;5, Pr1;0~Pr1; 5, Pb2;0~Pb2;5, Pr2;0~Pr2;5, . . . ).

The upper 10-bit portions Y0;6~Y0;15, Y1;6~Y1;15, Y2;6~Y2;15, Y3;6~Y3;15, . . . and the upper 10-bit portions Pb0;6~Pb0;15, Pr0;6~Pr0;15, Pb1;6~Pb1;15, Pr1;6~Pr1;15, Pb2;6~Pb2;15, Pr2;6 Pr2;15, . . . are multiplexed in parallel with each other to produce 20-bit word sequence data DD16A1 having the word transmission rate of 74.25 MBps as a link A-1, as shown in FIG. 50A.

Ancillary 4-bit word α0, α1, α2, α3, . . . are added to the lower 6-bit portions Y0;0~Y0;5, Y1;0~Y1;5, Y2;0~Y2;5, Y3;0~Y3;5, . . . , respectively, to produce 10-bit word data Y0;0~Y0;5+α0, Y1;0~Y1;5+α1, Y2;0~Y2;5+α2, Y3;0~Y3; 5+α3, . . . . Further, ancillary 4-bit word β0, β1, β2, β3, β4, β5, . . . are added to the lower 6-bit portions Pb0;0~Pb0;5, Pr0;0~Pr0;5, Pb1;0~Pb1;5, Pr1;0~Pr1;5, Pb2;0~Pb2;5, Pr2; 0~Pr2;5, . . . , respectively, to produce 10-bit word data Pb0;0~Pb0;5+β0, Pr0;0~Pr0;5+β1, Pb1;0~Pb1;5+β2, Pr1; 0~Pr1;5+β3, Pb2;0~Pb2;5+β4, Pr2;0~Pr2;5+β5, . . . .

Then, the 10-bit word data Y0;0~Y0;5+α0, Y1;0~Y1;5+ α1, Y2;0~Y2;5+α2, Y3;0~Y3;5+α3, . . . and the 10-bit word data Pb0;0~Pb0;5+β0, Pr0;0~Pr0;5+β1, Pb1;0~Pb1;5+β2, Pr1;0~Pr1;5+β3, Pb2;0~Pb2;5+β4, Pr2;0~Pr2;5+β5, . . . are multiplexed in parallel with each other to produce 20-bit word sequence data DD16A2 having the word transmission rate of 74.25 MBps as a link A-2, as shown in FIG. 50B.

Namely, the 32-bit word sequence data DD16A are converted to a couple of 20-bit word sequence data which are the 20-bit word sequence data DD16A1 having the word transmission rate of 74.25 MBps and the 20-bit word sequence data DD16A2 having the word transmission rate of 74.25 MBps.

Similarly, the 32-bit word sequence data DD16B having the word transmission rate of 74.25 MBps which is shown in FIG. 49B are subjected to the following further data processing.

Each of 16-bit words (YD0, YD1, YD2, YD3, . . . ) constituting the Y data sequence and 16-bit words (PbD0, PrD0, PbD1, PrD1, PbD2, PrD2, . . . ) constituting the $P_B/P_R$ data sequence is divided into an upper 10-bit portion (Y0; 6~Y0;15, Y1;6~Y1;15, Y2;6~Y2;15, Y3;6~Y3;15, . . . , Pb0;6~Pb0;15, Pr0;6~Pr0;15, Pb1;6~Pb1;15, Pr1;6~Pr1;15, Pb2;6~Pb2;15, Pr2;6~Pr2;15, . . . ) and a lower 6-bit portion (Y0;0~Y0;5, Y1;0~Y1;5, Y2;0~Y2;5, Y3;0~Y3;5, . . . , Pb0;0~Pb0;5, Pr0;0~Pr0;5, Pb1;0~Pb1;5, Pr1;0~Pr1;5, Pb2; 0~Pb2;5, Pr2;0~Pr2;5, . . . ).

The upper 10-bit portions Y0;6~Y0;15, Y1;6~Y1;15, Y2;6~Y2;15, Y3;6~Y3;15, . . . and the upper 10-bit portions Pb0;6~Pb0;15, Pr0;6~Pr0;15, Pb1;6~Pb1;15, Pr1;6~Pr1;15, Pb2;6~Pb2;15, Pr2;6~Pr2;15, . . . are multiplexed in parallel with each other to produce 20-bit word sequence data DDA16B1 having the word transmission rate of 74.25 MBps as a link B-1, as shown in FIG. 51A.

Ancillary 4-bit word α0, α1, α2, α3, . . . are added to the lower 6-bit portions Y0;0~Y0;5, Y1;0~Y1;5, Y2;0~Y2;5, Y3;0~Y3;5, . . . , respectively, to produce 10-bit word data Y0;0-Y0;5+α0, Y1;0~Y1;5+α1, Y2;0~Y2;5+α2, Y3;0~Y3; 5+α3, . . . . Similarly, ancillary 4-bit word β0, β1, β2, β3, β4, β5, . . . are added to the lower 6-bit portions Pb0;0~Pb0;5, Pr0;0~Pr0;5, Pb1;0~Pb1;5, Pr1;0~Pr1;5, Pb2;0~Pb2;5, Pr2; 0~Pr2;5, . . . , respectively, to produce 10-bit word data Pb0;0~Pb0;5+β0, Pr0;0~Pr0;5+β1, Pb1;0~Pb1;5+β2, Pr1; 0~Pr1;5+β3, Pb2;0~Pb2;5+β4, Pr2;0~Pr2;5+β5, . . . .

Then, the 10-bit word data Y0;0~Y0;5+α0, Y1;0~Y1;5+ α1, Y2;0~Y2;5+α2, Y3;0~Y3;5+α3, . . . and the 10-bit word data Pb0;0~Pb0;5+β0, Pr0;0~Pr0;5+β1, Pb1;0~Pb1;5+β2, Pr1;0~Pr1;5+β3, Pb2;0~Pb2;5+β4, Pr2;0~Pr2;5+β5, . . . are multiplexed in parallel with each other to produce 20-bit word sequence data DD16B2 having the word transmission rate of 74.25 MBps as a link B-2, as shown in FIG. 52B.

Namely, the 32-bit word sequence data DD16B are converted to a couple of 20-bit word sequence data which are the 20-bit word sequence data DD16B1 having the word transmission rate of 74.25 MBps and the 20-bit word sequence data DD16B2 having the word transmission rate of 74.25 MBps.

Consequently, when the digital data DVX supplied to the data processing portion 111 are the digital data DD16 in the form of 32-bit word sequence, the digital data DD16 are converted to four 20-bit word sequence data which are the 20-bit word sequence data DD16A1, DD16A2~DD16B1 and DD16B2 each having the word transmission rate of 74.25 MBps in the data processing portion 111.

When the digital data DVX are the digital data DE16, 32-bit word sequence data having the word transmission rate of 148.5 MBps, in which Y data sequence of 16-bit word sequence data having the word transmission rate of 148.5 MBps and the $P_B/P_R$ data sequence of 16-bit word sequence data having the word transmission rate of 148.5 MBps are multiplexed in parallel with each other in frame and line synchronism, as shown in FIG. 48, are also supplied to the data processing portion 111. In the data processing portion 111, the digital data DE16 are converted to four 20-bit word sequence data which are the 20-bit word sequence data DE16A1, DE16A2, DE16B1 and DE16B2 in the similar manner as the digital data DD16.

When the digital data DVX are the digital data DI12, 36-bit word sequence data having the word transmission rate of 148.5 MBps, in which G, B and R data sequences, each of which is 12-bit word sequence data having the word transmission rate of 148.5 MBps, are multiplexed in parallel with each other in frame and line synchronism as shown in FIG. 52, are supplied to the data processing portion 111.

In the data processing portion 111, the digital data DI12 supplied in the form of 36-bit word sequence shown in FIG. 52 are subjected to the following data processing.

First, 12-bit words GD0, GD1, GD2, GD3, . . . constituting the G data sequence, 12-bit words BD0, BD1, BD2, BD3, . . . constituting the B data sequence and 12-bit words RD0, RD1, RD2, RD3, . . . constituting the R data sequence are put in group 1 and group 2 alternately at every line portions. Then, 36-bit word sequence data DI12A having the word transmission rate of 148.5 MBps/2=74.25 MBps are formed based on the 12-bit words forming every other line portions of the G, B and R data sequences and belonging to the group 1 as a link A, as shown in FIG. 53A and similarly 36-bit word sequence data DI12B having the word transmission rate of 148.5 MBps/2=74.25 MBps are formed based on the 12-bit words forming another every other line portions of the G, B and R data sequences and belonging to the group 2 as a link B, as shown in FIG. 53B.

The 36-bit word sequence data DI12A having the word transmission rate of 74.25 MBps which is shown in FIG. 53A are subjected to the following further data processing.

Each of 12-bit words (GD0, GD1, GD2, GD3, . . . ) constituting the G data sequence, 12-bit words (BD0, BD1, BD2, BD3, . . . ) constituting the B data sequence and 12-bit words (RD0, RD1, RD2, RD3, . . . ) constituting the R data sequence is divided into an upper 10-bit portion (G0;2~G0; 11, G1;2~G1;11, G2;2~G2;11, G3;2~G3;11, . . . , B0;2~B0; 11, B1;2~B1;11, B2;2~B2;11, B3;2~B3;11, . . . and R0;2~R0;11, R1;2~R1;11, R2;2~R2;11, R3;2~R3;11, . . . ) and a lower 2-bit portion (G0;0~G0;1, G1;0~G1;1, G2;0~G2;1, G3;0~G3;1, . . . , B0;0~B0;1, B1;0~B1;1, B2;0~B2;1, B3;0~B3;1, . . . and R0;0~R0;1, R1;0~R1;1, R2;0~R2;1, R3;0~R3;1, . . . ).

Then, the lower 2-bit portions G0;0~G0;1, B0;0~B0;1 and R0;0~R0;1 are bit-multiplexed to produce 6-bit word GBR0(0~1). The lower 2-bit portions G1;0~G1;1, B1;0~B1;1 and R1;0~R1;1 are bit-multiplexed to produce 6-bit word GBR1(0~1). The lower 2-bit portions G2;0~G2; 1, B2;0~B2;1 and R2;0~R2;1 are bit-multiplexed to produce 6-bit word GBR2(0~1). Further, ancillary 4-bit word γ0, γ1, γ2, γ3, . . . are added to the 6-bit words GBR0(0~1), GBR1(0~1), GBR2(0~1), GBR3(0~1), . . . , respectively, to produce 10-bit word data GBR0(0~1)+γ0, GBR1(0~1)+γ1, GBR2(0~1)+γ2, GBR3(0~1)+γ3, . . . .

The upper 10-bit portions G0;2~G0;11, G1;2~G1;11, G2;2~G2;11, G3;203;11, . . . , B0;2~B0;11, B1;2~B1;11, B2;2~B2;11, B3;2~B3;11, . . . and R0;2~R0;11, R1;2~R1; 11, R2;2~R2;11, R3;2~R3;11, . . . are put in group 1 and group 2 and the 10-bit word data GBR0(0~1)+γ0, GBR1 (0~1)+γ1, GBR2(0~1)+γ2, GBR3(0~1)+γ3, . . . are added to the group 2, so that 10-bit word group 1 and 10-bit word group 2 which are partitioned in such a manner as shown with bold lines on a table shown in FIG. 54 are obtained.

20-bit word sequence data DI12A1 having the word transmission rate 74.25 MBps are formed based on the 10-bit word group 1 shown in FIG. 54 as a link A-1, as shown in FIG. 55A. Similarly, 20-bit word sequence data DI12A2 having the word transmission rate 74.25 MBps are formed based on the 10-bit word group 2 shown in FIG. 54 as a link A-2, as shown in FIG. 55B.

Namely, the 36-bit word sequence data DI12A having the word transmission rate 74.25 MBps are converted to a couple of 20-bit word sequence data which are the 20-bit word sequence data DI12A1 and DI12A2 each having the word transmission rate of 74.25 MBps.

Similarly, the 36-bit word sequence data DI12B having the word transmission rate of 74.25 MBps which is shown in FIG. 53B are subjected to the following further data processing.

Each of 12-bit words (GD0, GD1, GD2, GD3, . . . ) constituting the G data sequence, 12-bit words (BD0, BD1, BD2, BD3, . . . ) constituting the B data sequence and 12-bit words (RD0, RD1, RD2, RD3, . . . ) constituting the R data sequence is divided into an upper 10-bit portion (G0;2~G0; 11, G1;2~G1;11, G2;2-0G2;11, G3;2~G3;11, . . . , B0;2~B0; 11, B1;2~B1;11, B2;2~B2;11, B3;2~B3;11, . . . and R0;2~R0;11, R1;2~R1;11, R2;2~R2;11, R3;2~R3;11, . . . ) and a lower 2-bit portion (G0;0~G0;1, G1;0~G1;1, G2;0~G2;1, G3;0~G3;1, . . . , B0;0~B0;1, B1;0~B1;1, B2;0~B2;1, B3;0~B3;1, . . . and R0;0~R0;1, R1;0~R1;1, R2;0~R2;1, R3;0~R3;1, . . . ).

Then, the lower 2-bit portions G0;0~G0;1, B0;0~B0;1 and R0;0~R0;1 are bit-multiplexed to produce 6-bit word GBR0(0~1). The lower 2-bit portions G1;0~G1;1, B1;0~B1;1 and R1;0~R1;1 are bit-multiplexed to produce 6-bit word GBR1(0~1). The lower 2-bit portions G2;0~G2; 1, B2;0~B2;1 and R2;0~R2;1 are bit-multiplexed to produce 6-bit word GBR2(0~1). . . . . Further, ancillary 4-bit word γ0, γ1, γ2, γ3, . . . are added to the 6-bit words GBR0(0~1), GBR1(0~1), GBR2(0~1), GBR3(0~1), . . . , respectively, to produce 10-bit word data GBR0(0~1)+γ0, GBR1 (0~1)+γ1, GBR2(0~1)+γ2, GBR3(0~1)+γ3, . . .

The upper 10-bit portions G0;2~G0;11, G1;2~G1;11, G2;2~G2;11, G3;2~G3;11, . . . , B0;2~B0;11, B1;2~B1;11, B2;2~B2;11, B3;2~B3;11, . . . and R0;2~R0;11, R1;2~R1; 11, R2;2~R2;11, R3;2~R3;11, . . . are put in group 1 and group 2 and the 10-bit word data GBR0(0~1)+γ0, GBR1 (0~1)+γ1, GBR2(0~1)+γ2, GBR3(0~1)+γ3, . . . are added to the group 2, so that 10-bit word group 1 and 10-bit word group 2 which are partitioned in such a manner as shown with bold lines on a table shown in FIG. 54 are obtained.

20-bit word sequence data DI12B1 having the word transmission rate 74.25 MBps are formed based on the 10-bit word group 1 shown in FIG. 54 as a link B-1, as shown in FIG. 56A. Similarly, 20-bit word sequence data DI12B2 having the word transmission rate 74.25 MBps are formed based on the 10-bit word group 2 shown in FIG. 54 as a link B-2, as shown in FIG. 56B.

Namely, the 36-bit word sequence data DI12B having the word transmission rate 74.25 MBps are converted to a couple of 20-bit word sequence data which are the 20-bit word sequence data DI12B1 and DI12B2 each having the word transmission rate of 74.25 MBps.

Consequently, when the digital data DVX supplied to the data processing portion 111 are the digital data DI12 in the form of 36-bit word sequence, the digital data DI12 are converted to four 20-bit word sequence data which are the 20-bit word sequence data DI12A1, DI12A2 DI12B1 and DI12B2 each having the word transmission rate 74.25 MBps in the data processing portion 111.

When the digital data DVX are the digital data DJ12, 36-bit word sequence data having the word transmission rate of 148.5 MBps, in which G, B and R data sequences, each of which is 12-bit word sequence data having the word transmission rate of 148.5 MBps, are multiplexed in parallel with each other in frame and line synchronism as shown in FIG. 52, are also supplied to the data processing portion 111. In the data processing portion 111, the digital data DJ12 are converted to four 20-bit word sequence data which are the 20-bit word sequence data DJ12A1, DJ12A2, DJ12B1 and DJ12B2 each having the word transmission rate 74.25 MBps in the similar manner as the digital data DI12.

When the digital data DVX are the data DVD10+DKD10, 40-bit word sequence data having the word transmission rate of 148.5 MBps, in which G, data sequence, B data sequence, R data sequence and a key signal data sequence, each of which is 10-bit word sequence data having the word transmission rate of 148.5 MBps, are multiplexed in parallel with each other in frame and line synchronism as shown in FIG. 57, are supplied to the data processing portion 111.

In the data processing portion 111, the data DVD10+ DKD10 supplied in the form of 40-bit word sequence shown in FIG. 57 are subjected to the following data processing.

First, 10-bit words GD0, GD1, GD2, GD3, . . . constituting the G data sequence, 10-bit words BD0, BD1, BD2, BD3, . . . constituting the B data sequence, 10-bit words RD0, RD1, RD2, RD3, . . . constituting the R data sequence and 10-bit words AD0, AD1, AD2, AD3, . . . constituting the key signal data sequence are put in group 1 and group 2 alternately at every line portions. Then, 40-bit word sequence data DVD10A having the word transmission rate of 148.5 MBps/2=74.25 MBps are formed based on the 10-bit words which form every other line portions of the G, B and R data sequences and the key signal data sequence and belong to the group 1 as a link A, as shown in FIG. 58A and similarly 40-bit word sequence data DVD10B having the word transmission rate of 148.5 MBps/2=74.25 MBps are formed based on the 10-bit words which form another every other line portions of the G, B and R data sequences and the key signal data sequence and belong to the group 2 as a link B, as shown in FIG. 58B.

The 40-bit word sequence data DVD10A having the word transmission rate of 74.25 MBps which is shown in FIG. 58A are subjected to the following further data processing.

First, 10-bit words GD0, GD1, GD2, GD3, . . . constituting the G data sequence, 10-bit words BD0, BD1, BD2, BD3, constituting the B data sequence, 10-bit words RD0, RD1, RD2, RD3, . . . constituting the R data sequence and 10-bit words AD0, AD1, AD2, AD3, . . . constituting the key signal data sequence each shown in FIG. 58A are partitioned in such a manner as shown with bold lines on the table shown in FIG. 22 to be put in a couple of 10-bit word groups which are a 10-bit word group 1 in which the 10-bit words GD0, GD1, GD2, GD3, . . . constituting the G data sequence, the 10-bit words BD0, BD2, . . . constituting a part of the B data sequence and the 10-bit words RD0, RD2, . . . constituting a part of the R data sequence are included and a 10-bit word group 2 in which the 10-bit words AD0, AD1, AD2, AD3, . . . constituting the key signal data sequence, the 10-bit words BD1, BD3, . . . constituting another part of the B data sequence and the 10-bit words RD1, RD3, . . . constituting another part of the R data sequence are included.

Then, 20-bit word sequence data DVD10A1 having the word transmission rate of 74.25 MBps are formed based on the 10-bit word group 1 as shown in FIG. 22 as a link A-1, and 20-bit word sequence data DVD10A2 having the word transmission rate of 74.25 MBps are formed based on the 10-bit word group 2 as shown in FIG. 22 as a link A-2, as shown in FIG. 59.

Similarly, the 40-bit word sequence data DVD10B having the word transmission rate of 74.25 MBps which is shown in FIG. 58B are subjected to the following further data processing.

First, 10-bit words GD0, GD1, GD2, GD3, . . . constituting the G data sequence, 10-bit words BD0, BD1, BD2, BD3, . . . constituting the B data sequence, 10-bit words RD0, RD1, RD2, RD3, . . . constituting the R data sequence and 10-bit words AD0, AD1, AD2, AD3, . . . constituting the key signal data sequence each shown in FIG. 58B are partitioned in such a manner as shown with bold lines on the table shown in FIG. 22 to be put in a couple of 10-bit word groups which are a 10-bit word group 1 in which the 10-bit words GD0, GD1, GD2, GD3, . . . constituting the G data sequence, the 10-bit words BD0, BD2, . . . constituting a part of the B data sequence and the 10-bit words RD0, RD2, . . . constituting a part of the R data sequence are included and a 10-bit word group 2 in which the 10-bit words AD0, AD1, AD2, AD3, . . . constituting the key signal data sequence, the 10-bit words BD1, BD3, . . . constituting another part of the B data sequence and the 10-bit words RD1, RD3, . . . constituting another part of the R data sequence are included.

Then, 20-bit word sequence data DVD10B1 having the word transmission rate of 74.25 MBps are formed based on the 10-bit word group 1 as shown in FIG. 22 as a link B-1, and 20-bit word sequence data DVD10B2 having the word transmission rate of 74.25 MBps are formed based on the 10-bit word group 2 as shown in FIG. 22 as a link B-2, as shown in FIG. 60.

Namely, the data DVD10+DKD10 in the form of 40-bit word sequence having the word transmission rate of 148.5 MBps are converted to four 20-bit word sequence data which are the 20-bit word sequence data DVD10A1, DVD10A2, DVD10B1 and DVD10B2 each having the word transmission rate of 74.25 MBps.

From the data processing portion 111, one of data groups of the 20-bit word sequence data DD12A1, DD12A2, DD12B1 and DD12B2, the 20-bit word sequence data DE12A1, DE12A2, DE12B1 and DE12B2, the 20-bit word sequence data DD14A1, DD14A2, DD14B1 and DD14B2, the 20-bit word sequence data DE14A1, DE14A2, DD14B1 and DE14B2, the 20-bit word sequence data DD16A1, DD16A2, DD16B1 and DD16B2, the 20-bit word sequence data DE16A1, DE16A2, DD16B1 and DE16B2, the 20-bit word sequence data DI12A1, DI12A2, DI12B1 and DI12B2, the 20-bit word sequence data DJ12A1, DJ12A2, DJ12B1 and DJ12B2 and the 20-bit word sequence data DVD10A1, DVD10A2, DVD10B1 and DVD10B2 is derived as four 20-bit word sequence data DPA1(20), DPA2(20), DPB1(20) and DPB2(20).

The 20-bit word sequence data DPA1(20) having the word transmission rate of 74.25 MBps derived from the data processing portion 111 are supplied to a data inserting portion 112. In the data inserting portion 112, ancillary data DAA1 containing channel identification data as occasion demands are inserted into the 20-bit word sequence data DPA1 (20) to produce 20-bit word sequence data DPA1' (20). The 20-bit word sequence data DPA1' (20) obtained from the data inserting portion 112 are supplied to a P/S convertor 113.

In the P/S convertor 113, the 20-bit word sequence data DPA1' (20) are subjected to P/S conversion to produce serial data DSA1 having the bit transmission rate of 74.25 MBps× 20=1.485 Gbps. The serial data DSA1 are supplied to a bit multiplexing portion 114.

The 20-bit word sequence data DPA2(20) having the word transmission rate of 74.25 MBps derived from the data processing portion 111 are supplied to a data inserting portion 115. In the data inserting portion 115, ancillary data DAA2 containing channel identification data as occasion demands are inserted into the 20-bit word sequence data DPA2(20) to produce 20-bit word sequence data DPA2' (20). The 20-bit word sequence data DPA2' (20) obtained from the data inserting portion 115 are supplied to a P/S convertor 116. In the P/S convertor 116, the 20-bit word sequence data DPA2' (20) are subjected to P/S conversion to produce serial data DSA2 having the bit transmission rate of 74.25 MBps× 20=1.485 Gbps. The serial data DSA2 are supplied to the bit multiplexing portion 114.

In the bit multiplexing portion 114, each bit of the serial data DSA1 and each bit of the serial data DSA2 are alternately extracted to be arranged successively so that the serial data DSA1 and DSA2 are subjected to bit multiplexing to produce multiplexed serial data DSAZ having the bit transmission rate of 1.485 Gbps×2=2.97 Gbps.

The multiplexed serial data DSAZ obtained from the bit multiplexing portion 114 are supplied to an E/O convertor 117. The E/O convertor 117 is operative to cause the multiplexed serial data DSAZ to be subjected to E/O conversion to produce an optical signal OZA having, for example, the central wavelength of about 1.3 μm. The optical signal OZA is derived from the E/O convertor 117 to be transmitted at the bit transmission rate of 2.97 Gbps. The optical signal OZA derived from the E/O convertor 117 is guided to a wave multiplexing portion 118.

Further, the 20-bit word sequence data DPB1(20) having the word transmission rate of 74.25 MBps derived from the data processing portion 111 are supplied to a data inserting portion 119. In the data inserting portion 119, ancillary data DAB1 containing channel identification data as occasion demands are inserted into the 20-bit word sequence data DPB1(20) to produce 20-bit word sequence data DPB1' (20). The 20-bit word sequence data DPB1' (20) obtained from the data inserting portion 119 are supplied to a P/S convertor 120.

In the P/S convertor 120, the 20-bit word sequence data DPB1' (20) are subjected to P/S conversion to produce serial data DSB1 having the bit transmission rate of 74.25 MBps× 20=1.485 Gbps. The serial data DSB1 are supplied to a bit multiplexing portion 121.

The 20-bit word sequence data DPB2(20) having the word transmission rate of 74.25 MBps derived from the data processing portion 111 are supplied to a data inserting portion 122. In the data inserting portion 115, ancillary data DAB2 containing channel identification data as occasion demands are inserted into the 20-bit word sequence data DPB2(20) to produce 20-bit word sequence data DPB2' (20). The 20-bit word sequence data DPB2' (20) obtained from the data inserting portion 122 are supplied to a P/S convertor 123. In the P/S convertor 123, the 20-bit word sequence data DPB2' (20) are subjected to P/S conversion to produce serial data DSB2 having the bit transmission rate of 74.25 MBps×20=1.485 Gbps. The serial data DSB2 are supplied to the bit multiplexing portion 121.

In the bit multiplexing portion 121, each bit of the serial data DSB1 and each bit of the serial data DSB2 are alternately extracted to be arranged successively so that the serial data DSB1 and DSB2 are subjected to bit multiplexing to produce multiplexed serial data DSBZ having the bit transmission rate of 1.485 Gbps×2=2.97 Gbps.

The multiplexed serial data DSBZ obtained from the bit multiplexing portion 121 are supplied to an E/O convertor 124. The E/O convertor 124 is operative to cause the multiplexed serial data DSBZ to be subjected to E/O conversion to produce an optical signal OZB having, for example, the central wavelength of about 1.55 μm. The optical signal OZB is derived from the E/O convertor 124 to be transmitted at the bit transmission rate of 2.97 Gbps. The optical signal OZB derived from the E/O convertor 124 is guided to the wave multiplexing portion 118.

The wave multiplexing portion 118 is constituted with, for example, a WDM using optical fiber. In the wave multiplexing portion 118, the optical signal OZA having the central wavelength of about 1.3 μm and the optical signal OZB having the central wavelength of about 1.55 μm are multiplexed with each other to produce a multiplexed optical signal OZAB. The multiplexed optical signal OZAB is derived from the wave multiplexing portion 118 as a transmission signal. A portion including the bit multiplexing portions 114 and 121, the E/O convertors 117 and 124 and the wave multiplexing portion 118 constitutes a data transmitting portion for transmitting the serial data DSA1, DSA2, DSB1 and DSB2 obtained from the P/S convertors 113, 116, 120 and 123, respectively.

The multiplexed optical signal OZAB which is the transmission signal derived from the wave multiplexing portion 118 is guided through an optical connector 125 to an optical fiber data transmission line 126 to be transmitted thereby to a receiving side. The optical fiber data transmission line 126 is made of, for example, fused quartz SMF.

In the receiving side shown in FIG. 39, the multiplexed optical signal OZAB transmitted through the optical fiber data transmission line 1266 is guided through an optical connector 128 to a wave dividing portion 128. The wave dividing portion 128 is constituted with, for example, a WDD using optical fiber functioning as wave dividing means. In the wave dividing portion 128, the multiplexed optical signal OZAB is divided into a first optical element having the center wavelength of about 1.3 μm and a second optical element having the center wavelength of about 1.55 μm to reproduce the optical signal OZA which has the center wavelength of about 1.3 μm and the bit transmission rate of 1.485 Gbps and the optical signal OZB which has the center wavelength of about 1.55 μm and the bit transmission rate of 1.485 Gbps based on the first and second optical elements, respectively. The optical signals OZA and OZB obtained from the wave dividing portion 128 are guided to O/E convertors 129 and 130, respectively.

The O/E convertor 129 is operative to cause the optical signal OZA having the central wavelength of about 1.3 μm to be subjected to O/E conversion to reproduce the multiplexed serial data DSAZ having the bit transmission rate of 2.97 Gbps. The multiplexed serial data DSAZ thus reproduced are supplied to a bit dividing portion 131.

The O/E convertor 130 is operative to cause the optical signal OZB having the central wavelength of about 1.55 μm to be subjected to O/E conversion to reproduce the multiplexed serial data DSBZ having the bit transmission rate of 2.97 Gbps. The multiplexed serial data DSBZ thus reproduced are supplied to a bit dividing portion 132.

In the bit dividing portion 131, each bit of the multiplexed serial data DSAZ is extracted successively and separated to form a couple of bit groups, one of which includes every other bits and the other of which includes another every other bits so that the multiplexed serial data DSAZ is subjected to bit dividing. Thereby, the serial data DSA1 having the bit transmission rate of 2.97 Gbps/2=1.485 Gbps and the serial data DSA2 having the bit transmission rate of 2.97 Gbps/2=1.485 Gbps which form two channel data are reproduced. The serial data DSA1 are supplied to an S/P convertor 133 and the serial data DSA2 are supplied to an S/P convertor 134.

The S/P convertor 133 is operative to cause the serial data DSA1 to be subjected to S/P conversion to reproduce the 20-bit word sequence data DPA1' (20) to be supplied to a data separating portion 135. In the data separating portion 135, the ancillary data DAA1 containing the channel identification data are separated from the 20-bit word sequence data DPA1' (20) so that the 20-bit word sequence data DPA1 (20) and the ancillary data DAA1 are separately obtained. The 20-bit word sequence data DPA1 (20) are supplied to a data time difference absorbing portion 136.

The S/P convertor 134 is operative to cause the serial data DSA2 to be subjected to S/P conversion to reproduce the 20-bit word sequence data DPA2' (20) to be supplied to a data separating portion 137. In the data separating portion 137, the ancillary data DAA2 containing the channel identification data are separated from the 20-bit word sequence data DPA2' (20) so that the 20-bit word sequence data DPA2 (20) and the ancillary data DAA2 are separately obtained. The 20-bit word sequence data DPA2 (20) are supplied to the data time difference absorbing portion 136.

Further, in the bit dividing portion 132, each bit of the multiplexed serial data DSBZ is extracted successively and separated to form a couple of bit groups, one of which includes every other bits and the other of which includes another every other bits so that the multiplexed serial data DSBZ is subjected to bit dividing. Thereby, the serial data DSB1 having the bit transmission rate of 2.97 Gbps/2=1.485 Gbps and the serial data DSB2 having the bit transmission rate of 2.97 Gbps/2=1.485 Gbps which form two channel data are reproduced. The serial data DSB1 are supplied to an S/P convertor 139 and the serial data DSB2 are supplied to an S/P convertor 140.

The S/P convertor 139 is operative to cause the serial data DSB1 to be subjected to S/P conversion to reproduce the 20-bit word sequence data DPB1' (20) to be supplied to a data separating portion 141. In the data separating portion 141, the ancillary data DAB1 containing the channel identification data are separated from the 20-bit word sequence data DPB1' (20) so that the 20-bit word sequence data DPB1 (20) and the ancillary data DAB1 are separately obtained. The 20-bit word sequence data DPB1 (20) are supplied to the data time difference absorbing portion 136.

The S/P convertor 140 is operative to cause the serial data DSB2 to be subjected to S/P conversion to reproduce the 20-bit word sequence data DPB2' (20) to be supplied to a data separating portion 142. In the data separating portion 142, the ancillary data DAB2 containing the channel identification data are separated from the 20-bit word sequence data DPB2' (20) so that the 20-bit word sequence data DPB2 (20) and the ancillary data DAB2 are separately obtained. The 20-bit word sequence data DPB2 (20) are supplied to the data time difference absorbing portion 136.

In the data time difference absorbing portion 136, time difference among the 20-bit word sequence data DPA1(20) from the data separating portion 135, the 20-bit word sequence data DPA2(20) from the data separating portion 137, time difference among the 20-bit word sequence data DPB1(20) from the data separating portion 141 and the 20-bit word sequence data DPB2(20) from the data separating portion 142 is absorbed to produce 20-bit word sequence data DQA1(20) which are obtained based on the 20-bit word sequence data DPA1(20) to be transmitted at the word transmission rate of 74.25 MBps, to produce 20-bit word sequence data DQA2(20) which are obtained based on the 20-bit word sequence data DPA2(20) to be transmitted at the word transmission rate of 74.25 MBps, to produce 20-bit word sequence data DQB1(20) which are obtained based on the 20-bit word sequence data DPB1(20) to be transmitted at the word transmission rate of 74.25 MBps, and to produce 20-bit word sequence data DQB2(20) which are obtained based on the 20-bit word sequence data DPB2(20) to be transmitted at the word transmission rate of 74.25 MBps to be transmitted at the word transmission rate of 74.25 MBps in such a manner that time difference among the 20-bit word sequence data DQAI(20), DQA2(20), DQB1(20) and DQB2 (20) is substantially zero.

The 20-bit word sequence data DQA1(20), DQA2(20), DQB1(20) and DQB2(20) obtained from the data time difference absorbing portion 136 are supplied to a data reproducing portion 138.

In the data reproducing portion 138, the 20-bit word sequence data DQA1(20), DQA2(20), DQB1(20) and DQB2(20) are subjected to data reproduction processing, which is proceeded inversely to the data processing to which the word sequence data constituting the digital data DVX are subjected in the data processing portion 111, to reproduce the digital data DVX formed based on the 20-bit word sequence data DQA1(20), DQA2(20), DQB1(20) and DQB2(20).

The digital data DVX thus reproduced are one of the digital data DD12, DE12, DD14, DE14, DD16, DE16, D112 and DJ12 or the data DVD10+DKD10.

Incidentally, in the transmitting side shown in FIG. 38, it is possible to make such an arrangement that the optical signals OZA and OZB obtained from the E/O convertors 117 and 124 are transmitted independently through a couple of optical fiber data transmission lines, respectively, without using the wave multiplexing portion 118. In this case, the E/O convertors 117 and 124 can be provided to cause the optical signals OZA and OZB to have substantially the same central wavelength, for example, the central wavelength of 1.3 Am.

Further, in the transmitting side shown in FIG. 38, it is also possible to make such an arrangement that four O/E convertors are provided for converting the serial data DSA1, DSA2, DSB1 and DSB2 obtained from the P/S convertors 113, 116, 120 and 120 into four optical signals and the optical signals thus obtained are transmitted independently through four optical fiber data transmission lines, respectively, without using the bit multiplexing portions 114 and 121, the E/O convertors 117 and 124 and the wave multiplexing portion 118.

Figure 61:
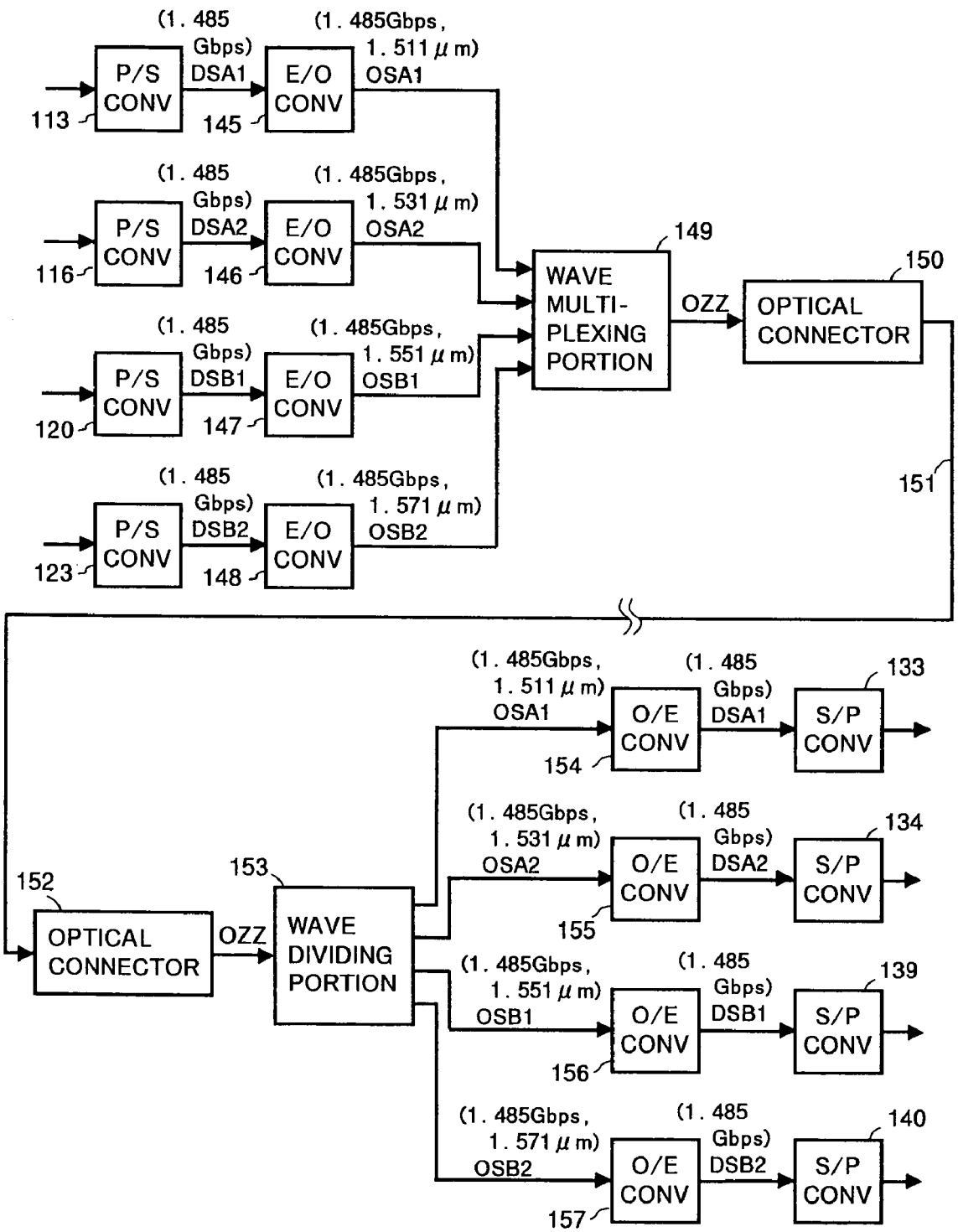
FIG. 61 is a schematic block diagram showing a part of an example of a data transmitting and receiving apparatus including another embodiment of apparatus for transmitting digital data according to one of the twenty-sixth, twenty-seventh and thirty-sixth aspects of the present invention, in which an embodiment of method of transmitting digital data according to one of the sixth, seventh and sixteenth aspects of the present invention is carried out.

FIG. 61 shows a part of an example of a data transmitting and receiving apparatus which includes a second embodiment of apparatus for transmitting digital data according to one of the twenty-sixth, twenty-seventh and thirty-sixth aspects of the present invention, in which an embodiment of method of transmitting digital data according to one of the sixth, seventh and sixteenth aspects of the present invention is carried out.

The example of the data transmitting and receiving apparatus, a part of which is shown in FIG. 61, has a number of blocks constituted in the same manner as those in the example of FIGS. 38 and 39 and blocks which are constituted to be different from those in the example of FIGS. 38 and 39 are shown in FIG. 61.

Referring to FIG. 61, E/O convertors 145, 146, 147 and 148 and O/E convertors 154, 155, 156 and 157 are provided in place of the bit multiplexing portions 114 and 121, the E/O convertors 117 and 124, the O/E convertor 129 and 130 and the bit dividing portions 131 and 132 employed in the example of FIGS. 38 and 39. A wave multiplexing portion 149 and a wave dividing portion 153 are provided in place of the wave multiplexing portion 118 and the wave dividing portion 149 employed in the example of FIGS. 38 and 39. Further, an optical connector 150, an optical fiber data transmission line 151 and an optical connector 152 are provided in place of the optical connector 125, the optical fiber data transmission line 126 and the optical connector 127 employed in the example of FIGS. 38 and 39.

In the example, a part of which is shown in FIG. 61, serial data DSA1 having the bit transmission rate of 1.485 Gbps obtained from a P/S convertor 113 is supplied to the E/O convertor 145, serial data DSA2 having the bit transmission rate of 1.485 Gbps obtained from a P/S convertor 116 is supplied to the E/O convertor 146, serial data DSB1 having the bit transmission rate of 1.485 Gbps obtained from a P/S convertor 120 is supplied to the E/O convertor 147 and serial data DSB2 having the bit transmission rate of 1.485 Gbps obtained from a P/S convertor 123 is supplied to the E/O convertor 148.

The E/O convertor 145 is operative to cause the serial data DSA1 to be E/O conversion to produce an optical signal OSA1 having, for example, a central wavelength of about 1.511 µm and the bit transmission rate of 1.485 Gbps. The optical signal OSA1 is guided to the wave multiplexing portion 149. The E/O convertor 146 is operative to cause the serial data DSA2 to be E/O conversion to produce an optical signal OSA2 having, for example, a central wavelength of about 1.531/m and the bit transmission rate of 1.485 Gbps. The optical signal OSA2 is guided to the wave multiplexing portion 149. The E/O convertor 147 is operative to cause the serial data DSB1 to be E/O conversion to produce an optical signal OSB1 having, for example, a central wavelength of about 1.551 µm and the bit transmission rate of 1.485 Gbps. The optical signal OSB1 is guided to the wave multiplexing portion 149. The E/O convertor 148 is operative to cause the serial data DSB2 to be E/O conversion to produce an optical signal OSB2 having, for example, a central wavelength of about 1.571 µm and the bit transmission rate of 1.485 Gbps. The optical signal OSB2 is guided to the wave multiplexing portion 149.

In the wave multiplexing portion 149, the optical signal OSA1 having the central wavelength of about 1.511 µm, the optical signal OSA2 having the central wavelength of about 1.531 µm, the optical signal OSB1 having the central wavelength of about 1.551 µm and the optical signal OSB2 having the central wavelength of about 1.571 µm are multiplexed with one another to produce a multiplexed optical signal OZZ. The multiplexed optical signal OZZ is derived from the wave multiplexing portion 149 as a transmission signal. A portion including the E/O convertors 145 to 148 and the wave multiplexing portion 149 constitutes a data transmitting portion for transmitting the serial data DSA1, DSA2, DSB1 and DSB2 obtained from the P/S convertors 113, 116, 120 and 123, respectively.

The optical signals OSA1, OSA2, OSB1 and OSB2 which are multiplexed with one another in the wave multiplexing portion 149 have the respective central wavelengths so close to one another as to be different only by about 0.02 µm (20 nm) for producing the multiplexed optical signal OZZ. Therefore, the wave multiplexing technology called the Coarse Wavelength Division Multiplexing (CWDM) is applied to a portion including the E/O convertors 145 to 148 and the wave multiplexing portion 149.

The multiplexed optical signal OZZ which is the transmission signal derived from the wave multiplexing portion 149 is guided through the optical connector 150 to the optical fiber data transmission line 151 to be transmitted thereby to a receiving side.

In the receiving side, the multiplexed optical signal OZZ transmitted through the optical fiber data transmission line 151 is guided through the optical connector 152 to the wave dividing portion 153. In the wave dividing portion 153, the multiplexed optical signal OZZ is divided into a first optical element having the center wavelength of about 1.511 µm, a second optical element having the center wavelength of about 1.531 µm, a third optical element having the center wavelength of about 1.551 µm and a fourth optical element having the center wavelength of about 1.571 µm to reproduce the optical signal OSA1 which has the center wavelength of about 1.531 µm and the bit transmission rate of 1.485 Gbps, the optical signal OSA2 which has the center wavelength of about 1.531 µm and the bit transmission rate of 1.485 Gbps, the optical signal OSB1 which has the center wavelength of about 1.551 µm and the bit transmission rate of 1.485 Gbps and the optical signal OSB2 which has the center wavelength of about 1.571 µm and the bit transmission rate of 1.485 Gbps based on the first, second, third and fourth optical elements, respectively.

The optical signals OSA1, OSA2, OSB1 and OSB2 reproduced by the wave dividing portion 153 are guided the O/E convertors 154, 155, 156 and 157, respectively. The O/E convertor 154 is operative to cause the optical signal OSA1 having the center wavelength of about 1.511 µm and the bit transmission rate of 1,485 Gbps to be subjected to O/E conversion to reproduce the serial data DSA1 having bit transmission rate of 1,485 Gbps. The serial data DSA1 thus reproduced are supplied to a S/P convertor 133. The O/E convertor 155 is operative to cause the optical signal OSA2 having the center wavelength of about 1.531 µm and the bit transmission rate of 1,485 Gbps to be subjected to O/E conversion to reproduce the serial data DSA2 having bit transmission rate of 1,485 Gbps. The serial data DSA2 thus reproduced are supplied to a S/P convertor 134. The O/E convertor 156 is operative to cause the optical signal OSB1 having the center wavelength of about 1.551 µm and the bit transmission rate of 1,485 Gbps to be subjected to O/E conversion to reproduce the serial data DSB1 having bit transmission rate of 1,485 Gbps. The serial data DSB1 thus reproduced are supplied to an S/P convertor 139. The O/E convertor 156 is operative to cause the optical signal OSA2 having the center wavelength of about 1.571 µm and the bit transmission rate of 1,485 Gbps to be subjected to O/E conversion to reproduce the serial data DSB2 having bit transmission rate of 1,485 Gbps. The serial data DSB2 thus reproduced are supplied to an S/P convertor 140.

Other operations of the example, a part of which is shown in FIG. 61, are similar to those of the example of FIGS. 38 and 39.

Figure 62:
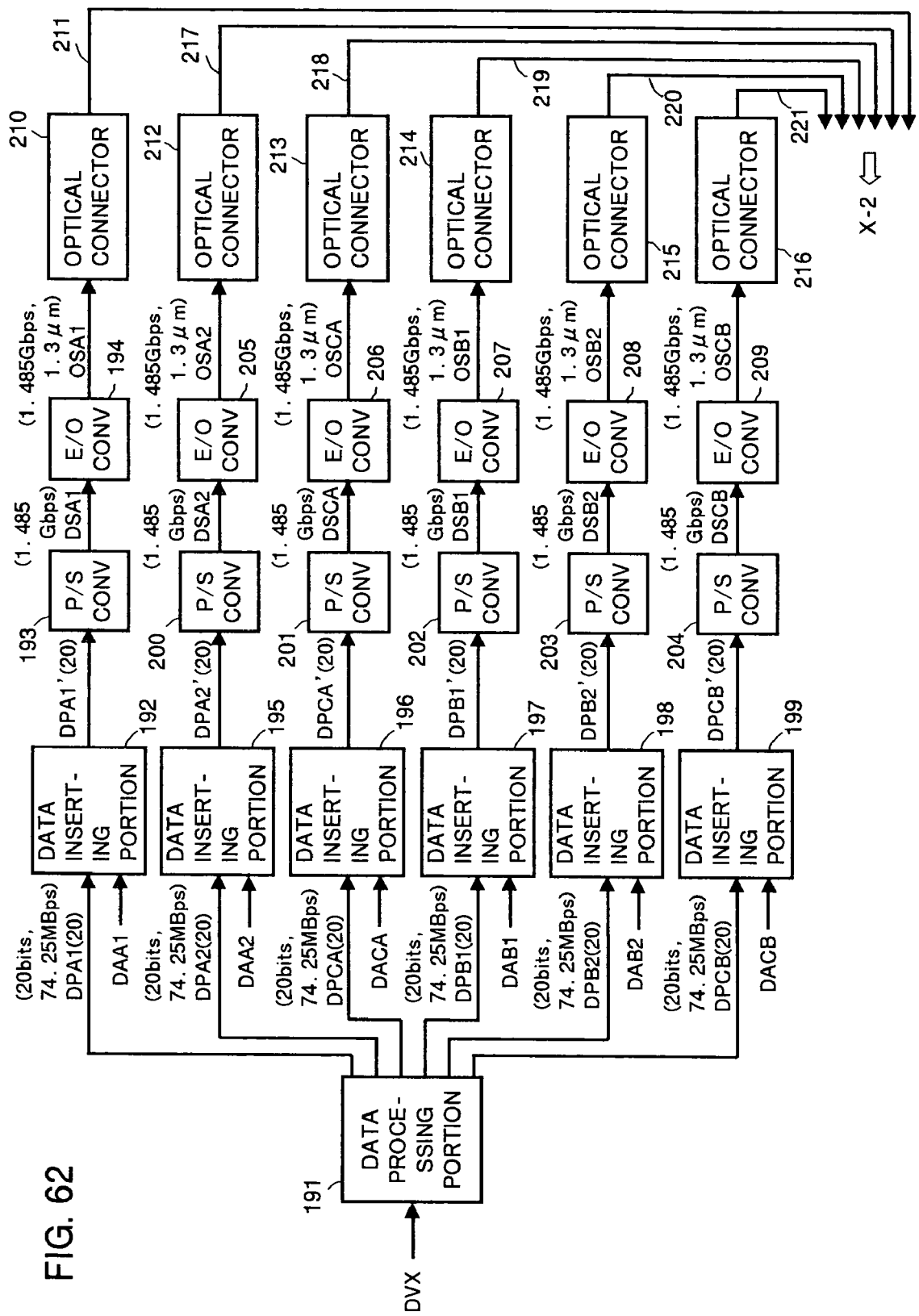
FIGS. 62 and 63 are schematic block diagrams showing an example of a data transmitting and receiving apparatus including an embodiment of apparatus for transmitting digital data according to the thirty-seventh or thirty-eighth aspects of the present invention, in which an embodiment of method of transmitting digital data according to the seventeenth or eighteenth aspects of the present invention is carried out.
Figure 63:
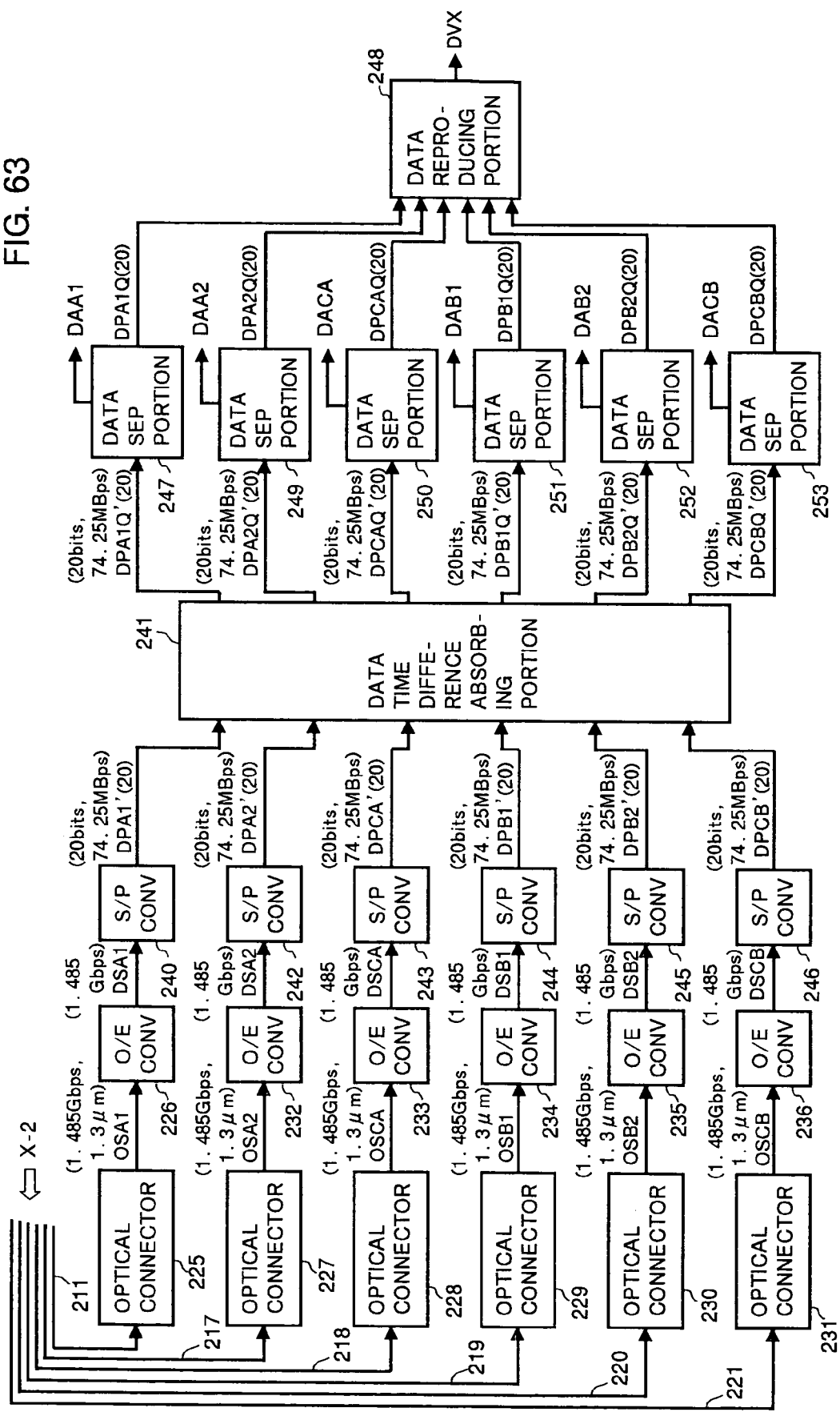

FIGS. 62 and 63 show an example of a data transmitting and receiving apparatus which includes a first embodiment of apparatus for transmitting digital data according to one of the thirty-seventh or thirty-eighth aspects of the present invention, in which an embodiment of method of transmitting digital data according to one of the seventeenth or eighteenth aspects of the present invention is carried out.

Referring to FIGS. 62 and 63, in a transmitting side which constitutes the embodiment of apparatus for transmitting digital data according to the present invention, the digital data DVX are supplied to a data processing portion 191.

The digital data DVX are one of data DVC12+DKC12 composed of the digital data DD12 or DE12 and a key signal data sequence DKC12 of 12-bit word sequence data annexed to the digital data DD12 or DE12; data DVC14+DKC14 composed of the digital data DD14 or DE14 and a key signal data sequence DKC14 of 14-bit word sequence data annexed to the digital data DD14 or DE14; data DVC16+DKC16 composed of the digital data DD16 or DE16 and a key signal data sequence DKC16 of 16-bit word sequence data annexed to the digital data DD16 or DE16; and data DVD12+DKD12 composed of the digital data DI12 or DJ12 and a key signal data sequence DKD12 of 0.12-bit word sequence data annexed to the digital data DI12 or DJ12.

Each of the key signal data sequences DKC12, DKC14 and DKC16 is formed with a data format similar to the data format of the Y data format to be an additional information data sequence accompanying the Y and $P_B/P_R$ data sequences. The key signal data sequences DKD12 is formed with a data format similar to the data format of the G data format to be an additional information data sequence accompanying the G, B and R data sequences.

When the digital data DVX are the data DVC12+DKC12, 36-bit parallel data having the word transmission rate of 148.5 MBps, in which the Y data sequence, the $P_B/P_R$ data sequence and the key signal data sequence, each of which is formed to be 12-bit word sequence data having the word transmission rate of 148.5 MBps, are multiplexed in parallel with each other in frame and line synchronism as shown in FIG. 64, are supplied to the data processing portion 191.

In the data processing portion 191, the data DVC12+DKC12 supplied in the form of 36-bit parallel data shown in FIG. 64 are subjected to the following data processing.

First, 12-bit words YD0, YD1, YD2, YD3, . . . constituting the Y data sequence, 12-bit words PbD0, PrD0, PbD1, PrD1, PbD2, PrD2, . . . constituting the $P_B/P_R$ data sequence and 12-bit words AD0, AD1, AD2, AD3, . . . constituting the key signal data sequence are put in group 1 and group 2 alternately at every line portions. Then, 36-bit word sequence data DVC12A having the word transmission rate of 148.5 MBps/2=74.25 MBps are formed based on the 12-bit words forming every other line portions of the Y, $P_B/P_R$ and key signal data sequences and belonging to the group 1 as a link A, as shown in FIG. 65A and similarly 36-bit word sequence data DVC12B having the word transmission rate of 148.5 MBps/2=74.25 MBps are formed based on the 12-bit words forming another every other line portions of the Y, $P_B/P_R$ and key signal data sequences and belonging to the group 2 as a link B, as shown in FIG. 65B.

The 36-bit word sequence data DVC12A having the word transmission rate of 74.25 MBps which is shown in FIG. 65A are subjected to the following further data processing.

Each of 12-bit words (YD0, YD1, YD2, YD3, . . . ) constituting the Y data sequence, 12-bit words (PbD0, PrD0, PbD1, PrD1, PbD2, PrD2, . . . ) constituting the $P_B/P_R$ data sequence and 12-bit words (AD0, AD1, AD2, AD3, . . . ) constituting the key signal data sequence is divided into an upper 10-bit portion (Y0;2-11, Y1;2-11, Y2;2-11, Y3; 2-11., . . . , Pb0;2-11, Pr0;2-11, Pb1;2-11, Pr1;2-11, Pb2;2-11, Pr2;2-11, . . . , A0;2-11, A1;2-11, A2;2-11, A3; 2-11, . . . ) and a lower 2-bit portion (Y0;0-1, Y1;0-1, Y2;0-1, Y3;0-1, . . . , Pb0;0-1, Pr0;0-1, Pb1;0-1, Pr1;0-1, Pb2;0-1, Pr2;01, . . . , A0;0-1, A1;0-1, A2;0-1, A3;0-1, . . . ).

The upper 10-bit portions Y0;2-11, Y1;2-11, Y2;2-11, Y3;2-11, . . . and the upper 10-bit portions Pb0;2-11, Pr0;2-11, Pb1;2-11, Pr1;2-11, Pb2;2-11, Pr2;2-11, . . . are multiplexed in parallel with each other to produce 20-bit word sequence data DVC12A1 having the word transmission rate of 74.25 MBps as a link A-1, as shown in FIG. 66.

Ancillary 8-bit word c0, c1, c2, c3, . . . are added to the lower 2-bit portions Y0;0-1, Y1;0-1, Y2;0-1, Y3;0-1, . . . , respectively, to produce 10-bit word data [Y0;0-1]+c0, [Y1; 0-1]+c1, [Y2;0-1]+c2, [Y3;0-1]+c3, . . . . Similarly, ancillary 8-bit word d0, d1, d2, d3, d4, d5, . . . are added to the lower 2-bit portions Pb0;0-1, Pr0;0-1, Pb1;0-1, Pr1;0-1, Pb2;0-1, Pr2;0-1, . . . , respectively, to produce 10-bit word data [Pb0;0-1]+d0, [Pr0;0-1]+d1, [Pb1;0-1]+d2, [Pr1;0-11]+d3, [Pb2;0-1]+d4, [Pr2;0-1]+d5, . . . .

Then, the 10-bit word data [Y0;0-1]+c0, [Y1;0-1]+c1, [Y2;0-1]+c2, [Y3;0-1]+c3, . . . and the 10-bit word data [Pb0;0-1]+d0, [Pr0;0-1]+d1, [Pb1;0-1]+d2, [Pr1;0-1]+d3, [Pb2;0-1]+d4, [Pr2;0-1]+d5, . . . are multiplexed in parallel with each other to produce 20-bit word sequence data DVC12A2 having the word transmission rate of 74.25 MBps as a link A-2, as shown in FIG. 66.

Further, ancillary 8-bit word e0, e1, e2, e3, . . . are added to the lower 2-bit portions A0;0-1, A1;0-1, A2;0-1, A3; 0-1, . . . , respectively, to produce 10-bit word data [A0;0-1]+e0, [A1;0-1]+e1, [A2;0-1]+e2, [A3;0-1]+e3, . . . . The upper 10-bit portions A0;2-11, A1;2-11, A2;2-11, A3;2-11, . . . and the 10-bit word data [A0;0-1]+e0, [A1;0-1]+e1, [A2;0-1]+e2, [A3;0-1]+e3, . . . are multiplexed in parallel with each other to produce 20-bit word sequence data DVC12CA having the word transmission rate of 74.25 MBps as a link C-1, as shown in FIG. 66.

Namely, the data DVC12A in the form of 36-bit word sequence having the word transmission rate of 74.25 MBps are converted to three 20-bit word sequence data which are the 20-bit word sequence data DVC12A12A1, DVC12A2 and DVC12CA each having the word transmission rate of 74.25 MBps.

The 36-bit word sequence data DVC12B having the word transmission rate of 74.25 MBps which is shown in FIG. 65B are also subjected to the following further data processing.

Each of 12-bit words (YD0, YD1, YD2, YD3, . . . ) constituting the Y data sequence, 12-bit words (PbD0, PrD0, PbD1, PrD1, PbD2, PrD2, . . . ) constituting the $P_B/P_R$ data sequence and 12-bit words (AD0, AD1, AD2, AD3, . . . ) constituting the key signal data sequence is divided into an upper 10-bit portion (Y0;2-11, Y1;2-11, Y2;2-11, Y3; 2-11, . . . , Pb0;2-11, Pr0;2-11, Pb1;2-11, Pr1;2-11, Pb2;2-11, Pr2;2-11, . . . , A0;2-11, A1;2-11, A2;2-11, A3;2-11, . . . ) and a lower 2-bit portion (Y0;0-1, Y1;0-1, Y2;0-1, Y3; 0-1, . . . , Pb0;0-1, Pr0;0-1, Pb1;0-1, Pr1;0-1, Pb2;0-1, Pr2;0-1, . . . , A0;0-1, A1;0-1, A2;0-1, A3;0-1, . . . ).

The upper 10-bit portions Y0;2-11, Y1;2-11, Y2;2-11, Y3;2-11, . . . and the upper 10-bit portions Pb0;2-11, Pr0;2-11, Pb1;2-11, Pr1;2-11, Pb2;2-11, Pr2;2-11, . . . are multiplexed in parallel with each other to produce 20-bit word sequence data DVC12B1 having the word transmission rate of 74.25 MBps as a link B-1, as shown in FIG. 67.

Ancillary 8-bit word c0, c1, c2, c3, . . . are added to the lower 2-bit portions Y0;0-1, Y1;0-1, Y2;0-1, Y3;0-1, respectively, to produce 10-bit word data [Y0;0-1]+c0, [Y1;0-1]+c1, [Y2;0-1]+c2, [Y3;0-1]+c3, . . . . Similarly, ancillary 8-bit word d0, d1, d2, d3, d4, d5, . . . are added to the lower 2-bit portions Pb0;0-1, Pr0;0-1, Pb1;0-1, Pr1;0-1, Pb2;0-1, Pr2; 0-1, . . . , respectively, to produce 10-bit word data [Pb0;0-1]+d0, [Pr0;0-1]+d1, [Pb1;0-1]+d2, [Pr1;0-1]+d3, [Pb2;0-1]+d4, [Pr2;0-1]+d5, . . . .

Then, the 10-bit word data [Y0;0-1]+c0, [Y1;0-1]+c1, [Y2;0-1]+c2, [Y3;0-1]+c3, . . . and the 10-bit word data [Pb0;0-1]+d0, [Pr0;0-1]+d1, [Pb1;0-1]+d2, [Pr1;0-1]+d3, [Pb2;0-1]+d4, [Pr2;0-1]+d5, . . . are multiplexed in parallel with each other to produce 20-bit word sequence data DVC12B2 having the word transmission rate of 74.25 MBps as a link B-2, as shown in FIG. 67.

Further, ancillary 8-bit word e0, e1, e2, e3, . . . are added to the lower 2-bit portions A0;0-1, A1;0-1, A2;0-1, A3; 0-1, . . . , respectively, to produce 10-bit word data [A0;0-1]+e0, [A1;0-1]+e1, [A2;0-1]+e2, [A3;0-1]+e3, . . . . The upper 10-bit portions A0;2-11, A1;2-11, A2;2-11, A3; 2-11, . . . and the 10-bit word data [A0;0-1]+e0, [A1;0-1]+e1, [A2;0-1]+e2, [A3;0-1]+e3, . . . are multiplexed in parallel with each other to produce 20-bit word sequence data DVC12CB having the word transmission rate of 74.25 MBps as a link C-2, as shown in FIG. 67.

Namely, the data DVC12B in the form of 36-bit word sequence having the word transmission rate of 74.25 MBps are converted to three 20-bit word sequence data which are the 20-bit word sequence data DVC12B1, DVC12B2 and DVC12CB each having the word transmission rate of 74.25 MBps.

Consequently, when the digital data DVX supplied to the data processing portion 191 are the data DVC12+DKC12 in the form of 36-bit word sequence shown in FIG. 64, the data DVC12+DKC12 are converted to six 20-bit word sequence data which are the 20-bit word sequence data DVC12A1, DVC12A2, DVC12CA, DVC12B1, DVC12B2 and DVC12CB each having the word transmission rate of 74.25 MBps in the data processing portion 191.

When the digital data DVX are the data DVC14+DKC14 or DCV16+DKC16, 42-bit or 48-bit parallel data having the word transmission rate of 148.5 MBps, in which the Y data sequence, the $P_B/P_R$ data sequence and the key signal data sequence, each of which is formed to be 14-bit or 16-bir word sequence data having the word transmission rate of 148.5 MBps, are multiplexed in parallel with each other in frame and line synchronism, are supplied to the data processing portion 191.

In the data processing portion 191, the data DVC14+DKC14 or DVC16+DKC16 are subjected to data processing in the similar manner as the data DVC12+DKC12 except that each of 14-bit or 16-bit words constituting the Y data sequence, the $P_B/P_R$ data sequence and the key signal data sequence is divided into an upper 10-bit portion and a lower 4-bit or 6-bit portion.

The data DVC14+DKC14 or DVC16+DKC16 forming the 42-bit or 48-bit parallel data having the word transmission rate of 148.5 MBps are converted to six 20-bit word sequence data which are 20-bit word sequence data DVC14A1, DVC14A2, DVC14CA, DVC14B1, DVC14B2 and DVC14CB each having the word transmission rate of 74.25 MBps or 20-bit word sequence data DVC16A1, DVC16A2, DVC16CA, DVC16B1, DVC16B2 and DVC16CB each having the word transmission rate of 74.25 MBps.

Figure 68:
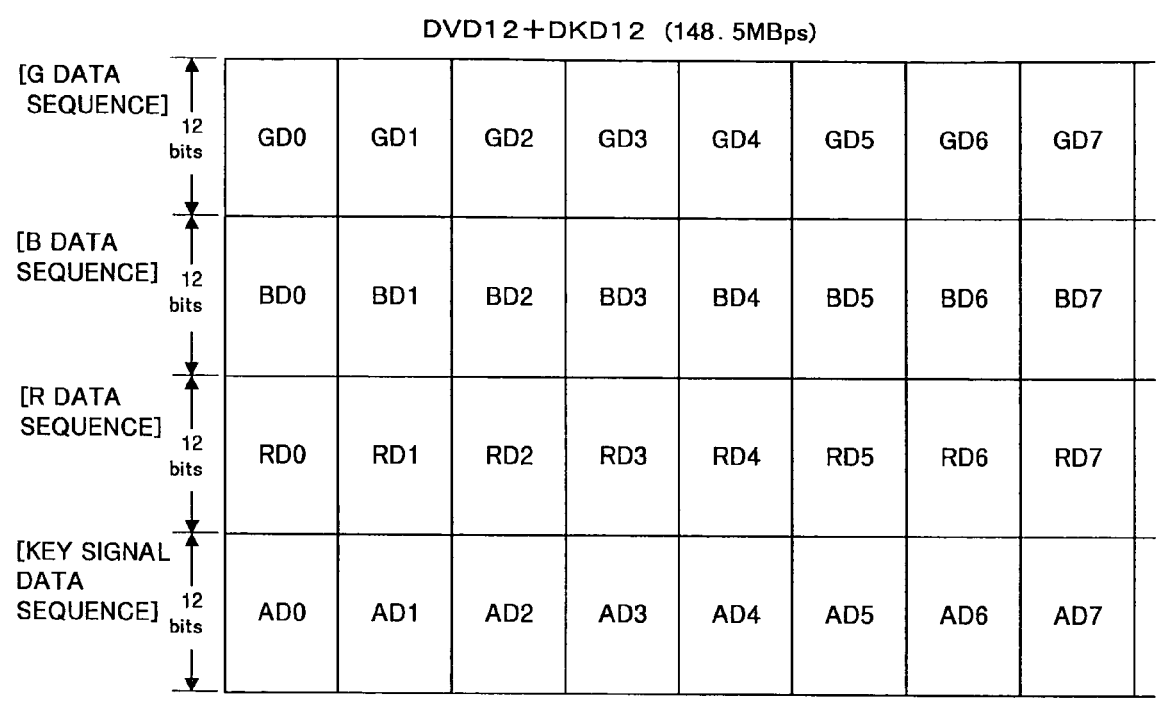

When the digital data DVX are the data DVD12+DKD12, 48-bit parallel data having the word transmission rate of 148.5 MBps, in which the G data sequence, the B data sequence, the R data sequence and the key signal data sequence, each of which is formed to be 12-bit word sequence data having the word transmission rate of 148.5 MBps, are multiplexed in parallel with one another in frame and line synchronism as shown in FIG. 68, are supplied to the data processing portion 191.

In the data processing portion 191, the data DVD12+DKD12 supplied in the form of 48 bit parallel data shown in FIG. 68 are subjected to the following data processing.

First, 12-bit words GD0, GD1, GD2, GD3, . . . constituting the G data sequence, 12-bit words BD0, BD1, BD2, BD3, constituting the B data sequence, 12-bit words RD0, RD1, RD2, RD3, . . . constituting the R data sequence and 12-bit words AD0, AD1, AD2, AD3, . . . constituting the key signal data sequence are put in group 1 and group 2 alternately at every line portions. Then, 48-bit word sequence data DVD12A having the word transmission rate of 148.5 MBps/2=74.25 MBps are formed based on the 12-bit words forming every other line portions of the G, B, R and key signal data sequences and belonging to the group 1 as a link A, as shown in FIG. 69A and similarly 36-bit word sequence data DVD12B having the word transmission rate of 148.5 MBps/2=74.25 MBps are formed based on the 12-bit words forming another every other line portions of the G, B, R and key signal data sequences and belonging to the group 2 as a link B, as shown in FIG. 69B.

The 48-bit word sequence data DVD12A having the word transmission rate of 74.25 MBps which is shown in FIG. 69A are subjected to the following further data processing.

Each of 12-bit words (GD0, GD1, GD2, GD3, . . . ) constituting the G data sequence, 12-bit words (B0, BD1, BD2, BD3, . . . ) constituting the B data sequence, 12-bit words (R0, RD1, RD2, RD3, . . . ) constituting the R data sequence and 12-bit words (AD0, AD1, AD2, AD3, . . . ) constituting the key signal data sequence is divided into an upper 10-bit portion (Y0;2-11, Y1;2-11, Y2;2-11, Y3; 2-11, . . . , B0;2-11, B1;2-11, B2;2-11, B3;2-11, . . . , R0;2-11, R1;2-11, R2;2-11, R3;2-11, . . . and A0;2-11, A1;2-11, A2;2-11, A3;2-11, . . . ) and a lower 2-bit portion (Y0;0-1, Y1;0-1, Y2;0-1, Y3;0-1, . . . , B0;0-1, B1;0-1, B2;0-1, B3;0-1, . . . , R0;0-1, R1;0-1, R2;0-1, R3;0-1, . . . and A0;0-1, A1;0-1, A2;0-1, A3;0-1, . . . ).

The lower 2-bit portion G0;0~1, B0;0-1, R0;0-1 and ancillary 4-bit word f0 are bit-multiplexed with one another to produce 10-bit word [0BR0;0-1]+f0, the lower 2-bit portion G1;0-1, B1;0-1, R1;0~L and ancillary 4-bit word f1 are bit-multiplexed with one another to produce 10-bit word [GBR1;0-1]+f1, the lower 2-bit portion G2;0-1, B2;0-1, R2;0-1 and ancillary 4-bit word f2 are bit-multiplexed with one another to produce 10-bit word [GBR2;0-1]+f2, the lower 2-bit portion G3;0-1, B3;0-1, R3;0-1 and ancillary 4-bit word f3 are bit-multiplexed with one another to produce 10-bit word [GBR3;0-1]+f3, . . . .

The upper 10-bit portions G0;2-11, G1;2-11, G2;2-11, G3;2-11, . . . , the upper 10-bit portions B0;2-11, B1;2-11, B2;2-11, B3;2-11, . . . , the upper 10-bit portions R0;2-11, R1;2-11, R2;2-11, R3;2-11, [GBR3;0-1]+f3 and the 10-bit words [GBR0;0-1]+f0, [GBR1;0-1]+f1, [GBR2;0-1]+f2, [GBR3;0-1]+f3, . . . are partitioned in such a manner as shown with bold lines on a table shown in FIG. 70 to be put in a couple of 10-bit word groups which are a 10-bit word group 1 in which the upper 10-bit words G0;2-11, G1;2-11, G2;2-11, G3;2-11, . . . , the upper 10-bit words B0;2-11, B2;2-11, B4;2-11, . . . and the upper 10-bit words R0;2-11, R2;2-11, R4;2-11, . . . and a 10-bit word group 2 in which the upper 10-bit words B1;2-11, B3;2-11, B5;2-11, . . . , the upper 10-bit words R10;2-11, R2;3-11, R5;2-11, . . . and the 10-bit words [GBR0;0-1]+f0, [GBR1;0-1]+f1, [GBR2;0-1]+f2, [GBR3;0-1]+f3, . . . . Then, 20-bit word sequence data DVD12A1 having the word transmission rate of 74.25 MBps are formed based on the 10-bit word group 1 shown in FIG. 70 as a link A-1, as shown in FIG. 71 and similarly 20-bit word sequence data DVD12A2 having the word transmission rate of 74.25 MBps are formed based on the 10-bit word group 2 shown in FIG. 70 as a link A-2, as shown in FIG. 71.

Further, ancillary 8-bit word e0, e1, e2, e3, . . . are added to the lower 2-bit portions A0;0-1, A1;0-1, A2;0-1, A3; 0-1, . . . , respectively, to produce 10-bit word data [A0;0-1]+e0, [A1;0-1]+e1, [A2;0-1]+e2, [A3;0-1]+e3, . . . . Then, the upper 10-bit portions A0;0-1, A1;0-1, A2;0-1, A3; 0-1, . . . and the 10-bit word data [A0;0-1]+e0, [A1;0-1]+e1, [A2;0-1]+e2, [A3;0-1]+e3, . . . are multiplexed in parallel with each other to produce 20-bit word sequence data DVD12CA having the word transmission rate of 74.25 MBps as a link C-1, as shown in FIG. 71.

Namely, the data DVD12A in the form of 48-bit word sequence having the word transmission rate of 148.5 MBps are converted to three 20-bit word sequence data which are the 20-bit word sequence data DVD12A1, DVD12A2 and DVD12CA each having the word transmission rate of 74.25 MBps.

The 48-bit word sequence data DVD12B having the word transmission rate of 74.25 MBps which is shown in FIG. 69B are also subjected to the following further data processing.

Each of 12-bit words (GD0, GD1, GD2, GD3, . . . ) constituting the G data sequence, 12-bit words (B0, BD1, BD2, BD3, . . . ) constituting the B data sequence, 12-bit words (R0, RD1, RD2, RD3, ... ) constituting the R data sequence and 12-bit words (AD0, AD1, AD2, AD3, ... ) constituting the key signal data sequence is divided into an upper 10-bit portion (Y0;2-11, Y1;2-11, Y2;2-11, Y3; 2-11, ..., B0;2-11, B1;2-11, B2;2-11, B3;2-11, ..., R0;2-11, R1;2-11, R2;2-11, R3;2-11, . . . and A0;2-11, A1;2-11, A2;2-11, A3;2-11, ... ) and a lower 2-bit portion (Y0;0-1, Y1;00-1, Y2;0-1, Y3;0-1, ..., B0;0-1, B1;0-1, B2;0-1, B3;0-1, ..., R0;0-1, R1;0-1, R2;0-1, R3;0-1, ... and A0;0-1, A1;0-1, A2;0-1, A3;0-1, ... ).

The lower 2-bit portion G0;0-1, B0;0-1, R0;0-1 and ancillary 4-bit word f0 are bit-multiplexed with one another to produce 10-bit word [GBR0;0-1]+f0, the lower 2-bit portion G1;0-1, B1;0-1, R1;0-1 and ancillary 4-bit word f1 are bit-multiplexed with one another to produce 10-bit word [GBR1;0-1]+f1, the lower 2-bit portion G2;0-1, B2;0-1, R2;0-1 and ancillary 4-bit word f2 are bit-multiplexed with one another to produce 10-bit word [GBR2;0-1]+f2, the lower 2-bit portion G3;0-1, B3;0-1, R3;0-1 and ancillary 4-bit word f3 are bit-multiplexed with one another to produce 10-bit word [GBR3;0-1]+f3, . . . .

The upper 10-bit portions G0;2-11, G1;2-11, 62;2-11, G3;2-11, . . . , the upper 10-bit portions B0;2-11, B1;2-11, B2;2-11, B3;2-11, . . . , the upper 10-bit portions R02-11, R1;2-11-, R2;2-11, R3;2-11, [GBR3;0-1]+f3 and the 10-bit words [GBR0;0-1]+f0, [GBR1;0-1]+f1, [GBR2;0-1]+f2, [GBR3;0-1]+f3, . . . are partitioned in such a manner as shown with bold lines on a table shown in FIG. 70 to be put in a couple of 10-bit word groups which are a 10-bit word group 1 in which the upper 10-bit words G0;2-11, G1;2-11, G2;2-11, G3;2-11, . . . , the upper 10-bit words B0;2-11, B2;2-11, B4;2-11, . . . and the upper 10-bit words R0;2-11, R2;2-11, R4;2-11, . . . and a 10-bit word group 2 in which the upper 10-bit words B1;2-11, B3;2-11, B5;2-11, . . . , the upper 10-bit words R10;2-11, R2;3-11, R5;2-11, . . . and the 10-bit words [GBR0;0-1]+f0, [GBR1;0-1]+f1, [GBR2;0-1]+ f2, [GBR3;0-1]+f3, . . . . Then, 20-bit word sequence data DVD12B1 having the word transmission rate of 74.25 MBps are formed based on the 10-bit word group 1 shown in FIG. 70 as a link B-1, as shown in FIG. 72, and similarly 20-bit word sequence data DVD12B2 having the word transmission rate of 74.25 MBps are formed based on the 10-bit word group 2 shown in FIG. 70 as a link B-2, as shown in FIG. 72.

Further, ancillary 8-bit word e0, e1, e2, e3, . . . are added to the lower 2-bit portions A0;0-1, A1;0-1, A2;0-1, A3; 0-1, . . . , respectively, to produce 10-bit word data [A0;0-1]+e0, [A1;0-1]+e1, [A2;0-1]+e2, [A3;0-1]+e3, . . . . Then, the upper 10-bit portions A0;0-1, A1;0-1, A2;0-1, A3; 0-1, . . . and the 10-bit word data [A0;0-1]+e0, [A1;0-1]+e1, [A2;0-1]+e2, [A3;0-1]+e3, . . . are multiplexed in parallel with each other to produce 20-bit word sequence data DVD12CB having the word transmission rate of 74.25 MBps as a link C-2, as shown in FIG. 72.

Namely, the data DVD12B in the form of 48-bit word sequence having the word transmission rate of 148.5 MBps are converted to three 20-bit word sequence data which are the 20-bit word sequence data DVD12B1, DVD12B2 and DVD12CB each having the word transmission rate of 74.25 MBps.

Consequently, when the digital data DVX supplied to the data processing portion 191 are the data DVD2+DKD12 in the form of 48-bit word sequence shown in FIG. 68, the data DVD12+DKD12 are converted to six 20-bit word sequence data which are the 20-bit word sequence data DVD12A1, DVD12A2, DVD12CA, DVD12B1, DVD12B2 and DVD12CB each having the word transmission rate of 74.25 MBps in the data processing portion 191.

From the data processing portion 191, one of data groups of the 20-bit word sequence data DVC12A1, DVC12A2, DVC12CA, DVC12B1, DVC12B2 and DVC12CB, the 20-bit word sequence data DVC14A1, DVC14A2, DVC14CA, DVC14B1, DVC14B2 and DVC14CB, the 20-bit word sequence data DVC16A1, DVC16A2, DVC16CA, DVC16B1, DVC16B2 and DVC16CB, and the 20-bit word sequence data DVD12A1, DVD12A2, DVD12CA, DVD12B1, DVD12B2 and DVD12CB each having the word transmission rate of 74.25 MBps, and the 20-bit word sequence data DVC12A, DVC12B and DVC12C, is derived as a data group of 20-bit word sequence data DPA1(20), DPA2(20), DPCA(20), DPB1(20), DPB2 (20) and DPCB(20).

The 20-bit word sequence data DPA1(20) having the word transmission rate of 74.25 MBps derived from the data processing portion 191 are supplied to a data inserting portion 192. In the data inserting portion 192, ancillary data DAA1 containing channel identification data as occasion demands are inserted into the 20-bit word sequence data DPA1(20) to produce 20-bit word sequence data DPA1' (20). The 20-bit word sequence data DPA1' (20) obtained from the data inserting portion 192 are supplied to a P/S convertor 193.

In the P/S convertor 193, the 20-bit word sequence data DPAL' (20) are subjected to P/S conversion to produce serial data DSAL having the bit transmission rate of 74.25 MBps× 20=1.485 Gbps. The serial data DSA1 are supplied to an E/O convertor 194. The E/O convertor 194 is operative to cause the 20-bit word sequence data DPA1' (20) to be subjected to E/O conversion to produce an optical signal OSA1 having, for example, the central wavelength of about 1.3 μm and the bit transmission rate of 1.4850 bps. The optical signal OSA1 is derived from the E/O convertor 194 as a transmission signal.

The 20-bit word sequence data DPA2(20), DPCA(20), DPB1(20), DPB2(20) and DPCB(20), each having the word transmission rate of 74.25 MBps, derived from the data processing portion 191 are supplied to data inserting portions 195, 196, 197, 198 and 199, respectively. In each of the data inserting portions 195 to 199, ancillary data DAA2, DACA, DAB1, DAB2 or DACB containing channel identification data as occasion demands are inserted into the 20-bit word sequence data DPA2(20), DPCA(20), DPB1 (20), DPB2(20) or DPCB(20) to produce 20-bit word sequence data DPA2' (20), DPCA' (20), DPB1' (20), DPB2' (20) or DPCB' (20). The 20-bit word sequence data DPA2' (20), DPCA' (20), DPB1' (20), DPB2' (20) and DPCB' (20) obtained from the data inserting portion 195 to 199, respectively, are supplied to P/S convertors 200 to 204.

In each of the P/S convertor 200 to 204, the 20-bit word sequence data DPA2' (20), DPCA' (20), DPB1' (20), DPB2' (20) or DPCB' (20) are subjected to P/S conversion to produce serial data DSA2, DSCA, DSB1, DSB2 or DSCB having the bit transmission rate of 74.25 MBps×20=1.485 Gbps. The serial data DSA2, DSCA, DSB1, DSB2 and DSCB are supplied to E/O convertors 205 to 209, respectively.

Each of the E/O convertor 205 to 209 is operative to cause the 20-bit word sequence data DPA2' (20), DPCA' (20), DPB1' (20), DPB2' (20) or DPCB' (20) to be subjected to E/O conversion to produce an optical signal OSA2, OSCA, OSB1, OSB2 or OSCB having, for example, the central wavelength of about 1.3 μm and the bit transmission rate of 1.485 Gbps. The optical signals OSA2, OSCA, OSB1, OSB2 and OSCB are derived from the E/O convertors 205 to 209, respectively, as transmission signals.

A portion including the E/O convertors 194 and 205 to 209 constitutes a data transmitting portion for transmitting the serial data DSA1, DSA2, DSCA, DSB1, DSB2 and DSCB obtained from the P/S convertors 193 and 200 to 204, respectively.

The optical signal OSA1 derived from the E/O convertor 194 is guided through an optical connector 210 to an optical fiber data transmission line 211 to be transmitted to a receiving side. The optical signal OSA2, OSCA, OSB1, OSB2 and OSCB derived from the E/O convertors 205 to 209 are guided through an optical connector 212 to an optical fiber data transmission line 217, through an optical connector 213 to an optical fiber data transmission line 218, through an optical connector 214 to an optical fiber data transmission line 219, through an optical connector 215 to an optical fiber data transmission line 220 and through an optical connector 216 to an optical fiber data transmission line 221, respectively, to be transmitted to the receiving side. Each of the optical fiber data transmission lines 211 and 217 to 221 is made of, for example, fused quartz SMF.

In the receiving side, the optical signal OSA1 transmitted through the optical fiber data transmission line 211 is guided through an optical connector 225 to an O/E convertor 226. The optical signals OSA2, OSCA, OSB1, OSB2 and OSCB transmitted through the optical fiber data transmission lines 217 to 221 are guided through an optical connector 227 to an O/E convertor 232, through an optical connector 228 to an O/E convertor 233, through an optical connector 229 to an O/E convertor 234, through an optical connector 230 to an O/E convertor 235 and through an optical connector 231 to an O/E convertor 236, respectively.

The O/E convertor 226 is operative to cause the optical signal OSA1 having the central wavelength of about 1.3 µm to be subjected to O/E conversion to reproduce the serial data DSA1 having the bit transmission rate of 1.485 Gbps. The serial data DSA1 thus reproduced are supplied to an S/P convertor 240. The S/P convertor 240 is operative to cause the serial data DSA1 to be subjected to S/P conversion to reproduce the 20-bit word sequence data DPA1' (20) having the word transmission rate of 74.25 MBps to be supplied to a data time difference absorbing portion 241.

Each of the O/E convertors 232 to 236 is operative to cause the optical signal OSA2, OSCA, OSB1, OSB2 or CSCB having the central wavelength of about 1.3 µm to be subjected to O/E conversion to reproduce the serial data DSA2, DSCA, DSB1, DSB2 or DSCB having the bit transmission rate of 1.485 Gbps. The serial data DSA2, DSCA, DSB1, DSB2 and DSCB thus reproduced are supplied to S/P convertors 242 to 246.

Each of the S/P convertors 242 to 246 is operative to cause the serial data DSA2, DSCA, DSB1, DSB2 or DSCB to be subjected to S/P conversion to reproduce the 20-bit word sequence data DPA2' (20), DPCA' (20), DPB1' (20), DPB2' (20) or DPCB' (20) having the word transmission rate of 74.25 MBps to be supplied to the data time difference absorbing portion 241.

In the data time difference absorbing portion 241, time difference among the 20-bit word sequence data DPA1' (20) from the S/P convertor 240 and the 20-bit word sequence data DSA2' (20), DPCA' (20), DSB1' (20), DPB2' (20) and DPCB' (20) from the S/P convertors 242 to 246 is absorbed to produce 20-bit word sequence data DPA1Q' (20), DPA2Q' (20), DPCAQ' (20), DPB1Q' (20), DPB2Q' (20) and DPCBQ' (20), which are obtained based on the 20-bit word sequence data DPA1' (20), DPA2' (20), DPCA' (20), DPB1' (20), DPB2' (20) and DPCB' (20), respectively, to be transmitted at the word transmission rate of 74.25 MBps in such a manner that time difference among the 20-bit word sequence data DPA1Q' (20), DPA2Q' (20), DPCAQ' (20), DPB1Q' (20), DPB2Q' (20) and DPCBQ' (20) is substantially zero.

The 20-bit word sequence data DPA1Q' (20) obtained from the data time difference absorbing portion 241 are supplied to data separating portion 247. In the data separating portion 247, the ancillary data DAA1 are separated from the 20-bit word sequence data DPA1Q' (20) so that the 20-bit word sequence data DPA1Q (20) and the ancillary data DAA1 are separately obtained. The 20-bit word sequence data DPA1Q (20) are supplied to a data reproducing portion 248.

The 20-bit word sequence data DPA2Q' (20), DPCAQ' (20), DPB1Q' (20), DPB2Q' (20) and DPCBQ' (20) obtained from the data time difference absorbing portion 241 are supplied to data separating portions 249 to 253, respectively. In each of the data separating portions 249 to 253, the ancillary data DAA2, DACA, DAB1, DAB2 or DACB are separated from the 20-bit word sequence data DPA2Q' (20), DPCAQ' (20), DPB1Q' (20), DPB2Q' (20) or DPCBQ' (20) so that the 20-bit word sequence data DPA2Q (20), DPCAQ (20), DPB1Q(20), DPB2Q(20) or DPCBQ(20) and the ancillary data DAA2, DACA, DAB1, DAB2 or DACB are separately obtained. The 20-bit word sequence data DPA2Q (20), DPCAQ(20), DPB1Q(20), DPB2Q(20) and DPCBQ (20) are supplied to the data reproducing portions 248.

In the data reproducing portion 248, the 20-bit word sequence data DPA1Q(20), DPA2Q(20), DPCAQ(20), DPB1Q(20), DPB2Q(20) and DPCBQ(20) are subjected to data reproduction processing, which is proceeded inversely to the data processing to which the 20-bit word sequence data constituting the digital data DVX are subjected in the data processing portion 191, to reproduce the digital data DVX formed based on the 20-bit word sequence data DPA1Q(20), DPA2Q(20), DPCAQ(20), DPB1Q(20), DPB2Q(20) and DPCBQ(20).

The digital data DVX thus reproduced are one of the data DVC12+DKC12, DVC14+DKC14, DVC16+DKC16 and DVD12+DKD12.

Each of the 20-bit word sequence data DVC12A1, DVC12B1, DVC14A1, DVC14B1, DVC16A1 or DVC16B1 composed of the upper 10-bit portions each divided from the 12-bit, 14-bit or 16-bit word constituting the Y data sequence and the upper 10-bit portions each divided from the 12-bit, 14-bit or 16-bit word constituting the $P_B/P_R$ data sequence, which are multiplexed in parallel with each other, and the 20-bit word sequence data DVD12A1 or DVD12B1 composed of the upper 10-bit portions each divided from the 12-bit word constituting the G data sequence, the upper 10-bit portions each divided from the 12-bit word constituting the B data sequence and the upper 10-bit portions each divided from the 12-bit word constituting the R data sequence, which are multiplexed in parallel with one another, can be recorded or reproduced by means of, for example, a previously proposed video tape recorder for HD digital video signals. Accordingly, it is possible to confirm or edit the contents of the 20-bit word sequence data DVC12A1, DVC12B1, DVC14A1, DVB14B1, DVC16A1, DVC16B1, DVD12A1 or DVD12B1 with use of the previously proposed video tape recorder for HD digital video signals. Further, it is also possible to obtain images reproduced from the 20-bit word sequence data DVC12A1, DVC12B1, DVC14A1, DVB14B1, DVC16A1, DVC16B1, DVD12A1 or DVD12B1 with use of the combination of a video tape recorder and a video monitor for HD digital video signals proposed previously. These facts bring about remarkable advantage for handling word sequence data constituting a digital video signal, in which each word is made of more than 10 bits.

Figure 73:
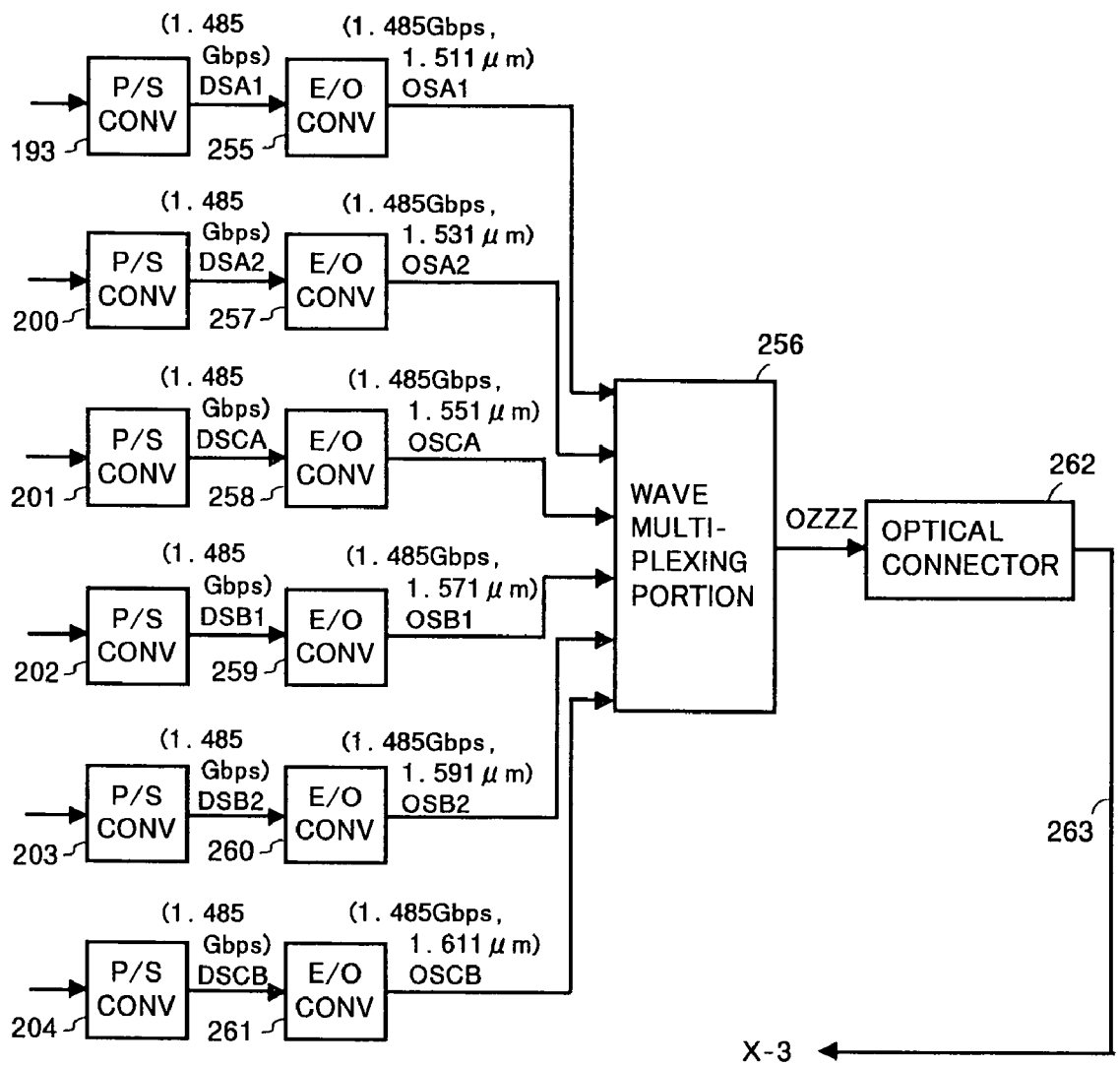
FIGS. 73 and 74 are schematic block diagrams showing a part of an example of a data transmitting and receiving apparatus including another embodiment of apparatus for transmitting digital data according to the thirty-seventh or thirty-eighth aspects of the present invention, in which an embodiment of method of transmitting digital data according to the seventeenth or eighteenth aspects of the present invention is carried out.
Figure 74:
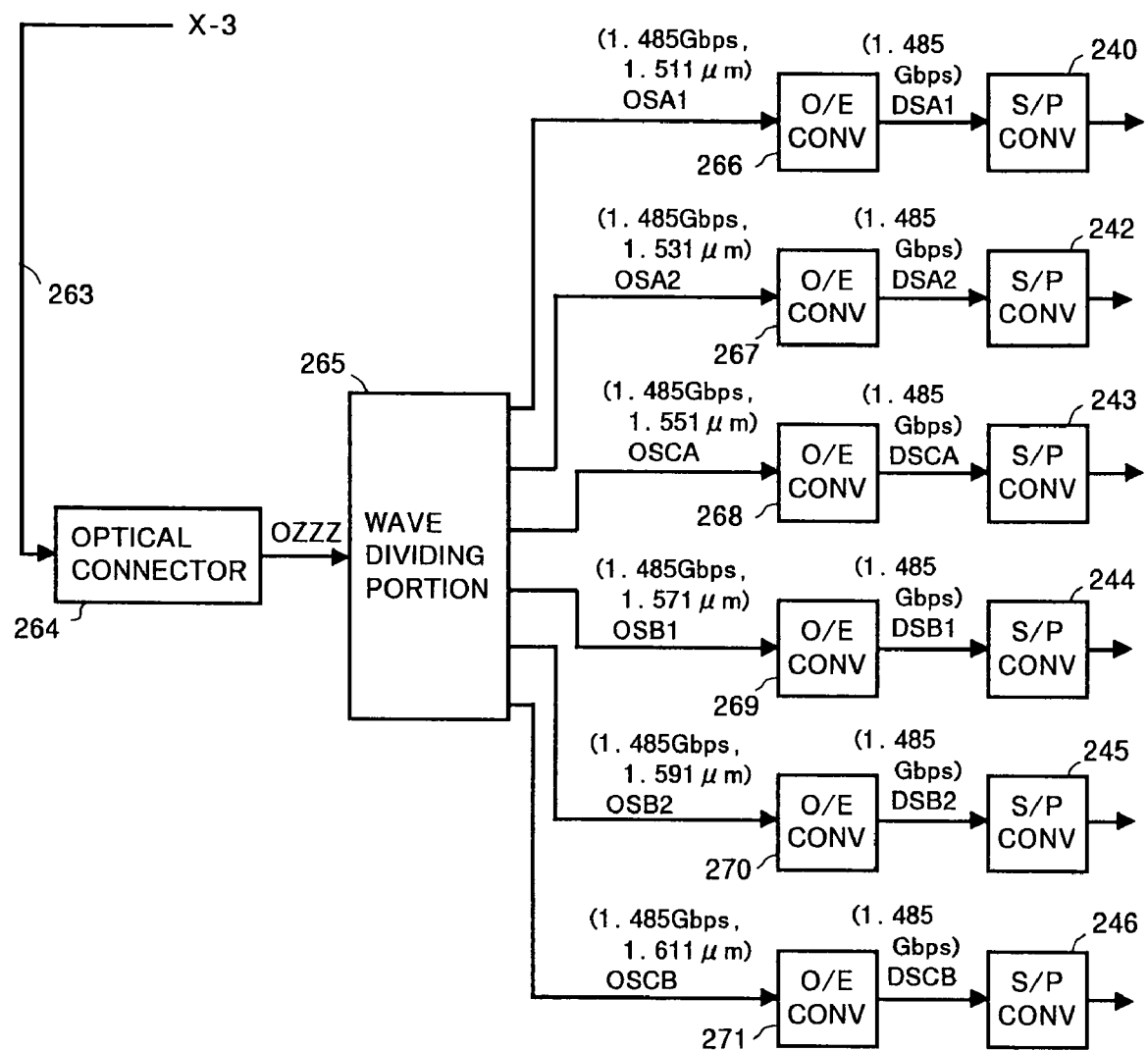

FIGS. 73 and 74 shows a part of an example of a data transmitting and receiving apparatus which includes a second embodiment of apparatus for transmitting digital data according to one of the thirty-seventh or thirty-eighth aspects of the present invention, in which an embodiment of method of transmitting digital data according to one of the seventeenth or eighteenth aspects of the present invention is carried out.

The example of the data transmitting and receiving apparatus, a part of which is shown in FIGS. 73 and 74, has a number of blocks constituted in the same manner as those in the example of FIGS. 62 and 63 and blocks which are constituted to be different from those in the example of FIGS. 62 and 63 are shown in FIGS. 73 and 74.

Referring to FIGS. 73 and 74, E/O convertors 255 and 257 to 261 and a wave multiplexing portion 256 are provided in place of the E/O convertors 194 and 205 to 209 employed in the example of FIGS. 62 and 63 a wave dividing portion 265 and O/E convertors 266 to 271 are provided in place of the O/E convertors 226 and 232 to 236 employed in the example of FIGS. 62 and 63. Further, an optical connector 262, an optical fiber data transmission line 263 and an optical connector 264 are provided in place of the optical connectors 210 and 212 to 216, the optical fiber data transmission lines 211 and 217 to 221 and the optical connectors 225 and 227 to 231 employed in the example of FIGS. 63 and 64.

In the example, a part of which is shown in FIGS. 73 and 74, serial data DSA1 having the bit transmission rate of 1.485 Gbps obtained from a P/S convertor 193 is supplied to the E/O convertor 255, serial data DSA2 having the bit transmission rate of 1.485 Gbps obtained from a P/S convertor 200 is supplied to the E/O convertor 257, serial data DSCA having the bit transmission rate of 1.485 Gbps obtained from a P/S convertor 201 is supplied to the E/O convertor 258, serial data DSB1 having the bit transmission rate of 1.485 Gbps obtained from a P/S convertor 202 is supplied to the E/O convertor 259, serial data DSB2 having the bit transmission rate of 1.485 Gbps obtained from a P/S convertor 203 is supplied to the E/O convertor 260 and serial data DSCB having the bit transmission rate of 1.485 Gbps obtained from a P/S convertor 204 is supplied to the E/O convertor 261.

The E/O convertor 255 is operative to cause the serial data DSA1 to be E/O conversion to produce an optical signal OSA1 having, for example, the central wavelength of about 1.511/m and the bit transmission rate of 1.485 Gbps. The optical signal OSA1 is guided to the wave multiplexing portion 256. The E/O convertor 257 is operative to cause the serial data DSA2 to be E/O conversion to produce an optical signal OSA2 having, for example, the central wavelength of about 1.531 μm and the bit transmission rate of 1.4856 bps. The optical signal OSA2 is guided to the wave multiplexing portion 256. The E/O convertor 258 is operative to cause the serial data DSCA to be E/O conversion to produce an optical signal OSCA having, for example, the central wavelength of about 1.551 μm and the bit transmission rate of 1.485 Gbps. The optical signal OSCA is guided to the wave multiplexing portion 256.

Further, the E/O convertor 259 is operative to cause the serial data DSB1 to be E/O conversion to produce an optical signal OSB1 having, for example, the central wavelength of about 1.571 μm and the bit transmission rate of 1.485 Gbps. The optical signal OSB1 is guided to the wave multiplexing portion 256. The E/O convertor 260 is operative to cause the serial data DSB2 to be E/O conversion to produce an optical signal OSB2 having, for example, the central wavelength of about 1.591 μm and the bit transmission rate of 1.485 Gbps. The optical signal OSB2 is guided to the wave multiplexing portion 256. The E/O convertor 261 is operative to cause the serial data DSCB to be E/O conversion to produce an optical signal OSCB having, for example, the central wavelength of about 1.611 μm and the bit transmission rate of 1.485 Gbps. The optical signal OSCB is guided to the wave multiplexing portion 256.

In the wave multiplexing portion 256, the optical signal OSA1 having the central wavelength of about 1.511 μm, the optical signal OSA2 having the central wavelength of about 1.531 μm, the optical signal OSCA having the central wavelength of about 1.551 μm, the optical signal OSB1 having the central wavelength of about 1.571 μm, the optical signal OSB2 having the central wavelength of about 1.591 μm and the optical signal OSCB having the central wavelength of about 1.911 μm are multiplexed with one another to produce a multiplexed optical signal OZZZ. The multiplexed optical signal OZZZ is derived from the wave multiplexing portion 156 as a transmission signal. A portion including the E/O convertors 255 and 257 to 261 and the wave multiplexing portion 256 constitutes a data transmitting portion for transmitting the serial data DSA1, DSA2, DSCA, DSB1, DSB2 and DSCB obtained from the P/S convertors 193 and 200 to 204, respectively.

The optical signals OSA1, OSA2, OSCA, OSB1, OSB2 and OSCB which are multiplexed with one another in the wave multiplexing portion 256 have the respective central wavelengths so close to one another as to be different only by about 0.02 μm (20 nm) for producing the multiplexed optical signal OZZZ. Therefore, the wave multiplexing technology called the Coarse Wavelength Division Multiplexing (CWDM) is applied to a portion including the E/O convertors 255 and 257 to 261 and the wave multiplexing portion 256.

The multiplexed optical signal OZZZ which is the transmission signal derived from the wave multiplexing portion 256 is guided through the optical connector 262 to the optical fiber datatransmission line 263 to be transmitted thereby to a receiving side.

In the receiving side, the multiplexed optical signal OZZZ transmitted through the optical fiber data transmission line 263 is guided through the optical connector 264 to the wave dividing portion 265. In the wave dividing portion 265, the multiplexed optical signal OZZZ is divided into a first optical elements having the center wavelength of about 1.511 μm, a second optical element having the center wavelength of about 1.531 μm, a third optical elements having the center wavelength of about 1.551 μm, a fourth optical element having the center wavelength of about 1.5731 μm, a fifth optical elements having the center wavelength of about 1.591 μm and a sixth optical element having the center wavelength of about 1.611 μm to reproduce the optical signal OSA1 which has the center wavelength of about 1.511 μm and the bit transmission rate of 1.485 Gbps, the optical signal OSA2 which has the center wavelength of about 1.531 μm and the bit transmission rate of 1.485 Gbps, the optical signal OSCA which has the center wavelength of about 1.551 μm and the bit transmission rate of 1.485 Gbps, the optical signal OSB1 which has the center wavelength of about 1.571 μm and the bit transmission rate of 1.485 Gbps, the optical signal OSB2 which has the center wavelength of about 1.591 μm and the bit transmission rate of 1.485 Gbps and the optical signal OSCB which has the center wavelength of about 1.611 μm based on the first, second, third, fourth, fifth and sixth optical elements, respectively.

The optical signals OSA1, OSA2, OSCA, OSB1, OSB2 and OSCB reproduced by the wave dividing portion 265 are guided the O/E convertors 266 to 271, respectively. The O/E convertor 266 is operative to cause the optical signal OSA1 having the center wavelength of about 1.511 μm and the bit transmission rate of 1,485 Gbps to be subjected to O/E conversion to reproduce the serial data DSAL having bit transmission rate of 1,485 Gbps. The serial data DSA1 thus reproduced are supplied to a S/P convertor 240. The O/E convertor 267 is operative to cause the optical signal OSA2 having the center wavelength of about 1.531 μm and the bit transmission rate of 1,485 Gbps to be subjected to O/E conversion to reproduce the serial data DSA2 having bit transmission rate of 1,485 Gbps. The serial data DSA2 thus reproduced are supplied to a S/P convertor 242. The O/E convertor 268 is operative to cause the optical signal OSCA having the center wavelength of about 1.551 μm and the bit transmission rate of 1,485 Gbps to be subjected to O/E conversion to reproduce the serial data DSCA having bit transmission rate of 1,485 Gbps. The serial data DSCA thus reproduced are supplied to a S/P convertor 243. The O/E convertor 269 is operative to cause the optical signal OSB1 having the center wavelength of about 1.571 μm and the bit transmission rate of 1,485 Gbps to be subjected to O/E conversion to reproduce the serial data DSB1 having bit transmission rate of 1,485 Gbps. The serial data DSB1 thus reproduced are supplied to a S/P convertor 244. The O/E convertor 270 is operative to cause the optical signal OSB2 having the center wavelength of about 1.591 μm and the bit transmission rate of 1,485 Gbps to be subjected to O/E conversion to reproduce the serial data DSB2 having bit transmission rate of 1,485 Gbps. The serial data DSB2 thus reproduced are supplied to a S/P convertor 245. The O/E convertor 271 is operative to cause the optical signal OSCB having the center wavelength of about 1.611 μm and the bit transmission rate of 1,485 Gbps to be subjected to O/E conversion to reproduce the serial data DSCB having bit transmission rate of 1,485 Gbps. The serial data DSCB thus reproduced are supplied to a S/P convertor 246.

Other operations of the example, a part of which is shown in FIGS. 73 and 74, are similar to those of the example of FIGS. 62 and 63.

APPLICABILITY FOR INDUSTRIAL USE

As apparent from the above description, with the method of producing digital data according to the first or second aspect of the present invention, the digital video signal constituted with 12-, 14- or 16-bit word digital data is obtained. In the 12-, 14- or 16-bit word digital data constituting the digital video signal, the 12-, 14- or 16-bit codes each containing the upper 8-bit portion representing 00h or FFh are predetermined to be the forbidden code for each active line, and therefore, 8-bit word sequence data constituted with the upper 8-bit portions of the 12-, 14- or 16-bit words or 10-bit word sequence data constituted with the upper 10-bit portions of the 12-, 14- or 16-bit words are compatible with 8- or 10-bit word digital data constituting a previously proposed HD digital video signal. Consequently, the digital data constituting the digital video signal obtained with the method of producing digital data according to the first or second aspect of the present invention can be subjected to recording, reading, editing, reproduction of images and so on by means of apparatus used for the 8- or 10-bit word digital data constituting the previously proposed HD digital video signal.

With the method of producing digital data according to the third aspect of the present invention, the 720P signal constituted with 12-, 14- or 16-bit word digital data is obtained. In the 12-, 14- or 16-bit word digital data constituting the 720P signal also, the 12-, 14- or 16-bit codes each containing the upper 8-bit portion representing 00h or FFh are predetermined to be the forbidden code for each active line, and therefore, 8-bit word sequence data constituted with the upper 8-bit portions of the 12-, 14- or 16-bit words or 10-bit word sequence data constituted with the upper 10-bit portions of the 12-, 14- or 16-bit words are compatible with 8- or 10-bit word digital data constituting a previously proposed 720P signal. Consequently, the digital data constituting the 720P signal obtained with the method of producing digital data according to the third aspect of the present invention can be subjected to recording, reading, editing, reproduction of images and so on by means of apparatus used for the 8- or 10-bit word digital data constituting the previously proposed 720P signal.

With the method of transmitting digital data according to the fourth, fifth, sixth or seventh aspect of the present invention or the apparatus for transmitting digital data according to the twenty-fourth, twenty-fifth, twenty-sixth or twenty-seventh aspect of the present invention, 12-, 14- or 16-bit word digital data constituting the digital video signal can be appropriately subjected to serial transmission with use of circuit devices used for serial transmission of the 8- or 10-bit word digital data constituting the previously proposed HD digital video signal.

With the method of transmitting digital data according to the eighth or ninth aspect of the present invention or the apparatus for transmitting digital data according to the twenty-eighth or twenty-ninth aspect of the present invention, 12-, 14- or 16-bit word digital data constituting the 720P signal can be appropriately subjected to serial transmission with use of circuit devices used for serial transmission of the 8- or 10-bit word digital data constituting the previously proposed HD digital video signal.

With the method of transmitting digital data according to the tenth to eighteenth aspect of the present invention or the apparatus for transmitting digital data according to the thirtieth to thirty-eighth aspect of the present invention, the digital data constituting the digital video signal with a series of words each made of more than 10 bits, for example, 12-, 14- or 16-bit word digital data constituting the digital video signal, and the key signal data sequence related to the digital data can be appropriately subjected to serial transmission in such a manner that the key signal data sequence are transmitted as the additional information data sequence annexed to the digital data with use of existing circuit devices used for serial transmission of, for example, 10-bit word digital data constituting a digital video signal.

With the method of transmitting digital data according to the nineteenth to twenty-third aspect of the present invention or the apparatus for transmitting digital data according to the thirty-ninth to forty-third aspect of the present invention, the digital data constituting the 720P signal with a series of words each made of more than 10 bits, for example, 12-, 14- or 16-bit word digital data constituting the 720P signal, and the key signal data sequence related to the digital data can be appropriately subjected to serial transmission in such a manner that the key signal data sequence are transmitted as the additional information data sequence annexed to the digital data constituting the 720P signal with use of existing circuit devices used for serial transmission of, for example, 10-bit word digital data constituting a digital video signal.

The invention claimed is:

1. A method of producing digital data comprising the steps of;
    making first arrangements for 12-, 14- or 16-bit word digital data constituting a digital video signal, which include a frame rate of 24 Hz, 25 Hz or 30 Hz, 1125 lines per frame, 1080 active lines per frame, a sampling frequency of 74.25 MHz and 1920 active data samples per line,
    making second arrangements for the 12-, 14- or 16-bit word digital data, in which 12-bit codes each containing an upper 8-bit portion representing 00h or FFh (h indicates a hexadecimal number) are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, and
    forming the 12-, 14- or 16-bit word digital data constituting the digital video signal in accordance with the first and second arrangements.

2. A method of producing digital data according to claim 1, wherein each line portion of the is formed to be composed of a line blanking portion and a video data portion successive to the line blanking portion and the video data a portion is provided with 1920 active data samples.

3. A method of producing digital data according to claim 2, wherein each video data portion of the 12-, 14- or 16-bit word digital data is formed to be composed of a first word data sequence representing luminance signal information and a second word data sequence representing color difference signal information arranged in parallel.

4. A method of producing digital data according to claim 2, wherein each video data portion of the 12-, 14- or 16-bit word digital data is formed to be composed of a first word data sequence representing blue primary color signal information, a second word data sequence representing green primary color signal information and a third word data sequence representing red primary color signal information arranged in parallel.

5. A method of producing digital data comprising the steps of;
    making first arrangements for 12-, 14- or 16-bit word digital data constituting a digital video signal, which include a frame rate of 50 Hz or 60 Hz, 1125 lines per frame, 1080 active lines per frame, a sampling frequency of 148.5 MHz and 1920 active data samples per line,
    making second arrangements for the 12-, 14- or 16-bit word digital data, in which 12-bit codes each containing an upper 8-bit portion representing 00h or FFh (h indicates a hexadecimal number) are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh (00 and FF are hexadecimal numbers) are predetermined to be forbidden code for each active line in case of the 16-bit word digital data, and
    forming the 12-, 14- or 16-bit word digital data constituting the digital video signal in accordance with the first and second arrangements.

6. A method of producing digital data according to claim 5, wherein each line portion of the is formed to be composed of a line blanking portion and a video data portion successive to the line blanking portion and the video data a portion is provided with 1920 active data samples.

7. A method of producing digital data according to claim 6, wherein each video data portion of the 12-, 14- or 16-bit word digital data is formed to be composed of a first word data sequence representing luminance signal information and a second word data sequence representing color difference signal information arranged in parallel.

8. A method of producing digital data according to claim 6, wherein each video data portion of the 12-, 14- or 16-bit word digital data is formed to be composed of a first word data sequence representing blue primary color signal information, a second word data sequence representing green primary color signal information and a third word data sequence representing red primary color signal information arranged in parallel.

9. A method of producing digital data comprising the steps of;
    making first arrangements for 12-, 14- or 16-bit word digital data constituting a digital video signal, which include a frame sequence at a rate of 60 Hz, 750 lines per frame, 720 active lines per frame, 1280 active data samples per line,
    making second arrangements for the 12-, 14- or 16-bit word digital data, in which 12-bit codes each containing an upper 8-bit portion representing 00h or FFh (h indicates a hexadecimal number) predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, and
    forming the 12-, 14- or 16-bit word digital data constituting the digital video signal in accordance with the first and second arrangements.

10. A method of producing digital data according to claim 9, wherein each line portion of the is formed to be composed of a line blanking portion and a video data portion successive to the line blanking portion and the video data a portion is provided with 1920 active data samples.

11. A method of producing digital data according to claim 10, wherein each video data portion of the 12-, 14- or 16-bit word digital data is formed to be composed of a first word data sequence representing luminance signal information and a second word data sequence representing color difference signal information arranged in parallel.

12. A method of producing digital data according to claim 10, wherein each video data portion of the 12-, 14- or 16-bit word digital data is formed to be composed of a first word data sequence representing blue primary color signal information, a second word data sequence representing green primary color signal information and a third word data sequence representing red primary color signal information arranged in parallel.

13. A method of transmitting digital data comprising the steps of;
    dividing each of 12-, 14- or 16-bit words contained in 12-, 14- or 16-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh (h indicates a hexadecimal number) are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, into an upper 10-bit portion and a lower 2-, 4- or 6-bit portion, forming first word sequence data having a word transmission rate of 74.25 MBps based on the upper 10-bit portions and second word sequence data having a word transmission rate of 74.25 MBps based on the lower 2-, 4- or 6-bit portions, obtaining first and second serial data based on the first and second word sequence data, respectively, and transmitting the first and second serial data.

14. A method of transmitting digital data according to claim 13, wherein the 12-, 14- or 16-bit word digital data are formed to be composed of a first word data sequence representing luminance signal information and a second word data sequence representing color difference signal information arranged in parallel.

15. A method of transmitting digital data according to claim 13, wherein each of the first and second word sequence data are formed to be 20-bit word sequence data.

16. A method of transmitting digital data according to claim 13, wherein the first serial data are subjected to E/O conversion to produce a first optical signal, the second serial data are subjected to E/O conversion to produce a second optical signal and the first and second optical signals are transmitted.

17. A method of transmitting digital data according to claim 13, wherein the first and second serial data are multiplexed with each other to produce multiplexed serial data, the multiplex serial data are subjected to E/O conversion to produce an optical signal and the optical signals are transmitted.

18. A method of transmitting digital data comprising the steps of;

dividing each of 12-bit words contained in 12-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh (h indicates a hexadecimal number) are predetermined to be forbidden code for each active line, into an upper 10-bit portion and a lower 2-bit portion, putting the upper 10-bit portions in first and second groups, multiplexing the lower 2-bit portions with one another at every predetermined numbers thereof to be caused to join in the second group, forming first word sequence data having a word transmission rate of 74.25 MBps based on data belonging to the first group and second word sequence data having a word transmission rate of 74.25 MBps based on data belonging to the second group, obtaining first and second serial data based on the first and second word sequence data, respectively, and transmitting the first and second serial data.

19. A method of transmitting digital data according to claim 18, wherein the 12-bit word digital data are formed to be composed of a first word data sequence representing blue primary color signal information, a second word data sequence representing green primary color signal information and a third word data sequence representing red primary color signal information arranged in parallel.

20. A method of transmitting digital data according to claim 18, wherein each of the first and second word sequence data are formed to be 20-bit word sequence data.

21. A method of transmitting digital data according to claim 18, wherein the first serial data are subjected to E/O conversion to produce a first optical signal, the second serial data are subjected to E/O conversion to produce a second optical signal and the first and second optical signals are transmitted.

22. A method of transmitting digital data according to claim 18, wherein the first and second serial data are multiplexed with each other to produce multiplexed serial data, the multiplex serial data are subjected to E/O conversion to produce an optical signal and the optical signals are transmitted.

23. A method of transmitting digital data comprising the steps of;

putting 12-, 14- or 16-bit word digital data constituting a digital video signal, which have a frame rate of 50 Hz or 60 Hz, 1125 lines per frame, 1080 active lines per frame, a sampling frequency of 148.5 MHz and 1920 active data samples per line and in which 12-bit codes each containing an upper 8-bit portion representing 00h or FFh (h indicates a hexadecimal number) are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, in first and second groups alternately at every line portion, forming first word sequence data having a word transmission rate of 74.25 MBps based on data belonging to the first group and second word sequence data having a word transmission rate of 74.25 MBps based on data belonging to the second group, processing the first word sequence data in such a manner as to divide each 12-, 14- or 16-bit word contained in the first word sequence data into a first upper 10-bit portion and a first lower 2-, 4- or 6-bit portion and form third word sequence data having a word transmission rate of 74.25 MBps based on the first upper 10-bit portions and fourth word sequence data having a word transmission rate of 74.25 MBps based on the first lower 12-, 14- or 16-bit portions, processing the second word sequence data in such a manner as to divide each 12-, 14- or 16-bit word contained in the second word sequence data into a second upper 10-bit portion and a second lower 2-, 4- or 6-bit portion and form fifth word sequence data having a word transmission rate of 74.25 MBps based on the second upper 10-bit portions and sixth word sequence data having a word transmission rate of 74.25 MBps based on the second lower 2-, 4- or 6-bit portions, obtaining first, second, third and fourth serial data based on the third, fourth, fifth and sixth word sequence data, respectively, and transmitting the first to fourth serial data.

24. A method of transmitting digital data according to claim 23, wherein the 12-, 14- or 16-bit word digital data are formed to be composed of a first word data sequence representing luminance signal information and a second word data sequence representing color difference signal information arranged in parallel.

25. A method of transmitting digital data according to claim 23, wherein each of the first and second word sequence data are formed to be 20-bit word sequence data.

26. A method of transmitting digital data according to claim 23, wherein the first and second serial data are multiplexed with each other to produce a first multiplexed serial data, the third and fourth serial data are multiplexed with each other to produce a second multiplexed serial data, the first multiplex serial data are subjected to E/O conversion to produce a first optical signal, the second multiplex serial data are subjected to E/O conversion to produce a second optical signal, and the first and second optical signals are transmitted.

27. A method of transmitting digital data comprising the steps of;

putting 12-bit word digital data constituting a digital video signal, which have a frame rate of 50 Hz or 60 Hz, 1125 lines per frame, 1080 active lines per frame, a sampling frequency of 148.5 MHz and 1920 active data samples per line and in which 12-bit codes each containing an upper 8-bit portion representing 00h or FFh (h indicates a hexadecimal number) are predetermined to be forbidden code for each active line in case of the digital data of 12-bit word sequence, in first and second groups alternately at every line portion, forming first word sequence data having a word transmission rate of 74.25 MBps based on data belonging to the first group and second word sequence data having a word transmission rate of 74.25 MBps based on data belonging to the second group, processing the first word sequence data in such a manner as to divide each 12-bit word contained in the first word sequence data into a first upper 10-bit portion and a first lower 2-bit portion, put the first upper 10-bit portions in first and second 10-bit groups, multiplex the first lower 2-bit portions with one another at every predetermined numbers thereof to be caused to join in the second 10-bit group, and form third word sequence data having a word transmission rate of 74.25 MBps based on data belonging to the first 10-bit group and fourth word sequence data having a word transmission rate of 74.25 MBps based on data belonging to the second 10-bit group, processing the second word sequence data in such a manner as to divide each 12-bit word contained in the second word sequence data into a second upper 10-bit portion and a second lower 2-bit portion, put the second upper 10-bit portions in third and fourth 10-bit groups, multiplex the second lower 2-bit portions with one another at every predetermined numbers thereof to be caused to join in the fourth 10-bit group, and form fifth word sequence data having a word transmission rate of 74.25 MBps based on data belonging to the third 10-bit group and sixth word sequence data having a word transmission rate of 74.25 MBps based on data belonging to the fourth 10-bit group, obtaining first, second, third and fourth serial data based on the third, fourth, fifth and sixth word sequence data, respectively, and transmitting the first to fourth serial data.

28. A method of transmitting digital data according to claim 27, wherein the 12-bit word digital data are formed to be composed of a first word data sequence representing blue primary color signal information, a second word data sequence representing green primary color signal information and a third word data sequence representing red primary color signal information arranged in parallel.

29. A method of transmitting digital data according to claim 27, wherein each of the third to sixth word sequence data are formed to be 20-bit word sequence data.

30. A method of transmitting digital data according to claim 27, wherein the first and second serial data are multiplexed with each other to produce a first multiplexed serial data, the third and fourth serial data are multiplexed with each other to produce a second multiplexed serial data, the first multiplex serial data are subjected to E/O conversion to produce a first optical signal, the second multiplex serial data are subjected to E/O conversion to produce a second optical signal, and the first and second optical signals are transmitted.

31. A method of transmitting digital data comprising the steps of;

dividing each of 12-, 14- or 16-bit words contained in 12-, 14- or 16-bit word digital data constituting a digital video signal, which have a frame rate of 60 Hz, 750 lines per frame, 720 active lines per frame and 1280 active data samples per line, into an upper 10-bit portion and a lower 2-, 4- or 6-bit portion, forming first word sequence data having a word transmission rate of 74.25 MBps based on the upper 10-bit portions and second word sequence data having a word transmission rate of 74.25 MBps based on the lower 2-, 4- or 6-bit portions, obtaining first and second serial data based on the first and second word sequence data, respectively, and transmitting the first and second serial data.

32. A method of transmitting digital data according to claim 31, wherein the 12-, 14- or 16-bit word digital data are formed to be composed of a first word data sequence representing luminance signal information and a second word data sequence representing color difference signal information arranged in parallel.

33. A method of transmitting digital data according to claim 31, wherein each of the first and second word sequence data are formed to be 20-bit word sequence data.

34. A method of transmitting digital data according to claim 31, wherein the first serial data are subjected to E/O conversion to produce a first optical signal, the second serial data are subjected to E/O conversion to produce a second optical signal and the first and second optical signals are transmitted.

35. A method of transmitting digital data according to claim 31, wherein the first and second serial data are multiplexed with each other to produce multiplexed serial data, the multiplex serial data are subjected to E/O conversion to produce an optical signal and the optical signals are transmitted.

36. A method of transmitting digital data comprising the steps of;

dividing each of 12-bit words contained in 12-bit word digital data constituting a digital video signal, which have a frame rate of 60 Hz, 750 lines per frame, 720 active lines per frame and 1280 active data samples per line, into an upper 10-bit portion and a lower 2-bit portion, putting the upper 10-bit portions in first and second groups, multiplexing the lower 2-bit portions with one another at every predetermined numbers thereof to be caused to join in the second group, forming first word sequence data having a word transmission rate of 74.25 MBps based on data belonging to the first group and second word sequence data having a word transmission rate of 74.25 MBps based on data belonging to the second group, obtaining first and second serial data based on the first and second word sequence data, respectively, and transmitting the first and second serial data.

37. A method of transmitting digital data according to claim 36, wherein the 12-bit word digital data are formed to be composed of a first word data sequence representing blue primary color signal information, a second word data sequence representing green primary color signal information and a third word data sequence representing red primary color signal information arranged in parallel.

38. A method of transmitting digital data according to claim 36, wherein each of the first and second word sequence data are formed to be 20-bit word sequence data.

39. A method of transmitting digital data according to claim 36 wherein the first serial data are subjected to E/O conversion to produce a first optical signal, the second serial data are subjected to E/O conversion to produce a second optical signal and the first and second optical signals are transmitted.

40. A method of transmitting digital data according to claim 36 wherein the first and second serial data are multiplexed with each other to produce multiplexed serial data, the multiplex serial data are subjected to E/O conversion to produce an optical signal and the optical signals are transmitted.

41. A method of transmitting digital data comprising the steps of;

processing 30-bit parallel data including Y and $P_B/P_R$ data sequences of 20-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, obtaining first and second serial data based on the first and second 20-bit word sequence data, respectively, and transmitting the first and second serial data.

42. A method of transmitting digital data according to claim 41, wherein the additional information data sequence represents key signal information annexed to the digital video signal.

43. A method of transmitting digital data comprising the steps of;

processing 40-bit parallel data including G, B and R data sequences of 30-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to put 10-bit words constituting each of the G, B and R data sequences and the additional information data sequence in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group, obtaining first and second serial data based on the first and second 20-bit word sequence data, respectively, and transmitting the first and second serial data.

44. A method of transmitting digital data according to claim 43, wherein the additional information data sequence represents key signal information annexed to the digital video signal.

45. A method of transmitting digital data comprising the steps of;

processing 36-bit parallel data including Y and $P_B/P_R$ data sequences of 24-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence, obtaining first and second serial data based on the first and second 20-bit word sequence data, respectively, and transmitting the first and second serial data.

46. A method of transmitting digital data according to claim 45, wherein the additional information data sequence represents key signal information annexed to the digital video signal.

47. A method of transmitting digital data comprising the steps of;
processing 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence,
obtaining first, second and third serial data based on the first, second and third 20-bit word sequence data, respectively, and
transmitting the first to third serial data.

48. A method of transmitting digital data according to claim 47, wherein the additional information data sequence represents key signal information annexed to the digital video signal.

49. A method of transmitting digital data comprising the steps of;
processing 48-bit parallel data including G, B and R data sequences of 36-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence,
obtaining first, second and third serial data based on the first, second and third 20-bit word sequence data, respectively, and
transmitting the first to third serial data.

50. A method of transmitting digital data according to claim 49, wherein the additional information data sequence represents key signal information annexed to the digital video signal.

51. A method of transmitting digital data comprising the steps of;
processing 30-bit parallel data including Y and $P_B/P_R$ data sequences of 20-bit word sequence data having a word transmission rate of 148.5 MBps and constituting a digital video signal, which have a frame rate of 50 Hz or 630 Hz, 1125 lines per frame, 1080 active lines per frame, a sampling frequency of 1438.5 MHz and 1920 active data samples per line, and an additional information data sequence of 10-bit word sequence data formed with a data format similar to the data format of the Y data sequence and having a word transmission rate of 148.5 MBps, in such a manner as to put the Y and $P_B/P_R$ data sequences in first and second 20-bit word group alternately at every line portion so as to form first and second 20-bit word sequence data having a word transmission rate of 0.74.25 MBps based on the first and second 20-bit word group, respectively, and form a third 20-bit word sequence data having a word transmission rate of 74.25 MBps based on the additional information data sequence,
obtaining first, second and third serial data based on the first, second and third 20-bit word sequence data, respectively, and
transmitting the first to third serial data.

52. A method of transmitting digital data according to claim 51, wherein the additional information data sequence represents key signal information annexed to the digital video signal.

53. A method of transmitting digital data comprising the steps of;
putting 40-bit parallel data including G, B and R data sequences of 30-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 10-bit word sequence data formed with a data format similar to the data format of the G data sequence and having a word transmission rate of 148.5 MBps, in first and second 40-bit word groups alternately at every line portion so as to form first and second divided 40-bit parallel data having a word transmission rate of 74.25 MBps based on the Y and $P_B/P_R$ data sequences, respectively,
processing the first divided 40-bit parallel data in such a manner as to put 10-bit words constituting the G, B and R data sequences and the additional information data sequence contained in the first divided 40-bit parallel data in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences, and form first and second 20-bit word sequence data each having a word transmission rate of 74.25 MBps based on the first and second word groups, respectively,
processing the second divided 40-bit parallel data in such a manner as to put 10-bit words constituting the G, B and R data sequences and the additional information data sequence contained in the second divided 40-bit parallel data in a third word group including the 10-bit words constituting the G data sequence and a part of the 10-bit words constituting the B and R data sequences and a fourth word group including the 10-bit words constituting the additional information data sequence and another part of the 10-bit words constituting the B and R data sequences, and form third and fourth 20-bit word sequence data each having a word transmission rate of 74.25 MBps based on the third and fourth word groups, respectively, obtaining first, second, third and fourth serial data based on the first, second, third and fourth 20-bit word sequence data, respectively, and transmitting the first to fourth serial data.

54. A method of transmitting digital data according to claim 53, wherein the additional information data sequence represents key signal information annexed to the digital video signal.

55. A method of transmitting digital data comprising the steps of;

putting 36-, 42- or 48-bit parallel data including Y and $P_B/P_R$ data sequences of 24-, 28- or 32-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 12-, 14- or 16-bit word sequence data formed with a data format similar to the data format of the Y data sequence and having a word transmission rate of 148.5 MBps, in first and second 36-, 42- or 48-bit word groups alternately at every line portion so as to form first and second divided 36-, 42- or 48-bit parallel data having a word transmission rate of 74.25 MBps based on the first and second 36-, 42- or 48-bit word groups, respectively, processing the first divided 36-, 42- or 48-bit parallel data in such a manner as to divide each 12-, 14- or 16-bit word constituting the Y and $P_B/P_R$ data sequences and the additional information data sequence contained in the first divided 36-, 42- or 48-bit parallel data in to a first upper 10-bit portion and a first lower 2-, 4- or 6-bit portion, and form first 20-bit word sequence data having a word transmission rate of 74.25 MBps based on the first upper 10-bit portions divided from the Y and $P_B/P_R$ data sequences, second 20-bit word sequence data having a word transmission rate of 74.25 MBps based on the first lower 2-, 4- and 6-bit portions divided from the Y and $P_B/P_R$ data sequences, and third 20-bit word sequence data having a word transmission rate of 74.25 MBps based on the first upper 10-bit portions and the first lower 2-, 4- and 6-bit portions divided from the additional information data sequence, processing the second divided 36-, 42- or 48-bit parallel data in such a manner as to divide each 12-, 14- or 16-bit word constituting the Y and $P_B/P_R$ data sequences and the additional information data sequence contained in the second divided 36-, 42- or 48-bit parallel data in to a second upper 10-bit portions and a second lower 2-, 4- or 6-bit portion, and form fourth 20-bit word sequence data having a word transmission rate of 74.25 MBps based on the second upper 10-bit portions divided from the Y and $P_B/P_R$ data sequences, fifth 20-bit word sequence data having a word transmission rate of 74.25 MBps based on the second lower 2-, 4- and 6-bit portions divided from the Y and $P_B/P_R$ data sequences, and sixth 20-bit word sequence data having a word transmission rate of 74.25 MBps based on the second upper 10-bit portions and the second lower 2-, 4- and 6-bit portions divided from the additional information data sequence, obtaining first, second, third, fourth, fifth and sixth serial data based on the first, second, third, fourth, fifth and sixth 20-bit word sequence data, respectively, and transmitting the first to sixth serial data.

56. A method of transmitting digital data according to claim 55, wherein the additional information data sequence represents key signal information annexed to the digital video signal.

57. A method of transmitting digital data comprising the steps of;

putting 48-bit parallel data including G, B and R data sequences of 36-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 12-bit word sequence data formed with a data format similar to the data format of the G data sequence and having a word transmission rate of 148.5 MBps, in first and second 48-bit word groups alternately at every line portion so as to form first and second divided 48-bit parallel data having a word transmission rate of 74.25 MBps based on the first and second 48-bit word groups, respectively, processing the first divided 48-bit parallel data in such a manner as to divide each 12-bit word constituting the G, B and R data sequences and the additional information data sequence contained in the first divided 48-bit parallel data in to a first upper 10-bit portion and a first lower 2-bit portion, and form first 20-bit word sequence data having a word transmission rate of 74.25 MBps based on the first upper 10-bit portions divided from the G data sequence and a part of the first upper 10-bit portions divided from the B and R data sequences, second 20-bit word sequence data having a word transmission rate of 74.25 MBps based on another part of the first upper 10-bit portions divided from the B and R data sequences and the first lower 2-bit portions divided from the G, B and R data sequence, and third 20-bit word sequence data having a word transmission rate of 74.25 MBps based on the first upper 10-bit portions and the first lower 2-bit portions divided from the additional information data sequence, processing the second divided 48-bit parallel data in such a manner as to divide each 12-bit word constituting the G, B and R data sequences and the additional information data sequence contained in the second divided 48-bit parallel data in to a second upper 10-bit portion and a second lower 2-portion, and form fourth 20-bit word sequence data having a word transmission rate of 74.25 MBps based on the second upper 10-bit portions divided from the G data sequence and a part of the second upper 10-bit portions divided from the B and R data sequences, fifth 20-bit word sequence data having a word transmission rate of 74.25 MBps based on another part of the second upper 10-bit portions divided from the B and R data sequences and the second lower 2-bit portions divided from the G, B and R data sequence, and sixth 20-bit word sequence data having a word transmission rate of 74.25 MBps based on the second upper 10-bit portions and the second lower 2-bit portions divided from the additional information data sequence, obtaining first, second, third, fourth, fifth and sixth serial data based on the first, second, third, fourth, fifth and sixth 20-bit word sequence data, respectively, and transmitting the first to sixth serial data.

58. A method of transmitting digital data according to claim 57, wherein the additional information data sequence represents key signal information annexed to the digital video signal.

59. A method of transmitting digital data comprising the steps of;

processing 30-bitparallel data including Y and $P_B/P_R$ data sequences of 20-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, obtaining first and second serial data based on the first and second 20-bit word sequence data, respectively, and transmitting the first and second serial data.

60. A method of transmitting digital data according to claim 59, wherein the additional information data sequence represents key signal information annexed to the digital video signal.

61. A method of transmitting digital data comprising the steps of;

processing 40-bit parallel data including G, B and R data sequences of 30-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the G data sequence and having a word transmission rate of 74.25 MBps, in such a manner as to put 10-bit words constituting each of the G, B and R data sequences and the additional information data sequence in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group, obtaining first and second serial data based on the first and second 20-bit word sequence data, respectively, and transmitting the first and second serial data.

62. A method of transmitting digital data according to claim 61, wherein the additional information data sequence represents key signal information annexed to the digital video signal.

63. A method of transmitting digital data comprising the steps of;

processing 36-bit parallel data including Y and $P_B/P_R$ data sequences of 24-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence, obtaining first and second serial data based on the first and second 20-bit word sequence data, respectively, and transmitting the first and second serial data.

64. A method of transmitting digital data according to claim 63, wherein the additional information data sequence represents key signal information annexed to the digital video signal.

65. A method of transmitting digital data comprising the steps of;

processing 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence, obtaining first, second and third serial data based on the first, second and third 20-bit word sequence data, respectively, and transmitting the first to third serial data.

66. A method of transmitting digital data according to claim 65, wherein the additional information data sequence represents key signal information annexed to the digital video signal.

67. A method of transmitting digital data comprising the steps of;
processing 48-bit parallel data including G, B and R data sequences of 36-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence,
obtaining first, second and third serial data based on the first, second and third 20-bit word sequence data, respectively, and
transmitting the first to third serial data.

68. A method of transmitting digital data according to claim 67, wherein the additional information data sequence represents key signal information annexed to the digital video signal.

69. An apparatus for transmitting digital data comprising;
a data processing portion operative to divide each of 12-, 14- or 16-bit words contained in 12-, 14- or 16-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh (h indicates a hexadecimal number) are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, into an upper 10-bit portion and a lower 2-, 4- or 6-bit portion, and to form first word sequence data having a word transmission rate of 74.25 MBps based on the upper 10-bit portions and second word sequence data having a word transmission rate of 74.25 MBps based on the lower 2-, 4- or 6-bit portions,
a first parallel to serial (P/S) converting portion for obtaining first serial data based on the first word sequence data,
a second P/S converting portion for obtaining second serial data based on the second word sequence data, and
a data transmitting portion for transmitting the first and second serial data obtained from the first and second P/S converting portions, respectively.

70. An apparatus for transmitting digital data comprising;
a data processing portion operative to divide each of 12-bit words contained in 12-bit word digital data constituting a digital video signal, which have a frame rate of 24 Hz, 25 Hz or 30 Hz, 1125 lines per frame, 1080 active lines per frame, a sampling frequency of 74.25 MHz and 1920 active data samples per line and in which 12-bit codes each containing an upper 8-bit portion representing 00h or FFh (h indicates a hexadecimal number) are predetermined to be forbidden code for each active line, into an upper 10-bit portion and a lower 2-bit portion, to put the upper 10-bit portions in first and second groups, to multiplex the lower 2-bit portions with one another at every predetermined numbers thereof to be caused to join in the second group, and to form first word sequence data having a word transmission rate of 74.25 MBps based on data belonging to the first group and second word sequence data having a word transmission rate of 74.25 MBps based on data belonging to the second group,
a first P/S converting portion for obtaining first serial data based on the first word sequence data,
a second P/S converting portion for obtaining second serial data based on the second word sequence data, and
a data transmitting portion for transmitting the first and second serial data obtained from the first and second P/S converting portions, respectively.

71. An apparatus for transmitting digital data comprising;
a data processing portion operative to put 12-, 14- and 16-bit word digital data constituting a digital video signal, which have a frame rate of 50 Hz or 60 Hz, 1125 lines per frame, 1080 active lines per frame, a sampling frequency of 148.5 MHz and 1920 active data samples per line and in which 12-bit codes each containing an upper 8-bit portion representing 00h or FFh (h indicates a hexadecimal number) are predetermined to be forbidden code for each active line in case of the 12-bit word digital data, 14-bit codes each containing an upper 8-bit portion representing 00h or FFh are predetermined to be forbidden code for each active line in case of the 14-bit word digital data, and 16-bit codes each containing an upper 8-bit portion representing 00h or FFh are predetermined to be forbidden code for each active line in case of the 16-bit word digital data, in first and second groups alternately at every line portion, to form first word sequence data having a word transmission rate of 74.25 MBps based on data belonging to the first group and second word sequence data having a word transmission rate of 74.25 MBps based on data belonging to the second group, to process the first word sequence data in such a manner as to divide each 12-, 14- or 16-bit word contained in the first word sequence data into a first upper 10-bit portion and a first lower 2-, 4- or 6-bit portion and form third word sequence data having a word transmission rate of 74.25 MBps based on the first upper 10-bit portions and fourth word sequence data having a word transmission rate of 74.25 MBps based on the first lower 12-, 14- or 16-bit portions, and to process the second word sequence data in such a manner as to divide each 12-, 14- or 16-bit word contained in the second word sequence data into a second upper 10-bit portion and a second lower 2-, 4- or 6-bit portion and form fifth word sequence data having a word transmission rate of 74.25 MBps based on the second upper 10-bit portions and sixth word sequence data having a word transmission rate of 74.25 MBps based on the second lower 2-, 4- or 6-bit portions, a first S/P converting portion for obtaining first serial data based on the third word sequence data, a second S/P converting portion for obtaining second serial data based on the fourth word sequence data, a third S/P converting portion for obtaining third serial data based on the fifth word sequence data, a fourth S/P converting portion for obtaining fourth serial data based on the sixth word sequence data, and a data transmitting portion for transmitting the first to fourth serial data obtained from the first to fourth S/P converting portions, respectively.

72. An apparatus for transmitting digital data comprising;

a data processing portion operative to put 12-bit word sequences constituting a digital video signal, which have a frame rate of 50 Hz or 60 Hz, 1125 lines per frame, 1080 active lines per frame, a sampling frequency of 148.5 MHz and 1920 active data samples per line and in which 12-bit codes each containing an upper 8-bit portion representing 00h or FFh (h indicates a hexadecimal number) are predetermined to be forbidden code for each active line, in first and second groups alternately at every line portion, to form first word sequence data having a word transmission rate of 74.25 MBps based on data belonging to the first group and second word sequence data having a word transmission rate of 74.25 MBps based on data belonging to the second group, to process the first word sequence data in such a manner as to divide each 12-bit word contained in the first word sequence data into a first upper 10-bit portion and a first lower 2-bit portion, put the first upper 10-bit portions in first and second 10-bit groups, multiplex the first lower 2-bit portions with one another at every predetermined numbers thereof to be caused to join in the second 10-bit group, and form third word sequence data having a word transmission rate of 74.25 MBps based on data belonging to the first 10-bit group and fourth word sequence data having a word transmission rate of 74.25 MBps based on data belonging to the second 10-bit group, and to processing the second word sequence data in such a manner as to divide each 12-bit word contained in the second word sequence data into a second upper 10-bit portion and a second lower 2-bit portion, put the second upper 10-bit portions in third and fourth 10-bit groups, multiplex the second lower 2-bit portions with one another at every predetermined numbers thereof to be caused to join in the fourth 10-bit group, and form fifth word sequence data having a word transmission rate of 74.25 MBps based on data belonging to the third 10-bit group and sixth word sequence data having a word transmission rate of 74.25 MBps based on data belonging to the fourth 10-bit group, a first S/P converting portion for obtaining first serial data based on the third word sequence data, a second S/P converting portion for obtaining second serial data based on the fourth word sequence data, a third S/P converting portion for obtaining third serial data based on the fifth word sequence data, a fourth S/P converting portion for obtaining fourth serial data based on the sixth word sequence data, and a data transmitting portion for transmitting the first to fourth serial data obtained from the first to fourth S/P converting portions, respectively.

73. An apparatus for transmitting digital data comprising;

a data processing portion operative to divide each of 12-, 14- or 16-bit words contained in 12-, 14- or 16-bit word digital data constituting a digital video signal, which have a frame rate of 60 Hz, 750 lines per frame, 720 active lines per frame and 1280 active data samples per line, into an upper 10-bit portion and a lower 2-, 4- or 6-bit portion, and to form first word sequence data having a word transmission rate of 74.25 MBps based on the upper 10-bit portions and second word sequence data having a word transmission rate of 74.25 MBps based on the lower 2-, 4- or 6-bit portions, a first S/P converting portion for obtaining first serial data based on the first word sequence data, a second S/P converting portion for obtaining second serial data based on the second word sequence data, and a data transmitting portion for transmitting the first and second serial data obtained from the first and second S/P converting portions, respectively.

74. An apparatus for transmitting digital data comprising;

a data processing portion operative to divide each of 12-bit words contained in 12-bit word digital data constituting a digital video signal, which have a frame rate of 60 Hz, 750 lines per frame, 720 active lines per frame and 1280 active data samples per line, into an upper 10-bit portion and a lower 2-bit portion, to put the upper 10-bit portions in first and second groups, to multiplex the lower 2-bit portions with one another at every predetermined numbers thereof to be caused to join in the second group, and to form first word sequence data having a word transmission rate of 74.25 MBps based on data belonging to the first group and second word sequence data having a word transmission rate of 74.25 MBps based on data belonging to the second group, a first S/P converting portion for obtaining first serial data based on the first word sequence data, a second S/P converting portion for obtaining second serial data based on the second word sequence data, and a data transmitting portion for transmitting the first and second serial data obtained from the first and second S/P converting portions, respectively.

75. An apparatus for transmitting digital data comprising;

a data processing portion operative to process 30-bit parallel data including Y and $P_B/P_R$ data sequences of 20-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

76. An apparatus for transmitting digital data comprising;

a data processing portion operative to process 40-bit parallel data including G, B and R data sequences of 30-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 10-bit word sequence data formed with a data format similar to the data format of the Y data sequence and having a word transmission rate of 74.25 MBps, in such a manner as to put 10-bit words constituting each of the G, B and R data sequences and the additional information data sequence in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

77. An apparatus for transmitting digital data comprising;

a data processing portion operative to process 36-bit parallel data including Y and $P_B/P_R$ data sequences of 24-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

78. An apparatus for transmitting digital data comprising;

a data processing portion operative to process 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

79. An apparatus for transmitting digital data comprising;

a data processing portion operative to process 48-bit parallel data including G, B and R data sequences of 36-bit word sequence data having a word transmission rate of 74.25 MBps and constituting a digital video signal, which have a frame rate of 24 Hz, 25 Hz or 30 Hz, 1125 lines per frame, 1080 active lines per frame, a sampling frequency of 74.25 MHz and 1920 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

80. An apparatus for transmitting digital data comprising;

a data processing portion operative to process 30-bit parallel data including Y and $P_B/P_R$ data sequences of 20-bit word sequence data having a word transmission rate of 148.5 MBps and constituting a digital video signal, which have a frame rate of 50 Hz or 630 Hz, 1125 lines per frame, 1080 active lines per frame, a sampling frequency of 1438.5 MHz and 1920 active data samples per line, and an additional information data sequence of 10-bit word sequence data formed with a data format similar to the data format of the Y data sequence and having a word transmission rate of 148.5 MBps, in such a manner as to put the Y and $P_B/P_R$ data sequences in first and second 20-bit word group alternately at every line portion so as to form first and second 20-bit word sequence data having a word transmission rate of 74.25 MBps based on the first and second 20-bit word group, respectively, and form a third 20-bit word sequence data having a word transmission rate of 74.25 MBps based on the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

81. An apparatus for transmitting digital data comprising;

a data processing portion operative to put 40-bit parallel data including G, B and R data sequences of 30-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 10-bit word sequence data formed with a data format similar to the data format of the G data sequence and having a word transmission rate of 148.5 MBps, in first and second 40-bit word groups alternately at every line portion so as to form first and second divided 40-bit parallel data having a word transmission rate of 74.25 MBps based on the Y and $P_B/P_R$ data sequences, respectively, to process the first divided 40-bit parallel data in such a manner as to put 10-bit words constituting the G, B and R data sequences and the additional information data sequence contained in the first divided 40-bit parallel data in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences, and form first and second 20-bit word sequence data each having a word transmission rate of 74.25 MBps based on the first and second word groups, respectively, and to process the second divided 40-bit parallel data in such a manner as to put 10-bit words constituting the G, B and R data sequences and the additional information data sequence contained in the second divided 40-bit parallel data in a third word group including the 10-bit words constituting the G data sequence and a part of the 10-bit words constituting the B and R data sequences and a fourth word group including the 10-bit words constituting the additional information data sequence and another part of the 10-bit words constituting the B and R data sequences, and form third and fourth 20-bit word sequence data each having a word transmission rate of 74.25 MBps based on the third and fourth word groups, respectively, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, a fourth S/P converting portion for obtaining fourth serial data based on the fourth 20-bit word sequence data, and a data transmitting portion for transmitting the first, second, third and fourth serial data obtained from the first to fourth S/P converting portions, respectively.

82. An apparatus for transmitting digital data comprising;

a data processing portion operative to put 36-, 42- or 48-bit parallel data including Y and $P_B/P_R$ data sequences of 24-, 28- or 32-bit word sequence data having a word transmission rate of 148.5 MBps and constituting a digital video signal, which have a frame rate of 50 Hz or 60 Hz, 1125 lines per frame, 1080 active lines per frame, a sampling frequency of 148.5 MHz and 1920 active data samples per line, and an additional information data sequence of 12-, 14- or 16-bit word sequence data formed with a data format similar to the data format of the Y data sequence and having a word transmission rate of 148.5 MBps, in first and second 36-, 42- or 48-bit word groups alternately at every line portion so as to form first and second divided 36-, 42- or 48-bit parallel data having a word transmission rate of 74.25 MBps based on the first and second 36-, 42- or 48-bit word groups, respectively, to process the first divided 36-, 42- or 48-bit parallel data in such a manner as to divide each 12-, 14- or 16-bit word constituting the Y and $P_B/P_R$ data sequences and the additional information data sequence contained in the first divided 36-, 42- or 48-bit parallel data in to a first upper 10-bit portion and a first lower 2-, 4- or 6-bit portion, and form first 20-bit word sequence data having a word transmission rate of 74.25 MBps based on the first upper 10-bit portions divided from the Y and $P_B/P_R$ data sequences, second 20-bit word sequence data having a word transmission rate of 74.25 MBps based on the first lower 2-, 0.4- and 6-bit portions divided from the Y and $P_B/P_R$ data sequences, and third 20-bit word sequence data having a word transmission rate of 74.25 MBps based on the first upper 10-bit portions and the first lower 2-, 4- and 6-bit portions divided from the additional information data sequence, and to process the second divided 36-, 42- or 48-bit parallel data in such a manner as to divide each 12-, 14- or 16-bit word constituting the Y and $P_B/P_R$ data sequences and the additional information data sequence contained in the second divided 36-, 42- or 48-bit parallel data in to a second upper 10-bit portions and a second lower 2-, 4- or 6-bit portion, and form fourth 20-bit word sequence data having a word transmission rate of 74.25 MBps based on the second upper 10-bit portions divided from the Y and $P_B/P_R$ data sequences, fifth 20-bit word sequence data having a word transmission rate of 74.25 MBps based on the second lower 2-, 4- and 6-bit portions divided from the Y and $P_B/P_R$ data sequences, and sixth 20-bit word sequence data having a word transmission rate of 74.25 MBps based on the second upper 10-bit portions and the second lower 2-, 4- and 6-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, a fourth S/P converting portion for obtaining fourth serial data based on the fourth 20-bit word sequence data, a fifth S/P converting portion for obtaining fifth serial data based on the fifth 20-bit word sequence data, a sixth S/P converting portion for obtaining sixth serial data based on the sixth 20-bit word sequence data, and a data transmitting portion for transmitting the first, second, third, fourth, fifth and sixth serial data obtained from the first to sixth S/P converting portions, respectively.

83. An apparatus for transmitting digital data comprising;

a data processing portion operative to put 48-bit parallel data including G, B and R data sequences of 36-bit word sequence data having a word transmission rate of 148.5 MBps and constituting a digital video signal, which have a frame rate of 50 Hz or 0.60 Hz, 1125 lines per frame, 1080 active lines per frame, a sampling frequency of 148.5 MHz and 1920 active data samples per line, and an additional information data sequence of 12-bit word sequence data formed with a data format similar to the data format of the G data sequence and having a word transmission rate of 148.5 MBps, in first and second 48-bit word groups alternately at every line portion so as to form first and second divided 48-bit parallel data having a word transmission rate of 74.25 MBps based on the first and second 48-bit word groups, respectively, to process the first divided 48-bit parallel data in such a manner as to divide each 12-bit word constituting the G, B and R data sequences and the additional information data sequence contained in the first divided 48-bit parallel data in to a first upper 10-bit portion and a first lower 2-bit portion, and form first 20-bit word sequence data having a word transmission rate of 74.25 MBps based on the first upper 10-bit portions divided from the G data sequence and a part of the first upper 10-bit portions divided from the B and R data sequences, second 20-bit word sequence data having a word transmission rate of 74.25 MBps based on another part of the first upper 10-bit portions divided from the B and R data sequences and the first lower 2-bit portions divided from the G, B and R data sequence, and third 20-bit word sequence data having a word transmission rate of 74.25 MBps based on the first upper 10-bit portions and the first lower 2-bit portions divided from the additional information data sequence, and to process the second divided 48-bit parallel data in such a manner as to divide each 12-bit word constituting the G, B and R data sequences and the additional information data sequence contained in the second divided 48-bit parallel data in to a second upper 10-bit portion and a second lower 2-portion, and form fourth 20-bit word sequence data having a word transmission rate of 74.25 MBps based on the second upper 10-bit portions divided from the G data sequence and a part of the second upper 10-bit portions divided from the B and R data sequences, fifth 20-bit word sequence data having a word transmission rate of 74.25 MBps based on another part of the second upper 10-bit portions divided from the B and R data sequences and the second lower 2-bit portions divided from the G, B and R data sequence, and sixth 20-bit word sequence data having a word transmission rate of 74.25 MBps based on the second upper 10-bit portions and the second lower 2-bit portions divided from the additional information data sequence, a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, a fourth S/P converting portion for obtaining fourth serial data based on the fourth 20-bit word sequence data, a fifth S/P converting portion for obtaining fifth serial data based on the fifth 20-bit word sequence data, a sixth S/P converting portion for obtaining sixth serial data based on the sixth 20-bit word sequence data, and a data transmitting portion for transmitting the first, second, third, fourth, fifth and sixth serial data obtained from the first to sixth S/P converting portions, respectively.

84. An apparatus for transmitting digital data comprising;

a data processing portion operative to process 30-bit parallel data including Y and $P_B/P_R$ data sequences of 20-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the Y data sequence and having a word transmission rate of 74.25 MBps, in such a manner as to form first 20-bit word sequence data having a word transmission rate of 74.25 MBps based on the Y and $P_B/P_R$ data sequences and second 20-bit word sequence data having a word transmission rate of 74.25 MBps based on the additional information data sequence, a first S/P converting portion for obtaining first serial data based on the first 20-bit word sequence data, a second S/P converting portion for obtaining second serial data based on the second 20-bit word sequence data, and a data transmitting portion for transmitting the first and second serial data obtained from the first and second S/P converting portions, respectively.

85. An apparatus for transmitting digital data comprising;
a data processing portion operative to process 40-bit parallel data including G, B and R data sequences of 30-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 10-bit word sequence data formed with a data format similar to the data format of the G data sequence and having a word transmission rate of 74.25 MBps, in such a manner as to put 10-bit words constituting each of the G, B and R data sequences and the additional information data sequence in a first word group including the 10-bit words constituting the G data sequence and a part of the 10-bit words constituting the B and R data sequences and a second word group including the 10-bit words constituting the additional information data sequence and another part of the 10-bit words constituting the B and R data sequences and form first 20-bit word sequence data having a word transmission rate of 74.25 MBps based on the first word group and second 20-bit word sequence data having a word transmission rate of 74.25 MBps based on the second word group,
a first S/P converting portion for obtaining first serial data based on the first 20-bit word sequence data,
a second S/P converting portion for obtaining second serial data based on the second 20-bit word sequence data, and
a data transmitting portion for transmitting the first and second serial data obtained from the first and second S/P converting portions, respectively.

86. An apparatus for transmitting digital data comprising;
a data processing portion operative to process 36-bit parallel data including Y and $P_B/P_R$ data sequences of 24-bit word sequence data having a word transmission rate of 74.25 MBps and constituting a 720P signal, which have a frame rate of 60 Hz, 750 lines per frame, 720 active lines per frame and 1280 active data samples per line, and an additional information data sequence of 12-bit word sequence data formed with a data format similar to the data format of the Y data sequence and having a word transmission rate of 74.25 MBps, in such a manner as to divide each 12-bit word constituting the Y and $P_B/P_R$ data sequences and the additional information data sequence into an upper 10-bit portion and a lower 2-bit portion, and form first 20-bit word sequence data having a word transmission rate of 74.25 MBps based on the upper 10-bit portions divided from the Y and $P_B/P_R$ data sequences and second 20-bit word sequence data having a word transmission rate of 74.25 MBps based on the upper 10-bit portions divided from the additional information data sequence and the lower 2-bit portions divided from the Y and $P_B/P_R$ data sequences and the additional information data sequence,
a first S/P converting portion for obtaining first serial data based on the first 20-bit word sequence data,
a second S/P converting portion for obtaining second serial data based on the second 20-bit word sequence data, and
a data transmitting portion for transmitting the first and second serial data obtained from the first and second S/P converting portions, respectively.

87. An apparatus for transmitting digital data comprising;
a data processing portion operative to process 36-, 42- 48-bit parallel data including Y and $P_B/P_R$ data sequences of 24-, 28- or 32-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-, 14- or 16-bit word sequence data formed with a data format similar to the data format of the Y data sequence and having a word transmission rate of 74.25 MBps, in such a manner as to divide each 12-, 14- or 16-bit word constituting the Y and $P_B/P_R$ data sequences and the additional information data sequence into an upper 10-bit portion and a lower 2-, 4- or 6-bit portion, and form first 20-bit word sequence data having a word transmission rate of 74.25 MBps based on the upper 10-bit portions divided from the Y and $P_B/P_R$ data sequences, second 20-bit word sequence data having a word transmission rate of 74.25 MBps based on the lower 2-, 4- or 6-bit portions divided from the Y and $P_B/P_R$ data sequences and third 20-bit word sequence data based on the upper 10-bit portions and the lower 2-, 4- or 6-bit portions divided from the additional information data sequence,
a first S/P converting portion for obtaining first serial data based on the first 20-bit word sequence data,
a second S/P converting portion for obtaining second serial data based on the second 20-bit word sequence data,
a third S/P converting portion for obtaining third serial data based on the third 20-bit word sequence data, and
a data transmitting portion for transmitting the first, second and third serial data obtained from the first to third S/P converting portions, respectively.

88. An apparatus for transmitting digital data comprising;
a data processing portion operative to process 48-bit parallel data including G, B and R data sequences of 36-bit word sequence data having a word transmission rate of 74.25 MBps and constituting a digital video signal, which have a frame rate of 60 Hz, 750 lines per frame, 720 active lines per frame and 1280 active data samples per line, and an additional information data sequence of 12-bit word sequence data formed with a data format similar to the data format of the G data sequence and having a word transmission rate of 74.25 MBps, in such a manner as to divide each 12-bit word constituting the G, B and R data sequences and the additional information data sequence into an upper 10-bit portion and a lower 2-bit portion, and form first 20-bit word sequence data having a word transmission rate of 74.25 MBps based on the upper 10-bit portions divided from the G data sequence and a part of the upper 10-bit portions divided from the B and R data sequences, second 20-bit word sequence data having a word transmission rate of 74.25 MBps based on another part of the upper 10-bit groups divided from the B and R data sequences and the lower 2-bit portions divided from the G, B and R data sequences and the additional information data sequence and third 20-bit word sequence data based on the upper 10-bit groups and the lower 2-bit portions divided from the additional information data sequence,
a first S/P converting portion for obtaining first serial data based on the first 20-bit word sequence data, a second S/P converting portion for obtaining second serial data based on the second 20-bit word sequence data, a third S/P converting portion for obtaining third serial data based on the third 20-bit word sequence data, and a data transmitting portion for transmitting the first, second and third serial data obtained from the first to third S/P converting portions, respectively.

* * * * *